US012688434B1

(12) United States Patent
Tran

(10) Patent No.: US 12,688,434 B1
(45) Date of Patent: Jul. 21, 2026

(54) GENERATIVE AI SYSTEM

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 0 days.

(21) Appl. No.: 19/326,606

(22) Filed: Sep. 11, 2025

(51) Int. Cl.
*G06N 3/098* (2023.01)
*G06N 3/0495* (2023.01)

(52) U.S. Cl.
CPC ........... *G06N 3/098* (2023.01); *G06N 3/0495* (2023.01)

(58) Field of Classification Search
CPC ...................................................... G06N 20/00
See application file for complete search history.

(56) References Cited

U.S. PATENT DOCUMENTS

| | | | | |
|---|---|---|---|---|
| 2022/0044113 A1* | 2/2022 | Wu | ........................ | G06N 3/0464 |
| 2022/0374717 A1* | 11/2022 | Ki Yeom | ............. | G06N 3/0464 |
| 2025/0045120 A1* | 2/2025 | Rozin | .................. | G06F 12/0862 |
| 2025/0363365 A1* | 11/2025 | Galvin | .................... | G06N 3/045 |

OTHER PUBLICATIONS

Aline, C. et al., "Reimagining model efficiency in generative AI through unified and differentiable quantization approaches," downloaded from <www.preprints.org/frontend/manuscript/ d7a3d4d1263454b18320381933ed3152/download_pub> (Aug. 19, 2025) 21 pp. (Year: 2025).*
Surya, R.Y. et al., "Dynamic resource allocation for distributed tensorflow training in kubernetes cluster," 2019 Intl. Conf. on Data and Software Engineering ICoDSE (2019) 6 pp. (Year: 2019).*
Abadi, M. et al., "TensorFlow: a system for large-scale machine learning," Proc. of the 12th USENIX Symp. on Operating System Design and Implementation OSDI '16 (2016) 21 pp. (Year: 2016).*

* cited by examiner

*Primary Examiner* — Brian M Smith

(57) ABSTRACT

A method for running a multimodal generative artificial intelligence (AI) model includes transforming model parameters of a trained multimodal generative AI network from floating-point precision to selected bit-depth representations including 16-bit, 8-bit or 4-bit integers, wherein quantization comprises minimizing representation error and preserving semantic features across text, image, video, audio, or sensor modalities to reduce memory footprint and computational complexity; packaging the quantized model parameters and network architecture into a compressed deployment bundle; transmitting said bundle to one or more edge devices, wherein model compatibility and runtime configuration for heterogeneous device hardware are validated prior to installation; and conducting AI inference operations on the deployed edge devices with modular lightweight neural network layers, on-device caching of intermediate results, and batched or streaming inference, wherein inference on multimodal inputs is completed without exceeding predetermined device memory or compute constraints while maintaining generative accuracy.

20 Claims, 5 Drawing Sheets

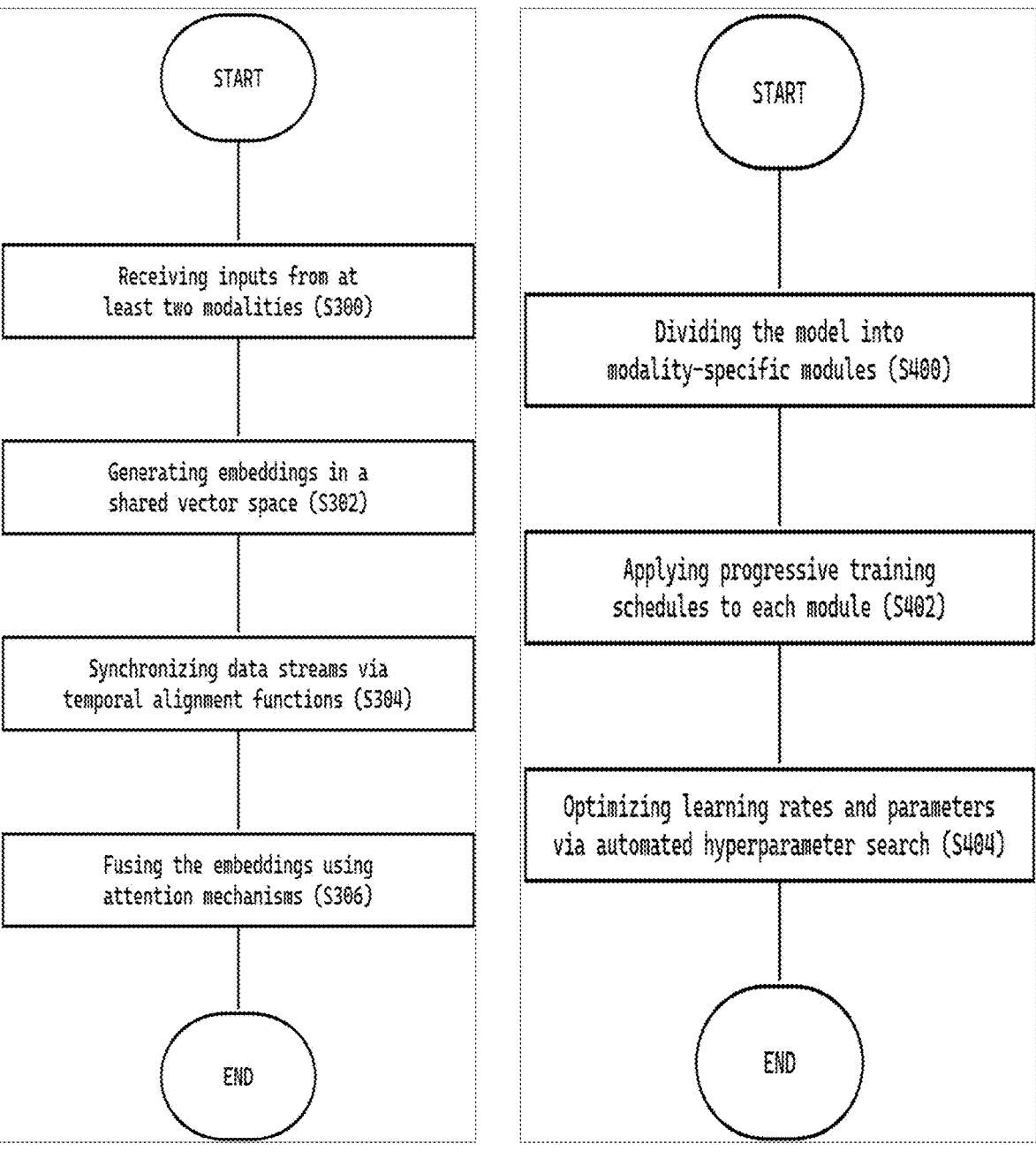
FIGURE 3                              FIGURE 4

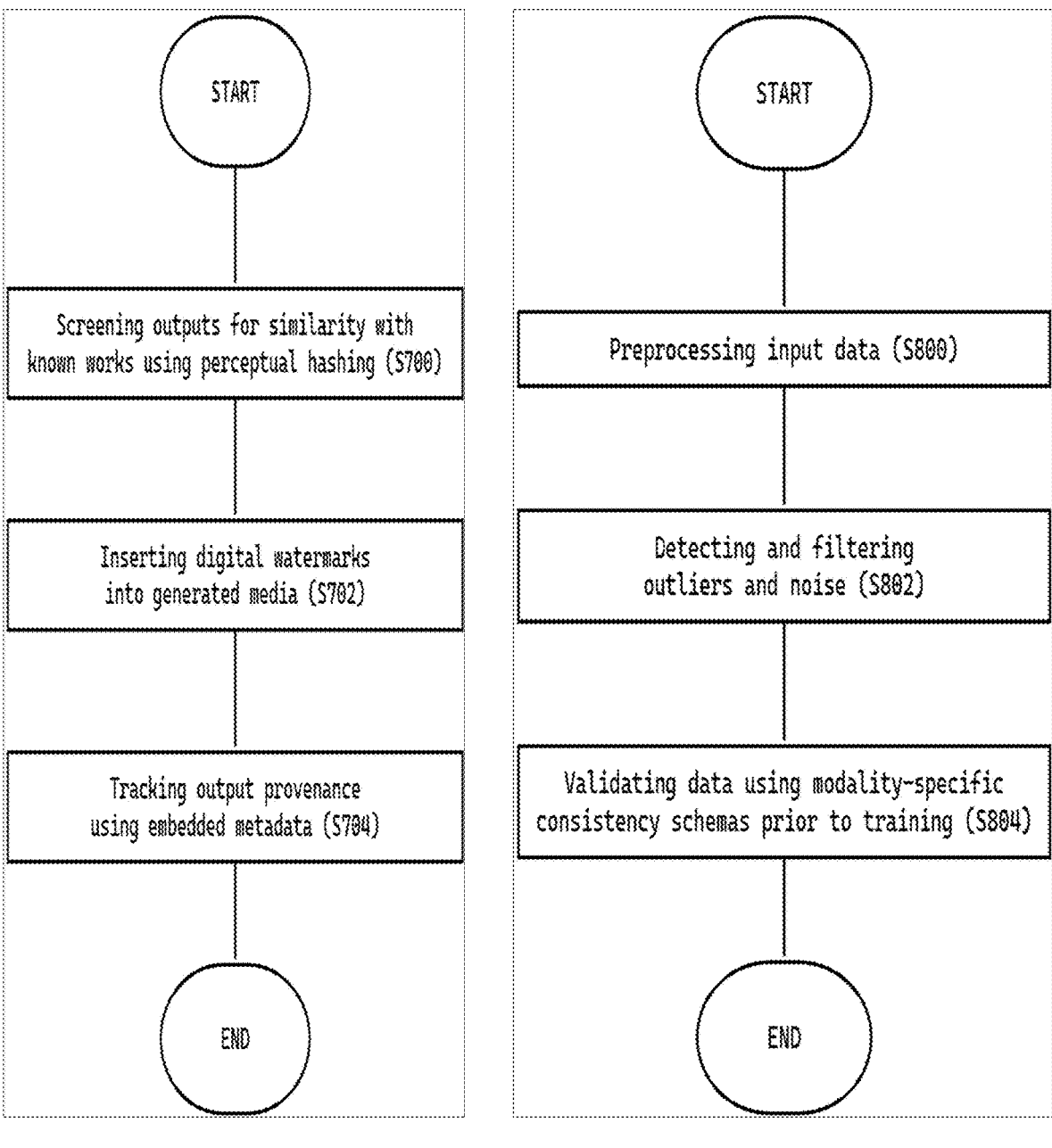
FIGURE 7                              FIGURE 8

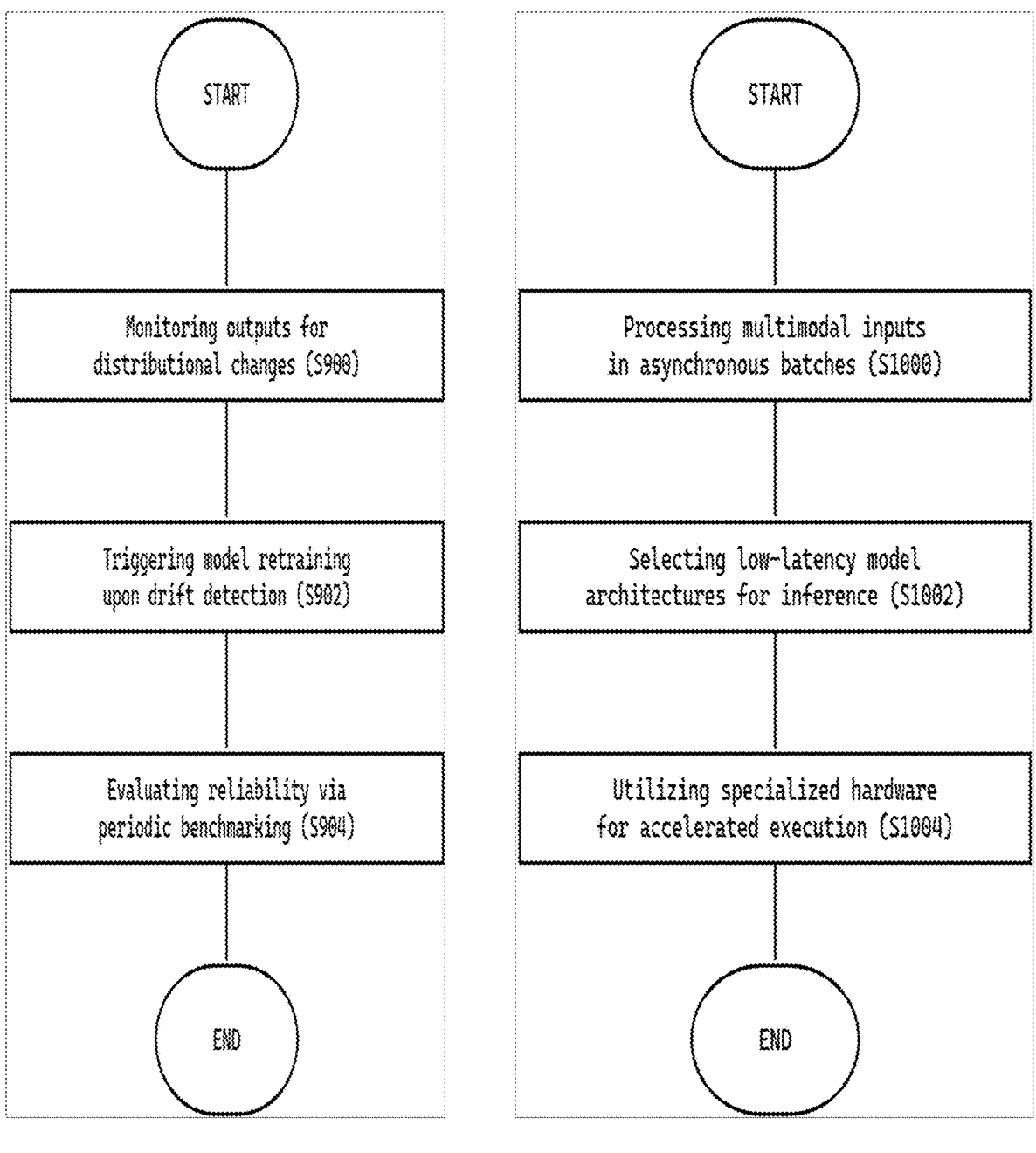
FIGURE 9                    FIGURE 10

GENERATIVE AI SYSTEM

BACKGROUND OF THE INVENTION

Recent advances in deep learning, transformer architectures, and self-supervised pretraining have enabled the emergence of large multimodal generative models capable of producing coherent outputs across text, image, audio, and other sensory domains; however, the development and deployment of such systems continue to face significant technical and organizational challenges.

SUMMARY OF THE INVENTION

A suite of methods for training, scaling, aligning, and governing generative multimodal AI is provided: model computation is distributed across compute nodes with dynamic resource allocation and parameter pruning; training efficiency is improved via synthetic sample generation, data augmentation, and active learning; multimodal inputs are encoded (e.g., image, text, audio), embedded into a shared vector space, temporally aligned, and fused with attention mechanisms; training employs curriculum/progressive schedules, convergence-based stopping, Bayesian and grid/random hyperparameter search, per-module regularization, adaptive per-module learning rates, adversarial training, customized modality-specific losses, gradient-driven sample reordering, batch normalization and dropout, parallel module training, and meta-learning for rapid adaptation; scaling uses quantization, compression, and memory-efficient architectures for edge deployment with hardware and low-level software optimizations (mixed precision, memory scheduling); and data governance and reliability measures include preprocessing and outlier filtering, modality-specific validation schemas, bias detection and reweighting with fairness-constrained retraining, copyright screening via perceptual hashing, imperceptible watermarking and provenance metadata, drift monitoring with retraining triggers and benchmarking, and runtime optimizations such as asynchronous batching, pruning, early-exit mechanisms, and use of specialized accelerators.

In various aspects of the AI system can include one or more of the following:

1. A method for training generative multimodal AI models comprising:

segmenting the neural network model computation into multiple partitions, each partition assigned to a distinct compute node within a distributed computing environment, wherein the segmentation is performed based on layer structure, data modality, or computational demand;

monitoring real-time workload characteristics at each compute node, and dynamically allocating computational resources including processor cores, memory, and network bandwidth to each compute node in response to detected changes in training workload during model training for optimizing throughput and resource utilization;

evaluating the importance of model parameters using a relevance metric selected from parameter magnitude, activation statistics, or contribution to output accuracy, and removing or zeroing model parameters falling below a predefined relevance threshold during or after the training process, wherein the pruning comprises both structured pruning by removing neurons, filters, or layers and unstructured pruning by removing individual weights; and retraining the pruned model for a plurality of epochs to recover performance degraded by parameter removal, and updating the relevance threshold in subsequent pruning iterations to balance model sparsity and accuracy.

2. The method of aspect 1, wherein the distributed compute nodes comprise GPU clusters.

3. The method of aspect 1, wherein the distributed compute nodes comprise TPU clusters.

4. The method of aspect 1, further comprising using a scheduler to prioritize resource allocation.

5. The method of aspect 1, wherein model parameter pruning is based on contribution to output accuracy.

6. The method of aspect 1, further comprising periodically evaluating model performance to adjust the relevance threshold.

7. The method of aspect 1, wherein the model parameters are pruned using L1 regularization.

8. The method of aspect 1, wherein the model parameters are pruned using L2 regularization.

9. The method of aspect 1, further comprising using federated learning for distributed training.

10. The method of aspect 1, further comprising performing asynchronous updates to model weights across nodes.

11. The method of aspect 1, wherein resource allocation includes monitoring real-time hardware utilization.

12. The method of aspect 1, wherein resource allocation is optimized by a reinforcement learning controller.

13. The method of aspect 1, further comprising checkpointing model states to optimize recovery after failure.

14. The method of aspect 1, wherein pruning is performed after each training epoch.

15. The method of aspect 1, wherein pruning is performed after a predefined number of minibatches.

16. The method of aspect 1, wherein nodes communicate updates using a high-speed network interface.

17. The method of aspect 1, further comprising compressing model weights post-pruning.

18. The method of aspect 1, wherein the relevance threshold is adaptive.

19. The method of aspect 1, wherein pruned parameters are stored in a sparse format.

20 The method of aspect 1, further comprising monitoring energy consumption and adjusting resource allocation accordingly.

21. A method for improving training efficiency of a generative multimodal artificial intelligence model, comprising: generating synthetic multimodal training samples using one or more generative models configured for distinct modalities; applying data augmentation techniques to real multimodal datasets, the data augmentation techniques including modality-adaptive transformations selected from geometric manipulations for images, pitch and speed alterations for audio, paraphrasing for text, and frame interpolation for video; executing an active learning process to evaluate pooled training data using an uncertainty sampling metric, model output entropy, or diversity score to select informative instances from among synthetic and augmented samples for label refinement; integrating the selected labeled samples into a model training loop for the generative multimodal artificial intelligence model and repeating the training loop for successive cycles to optimize model generalization, data efficiency, and computational cost; wherein the trained model provides improved accuracy and robustness across diverse input modalities while reducing training overhead.

22. The method of aspect 21, wherein synthetic samples are generated using text-to-image models.

23. The method of aspect 21, wherein synthetic samples are generated using video generation models.

24. The method of aspect 21, wherein data augmentation includes image rotations and scaling.

25. The method of aspect 21, wherein data augmentation includes audio pitch shifting.

26. The method of aspect 21, wherein augmentation includes multimodal mixing of real and synthetic data.

27. The method of aspect 21, wherein active learning uses uncertainty sampling.

28. The method of aspect 21, wherein labeling is performed by expert annotators.

29. The method of aspect 21, further comprising validating synthetic data using a discriminator model.

30. The method of aspect 21, further comprising filtering synthetic samples for ethical compliance.

31. The method of aspect 21, wherein augmentation is performed via feature-space transformations.

32. The method of aspect 21, further comprising using bootstrap sampling for data diversity.

33. The method of aspect 21, wherein active learning uses diversity sampling.

34. The method of aspect 21, further comprising storing augmented data in cloud storage.

35. The method of aspect 21, further comprising periodic retraining on newly labeled instances.

36. The method of aspect 21, wherein real and synthetic data are integrated within a unified pipeline.

37. The method of aspect 21, wherein augmentation parameters are adjusted adaptively based on validation accuracy.

38. The method of aspect 21, further comprising multi-stage data augmentation.

39. The method of aspect 21, further comprising prioritizing underrepresented modalities for synthetic data generation.

40. The method of aspect 21, wherein active learning incorporates label propagation.

41. A method for aligning and integrating multimodal inputs in a generative artificial intelligence system, the method comprising:

Receiving input data simultaneously from at least two different modalities, wherein the modalities comprise any combination of image, video, text, audio, sensor signals, or other structured data streams; Transforming each modality's input data into a modality-specific embedding using one or more neural network encoders, wherein the embeddings are mapped into a shared vector space such that inter-modal semantic or temporal relationships are preserved for subsequent fusion;

Synchronizing the embeddings by applying temporal alignment functions-selected from dynamic time warping, time code mapping, or frame-to-frame correspondence algorithms-so that sequential elements or events in different modalities correspond to equivalent time points or contextual features within the shared vector space; and Fusing the temporally aligned embeddings using an attention-based neural network, wherein the attention mechanism computes weighted importance scores across subcomponents of each modality so as to generate integrated fused representations that reflect cross-modal interactions and preserve relevant contextual dependencies between modalities.

42. The method of aspect 41, wherein the modalities comprise video and audio.

43. The method of aspect 41, wherein the modalities comprise image and text.

44. The method of aspect 41, wherein the shared vector space is constructed via contrastive training.

45. The method of aspect 41, wherein temporal alignment is performed via dynamic time warping.

46. The method of aspect 41, wherein attention fusion includes multi-head attention.

47. The method of aspect 41, wherein attention fusion comprises cross-modal self-attention.

48. The method of aspect 41, further comprising normalizing embeddings prior to fusion.

49. The method of aspect 41, wherein the shared vector space is a manifold learned by a neural network.

50. The method of aspect 41, wherein synchronization adapts based on modality-specific lag.

51. The method of aspect 41, further comprising frame-to-frame correspondence calculation.

52. The method of aspect 41, further comprising semantic consistency validation.

53. The method of aspect 41, wherein embeddings are generated by an encoder-decoder model.

54. The method of aspect 41, further comprising hierarchical fusion of multi-level embeddings.

55. The method of aspect 41, further comprising real-time synchronization of streaming inputs.

56. The method of aspect 41, wherein temporal alignment is performed on-server.

57 The method of aspect 41, further comprising using modality masking during attention fusion.

58. The method of aspect 41, wherein cross-modal alignment is validated using a pre-trained model.

59. The method of aspect 41, further comprising outputting an integrated feature vector for downstream tasks.

60. The method of aspect 41, wherein the attention mechanism uses task-specific weights.

61. A method for optimizing the training of a multimodal generative artificial intelligence model, the method comprising:

Partitioning the multimodal generative AI model into a plurality of modality-specific modules, wherein each module is configured to process input data from a corresponding modality-selected from image, text, video, audio, or sensor signals-using distinct subnetwork architectures optimized for said modalities;

Assigning progressive training schedules to each modality-specific module, said schedules comprising curriculum learning, staged data presentation, or adaptive curriculum updates, such that the training loop sequentially introduces samples of increasing complexity or relevance, and wherein training epochs; batch sizes, and regularization parameters for each module are adapted in response to intermediate performance metrics;

Executing an automated hyperparameter optimization process that selects and refines learning rates, weight initialization, dropout ratios, and optimization algorithms for each modality-specific module using a search strategy selected from Bayesian optimization, grid search, or evolutionary algorithms, wherein candidate hyperparameter sets are validated through cross-validation or holdout evaluation to maximize generalization and training efficiency; and Aggregating the outputs of all modality-specific modules into a shared fusion space, followed by joint training of the full multimodal generative AI model, wherein module-level parameters and fusion weights are updated iteratively based on gradient signals and validation scores throughout training cycles.

62. The method of aspect 61, wherein the modules include image, text, and audio encoders.

63. The method of aspect 61, wherein progressive training schedules use curriculum learning.

64. The method of aspect 61, further comprising stopping training of a module upon convergence criteria.

65. The method of aspect 61, wherein hyperparameter optimization comprises Bayesian optimization.

66. The method of aspect 61, wherein regularization is applied separately for each module.

67. The method of aspect 61, further comprising dynamic reordering of training samples based on loss gradients.

68. The method of aspect 61, wherein early fusion of module outputs is performed.

69. The method of aspect 61, wherein late fusion of module outputs is performed.

70 The method of aspect 61, wherein batch normalization is applied at each module interface.

71. The method of aspect 61, wherein dropout regularization is applied during training.

72. The method of aspect 61, further comprising meta-learning for rapid adaptation to new modalities.

73. The method of aspect 61, wherein learning rates are set adaptively per module.

74. The method of aspect 61, further comprising adversarial training for module robustness.

75. The method of aspect 61, wherein loss functions are customized per modality.

0.76. The method of aspect 61, wherein modules are trained in parallel.

77. The method of aspect 61, wherein training schedules are updated based on validation metrics.

78. The method of aspect 61, wherein overfitting is detected via cross-validation.

79. The method of aspect 61, wherein the automated hyperparameter search is grid search.

80. The method of aspect 61, wherein the automated hyperparameter search is random search.

81. A method for scaling a multimodal generative artificial intelligence model, the method comprising:

Transforming the model parameters of a trained multimodal generative AI network from floating-point precision to lower bit-depth representations including 8-bit or 4-bit integers, wherein quantization comprises minimizing representation error and preserving essential semantic features across text, image, video, audio, or sensor modalities to reduce memory footprint and computational complexity;

Packaging the quantized model parameters and network architecture into a compressed deployment bundle, and transmitting said bundle to one or more remote edge devices—selected from smartphones, IoT sensors, embedded systems, or low-resource processors—wherein model compatibility and optimal runtime configuration for heterogeneous device hardware are validated prior to installation; and Conducting AI inference operations on the deployed edge devices using a memory-efficient architecture, said architecture comprising modular lightweight neural network layers, on-device caching of intermediate results, and batched or streaming inference approaches, wherein inference on multimodal inputs is completed without exceeding predetermined device memory or compute constraints while maintaining generative accuracy standards.

82. The method of aspect 81, wherein quantization reduces parameters to 8-bit integers.

83. The method of aspect 81, wherein memory-efficient architecture comprises lightweight transformer layers.

84. The method of aspect 81, further comprising model distillation prior to deployment.

85. The method of aspect 81, wherein inference is performed asynchronously.

86. The method of aspect 81, wherein both weights and activations are quantized.

87. The method of aspect 81, further comprising caching frequently used inputs.

88. The method of aspect 81, wherein edge devices include smartphones.

89. The method of aspect 81, wherein edge devices include embedded systems.

90 The method of aspect 81, wherein compression is performed using principal component analysis.

91. The method of aspect 81, further comprising fallback to cloud-based inference if edge capacity is exceeded.

92. The method of aspect 81, wherein quantization parameters are set based on modality type.

93. The method of aspect 81, further comprising real-time monitoring of device performance.

94. The method of aspect 81, wherein memory-efficient architecture uses knowledge distillation from a teacher model.

95. The method of aspect 81, further comprising dynamic loading of model modules based on task.

96. The method of aspect 81, wherein compressed models retain accuracy above a threshold.

97. The method of aspect 81, wherein model inference is batched.

98. The method of aspect 81, further comprising updating model weights on edge devices periodically.

99. The method of aspect 81, wherein quantization uses uniform or non-uniform schemes.

100. The method of aspect 81, wherein models are deployed in a federated architecture.

101. A method for managing ethical bias and fairness in a multimodal generative artificial intelligence model, the method comprising:

Performing statistical analysis on training datasets comprising two or more modalities—such as images, text, audio, or sensor data—by computing quantitative fairness metrics including demographic parity, equalized odds, or disparate impact, wherein said metrics are used to identify distributional imbalances or outcome disparities across protected attribute groups within each modality and across modality intersections;

Dynamically adjusting the sampling weights of training instances by increasing or decreasing the selection frequency for underrepresented or overrepresented attribute combinations, such that the resulting training batches achieve statistically balanced representation across identified sensitive groups and cross-modal associations, with said reweighting applied iteratively during successive training epochs; and Retraining the multimodal generative AI model using the reweighted data, with the addition of fairness constraints encoded in the model's loss function, wherein said constraints penalize output disparities or biased generative features detected by prior statistical analysis, and wherein constraint parameters are updated adaptively during retraining to maintain or improve fairness metrics over time.

102. The method of aspect 101, wherein fairness constraints are defined by demographic balancing.

103. The method of aspect 101, wherein statistical analysis includes measuring disparate impact.

104. The method of aspect 101, further comprising removing samples identified as proxy discrimination.

105. The method of aspect 101, wherein reweighting is performed iteratively during training.

106. The method of aspect 101, further comprising audit logs for fairness tracking.

107. The method of aspect 101, wherein retraining occurs upon bias detection events.

108. The method of aspect 101, further comprising validation on third-party ethical benchmarks.

109. The method of aspect 101, wherein fairness constraints are dynamically updated.

110. The method of aspect 101, further comprising human review of outputs for bias.

111. The method of aspect 101, wherein reweighting uses adversarial debiasing.

112. The method of aspect 101, wherein bias detection is automated.

113. The method of aspect 101, further comprising differential privacy for personal data protection.

114. The method of aspect 101, wherein model fairness is scored using equality metrics.

115. The method of aspect 101, further comprising publishing a fairness report.

116. The method of aspect 101, wherein outputs are filtered using bias detectors.

117. The method of aspect 101, further comprising stakeholder feedback integration.

118. The method of aspect 101, wherein fairness constraints are based on legal standards.

119. The method of aspect 101, further comprising output balancing by demographic distribution.

120. The method of aspect 101, wherein reweighting uses class rebalancing.

121. A method for ensuring copyright compliance in generative multimodal artificial intelligence outputs, the method comprising:

analyzing AI-generated outputs, including images, video, audio, and text, by applying perceptual hashing to generate compact similarity fingerprints and comparing said fingerprints to a database of known copyrighted works, wherein outputs exhibiting similarity above a predefined threshold are flagged for further review, filtering, or modification;

embedding digital watermarks into the content of AI-generated media—utilizing machine learning-based, cryptographic, or algorithmic watermarking approaches during model output generation—such that the watermark is imperceptible to the end user but detectable by authorized verification systems, and wherein the watermark encodes information corresponding to the generative model, creation timestamp, and source identifiers for subsequent intellectual property validation; and attaching embedded metadata to each AI-generated output that includes cryptographically signed provenance information, such as model identifier, generation date, user or process ID, licensing terms, and copyright compliance status, wherein said metadata adheres to tamper-evident digital standards (such as C2PA or blockchain) and is retained through downstream content dissemination, modification, or storage operations.

122. The method of aspect 121, wherein perceptual hashing is performed using DCT-based algorithms.

123. The method of aspect 121, further comprising maintaining an up-to-date database of copyrighted works.

124. The method of aspect 121, wherein watermarks are invisible during normal viewing.

125. The method of aspect 121, further comprising user notification upon detected similarity.

126. The method of aspect 121, wherein metadata includes timestamp and source model identifier.

127. The method of aspect 121, further comprising automated reporting of compliance incidents.

128. The method of aspect 121, wherein watermarks persist after format conversion.

129. The method of aspect 121, further comprising manual overrides for disputed outputs.

130. The method of aspect 121, wherein embedded metadata uses blockchain verification.

131. The method of aspect 121, further comprising maintaining audit trails for IP review.

132. The method of aspect 121, further comprising flagging outputs with high similarity for human review.

133. The method of aspect 121, wherein watermarking is performed per modality.

134. The method of aspect 121, further comprising version control on generated outputs.

135. The method of aspect 121, wherein compliance checks are periodically updated with new copyright information.

136. The method of aspect 121, further comprising access controls for sensitive outputs.

137. The method of aspect 121, wherein different hashing techniques are combined for detection.

138. The method of aspect 121, further comprising licensing integration for authorized use.

139. The method of aspect 121, further comprising report generation for compliance audits.

140. The method of aspect 121, wherein the similarity threshold is adjustable.

141. A method for enhancing data quality and consistency in a generative multimodal artificial intelligence model, the method comprising:

receiving a dataset comprising inputs from two or more modalities, including at least text, image, audio, or video data, and applying modality-specific preprocessing operations selected from normalization (such as mean-variance scaling, histogram equalization), resizing (for images/videos), tokenization (for text), and spectral filtering (for audio), so as to convert each raw input into a clean, machine-processable format;

analyzing the preprocessed data for statistical outliers and noise artifacts by calculating summary statistics for each modality, applying denoising algorithms (such as Gaussian blur for images, spectral subtraction for audio, spell checking for text), and removing or correcting data samples that fall outside modality-specific quality thresholds or contain missing, corrupted, or anomalous features; and evaluating each modality's cleaned input data against a schema tailored to the expected format and distribution for the modality, such that validation rules enforce conformity to required structures (e.g., image size/ aspect ratios, text language/coding, audio sampling rate, video frame continuity); and, further, excluding data points that fail schema validation to ensure only compliant samples are propagated to downstream training routines.

142. The method of aspect 141, wherein preprocessing includes normalization and scaling.

143. The method of aspect 141, wherein outlier detection uses statistical thresholds.

144. The method of aspect 141, further comprising automatic noise filtering using signal processing.

145. The method of aspect 141, wherein modality-specific schemas are customized per dataset.

146. The method of aspect 141, further comprising missing data imputation.

147. The method of aspect 141, wherein preprocessing pipelines are modular.

148. The method of aspect 141, further comprising logging preprocessing events for monitoring.

149. The method of aspect 141, wherein noise filtering parameters are adaptively updated.

150. The method of aspect 141, further comprising reporting preprocessing statistics to a dashboard.

151. The method of aspect 141, wherein schema validation is run prior to every training session.

152. The method of aspect 141, further comprising dynamic adjustment of schema rules.

153. The method of aspect 141, wherein outlier filtering uses clustering algorithms.

154. The method of aspect 141, further comprising rejection of incomplete data instances.

155. The method of aspect 141, wherein data validation includes semantic checks.

156. The method of aspect 141, further comprising redundancy elimination across modalities.

157. The method of aspect 141, further comprising feedback loops to source systems for correction.

158. The method of aspect 141, wherein preprocessing includes data augmentation.

159. The method of aspect 141, further comprising adaptive retraining based on detected anomalies.

160. The method of aspect 141, wherein data validation uses external benchmarks.

161. A method for managing performance drift and reliability in generative multimodal AI systems comprising: monitoring outputs for distributional changes; triggering model retraining upon drift detection; and evaluating reliability via periodic benchmarking.

162. The method of aspect 161, wherein drift detection uses statistical distance metrics.

163. The method of aspect 161, further comprising storing baseline model outputs for comparison.

164. The method of aspect 161, wherein retraining uses the latest available data.

165. The method of aspect 161, further comprising real-time drift alerts to system operators.

166. The method of aspect 161, further comprising periodic calibration of drift metrics.

167. The method of aspect 161, wherein benchmarks include standard datasets per modality.

168. The method of aspect 161, further comprising automated evaluation on benchmark tasks.

169. The method of aspect 161, wherein retraining uses transfer learning from baseline.

170. The method of aspect 161, wherein drift detection models are updated regularly.

171. The method of aspect 161, further comprising anomaly detection on output streams.

172. The method of aspect 161, further comprising reporting performance drift statistics to stakeholders.

173. The method of aspect 161, further comprising adaptive retraining schedules.

174. The method of aspect 161, wherein reliability metrics are weighted by modality.

175. The method of aspect 161, further comprising human-in-the-loop review of benchmark failures.

176. The method of aspect 161, wherein retraining events are logged for audit.

177. The method of aspect 161, further comprising predicting drift using time series analysis.

178. The method of aspect 161, wherein benchmarking results inform continual improvement.

179. The method of aspect 161, wherein retraining is triggered automatically or manually.

181. A method for optimizing real-time operation and latency in generative multimodal AI models comprising: processing multimodal inputs in asynchronous batches; selecting low-latency model architectures for inference; and utilizing specialized hardware for accelerated execution.

182. The method of aspect 181, wherein asynchronous batching is managed by a queueing system.

183. The method of aspect 181, further comprising prioritizing inputs based on application needs.

184. The method of aspect 181, wherein low-latency models include quantized neural networks.

185. The method of aspect 181, further comprising pipeline parallelism for inference.

186. The method of aspect 181, wherein hardware acceleration uses parallel GPU processing.

187. The method of aspect 181, wherein hardware acceleration uses TPU arrays.

188. The method of aspect 181, further comprising load balancing for server clusters.

189. The method of aspect 181, wherein inference models are selected based on latency profiles.

190. The method of aspect 181, further comprising statistical latency monitoring and adaptation.

191. The method of aspect 181, wherein batches are size-adaptive based on input stream speed.

192. The method of aspect 181, further comprising error detection and recovery in pipelines.

193. The method of aspect 181, further comprising approximate computing for ultra-low latency.

194. The method of aspect 181, further comprising integration with edge computing platforms.

195. The method of aspect 181, wherein hardware utilization is monitored and reported.

196. The method of aspect 181, further comprising dynamic switching between compute modes.

197. The method of aspect 181, wherein specialized hardware includes FPGAs.

198. The method of aspect 181, further comprising quality-of-service guarantees for real-time outputs.

199. The method of aspect 181, further comprising periodic model retraining for latency improvements.

200.
The method of aspect 181, wherein batch processing includes modality-specific optimizations.

More details on the above methods are discussed in Provisional Application 63/880,195 filed Sep. 11, 2025, the content of which is incorporated by reference.

Advantages of one implementation may include one or more of the following:

Reduced training and inference computational cost and energy consumption through dynamic resource allocation, parameter pruning, mixed-precision computation, and memory scheduling.

Improved sample efficiency and faster convergence by leveraging synthetic sample generation, active learning, curriculum/progressive training schedules, and meta-learning techniques.

Enhanced multimodal representation quality and cross-modal alignment via shared embedding spaces, temporal alignment, attention-based fusion, and modality-specific loss functions.

Greater robustness to domain shift, noise, and adversarial inputs through adversarial training, per-module regularization, dropout/batch normalization, and gradient-driven sample reordering.

Lower end-to-end latency and higher throughput in deployment enabled by asynchronous batching, early-exit mechanisms, pruning, and use of specialized accelerators.

Scalable deployment across cloud, datacenter, distributed, and edge environments enabled by quantization, compression, memory-efficient architectures, and heterogeneous hardware/software optimizations.

Reduced memory footprint and improved suitability for edge and mobile inference through model compression, quantization-aware training, and memory-efficient architectures.

Improved model generalization and task adaptation by applying meta-learning, adaptive per-module learning rates, and parallel module training strategies.

Better reliability and stability of training via convergence-based stopping criteria, Bayesian/grid/random hyper-parameter search, and per-module optimization strategies.

Enhanced safety and controllability of generated outputs through conditioning mechanisms, safety filters, perceptual watermarking, copyright screening, and provenance metadata embedding.

Improved data governance, auditability, and traceability through preprocessing/outlier filtering, modality-specific validation schemas, provenance metadata, and lineage tracking.

More equitable model behavior via bias detection, reweighting, and fairness-constrained retraining that reduce disparate performance across subpopulations.

Reduced operational risk and easier maintenance through drift monitoring, benchmarking, and automated retraining triggers.

Flexible trade-off management between accuracy, latency, and cost by enabling configurable pruning, early exits, and per-module computation scaling.

Improved interpretability and debugging support by modular architectures, per-module validations, and explicit provenance and metadata that aid audit and post-hoc analysis.

Faster iteration and lower data labeling cost by prioritizing informative samples (active learning) and augmenting scarce modalities with high-quality synthetic data.

Enhanced intellectual property protection and content provenance via imperceptible watermarking, perceptual hashing, and copyright screening pipelines.

Fine-grained privacy controls and reduced exposure of sensitive data through privacy-preserving training workflows and selective data handling policies integrated into the pipeline.

Reduced infrastructure complexity and better resource utilization through dynamic allocation, node-aware scheduling, and parameter-sharding strategies.

Improved end-user experience through more consistent, controllable, and contextually appropriate multimodal generations across text, image, audio, and other sensory domains.

Support for regulatory and compliance requirements by combining audit logs, provenance metadata, fairness and bias reporting, and retraining governance.

These and other advantages follow from the combined application of the disclosed training, scaling, alignment, deployment, and governance techniques, which together yield multimodal generative systems that are more efficient, robust, adaptable, secure, and auditable.

BRIEF DESCRIPTION OF DRAWINGS

FIG. 3 illustrates a flowchart of a multimodal alignment method comprising receiving inputs from at least two modalities, generating embeddings in a shared vector space, synchronizing data streams via temporal alignment functions, and fusing the embeddings using attention mechanisms.

FIG. 4 depicts a flowchart for optimizing multimodal model training by dividing into modality-specific modules, applying progressive training schedules, and using automated hyperparameter search.

FIG. 7 illustrates a flowchart for copyright compliance that screens outputs via perceptual hashing, inserts digital watermarks, and tracks provenance using embedded metadata.

FIG. 8 illustrates a flowchart showing preprocessing input data, detecting and filtering outliers and noise, and validating data using modality-specific consistency schemas prior to training.

FIG. 9 illustrates a flowchart from start to end showing monitoring outputs for distributional changes (S900), triggering model retraining upon drift detection (S902), and evaluating reliability via periodic benchmarking (S904).

FIG. 10 illustrates a flowchart for real-time operation showing processing multimodal inputs in asynchronous batches (S1000), selecting low-latency model architectures for inference (S1002), and utilizing specialized hardware for accelerated execution (S1004) from start to end.

DETAILED DESCRIPTION OF THE INVENTION

Figure 1:
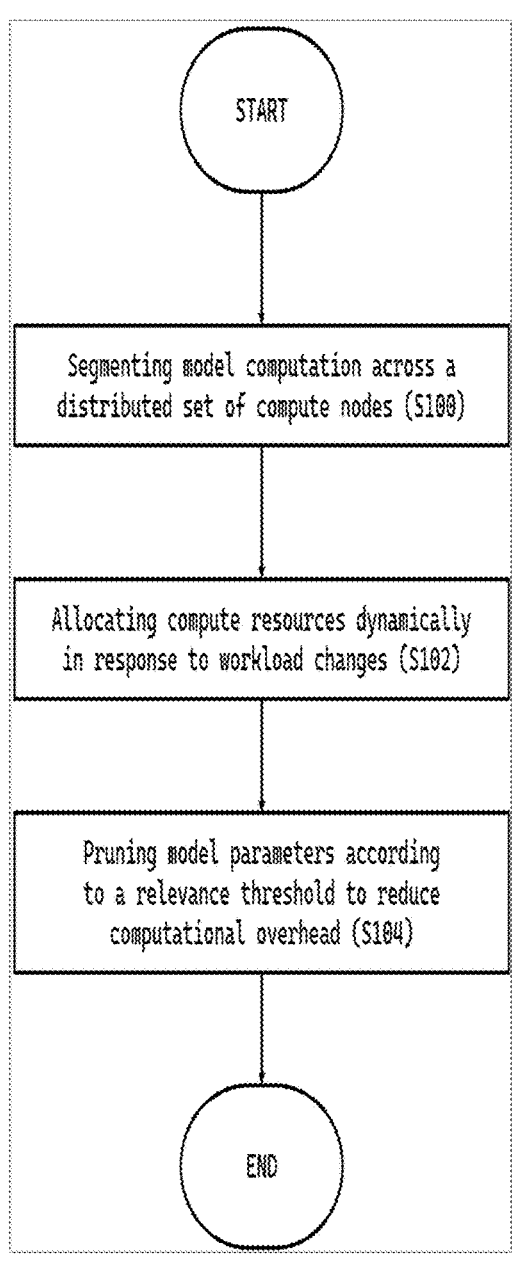
FIG. 1 illustrates flowchart illustrating a method that segments model computation across distributed compute nodes, dynamically allocates compute resources based on workload changes, and prunes model parameters using a relevance threshold to reduce computational overhead.

The present disclosure provides a suite of methods for training, scaling, aligning, and governing generative multimodal artificial intelligence systems that together improve efficiency, robustness, adaptability, security, and auditability. In various embodiments, model computation is partitioned and scheduled across computational resources with dynamic allocation and parameter reduction to match workload demands; training efficiency is enhanced through a combination of synthetic sample generation, data augmentation, active selection of informative instances, and curriculum- and convergence-driven schedules; multimodal inputs are encoded into a shared embedding space, temporally aligned, and fused using attention-driven mechanisms; scaling and deployment employ quantization, compression, and memory-efficient architectures with mixed-precision and hardware-aware optimizations to enable edge inference; and data governance and reliability are addressed through pre-processing, outlier filtering, bias detection and reweighting, copyright screening, watermarking and provenance metadata, drift monitoring with retraining triggers, and runtime optimizations such as asynchronous batching, pruning, and early-exit mechanisms. These techniques can be applied in combination and in coordinated workflows to deliver generative multimodal systems that are more computationally efficient, better aligned to specified objectives, and more readily monitored and maintained.

In one embodiment, segmenting model computation across a distributed set of compute nodes S100 comprises dividing a model into partitions or modules and assigning those partitions to multiple compute nodes so that the aggregate available memory and processing capacity are leveraged to execute models that would not fit or run efficiently on a single node. The segmentation can be performed at granularity ranging from layers to functional modules, and includes placement decisions that consider node heterogeneity, available bandwidth, and latency constraints; inter-node communication is orchestrated to exchange activations, gradients, and parameter updates while minimizing synchronization overhead. Mechanisms for fault tolerance, state checkpointing, and dynamic rebalancing are provided so that compute segments can be migrated or replicated in response to node failures or changing workload patterns, and the segmented execution supports integration with complementary techniques such as dynamic resource allocation and parameter pruning to reduce computational overhead and to enable elastic scaling of training and inference.

Scaling and deployment techniques include quantization, compression, and memory-efficient architectures to enable edge inference, combined with mixed-precision execution, memory scheduling, and system-level software optimizations to exploit specialized accelerators. Data governance and reliability measures encompass input preprocessing, outlier detection and filtering, modality-specific validation schemas, statistical bias detection with reweighting and constrained retraining to satisfy fairness objectives, copyright screening using perceptual hashing, imperceptible watermarking and embedded provenance metadata, drift monitoring with retraining triggers, and periodic benchmarking to assess performance and robustness. Runtime optimizations such as asynchronous batching, model pruning, early-exit mechanisms, and selection of latency-optimized architectures further reduce inference latency and resource consumption.

In one embodiment, compute orchestration continuously monitors workload metrics and telemetry and adjusts allocations of CPU, GPU, memory, or task placements across the distributed fabric to match demand, thereby allocating compute resources dynamically in response to workload changes (S102). This dynamic allocation is implemented via autoscaling policies that instantiate or retire nodes, adjust resource shares, preempt or reprioritize tasks, and select instance types based on performance, cost, and latency constraints, with thresholds and feedback loops that prevent oscillation and ensure stable operation.

In one embodiment, model parameters are pruned according to a relevance threshold to reduce computational overhead (S104). A relevance score is computed for individual parameters or parameter groups based on criteria such as magnitude, gradient contribution, or impact on a validation objective.

Parameters with scores below a configurable threshold are removed, zeroed, or otherwise disabled to reduce memory footprint and inference cost. Pruning can be performed iteratively with intermittent fine-tuning to recover or preserve predictive performance, and can be applied statically after training or dynamically during training and deployment to adapt to changing resource constraints. Pruning operations can be coordinated with distributed computation and dynamic resource allocation to rebalance workloads and maximize efficiency while maintaining model reliability.

Figure 2:
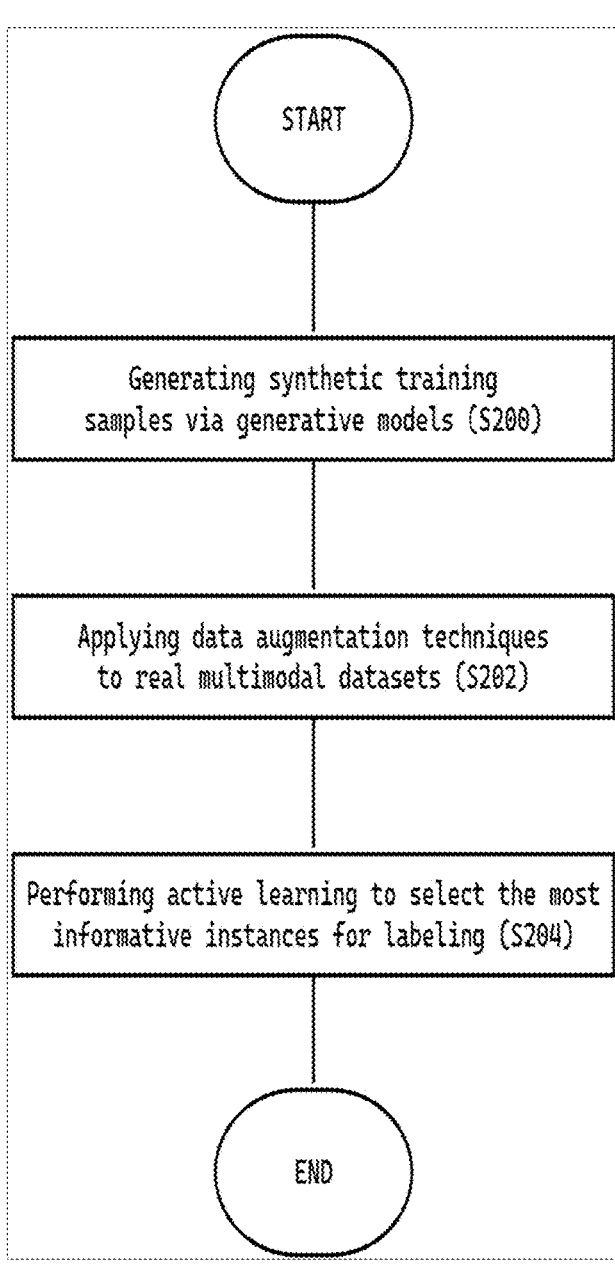
FIG. 2 illustrates flowchart depicting start-to-end steps for multimodal AI training: generating synthetic samples (S200), applying data augmentation (S202), and performing active learning for labeling (S204).

FIG. 2 illustrates a start-to-end flow for multimodal AI training. In step S200, synthetic training samples are generated via generative models. The resulting synthetic samples are combined with real multimodal datasets and, in step S202, data augmentation techniques are applied to these combined sources. In step S204, active learning operates on the pooled augmented real data and the generated samples to select the most informative instances for labeling, the labeled outputs being used to train or update the multimodal model.

In step S200, synthetic training samples are produced by one or more generative models to expand and diversify the training corpus. The generative process is conditioned on available labels, prompts, or paired modalities so that outputs exhibit task-relevant attributes while preserving cross-modal correspondence. Where appropriate, annotations are propagated from conditioning signals or simulator states to the generated outputs, and provenance metadata is attached for downstream governance. Quality and diversity controls are applied to remove samples judged to have limited utility or to be redundant prior to inclusion in subsequent training phases, as depicted in FIG. 2, where S200 precedes augmentation and active learning.

At S202, data augmentation is applied to real multimodal datasets to increase sample diversity while preserving cross-modal semantics. Image streams can undergo randomized crops, geometric transforms, color perturbations, blur, and compression simulation; text counterparts can be paraphrased via back-translation, token masking, and synonym substitution; audio segments can receive time-stretch, pitch shift, additive noise, and room impulse response convolution. Transformations are synchronized across modalities so that augmented images, audio, and text remain temporally and spatially aligned, with labels and metadata updated to reflect the applied operations. Augmentation strength is selected adaptively from a learned policy based on sample difficulty or uncertainty, subject to constraints that limit distributional drift and protect minority classes. The process executes online during training with deterministic seeding for reproducibility, records provenance for each augmented instance, and filters outputs using quality gates that reject semantically degraded samples.

The model can be divided into modality-specific modules to isolate learning dynamics and promote parallelism (S400). Progressive training schedules are applied per module to enable curriculum or staged optimization and to stabilize convergence (S402), with automated search routines tuning learning rates and other hyperparameters to achieve targeted performance and efficiency objectives (S404). For deployment, parameters are quantized to reduce memory footprint and bandwidth needs (S500), compressed variants are delivered to edge devices to bring inference closer to data sources (S502), and inference is executed using memory-efficient architectures suitable for constrained environments (S504). Data governance and reliability measures include detecting bias in source datasets using statistical tests (S600), reweighting samples to balance representation (S602), and retraining under fairness-constrained objectives to mitigate disparate error rates (S604). Outputs are screened for similarity to known works via perceptual hashing to support copyright compliance (S700), digital watermarks are inserted into generated media to enable traceability (S702), and embedded metadata is maintained to track provenance across transformations (S704). Upstream data is preprocessed to normalize and standardize inputs (S800), with outliers and noise filtered using robust estimators (S802), and modality-specific consistency schemas applied prior to training for validation (S804). During operation, outputs are monitored for distributional change indicating potential drift (S900), with retraining triggered when thresholds or statistical tests are met (S902) and reliability evaluated via periodic benchmarking using fixed suites (S904). Runtime performance is optimized by processing multimodal inputs in asynchronous batches to match heterogeneous arrival rates (S1000), selecting latency-optimized model architectures for inference while meeting quality targets (S1002), and utilizing specialized hardware for accelerated execution with mixed-precision and memory scheduling optimizations (S1004). FIG. 2 illustrates a representative training data enrichment flow comprising generation of synthetic samples (S200), augmentation of real datasets (S202), and active-learning selection for labeling (S204).

The reference label S204 denotes performing active learning to select the most informative instances for labeling. In S204, a candidate pool is scored using acquisition metrics such as predictive uncertainty, expected error reduction, or diversity with respect to the labeled set and the model's embedding space. A budget-constrained subset is chosen to maximize the utility of new annotations, optionally balancing uncertainty with coverage across modalities and classes. Selected instances are routed to an annotation interface, labels are verified, and the labeled pool is updated; the model is then incrementally retrained or fine-tuned, and the selection process is repeated until a stopping condition such as convergence, budget exhaustion, or stability of acquisition scores is met.

FIG. 3 illustrates a flowchart of a multimodal alignment method in which, at S300, inputs from at least two modalities are received; the resulting signals feed S302, where they are encoded to generate embeddings in a shared vector space; these embeddings pass to S304, where their data streams are synchronized via temporal alignment functions; and the temporally aligned embeddings are then provided to S306, where they are fused using attention mechanisms to yield a joint representation, with each stage sequentially dependent on the preceding one.

In operation S302, the method generates modality-agnostic representations by mapping features from each modality-specific encoder into a common latent dimensionality. For each input stream, a learned projection head converts native features into d-dimensional vectors using a linear or multilayer perceptron mapping with normalization. The shared space is defined by a similarity metric, such as cosine or a learned Mahalanobis distance, and embeddings are L2-normalized with optional whitening and temperature scaling so that distances reflect cross-modal semantic correspondence. Sequence-level token vectors and pooled clip or segment vectors are produced using attention pooling or masked averaging, preserving both local and global context for downstream processing.

Training of S302 jointly optimizes all projection heads so that paired samples from different modalities are close while non-paired samples are separated. Contrastive, triplet, or InfoNCE-style objectives are employed, optionally combined with label-supervised losses on pooled embeddings and distribution-alignment penalties such as MMD or KL to harmonize modality-specific statistics. To ensure stable optimization across batch sizes and hardware, mixed-precision-compatible normalization, queue-based negative banks, and calibrated scale-and-bias parameters per modality are employed.

S302 handles variable-length and streaming inputs by embedding positional indices instead of imposing a fixed sequence length. It enables efficient deployment via techniques such as weight sharing across projection heads and reduced-rank factorization, and by producing outputs that are ready for quantization. The resulting embeddings provide a uniform interface to downstream stages, supplying temporally indexed vectors to S304 for synchronization and consolidated representations to S306 for attention-based fusion.

At S304, heterogeneous data streams obtained at S300 and embedded at S302 are synchronized to a common temporal reference. The system estimates inter-modal lags using techniques such as cross-correlation, learned offset predictors, dynamic time warping or soft-DTW, and attention-based alignment with positional encodings. Sampling-rate differences and clock drift are compensated by resampling and interpolation, and missing frames are handled with gap filling or masking. A differentiable alignment mapping with per-segment confidence scores is produced, enforcing monotonicity where appropriate (for example, speech-to-text) and preserving causality for streaming operation via bounded look-ahead windows. The mapping yields aligned embedding sequences and corresponding attention masks, smoothing jitter through temporal filtering that attenuates high-frequency components and median stabilization while attenuating contributions from regions with insufficient confidence. For online inference, S304 updates alignments incrementally using sliding windows and buffered timestamps to maintain minimal end-to-end latency. The aligned outputs and masks are emitted for subsequent fusion in S306.

At S306, the system fuses embeddings using attention mechanisms. After generating modality-specific embeddings and performing temporal alignment, each token is projected into query, key, and value spaces and multi-head attention is applied to capture relations within and across modalities. Cross-attention is implemented using a learned fusion token or a target-modality query against keys and values from other modalities to aggregate complementary information, while self-attention over the concatenated sequence preserves intra-modality structure. Alignment offsets and confidence scores are incorporated as masks or additive biases so that attention focuses on time-coincident or reliable tokens and downweights missing or uncertain regions. The attention weights are applied to the values to form per-head fused vectors that are concatenated and linearly projected, then processed with residual connections, normalization, and a position-wise feedforward network to yield a unified representation. Learnable gates or coefficients modulate each modality's contribution, and sparsity or locality constraints can be applied to manage computational cost. The fused representation produced in S306 is provided to subsequent decoding or decision components for training and inference.

FIG. 4 illustrates a flowchart for optimizing multimodal model training. In step S400, the model is divided into modality-specific modules. In step S402, progressive training schedules are applied to each module, optionally in a staged or sequential manner. In step S404, learning rates and other parameters are optimized via an automated hyperparameter search for the individual modules and the combined system. The steps proceed in order and can be iterated until satisfactory convergence, after which the process ends.

In step S400, the multimodal model is partitioned into modality-specific modules, each configured to process a respective input modality and to emit standardized intermediate representations for downstream fusion. The partitioning defines per-modality encoder backbones, projection heads that map features into a shared embedding space, and optional adapters for normalization and temporal alignment, together with explicit interface specifications covering tensor shapes, timing semantics, and gradient routing. Each module is instantiated as an independently addressable component to enable parallel execution, selective freezing or fine-tuning, and modality-aware regularization while preserving compatibility with attention-based fusion layers. Metadata describing module capabilities and resource requirements is registered to support automated scheduling and hyperparameter search, and parameter sharing across modules is scoped to designated adaptor layers to control cross-modal influence.

In some embodiments, applying progressive training schedules to each module (S402) includes training modality-specific components in staged phases that gradually increase task difficulty and model capacity. For a given module, early phases employ coarse inputs, shorter sequences, reduced image resolutions, constrained vocabularies, or elevated noise levels to stabilize optimization, with subsequent phases incrementally relaxing these constraints. The schedule can unfreeze layers in a predefined order, beginning with later layers while keeping front-end feature extractors fixed, then sequentially enabling additional layers as monitored validation loss, gradient norms, or accuracy metrics satisfy stage-transition criteria. Learning rate warmup is used in initial steps followed by cosine decay or stepwise reductions; batch size, sequence length, and input resolution are ramped according to convergence indicators; regularization strength, such as dropout probability or weight decay, is annealed to preserve generalization while allowing later-stage fitting. Loss composition is staged by increasing weights on cross-modal alignment or adversarial objectives after the module demonstrates stability on reconstruction or classification losses. Teacher-forced objectives transition to free-running generation with scheduled sampling, and label smoothing is reduced over phases. The schedule can operate asynchronously across modules so that a faster-converging module advances to later phases while another remains in an earlier phase, with inter-module checkpoints coordinating fusion readiness. Transitions between phases are triggered when moving averages of validation metrics change by less than a predefined threshold over a specified window or when early-stopping guards are cleared, and rollback to prior checkpoints can be performed upon detected instability. The progressive regimen thereby conditions each module to acquire robust fundamental features before undertaking more complex cross-modal behaviors, yielding stable convergence and enhanced downstream fusion performance.

Data quality measures are configured to preprocess input data (S800), detect and filter outliers and noise (S802), and validate data with modality-specific consistency schemas prior to training (S804). Reliability operations monitor outputs for distributional changes (S900), trigger retraining upon drift detection (S902), and evaluate reliability via periodic benchmarking (S904). Runtime performance operations process multimodal inputs in asynchronous batches (S1000), select architectures optimized for minimal latency for inference (S1002), and utilize specialized hardware for accelerated execution (S1004). These coordinated techniques support efficient, robust, adaptable, secure, and auditable multimodal generative systems.

In S404, an automated process explores a defined hyperparameter space to optimize learning rates and associated parameters for each module and for cross-modal fusion. The search employs Bayesian optimization, random search, grid search, or hybrid strategies, and can be distributed to parallelize evaluations. Candidate configurations are assessed using validation metrics that include loss, accuracy for modality-specific tasks, cross-modal alignment scores, fairness constraints, and latency or memory targets. The procedure adapts learning rates per module and per layer, tunes optimizer settings, regularization strengths, dropout probabilities, batch sizes, and attention-fusion parameters, and selects early-stopping criteria. Results are recorded in a search controller, which updates the training configuration for subsequent rounds and promotes top configurations to full training. The selected learning rates and parameters are then committed to the progressive schedules to improve convergence stability and end-to-end performance.

Figures 5, 6:
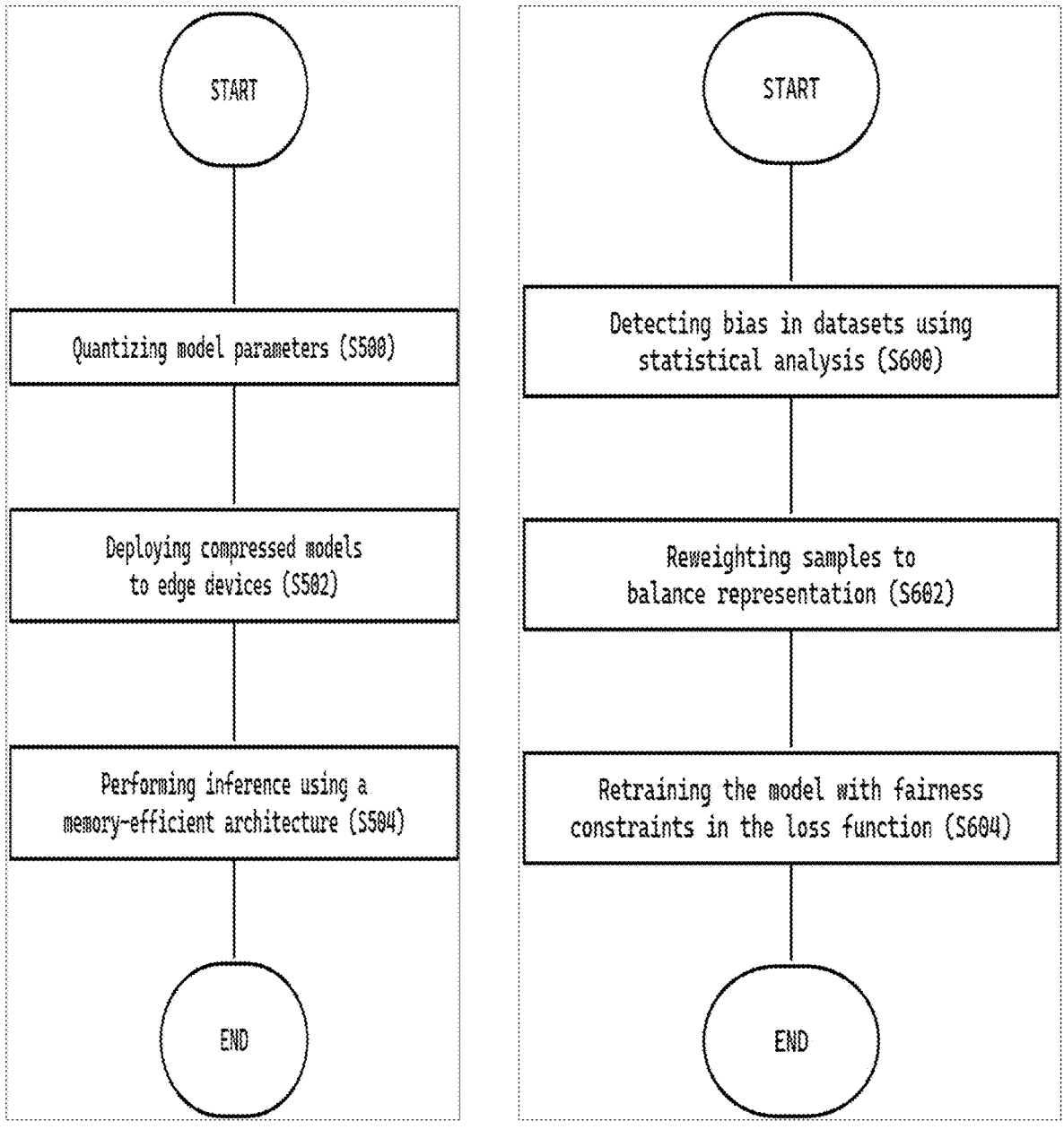
FIG. 5 illustrates a flowchart for scaling multimodal generative AI models by quantizing model parameters (S500), deploying compressed models to edge devices (S502), and performing inference using a memory-efficient architecture (S504).
FIG. 6 illustrates a flowchart for bias detection in datasets, reweighting samples to balance representation, and retraining with fairness constraints.

FIG. 5 illustrates a flow for scaling multimodal generative AI on constrained hardware. In step S500, model parameters are quantized to reduce precision and memory footprint while maintaining target accuracy. The quantized parameters are bundled as a compressed model that, in step S502, is deployed to edge devices via network or local transfer. Using the installed compressed model, the edge device then performs inference in step S504 with a memory-efficient architecture that exploits the quantization to achieve reduced latency and reduced power consumption. The operations proceed sequentially from S500 to S502 to S504.

Quantizing model parameters (S500) converts floating-point weights and activations to reduced-precision numeric formats selected per network layer and tensor to meet target accuracy and hardware constraints. Representative calibration data establish scale and zero-point values that map real-valued ranges to discrete integer levels, using symmetric or asymmetric schemes as appropriate. Weights can be quantized per-channel to better preserve variance, while activations can be quantized per-tensor to simplify execution; mixed-precision assignments are determined based on sensitivity analysis and latency or memory budgets. Quantization-aware training or post-training quantization with bias correction can be employed to compensate for approximation error. The procedure outputs a quantized model artifact with associated quantization parameters that reduce memory footprint and bandwidth while retaining functional equivalence within specified tolerances, preparing the model for deployment steps shown in FIG. 5.

In some embodiments, S502 entails deploying a compressed model artifact produced upstream to heterogeneous edge devices and activating the artifact for on-device inference. The artifact includes a compact model graph, quantized weight tensors, calibration tables, operator libraries, and configuration metadata packaged into a signed container with a version identifier and provenance tags. Device-specific builds are selected based on instruction set, accelerator availability, and memory budget, and the container is delivered via over-the-air update, application store distribution, or sideloading. Upon receipt, the device verifies signature integrity and compatibility, installs the runtime components into a sandboxed execution environment, binds kernels to available accelerators such as NPUs, GPUs, or DSPs, and performs lightweight compilation or linking using vendor toolchains. Weights are memory-mapped from persistent storage, cache warming is performed for hot operators, and allocator parameters are initialized to meet latency and footprint constraints.

Deployment is staged using canary groups with atomic rollback to a prior version if health metrics regress. Telemetry is limited to anonymized performance counters, and no user content is transmitted off device. An optional post-deployment calibration refines quantization scales using locally computed statistics without exposing protected data. The deployed model exposes stable interfaces for multimodal pipelines, negotiates resources with power and thermal governors, and cooperates with background scheduling so that subsequent inference proceeds within target latency and energy envelopes.

FIG. 6 illustrates a sequential flow for mitigating dataset bias. In step S600, bias in datasets is detected using statistical analysis to quantify disparities across protected or underrepresented groups. The detected imbalances inform step S602, in which sample weights are adjusted to balance representation across groups, producing a reweighted training set. The reweighted data and the measured disparities are then used in step S604 to retrain the model with fairness constraints incorporated into the loss function, thereby reducing biased outcomes in subsequent predictions.

Reweighting samples to balance representation (S602) assigns instance weights that counter observed imbalances across protected attributes, classes, or multimodal conditions. Weights can be computed from prevalence statistics estimated during S600, for example by increasing the relative contribution of underrepresented groups and decreasing that of overrepresented groups while capping extremes to preserve numerical stability. The weights are integrated into the training objective so gradient contributions reflect the target distribution rather than the raw dataset distribution, and can be applied per-sample or per-group within each minibatch. The procedure can be combined with augmentation from S202 to ensure synthetic and real samples share a consistent target mix, and can be updated adaptively across epochs as the model or data distribution changes. Reweighting can be performed jointly with curriculum schedules and automated hyperparameter search from S404, enabling coordinated adjustments to learning rates and regularization that account for the modified effective sample sizes. The outcome of S602 is a set of weights and associated metadata that are consumed by S604 to impose fairness-aware loss terms while maintaining model stability and preserving task performance.

For scaling and deployment, parameters can be quantized (S500), compressed models can be deployed to edge devices (S502), and inference can be performed using memory-efficient architectures (S504). Runtime improvements include asynchronous batching of multimodal inputs (S1000), selection of latency-optimized architectures for inference (S1002), and utilization of specialized hardware for accelerated execution (S1004), complemented by mixed-precision computation and memory scheduling.

Governance and reliability features include detecting bias in datasets via statistical analysis (S600), reweighting samples to balance representation (S602), and retraining with fairness constraints in the loss function (S604). Copyright-related controls are provided by screening outputs for similarity to known works using perceptual hashing (S700), inserting digital watermarks into generated media (S702), and tracking provenance with embedded metadata (S704). Operational robustness is supported by monitoring outputs for distributional changes (S900), triggering retraining upon drift detection (S902), and evaluating reliability via periodic benchmarking (S904). The combined application of these techniques produces multimodal generative systems that deliver enhanced computational efficiency, elevated data quality, stronger alignment across modalities, scalable deployment, and trustworthy behavior throughout the model lifecycle.

At S604, the model is retrained using an objective function augmented with fairness constraints that penalize disparities identified during bias analysis and after reweighting. The constraint terms encode metrics such as parity or error-rate balance and are applied alongside the primary task loss so that optimization simultaneously improves task performance and reduces measured inequities. The retraining can reuse the reweighted dataset, adjust per-sample or per-group loss coefficients, and iterate until convergence criteria reflect both accuracy and fairness targets, thereby producing a model whose outputs exhibit reduced bias under the selected statistical definitions.

FIG. 7 illustrates a copyright-compliance flow in which generated outputs are first screened for similarity with known works using perceptual hashing (S700). Based on the screening result, the output is either flagged or allowed to proceed to inserting digital watermarks into the generated media (S702). The system then tracks the output's provenance using embedded metadata (S704), which can include the perceptual hash from S700 and identifiers of the watermark inserted at S702, thereby enabling downstream detection, auditing, and enforcement.

In step S700, a copyright compliance module evaluates a generated output against a corpus of known works using perceptual hashing. The module first normalizes the candidate output per modality, such as resizing and converting to luminance for images or extracting key frames from video, and applying windowed spectral transforms to audio. It then computes one or more perceptual hashes that preserve content characteristics while being resilient to resizing, compression, color shifts, cropping, temporal shifts, or re-encoding. Example hashes include reduced-frequency DCT or wavelet-based pHash variants, gradient or average hash variants, key-frame hashes for video with temporal sampling, and landmark or MFCC-based audio fingerprints. Multiple hashes can be produced at different scales or tiles to improve robustness.

The module queries an index of reference hashes derived from known or licensed works using approximate nearest neighbor search. Similarity is measured via Hamming distance for binary hashes or cosine distance for learned embeddings, and decisions are made using modality-specific thresholds calibrated on validation sets. The result is a similarity score and decision flag indicating allow, block, or review. Matched identifiers, distances, and transformation estimates are recorded for audit and downstream provenance logging, and only outputs that pass S700 proceed to watermark insertion in S702.

In the process of FIG. 7, tracking output provenance using embedded metadata (S704) records, within each generated asset, cryptographically verifiable identifiers that can include a content hash, timestamp, model identifier and version, training data lineage indicators, and license or usage tags. The metadata can be embedded in-band using format-native containers or sidecar manifests linked by strong hashes and digital signatures. During distribution or at any downstream checkpoint, a verifier reads the embedded metadata, validates signatures and hashes against a registry, and associates the asset with a provenance record that logs generation context, post-processing operations, and transfer events. If the embedded data is missing or altered, the verification step flags the asset for remediation, thereby maintaining an auditable chain of custody for generated media.

FIG. 8 illustrates a flowchart in which preprocessing input data (S800) is first applied to raw inputs, the preprocessed outputs are then subjected to detecting and filtering outliers and noise (S802), and the cleaned dataset is subsequently validated using modality-specific consistency schemas prior to training (S804), producing a validated dataset ready for model training.

FIG. 8 illustrates a flow in which preprocessing input data (S800) prepares raw multimodal inputs for downstream training and evaluation by performing operations such as decoding, normalization, tokenization, resampling, time-stamp correction, and feature extraction appropriate to each modality, while preserving associations between modalities to maintain alignment in later stages.

In S802, the system analyzes the preprocessed multi-modal inputs to detect statistical outliers and measurement noise at the sample, feature, and pair levels. Modality-specific detectors compute deviation and density scores both in the raw input space and in a shared embedding space, using adaptive thresholds derived from robust statistics and temporal consistency error metrics. Paired inputs exhibiting excessive cross-modal misalignment are flagged as outliers. Noise parameters are estimated separately for each modality, after which modality-appropriate filtering is applied: spatial denoising and artifact correction for images, spectral and temporal filtering for audio, and token-level normalization and deduplication for text. When confidence in an outlier determination meets a prescribed criterion, the sample is removed or corrected; otherwise it is down-weighted, with the original unaltered sample retained in a quarantine store for audit and potential reuse. Each action is recorded with provenance metadata and quality scores that propagate into training pipelines to enable reweighting and selective sampling. The output of S802 is a noise-reduced dataset and associated masks that preserve valid edge cases while preparing inputs for subsequent schema validation in S804.

In some embodiments, validating data using modality-specific consistency schemas prior to training (S804) comprises executing a rules engine that receives preprocessed and de-noised samples from upstream stages and evaluates each sample against a machine-readable schema tailored to its modality. A consistency schema defines structural constraints, allowed value ranges, type requirements, statistical profiles, and cross-field dependencies for a given modality, and can be expressed as declarative rules or compiled validators. For image data, the schema can require permitted color spaces and bit depths, minimum and maximum resolutions, aspect-ratio bounds, absence of truncation, and alignment between annotations and pixel coordinates, including mask dimensionality and bounding-box containment checks. For text, the schema can enforce character encoding, language tag membership, length limits, vocabulary constraints for labels, and determinism of tokenization under the configured tokenizer. For audio, the schema can verify sample rate and channel count, duration limits, codec compliance, loudness and clipping thresholds, and spectrogram shape consistency. For video, the schema can enforce codec and container policies, frame-rate stability, keyframe interval ranges, monotonic timestamps, and correspondence between frame and annotation indices.

S804 further applies cross-modal consistency tests when a sample comprises multiple synchronized modalities, including timestamp alignment within a tolerance window, one-to-many mapping integrity between segments and captions or labels, and embedding-based sanity checks that detect gross mismatches between paired modalities using lightweight pre-trained encoders. The validator emits a pass/fail decision with a reason code and can apply reversible corrections specified by the schema, such as re-encoding to a target sample rate, resizing to canonical dimensions, or normalizing text encodings. Samples that fail validation without an available correction are quarantined, logged with provenance and schema-version identifiers, and routed for review when configured. Only samples that satisfy the active schema proceed to the training queues, and acceptance metrics and audit trails are persisted to support reproducibility and governance. Continuous or batch execution of S804 can be configured such that updates to schema versions are atomically associated with specific training runs, ensuring consistent enforcement of data quality throughout the lifecycle.

FIG. 9 illustrates a flowchart for ongoing model maintenance. At S900, the system monitors model outputs for distributional changes using drift detection and preset thresholds. When drift is detected in S900, the system triggers model retraining at S902 to update the deployed model. Following retraining, and at scheduled intervals, the system evaluates reliability via periodic benchmarking at S904 against reference datasets and target metrics. Results from S904 inform threshold updates and deployment decisions and the process returns to S900, closing the loop from start to end.

At S904, the system evaluates reliability via periodic benchmarking by executing a scheduled test regimen against curated, versioned datasets that represent the supported modalities and anticipated operating conditions. The benchmarking service runs inference in a controlled environment with fixed seeds and recorded configuration metadata, captures task and system metrics such as accuracy and calibration for each modality, cross-modal alignment quality, robustness under perturbations, latency, throughput, and resource/energy usage, and compares the results to baselines and acceptance thresholds using statistical significance checks and control limits derived from historical performance. Outcomes are logged with timestamps, model and data hashes, and hardware identifiers to enable reproducibility and auditability, and trend analysis is performed to detect regressions or reliability drift. When deviations exceed predefined tolerances, the system flags the release, gates deployment, or recommends remedial actions such as targeted data refresh, hyperparameter re-tuning, or rollback. The benchmarking cadence is either time-based or event-driven, and test selection is stratified to ensure coverage of sensitive cohorts and edge cases, with fairness and safety assessments included alongside core quality and efficiency measurements.

FIG. 10 illustrates a real-time operation pipeline in which multimodal inputs are first processed in asynchronous batches (S1000), the characteristics of those batches and a latency budget are then used to select latency-optimized model architectures for inference (S1002), and the selected models are executed on specialized hardware to accelerate computation and satisfy the real-time constraint (S1004). Outputs produced at S1004 are streamed back to update batching at S1000 and to refine subsequent model selections at S1002, thereby enabling continuous start-to-end operation.

S1000 refers to receiving multimodal inputs and aggregating them into asynchronous batches that are formed and processed without requiring simultaneous availability of all modalities. Incoming text, image, audio, and other items are placed into modality-specific queues with timestamps and correlation identifiers, enabling later fusion while permitting out-of-order execution across requests. A scheduler assembles micro-batches per modality according to arrival rates, latency budgets, and size constraints, applying bucketing by length or resolution, padding minimization, and format normalization to maximize kernel efficiency under mixed precision. Batch windows adapt dynamically based on queue depth and service-level targets, and execution overlaps data transfer with computation to reduce idle time. The batching layer implements deadline-aware admission control, backpressure, and retries, dropping stale items or routing them to fallback paths when needed, and emits metrics that drive subsequent resource allocation and model selection.

The pipeline receives inputs from at least two modalities (S300), generates embeddings in a shared vector space (S302), synchronizes data streams using temporal alignment functions (S304), and fuses the embeddings with attention mechanisms (S306). The model is divided into modality-specific modules (S400), each trained with progressive schedules (S402) and optimized using automated hyperparameter search, including Bayesian and grid/random strategies (S404). Additional measures include per-module regularization and adaptive learning rates, adversarial training, curriculum training, customized modality-specific losses, gradient-driven sample reordering, batch normalization and dropout, parallel module training, and meta-learning for rapid adaptation.

Selecting reduced-latency model architectures for inference (S1002) includes choosing, at runtime or deployment time, an architecture that satisfies a target latency budget under current hardware and workload conditions. The selection can draw from a catalog of candidate architectures with calibrated latency profiles, such as distilled variants, pruned backbones, early-exit networks, or quantized ensembles. The choice can be governed by constraints derived from measured queue depths, batch sizes, input modality mix, and accelerator capabilities, and can adapt by switching architectures when estimated time-to-result exceeds a threshold. The mechanism can incorporate cost models that combine operator-level profiles, memory-bandwidth estimates, and kernel availability to predict end-to-end latency, and can co-optimize precision settings and sequence lengths to remain within the target service-level objective. The selected architecture interfaces with asynchronous batching (S1000) and specialized hardware utilization (S1004) so that operator layouts, kernel selections, and tensor shapes align with the accelerator's optimal execution paths.

In step S1004, specialized hardware is engaged to accelerate execution by mapping the fused computation graph to one or more accelerators such as GPUs, TPUs, NPUs, FPGAs, or custom ASICs selected from device capability profiles. The runtime binds operators to accelerator-specific kernels, sets precision modes (for example FP16, BF16, or INT8) under accuracy constraints, and schedules asynchronous compute and DMA transfers to overlap data movement with execution. Tensors are rearranged into accelerator-preferred layouts and placed in pinned or on-chip memory; activations are recomputed or checkpointed to satisfy memory budgets. Kernel autotuning determines tiling, threading, vectorization, and shared-memory usage, with winning configurations cached for reuse. For heterogeneous nodes, workloads are partitioned across devices according to measured throughput and thermal headroom, with backpressure applied to maintain latency targets and CPU fallback invoked on accelerator fault. Telemetry from S1004 updates device-selection and scheduling policies to re-optimize when workload characteristics change.

In one embodiment, the method for training generative multimodal AI models performs segmentation of the model computation across a distributed set of compute nodes (S100) by partitioning the model graph into subgraphs that are mapped to individual nodes or groups of nodes. Partitioning can be performed at different granularities, including layer-wise partitioning (assigning individual layers or contiguous sets of layers to different nodes), operator-wise partitioning (assigning computational kernels or operator groups to nodes), tensor-slicing (splitting large tensors across nodes by dimension), or functional partitioning (assigning modality-specific modules or decoder/encoder components to different nodes). Partitioning takes into account compute node capabilities (e.g., number and type of accelerators, available memory, network bandwidth), operator compute and memory requirements, and inter-operator communication patterns. A placement optimizer scores candidate partitions according to estimated compute cost, memory footprint, communication volume, and latency to generate a mapping of subgraphs to nodes that balances load and minimizes cross-node data transfer. Inter-node communication for forward and backward passes is performed using transports optimized for throughput and reduced latency (e.g., RDMA or gRPC) and can incorporate techniques such as gradient aggregation via hierarchical all-reduce, parameter-server coordination, or decentralized peer-to-peer synchronization to exchange activations, gradients, and parameter updates across the segmented computation.

In one embodiment, segmentation supports heterogeneous compute resources by assigning memory-bound operators to nodes with larger memory capacity and compute-bound operators to nodes with more or faster accelerators. Segmentation is combined with pipelined parallelism and micro-batching to increase utilization: the model graph is divided into pipeline stages and micro-batches are streamed through the stages so that different nodes operate concurrently on different micro-batches. Checkpointing is applied at stage boundaries to provide fault tolerance: nodes periodically save intermediate activations and parameters so that, if a node fails, computation can be resumed without a full restart. A runtime monitor tracks per-node metrics (compute utilization, memory usage, queue lengths, network traffic) to feed into dynamic allocation decisions (S102).

Pruning can be scheduled in epochs or rounds: after a burn-in training phase in which the model learns initial representations, a pruning round removes parameters below the chosen threshold, followed by fine-tuning to recover or improve accuracy. Thresholds can be static, progressively tightened (progressive pruning schedules), or determined via automated hyperparameter search to trade off model size, throughput, and accuracy. In a distributed setting, pruning reduces computation and communication demands by lowering operator complexity and shrinking the size of tensors exchanged between nodes. Following pruning, the segmentation mapping can be recomputed or adjusted (S100) to take advantage of the reduced computational load on nodes and to rebalance work. In addition, pruned parameters can be physically removed or represented sparsely to reduce memory footprint and network transfer; sparse representations can be encoded with compressed formats and communicated using sparse all-reduce protocols to preserve bandwidth.

In one embodiment the pruning subsystem coordinates with the dynamic allocation subsystem: when pruning significantly reduces workload on a set of nodes, the orchestration layer can scale in by releasing nodes or reassigning their responsibilities to other nodes; conversely, when pruning increases compute density on certain operators, the orchestration layer can allocate additional resources to preserve latency targets. The pruning process includes safety checks to avoid unacceptable degradation of generative performance; these checks include validation accuracy thresholds, perceptual metric evaluations for multimodal outputs, and rollback mechanisms that restore parameters or reverse pruning decisions if post-pruning evaluation reveals quality loss beyond allowable limits.

Instrumentation and telemetry are integrated throughout the training process to collect data consumed by the segmentation, allocation, and pruning modules. Telemetry captures layer-level flop counts, memory footprints, communication volumes, parameter sparsity patterns, and end-to-end iteration latency. Collected data is supplied to a learning-based or heuristic optimizer that updates partitioning policies, autoscaling rules, and pruning schedules. Embodiments are configured to include mechanisms for weighted importance across modalities (for multimodal generative models), ensuring that pruning preserves modality-specific pathways that are essential for model performance and that segmentation respects the locality of modality-specific modules. Continuous evaluation on held-out multimodal validation datasets measures generation fidelity and informs decisions for additional pruning, remapping, or resource reallocation.

In one embodiment, the distributed compute nodes comprise GPU clusters configured to execute portions of a machine learning model in a coordinated manner (S100). Each GPU cluster includes one or more server nodes, each server node including a plurality of graphics processing units (GPUs) interconnected via fast, minimal-latency interconnects (for example, NVLink or PCIe within a server and InfiniBand or RDMA links between servers). The GPU clusters are organized so that model computation is segmented across the clusters using a combination of data parallelism, model parallelism and pipeline parallelism to match the memory, compute and communication characteristics of the model (S100). Partitioning decisions are made either statically at deployment time or adjusted dynamically at runtime based on workload characteristics and resource availability (S102).

In a training embodiment, forward and backward propagation operations are distributed across the GPUs in the cluster. Gradient synchronization is performed using optimized collective communication primitives such as ring AllReduce, tree-based reductions or NCCL-enabled operations to minimize communication overhead. To reduce bandwidth and latency requirements, gradient compression techniques, mixed-precision arithmetic and sparsification can be employed. Model parameters not required for a particular GPU can be pruned or sharded to reduce memory footprint and inter-node transfer (S104). Checkpointing of model weights and optimizer state occurs to shared storage or replicated across nodes to enable recovery from node failures and to support iterative training workflows.

Resource orchestration for the GPU clusters uses compute schedulers and container orchestration systems (for example, Kubernetes with GPU support or cluster schedulers such as Slurm) to allocate GPUs and host resources to jobs (S102). The orchestration layer monitors GPU utilization, temperature, and memory pressure and can migrate or rescale tasks in response to variations in workload. Autoscaling policies permit adding or removing GPU nodes from the cluster in response to queue depth, latency targets, or cost constraints. The orchestration layer supports heterogeneous GPU types and places workloads on nodes with appropriate GPU capabilities (e.g., tensor cores or larger-memory GPUs) to satisfy model requirements (S1004).

For multimodal processing, inputs from at least two modalities (S300) are received and preprocessed into batches suitable for GPU execution. Multimodal inputs can be processed in asynchronous batches to maximize throughput while meeting latency constraints (S1000). Temporal alignment and synchronization of data streams (S304) are performed on CPU hosts or on GPUs depending on latency and throughput trade-offs; aligned segments are then converted into modality-specific tensors and dispatched to GPU clusters. Modality-specific modules of the model (S400) are assigned to separate sets of GPUs to exploit locality and specialized compute kernels; embeddings generated on different GPU partitions are exchanged and fused using attention mechanisms (S306) implemented with batched GPU kernels to maintain efficient utilization.

Memory-efficient inference is supported by loading quantized and optimized model partitions into GPU memory (S500, S504). Quantization to reduced-precision formats (for example, INT8 or FP16) and operator fusion reduce the required GPU memory and computation, enabling larger models or higher batch sizes to be served from the same GPU cluster footprint. Where latency-sensitive inference is required, the system selects model architectures optimized for minimal latency and places such models on clusters with favorable locality and networking characteristics (S1002). For edge-oriented scenarios, compressed models are produced on the GPU clusters and then deployed to edge devices (S502) while the GPU clusters continue to serve central training and large-batch inference tasks.

Communication optimization between GPUs and between GPU clusters is achieved by overlapping communication and computation, staging data in pinned host memory, using NVMe-based local caches for dataset shards, and employing topology-aware placement to minimize cross-switch traffic. For very large models, parameter servers or distributed optimizer shards are distributed across GPUs to spread the optimizer computation and memory demands. Fault tolerance mechanisms include coordinated checkpoints, bounded staleness for asynchronous parameter updates, and redundancy in essential services, allowing training and inference to continue despite individual GPU or node failures.

Performance and cost trade-offs are managed by combining model compression and pruning (S104) with dynamic scaling (S102). For example, during periods of reduced demand, lower-priority portions of the model are pruned or served at reduced precision, allowing the orchestration layer to decommission GPU nodes and reduce operating costs. Conversely, when accuracy-sensitive training or large-batch inference is required, the orchestration layer can instantiate additional GPU clusters and repartition model shards to achieve required throughput.

Security and provenance measures are implemented by placing GPU clusters behind authenticated service endpoints and by maintaining logs and metadata for jobs executed on the clusters. Generated artifacts, such as model checkpoints and synthetic samples (S200), include embedded metadata describing the GPU cluster configuration and software stack used for generation, supporting reproducibility and tracking (S704). Screening and watermarking of generated content (S700, S702) are performed on the GPU clusters prior to export.

Alternative embodiments include GPU clusters augmented with other accelerator types (for example, TPUs or FPGAs) where certain model components are offloaded to specialized hardware (S1004). Heterogeneous clusters can be orchestrated so that modules requiring dense linear algebra execute on GPUs while other modules run on accelerators optimized for their computational patterns. The system supports reconfiguration so that a logical compute node can be implemented by one, or more physical GPU clusters, and GPU clusters can be partitioned into virtual clusters to host multiple workloads concurrently while enforcing isolation and quality-of-service guarantees.

Example configurations include clusters of server nodes, each containing 4 to 16 GPUs with substantial memory (for example, NVIDIA A100 or H100) connected via NVLink within the server and interconnected across servers using InfiniBand HDR. A deployment can span tens to thousands of such GPU servers, enabling distributed training of models with billions to trillions of parameters by sharding parameter tensors across GPUs and leveraging mixed parallelism strategies. The disclosure contemplates smaller-scale GPU clusters for on-premises deployments as well as cloud-based GPU clusters provisioned on demand to accommodate peak training or inference loads.

In some embodiments, the distributed compute nodes for segmenting model computation across a distributed set of compute nodes (S100) comprise TPU clusters. A TPU cluster as used herein refers to one or more interconnected TPU devices and associated host controllers configured to execute machine learning workloads and to provide matrix and tensor operations optimized for throughput and for latency-sensitive tasks, useful for both training and inference. The TPU clusters are organized as pods, slices, or other logical groupings, and expose interfaces for programmatic allocation, monitoring, and orchestration to support dynamic allocation of compute resources in response to workload changes (S102).

TPU clusters are employed to implement a variety of parallelism strategies depending on model size, modality mixing, and latency requirements. For example, data-parallel training is used for batches of multimodal input data (S300), with replicas of the model placed on distinct TPU devices and gradients aggregated across the cluster. Model-parallel, tensor-sharding, and pipeline-parallel techniques are applied to distribute large modality-specific modules (S400) across TPU devices to avoid exceeding on-chip and host memory limits. In one embodiment, attention-intensive fusion operations (S306) and embedding generation (S302) are sharded across TPU cores so that matrix-multiply workloads are balanced while minimizing interconnect communication. The TPU cluster interconnect and topology guide partitioning decisions: tasks with tight synchronization or substantial all-to-all communication are scheduled within a pod slice to reduce communication latency, whereas loosely coupled tasks are distributed across slices.

The TPU software stack, including ahead-of-time and just-in-time compilation layers (for example XLA or analogous compilers), is leveraged to fuse operations, compile computation into efficient accelerator kernels, and place tensors in physical memory to optimize throughput. Compilation and placement pass choices are selected with regard to quantization (S500) and mixed-precision formats supported by TPUs (for example bfloat16 or other reduced-precision formats). The compiler is directed to generate kernels that exploit TPU systolic units for large matrix-multiply-and-accumulate operations commonly arising in transformer attention, convolutional feature extraction, and linear layers used in multimodal encoders (S300, S302). Where temporal alignment functions (S304) are implemented as streaming pre- or post-processing, TPU-hosted kernels are employed to perform batched alignment and transformation in parallel with other compute.

Dynamic resource allocation (S102) for TPU clusters is implemented through autoscaling of pod slices, queuing and preemption policies, and scheduling of preemptible TPU instances for background tasks such as large-scale hyperparameter sweeps (S404) or synthetic sample generation (S200). In one embodiment, a centralized scheduler monitors workload metrics and model-serving latency; when workload increases, the scheduler requests allocation of additional TPU slices and redistributes partitions of the segmented model (S100) to newly provisioned TPU devices. Conversely, when workloads decrease, shards can be compacted and excess TPU slices released to reduce cost. Checkpointing and consistent snapshot mechanisms ensure that progressive training schedules (S402) and retraining operations (S902) resume after resource changes without loss of training state.

Memory and compute constraints of TPU clusters motivate complementary techniques such as pruning (S104), quantization (S500), and model compression. In some embodiments, pruning is applied to remove model parameters based on a relevance threshold to reduce computational overhead (S104) prior to partitioning onto TPU devices; pruning targets are selected to minimize disruption to hardware-friendly tensor layouts. Post-pruning fine-tuning is performed on the TPU cluster to recover accuracy. Quantization-aware training and post-training quantization are supported to produce models compatible with reduced-precision TPU kernels and to reduce memory footprint, enabling deployment of larger multimodal modules on a given TPU slice. These compression techniques facilitate subsequent deployment of compressed models to edge devices (S502) while keeping the TPU cluster as the principal training and validation environment.

Operational aspects such as telemetry, fault tolerance, and provenance are integrated with TPU cluster usage. Model checkpoints, training logs, and metadata are co-located with TPU job submissions to permit output provenance tracking (S704). Per-run artifacts enable screening outputs for similarity to known works (S700), insertion of digital watermarks (S702) where applicable, and execution of bias detection analyses (S600) using TPU-accelerated analytics pipelines. Distributional monitors (S900) aggregate inference outputs from TPU-hosted serving endpoints to detect drift and trigger retraining (S902) on the TPU cluster when necessary.

Inference deployments leveraging TPU clusters select minimal-latency model architectures (S1002) and memory-efficient execution strategies (S504) suitable for the TPU hardware. In certain embodiments, portions of the model that require strict minimal-latency responses are compiled and pinned to dedicated TPU slices to avoid queueing delays, while batch-oriented or reduced-priority tasks run on shared slices. The TPU cluster is configured to serve real-time multimodal inference by accepting asynchronous input batches (S1000) and applying scheduling heuristics to meet latency targets, while using specialized hardware features (S1004) such as fused kernels and on-chip collectives to accelerate end-to-end inference.

Integration with edge and hybrid deployments is enabled by producing models optimized for TPUs that are subsequently compressed and quantized for edge deployment (S502, S500). The TPU cluster provides a throughput-optimized environment for generating and validating compressed models and for performing memory- and compute-limited inference simulations prior to rollout. In addition, the TPU cluster is used to generate synthetic training samples (S200) and to apply data augmentation (S202) at scale, enabling robust multimodal training datasets for downstream edge models.

In some embodiments, the system further comprises a scheduler configured to prioritize resource allocation among the distributed compute nodes used to segment model computation (S100) and to dynamically allocate compute resources in response to workload changes (S102). The scheduler can execute on a dedicated control node or be implemented in a decentralized manner with coordinated agents on each compute node. The scheduler receives runtime telemetry including compute utilization, memory usage, network bandwidth, current task queue lengths, observed per-task latency, and service-level objective (SLO) indicators, and uses these inputs to generate a prioritized allocation plan that is communicated to the resource managers on the respective compute nodes.

The scheduler computes a priority score for each pending task or workload based on one or more criteria, such as inferred latency sensitivity; the modality of the input (e.g., audio, video, text) as determined from received multimodal inputs (S300); the importance or criticality of the downstream inference or training objective; user-level quality-of-service tags; and historical performance data. Priority scoring functions can be rule-based, configurable via policy, or learned using a predictive model that forecasts resource demand and execution latency. Example scoring techniques include a weighted combination of normalized metrics, earliest-deadline-first for time-sensitive workloads, and weighted fair queuing to provide proportional resource shares across classes of workloads.

The scheduler further integrates information regarding the segmentation of model computation across nodes (S100) and the resource capabilities of each node, including availability of specialized hardware accelerators (S1004), presence of memory-constrained edge devices (S502), and suitability for architectures optimized for minimal-latency inference (S1002). Using capability-aware placement, the scheduler gives preference to assigning latency-sensitive tasks to nodes with architectures optimized for minimal latency or to edge-deployed compressed models (S502, S504), while directing large-batch or throughput-intensive training tasks to nodes with greater aggregate compute. The scheduler also selects placements that minimize inter-node communication for modules divided into modality-specific components (S400), thereby reducing synchronization overhead and improving end-to-end latency.

To adapt to changes in workload characteristics, the scheduler implements preemptive and non-preemptive allocation strategies. In preemptive embodiments, tasks of reduced priority are paused, checkpointed, or migrated to alternative nodes to free resources for higher-priority tasks. Checkpointing uses intermediate model states or partial inputs so that paused tasks can resume without excessive rework. In non-preemptive embodiments, admission control enforces capacity limits and defers or rejects new tasks when doing so would compromise higher-priority workloads. The scheduler also performs graceful degradation by selecting pruned or quantized model variants (S104, S500) for tasks of reduced priority to reduce resource consumption while maintaining acceptable fidelity.

The scheduler can act in concert with automated hyper-parameter search and training schedulers (S404) by allocating additional resources to training jobs predicted to yield the highest marginal benefit, or by deferring less promising trials. When synthetic sample generation (S200), augmentation (S202), or active learning selection (S204) occur concurrently, the scheduler balances compute between data-preparation pipelines and model execution to prevent pipeline stalls and meet label-acquisition timelines. The scheduler is also configured to honor fairness-related constraints by incorporating dataset-representation metrics produced by bias-detection modules (S600) and by adjusting resource shares to support reweighting or retraining tasks (S602, S604) that improve fairness.

The scheduler implements predictive autoscaling by consuming near-term workload forecasts derived from historical telemetry and from drift detection systems (S900). Upon detecting impending load surges, the scheduler proactively allocates additional nodes, instantiates compressed model instances, or shifts execution to specialized accelerators (S1004). Conversely, when underutilization is predicted, the scheduler consolidates workloads onto a smaller set of nodes and releases idle resources to conserve energy. The scheduler also coordinates with monitoring and retraining triggers (S902) so that diagnostic or benchmarking workloads (S904) are scheduled during windows of minimal user-facing demand.

For multimodal, temporally-aligned workloads, the scheduler is configured to prioritize tasks based on synchronization requirements; tasks requiring strict temporal alignment of multiple data streams (S304) are assigned elevated priority to preserve temporal coherence. The scheduler enforces co-placement constraints for modality-specific modules (S400) that are tightly coupled during fusion (S306), placing them on nodes whose interconnects provide ample bandwidth to reduce fusion latency. The scheduler further favors colocating embedding generation (S302) and subsequent fusion operations when doing so reduces network transfer and memory footprint.

Policy configuration interfaces allow operators to specify priorities, quotas, and preemption rules. Example policies include priority lanes for real-time inference, quota guarantees for fairness-driven retraining, and energy-aware policies that reduce allocation to power-constrained edge nodes. The scheduler can expose an API that lets applications annotate requests with priority hints, deadlines, or degradation tolerances; the scheduler then translates those annotations into concrete allocation decisions and fallbacks, such as selecting quantized models (S500) or reduced-compute variants.

When implemented across multiple control agents, the scheduler employs distributed consensus or coordination protocols to avoid conflicting allocation decisions. Fault-tolerant mechanisms include leader election for centralized decision-making and eventual-consistency reconciliations for decentralized policies. The scheduler maintains a global resource view and a per-node capability manifest, enabling rapid recomputation of allocation plans in response to node failures, resource contention, or changes in workload mix.

In some embodiments, the scheduler is configured to perform multi-objective optimization to balance latency, throughput, energy consumption, and fairness. Optimization techniques include heuristic bin-packing, integer programming for offline planning, and continuous optimization using gradient-free solvers for rapid online decisions. Where available, the scheduler leverages specialized hardware telemetry (S1004) and model profiling to inform cost models employed during optimization.

Finally, the scheduler is instrumented to produce audit trails and provenance metadata documenting allocation decisions, migrations, and preemption events. These records are used for debugging and compliance, and to feed into automated policy tuning loops that continuously improve allocation efficacy while meeting operational constraints.

A multimodal machine learning system is described in which model parameter pruning is based on contribution to output accuracy. In one embodiment, pruning of model parameters S104 is performed by first establishing a baseline performance metric for the overall system using one or more chosen accuracy measures (for example, top-1 accuracy, top-k accuracy, F1 score, area under the ROC curve, mean average precision, or other task-appropriate metrics) computed on a held-out validation set representative of the intended operating distribution. The baseline evaluation is performed after preprocessing S800 and any required temporal alignment S304 and embedding generation S302 for inputs from at least two modalities S300. The baseline accuracy is stored as a reference for subsequent importance computations.

To quantify the contribution of individual parameters or parameter groups to output accuracy, the system computes an importance score for each parameter—weights, biases, or structured groups such as channels, attention heads, neurons, or layers. Importance scoring is performed either exactly via ablation testing, by measuring the change in the chosen accuracy metric when a parameter or group is removed or zeroed, or approximately using analytic or statistical approximation techniques. Exact ablation testing comprises iteratively modifying the model by temporarily removing or masking a candidate parameter or group, recomputing outputs on a validation set while keeping all other parameters constant, and measuring the resulting delta in the accuracy metric. The importance score $I\_p$ for parameter p is defined as $I\_p=A\_baseline-A\_p\_removed$, where $A\_baseline$ is the baseline accuracy and $A\_p\_removed$ is the accuracy with parameter p removed. Parameters with negligible $I\_p$ contribute minimally to the metric and are candidates for pruning.

Because exact ablation at scale is computationally expensive, especially for large models and distributed compute environments S100, various approximations are supported. First-order approximations compute importance using gradients and parameter magnitude, for example by evaluating the product of the parameter value and the gradient of the loss with respect to that parameter averaged over the validation set (e.g., $|w\_p*\partial L/\partial w\_p|$), or by using Taylor expansions of the loss increase induced by parameter perturbation. Second-order approximations employ curvature information, such as diagonal approximations of the Hessian or the Fisher information matrix, as in Optimal Brain Surgeon or Fisher-based importance scoring. Shapley-value-inspired approximations are used to capture interactions among parameters by sampling permutations and estimating marginal contributions. Sampling-based methods and reduced-rank approximations decrease compute requirements while preserving ranking fidelity. The system selects an importance scoring method based on compute availability, latency requirements, and approximation accuracy, with that accuracy determined via automated hyperparameter search S404.

Pruning is either unstructured (individual weights) or structured (filters, channels, attention heads, neurons, or entire modality-specific modules S400). For multimodal architectures, importance scoring and pruning can be modality-aware: parameters are attributed to specific modality pathways, cross-modal fusion layers S306, or shared embedding layers S302, and contributions are measured with respect to multimodal performance objectives. For example, an attention head used primarily for one modality that makes an insignificant contribution to overall multimodal accuracy can be pruned preferentially, or entire modality-specific subnetworks whose marginal contribution to joint-task accuracy is minimal can be disabled or compressed. Structured pruning typically offers greater speed and memory benefits on specialized hardware S1004 during inference and for deployment to edge devices S502.

Model parameter pruning based on contribution to output accuracy is performed offline after training or online during training (dynamic or continuous pruning). In online embodiments, importance scores are periodically estimated during training using minibatch statistics or running estimates (for example, exponential moving averages of gradient-magnitude-based scores), and pruning decisions are applied progressively while the model continues to learn. Dynamic reallocation of compute resources S102 and segmentation of computation across distributed nodes S100 are coordinated with pruning: when pruning reduces the size or compute requirements of a module, the orchestration layer redistributes workloads, scales down allocated resources, or consolidates computation to fewer nodes to improve efficiency and reduce cost. Conversely, if additional capacity is required to recompute importance scores using more expensive second-order methods, the orchestration can temporarily allocate additional resources.

After pruning, the system applies one or more recovery or stabilization steps. Fine-tuning or full retraining of the pruned model against the original training objective recovers lost accuracy and allows remaining parameters to re-balance representational capacity. In some embodiments, retraining incorporates regularization or constraint terms that encourage robustness to pruning, such as L0/L1 penalties during pretraining to induce sparsity-friendly weight distributions, or loss terms that penalize sensitivity of the accuracy metric to individual parameters. Automated hyperparameter search S404 is used to select pruning rates, threshold values t, learning rates for fine-tuning, and numbers of pruning iterations by optimizing a multi-objective function that balances compression ratio, inference latency, and validation accuracy.

To ensure reliability and limit unintended degradations, the pruning process is monitored using distributional checks S900 and periodic benchmarking S904. If drift or an unexpected accuracy drop is detected on validation or production streams, the system can trigger rollback or retraining procedures S902. The system logs the provenance of pruning actions and model versions, including which parameters were removed and their associated importance scores, enabling auditing and reproducibility. In embodiments where model outputs are screened for quality or similarity to known works S700, additional safeguards are invoked post-pruning to confirm that desired behavioral properties and content-generation constraints remain satisfied.

The system supports mixed compression strategies where pruning based on contribution to output accuracy S104 is combined with quantization S500 and architecture selection S1002. After pruning to remove parameters that contribute minimally to output accuracy, the remaining parameters can be quantized to reduced-precision representations to further reduce memory and bandwidth requirements prior to deployment to edge devices S502. Selection of latency-optimized architectures S1002 and use of specialized hardware S1004 are informed by the sparsity patterns produced by contribution-based pruning; structured pruning that removes entire channels or layers is prioritized when hardware does not efficiently exploit unstructured sparsity.

In one exemplary procedure, the following steps are performed: 1 train a baseline multimodal model using progressive schedules S402 and modality-specific modules S400; 2 evaluate baseline accuracy A_baseline on a held-out validation set; 3 compute importance scores for all parameters using an importance metric that estimates contribution to output accuracy (for example, first-order gradient-based scores, second-order Hessian approximations, or sampled ablation-based estimates); 4 select a relevance threshold t or a target sparsity and mark parameters with importance less than t for pruning; 5 prune marked parameters and, if desired, convert pruned weights to sparse storage formats compatible with memory-efficient inference S504; 6 fine-tune the pruned model on the training set, possibly with fairness constraints or reweighting S602/S604 if required; 7 validate the pruned and fine-tuned model against acceptance criteria (accuracy loss within ε, latency below a target, and other task-specific checks); 8 deploy the pruned model to target execution environments, including edge devices S502, or perform additional compression such as quantization S500; and 9 monitor production performance and trigger retraining S902 if distributional changes S900 indicate model degradation.

Parameters of the pruning operation, including the choice of importance metric, threshold t, pruning granularity (unstructured vs structured), iteration schedule, and acceptance criteria for accuracy loss, are selected to optimize the tradeoff between computational efficiency and task performance. In some embodiments, importance thresholds are learned automatically by optimizing a global objective that combines accuracy and resource cost; in other embodiments, user-specified bounds (for example, a maximum acceptable drop in accuracy ε and a minimum compression target) control the pruning algorithm. The system can further prioritize retention of parameters that contribute to essential sub-tasks or fairness objectives as determined by bias-detection mechanisms S600 and fairness-aware retraining S604, thereby ensuring that pruning based on contribution to output accuracy does not disproportionately harm underrepresented groups or modalities.

When model parameter pruning is carried out according to each parameter's contribution to output accuracy, the system can include human-in-the-loop controls for deployments with safety or mission implications, allowing operators to inspect importance scores and override pruning decisions for components that must be preserved. Comprehensive importance logs and iterative validation procedures create an audit trail to support regulatory compliance and to facilitate downstream debugging, rollback, or targeted retraining as needed.

The system implements dynamic adjustment of the relevance threshold used for pruning model parameters (S104) by periodically evaluating model performance on one or more validation datasets and on live operational signals. At predefined intervals or upon detection of distributional or performance changes (for example, at every N training iterations, every epoch, or after a fixed time interval T), the system computes a set of performance metrics including but not limited to validation accuracy, task-specific loss, precision/recall, latency, memory usage, and other resource metrics. The periodic evaluation is triggered according to a schedule, by events such as drift detection (S900) or benchmarking anomalies (S904), or by a combination of temporal and event-driven triggers.

During each evaluation cycle, the system measures baseline performance using a held-out validation set or cross-validation folds and computes rolling statistics over recent production outputs to capture live behavior. Performance metrics are aggregated via sliding windows or exponential moving averages to reduce sensitivity to transient fluctuations. Statistical significance tests or confidence intervals are applied to determine whether observed changes are meaningful relative to historical variance.

Adjustment of the relevance threshold t can follow basic schedulers or adaptive control policies. In one embodiment, a proportional controller updates t according to $\tau\_\{\tau+1\}=\tau\_t+\alpha*(M\_target-M\_observed)$, where M_target is a target value for a chosen performance metric, M_observed is the current observed value, and a is a tunable step-size parameter. In another embodiment, multiplicative adjustments are used such that $\tau\_\{t+1\}=\tau\_t*(1+\beta)$ when observed metrics indicate pruning is permissible, and $\tau\_\{t+1\}=\tau\_t*(1-\gamma)$ when performance degrades, with β and γ selected to bound the rate of change. Limits on τ (for example τ_min and τ_max) are enforced to prevent complete retention of all parameters or over-pruning that would irreversibly damage model capacity. Hysteresis and minimum dwell-time constraints can be applied so that t does not oscillate frequently between values in response to noise.

The system performs multi-objective adjustment to balance accuracy against resource constraints. For example, a composite score C=w_acc*(normalized accuracy)+w_res* (normalized resource efficiency) guides adaptations of t, with weights w_acc and w_res set according to operator policy. Pareto-front selection or constrained optimization techniques choose t values that satisfy specified accuracy thresholds and computational budget limits.

When the model is partitioned across distributed compute nodes (S100) or when compute resources are allocated dynamically (S102), adjustment of per-node or per-partition relevance thresholds can be coordinated. A centralized controller can compute a global τ and communicate updates to each node, or nodes can perform local evaluations and employ a consensus or federated averaging mechanism to derive a cluster-wide τ. Per-modality modules (S400) can maintain independent relevance thresholds to account for differing importance and sparsity patterns across modalities; for example, modality-specific $\tau\_m$ values are adjusted according to modality-specific validation metrics. Progressive training schedules (S402) can incorporate gradual tightening or relaxation of t alongside scheduled changes in learning rates or capacity.

Implementation details include a validation harness that executes standardized benchmarking routines (S904) to ensure comparability across evaluation cycles, maintaining logs of τ values and corresponding performance metrics for audit and tuning, and embedding safety constraints such as a minimum preserved parameter fraction or minimum task-specific metric thresholds. In production settings where latency-sensitive inference is required (S1002) or models are deployed to edge devices (S502), the periodic evaluation cadence and aggressiveness of t updates can be adjusted according to deployment constraints; for example, conservative adjustments and longer evaluation windows are applied for edge-deployed models to reduce churn, while more rapid adaptations are employed in cloud-hosted training pipelines.

Alternative embodiments include using reinforcement learning to learn a policy that proposes t adjustments based on observed state vectors comprising recent metrics, gradients, and resource usage; employing Bayesian optimization to select $\tau$ values that balance exploration and exploitation; and incorporating fairness and robustness constraints (for example via reweighted samples S602 or fairness-aware retraining S604) into the objective used to evaluate the acceptability of pruning outcomes. The periodic evaluation mechanism supports asynchronous and batched processing of multimodal inputs (S1000) and can interoperate with monitoring subsystems (S900) that detect drift and trigger additional evaluation or retraining cycles.

Pruning of model parameters (S104) is achieved by adding an L1 regularization term to the training objective so that the loss minimized during training is $L\_total=L\_task+\lambda*sum\_i|w\_i|$, where $w\_i$ denotes an individual model parameter and $\lambda$ is a tunable sparsity regularization coefficient. During gradient-based optimization, the L1 term yields gradients proportional to the sign of each parameter, driving parameters with magnitudes near zero toward exactly zero and thereby promoting a sparse parameter vector. The value of $\lambda$ is chosen based on validation loss and a target sparsity level and can be determined automatically via automated hyperparameter search (S404).

After or during training with the L1-augmented objective, parameters whose absolute values fall below a relevance threshold $\tau$ are removed from the model, in accordance with the relevance-based pruning step S104. The threshold $\tau$ is defined as an absolute magnitude, a percentile of the parameter-magnitude distribution, or a per-layer or per-module criterion. For multimodal or modular architectures, the threshold is applied per modality-specific module (S400) or per layer to preserve capacity where needed. Threshold selection strategies include fixed-magnitude thresholds, adaptive thresholds computed from validation sensitivity analyses, or schedules that reduce t progressively to reach a target sparsity.

An iterative prune-and-fine-tune schedule is supported in which L1-regularized training is alternated with explicit pruning and subsequent fine-tuning. In one implementation, a soft-thresholding or proximal operator is applied during optimization so that parameter updates incorporate shrinkage ($w\leftarrow sign(w)*max(0, |w|-\eta*\lambda)$ for learning rate $\eta$). In another implementation, pruning is performed discretely after an L1-regularized training phase by setting parameters with $|w|<\tau$ to zero and then continuing training without, or with reduced, L1 weight to recover performance. Progressive pruning schedules can be aligned with progressive training schedules applied to modules (S402) so that early training encourages sparsity in lower-impact regions and later training consolidates pruning in higher-level or less-sensitive parameters.

Group and structured variants of L1-based pruning are described to create hardware-friendly sparsity patterns. For channel, filter, or block pruning a grouped L1 norm is added for each group g as $\lambda\_g *\|w\_g\|\_1$ or alternatively a mixed norm such as L1/L2 across groups, and groups whose group-norm falls below a group-specific threshold $\tau\_g$ are pruned. Structured pruning reduces irregular memory access and improves the efficiency of downstream compression (S500) and deployment to edge devices (S502) and facilitates utilization of specialized hardware for accelerated execution (S1004). The description encompasses both unstructured fine-grained sparsity and structured coarse-grained sparsity, noting tradeoffs between compression ratio and achievable inference acceleration.

Selection of $\lambda$ and $\tau$, and scheduling parameters for iterative pruning, is guided by automated search and benchmarking (S404, S904). Candidate pruning schedules are evaluated on held-out validation sets and on task-specific performance metrics; a Pareto frontier of accuracy versus sparsity or inference latency is generated to select operating points. Monitoring of deployed model outputs for distributional changes (S900) can trigger retraining (S902) with updated L1 regularization settings to restore a desired balance between sparsity and performance as data drift occurs.

For multimodal systems that generate shared embeddings (S302) and fuse modality embeddings (S306), L1-based pruning is applied both at the modality-specific module level (S400) and at shared fusion layers. Per-modality regularization coefficients $\lambda\_modality$ and per-module thresholds $\tau\_modality$ permit preservation of representational capacity in modalities that are more informative for the target task. During temporal synchronization and fusion (S304, S306), care is taken to avoid pruning that would remove parameters essential for alignment or attention—for example, by weighting the L1 penalty less for parameters identified as attention keys or temporal-alignment parameters.

Implementation details include using subgradient methods to handle nondifferentiability at zero, optionally employing proximal optimization algorithms to explicitly enforce sparsity, and incorporating warm-up phases with reduced or zero L1 penalty to permit stable initial convergence. The pruning pipeline supports retraining with fairness or reweighting constraints (S602, S604) by retaining parameters deemed critical for underrepresented groups—identified via per-sample gradient sensitivity or attribution metrics—and protecting those parameters from pruning by applying elevated $\tau$ or reduced local $\lambda$. Provenance and validation steps (S700-S704) ensure that synthetic or augmented training samples (S200, S202) used during L1-regularized pruning are tracked and that pruning decisions are reproducible.

Hardware-aware considerations include constraining pruning patterns to block-sparse or channel-sparse formats to align with accelerator memory layouts and compute primitives, and exporting sparse models with metadata that specifies sparsity masks and the indices of retained parameters. The disclosed L1-based pruning techniques are compatible with distributed segmentation of model computation (S100) and with dynamic allocation of compute resources (S102) to support varying training workloads during iterative pruning and subsequent fine-tuning, and they further support asynchronous batching and reduced-latency inference modes (S1000, S1002) for production deployment.

A practical implementation computes, at specified pruning intervals (for example, after each epoch or after a fixed number of mini-batch updates), a per-parameter or per-structure importance metric based on L2 magnitude. For unstructured pruning the importance metric for parameter i is $|w\_i|$ or $w\_i^2$; for structured pruning the importance metric for a group g (for example, all weights in a convolutional filter, an attention head, or a modality-specific module S400) is the L2 norm of the group, $\|w\_g\|2$. Pruning is performed by comparing the importance metric to a threshold $\tau$: parameters or groups whose metric falls below $\tau$ are set to zero and masked from further forward and backward computation unless allowed to regrow under a dynamic-sparsity policy. Threshold $\tau$ is defined as an absolute value, a per-layer absolute value, a percentile of the importance distribution (for example, the 10th percentile), or as an adaptive function that ensures a target sparsity level s_target (for example, progressively increasing s_target from 0% to 90% over T pruning steps).

For distributed training across a set of compute nodes S100, the L2 magnitudes used for pruning are computed locally and aggregated via a global reduction to produce consistent pruning masks across nodes. In one distributed embodiment, each node computes local group L2 norms for its shard of parameters and periodically communicates summary statistics (for example, per-group L2 norms and counts) to a central coordinator or uses an all-reduce operation to compute exact global L2 norms. The central coordinator determines global thresholds tau_g or percentiles and broadcasts pruning masks or threshold values so that S104 can be applied consistently on each node. When dynamic allocation of compute resources S102 is used, pruning can trigger reallocation of resources away from heavily pruned modules toward modules requiring additional compute, such as retraining for accuracy recovery.

Variants of the L2-based pruning method include combining L2 regularization with saliency measures that incorporate first- or second-order information. For example, an importance score $I\_i$ can be computed as $|w\_i|*|g\_i|$, where $g\_i$ denotes the moving-average magnitude of the gradient for parameter $i$, or as $w\_i^2/(H\_{ii}+epsilon)$, where $H\_{ii}$ approximates the diagonal of the Hessian. The L2 regularization term remains part of the loss to encourage reduced parameter magnitudes, while the augmented importance score enhances pruning decisions by accounting for the sensitivity of the loss to parameter removal. Such hybrid scores are computed prior to thresholding and yield greater accuracy retention after pruning.

Operational choices for lambda, tau, pruning interval, and retraining length are determined empirically and can be tuned automatically via hyperparameter search S404. Typical ranges for lambda include 1e-6 to 1e-2 for large networks, with larger lambda values producing stronger shrinkage; tau can be selected as an absolute numeric value (for example, 1e-5 to 1e-3) or as a percentile (for example, 5% to 50% depending on desired sparsity). Automated search routines can optimize lambda and tau subject to validation-set performance and compute constraints; the optimization objective can include penalty terms that favor higher sparsity for a given accuracy target.

When iterative or dynamic sparse training is desired, parameters set to zero by the mask are permitted to regrow if their gradients exceed a regrowth threshold during subsequent fine-tuning. Regrowth policies include magnitude-based methods, gradient-based methods, or random selection with probability proportional to recent gradient magnitudes. Alternatively, once masked, parameters can be permanently pruned to simplify storage and execution for inference deployments. The choice between dynamic regrowth and permanent pruning depends on downstream constraints such as the need for continual adaptation S902 or the desire to minimize model footprint for edge deployment S502.

For transparency and reproducibility the detailed pruning workflow records metadata describing the pruning events and the L2 regularization configuration S704. Metadata includes timestamps, lambda values, threshold values, target sparsity levels, and per-layer or per-group sparsity achieved. Such recorded metadata supports provenance tracking and can be used to trigger subsequent processes such as distributional monitoring S900 or retraining S902 if downstream performance degrades.

The L2-based pruning approach also integrates with data augmentation S202, synthetic sample generation S200, and active learning S204 by allowing the pruning schedule to be influenced by changes in the training corpus. For example, when active learning introduces new informative examples or when synthetic samples increase representation for a particular modality, thresholds and per-module sparsity targets can be adjusted to reallocate model capacity where needed. Similarly, detection of dataset bias S600 can trigger reweighting of pruning thresholds to avoid further disadvantage underrepresented classes or modalities.

Edge-case and alternative embodiments are supported. For compact or resource-constrained models, or when L2 regularization alone does not produce a clear separation between important and unimportant parameters, L1 regularization or explicit magnitude thresholding without L2 preconditioning can be substituted. For hardware that benefits from structured sparsity, group L2 pruning at the filter, head, or channel level is favored; for hardware that supports unstructured sparse computation, fine-grained L2-based magnitude pruning can be applied. The detailed description above contemplates both cases and provides for per-layer, per-module, or global thresholding policies as appropriate for the target deployment and compute architecture.

The embodiments further comprise using federated learning for distributed training. In one embodiment, model computation is segmented across a distributed set of compute nodes (S100) and the segmented computation is coordinated using a federated learning framework in which individual nodes (clients) locally train model segments on their private data and periodically communicate model updates to one or more aggregation servers (coordinators). Local training at each client operates on modality-specific modules (S400); for example, a client possessing primarily visual data optimizes parameters of the visual module while another client possessing audio data optimizes parameters of the audio module. Global synchronization and parameter aggregation occur according to federated rounds in which selected clients upload updates, the aggregator computes an aggregated model (for example by weighted averaging or more sophisticated aggregation rules), and the aggregated parameters are redistributed to clients for subsequent local training. Client selection and scheduling are governed by dynamic allocation of compute resources (S102) to match workload changes and heterogeneity among participating nodes.

In embodiments receiving inputs from at least two modalities (S300), clients compute local embeddings in a shared vector space (S302) and can optionally perform temporal alignment (S304) and modality fusion (S306) locally before contributing gradients or model parameter deltas to the federation. To minimize communication bandwidth and protect private information, the system can apply update compression, sparsification, or quantization (S500) at the client side prior to upload. Secure aggregation protocols and cryptographic techniques (e.g., secure multiparty computation, homomorphic encryption) can be used during aggregation to prevent the aggregator from reconstructing individual client updates. Differential privacy mechanisms can be applied to client updates to provide formal privacy guarantees while balancing model utility.

The federated learning workflow integrates with data preparation and training augmentation. Clients generate synthetic training samples locally via generative models (S200), apply data augmentation (S202), and perform active learning selection (S204) to identify valuable examples for local labeling and training. When outlier detection and filtering (S802) are required, clients prefilter local datasets prior to local training. Where fairness and representation are concerns, clients detect bias locally using statistical analysis (S600) and reweight samples (S602) or enforce fairness constraints during local loss optimization (S604), while the global aggregator tracks and corrects aggregated fairness metrics.

To address heterogeneity in client compute capabilities and network conditions, federated protocols can support asynchronous and synchronous variants. In asynchronous embodiments, clients perform local training and push updates independently, and the server applies update aggregation as updates arrive, enabling processing of multimodal inputs in asynchronous batches (S1000). In synchronous embodiments, the server waits for a quorum of client updates per round and applies straggler mitigation strategies. The system can use progressive training schedules (S402) in which lightweight modules are trained first and heavier modules are introduced later, and adaptive learning rate and hyperparameter optimization (S404) are coordinated across federated rounds to improve convergence.

Communication efficiency and edge deployment are addressed by integrating model compression and deployment techniques. Prior to deployment to edge devices, the system quantizes model parameters (S500), compresses models, and deploys the compressed models to edge devices (S502). Edge devices perform inference using memory-efficient architectures (S504) and are capable of locally fine-tuning portions of the model with limited amounts of data, reporting only parameter deltas to the federation. The federation supports selection of reduced-latency model architectures for inference (S1002) and utilization of specialized hardware for accelerated execution (S1004) where available. When on-device resources are constrained, the system dynamically allocates compute resources (S102) across nodes and offloads heavier computation to nearby edge servers or cloud servers while preserving federated learning principles.

Robustness mechanisms include pruning and pruning schedules to reduce computational overhead on constrained clients. The system prunes model parameters according to a relevance threshold (S104) before local training or when preparing updates for transmission. Model updates are also screened for bias and provenance prior to integration into the global model: for example, detection of dataset bias can trigger reweighting or retraining policies, and generated content is checked for similarity with known works (S700) or embedded with watermarks (S702) as appropriate. Metadata and provenance information (S704) accompanying updates and model versions are tracked by the aggregator to support auditing and rollback.

Monitoring and lifecycle management are integrated into the federated architecture. The aggregator monitors outputs for distributional changes and model drift (S900) based on aggregated metrics and can trigger retraining (S902) or targeted client selection for additional local data collection. Periodic benchmarking (S904) of aggregated models against held-out datasets or standardized tasks is used to evaluate reliability. Retraining can be scheduled adaptively and incorporate new modalities or updated preprocessing pipelines (S800) as clients upgrade sensors or datasets.

Security, fault tolerance, and extensibility are provided through multiple measures. Federated communication uses secure channels and authenticated client-server interactions.

Clients that exhibit anomalous update patterns are subject to filtering or downweighting. The aggregation server supports rollback to prior model checkpoints and coordinates model versioning. The federated learning framework is extensible to hybrid schemes in which some model components are trained centrally while others are trained at the edge; for example, core shared embedding layers are aggregated across the federation while highly personalized heads remain local.

Example operational parameters include configurable federation round frequency, number of local epochs per round, client sampling rates, and update compression ratios to balance convergence speed with communication cost. Embodiments enable heterogeneity-aware aggregation rules that weight client updates based on dataset size, data quality as measured by local consistency schemas (S804), or compute contributions. The system is further configured to integrate active client recruitment to ensure representation across demographic or modality axes and to satisfy fairness constraints tracked globally.

Collectively, these measures enable distributed training via federated learning that preserves data locality and privacy while supporting efficient multimodal model training, model compression and edge deployment, adaptability to changing workloads, and mechanisms for fairness, provenance, and reliability across the model lifecycle.

As used herein, performing asynchronous updates to model weights across nodes refers to techniques whereby compute nodes that jointly implement a machine learning model exchange and apply parameter updates without requiring a global synchronization barrier at every update step. In one embodiment, the model computation is segmented across a distributed set of compute nodes (S100), and each node maintains a local replica or shard of a subset of model parameters. A node processes incoming data or minibatches independently (for example, processing multimodal inputs in asynchronous batches (S1000)), computes gradients or parameter updates based on its local computation, and transmits those updates to one or more peers or to a central coordination entity. The receiving entity applies the updates to the corresponding global parameters and can respond with an updated parameter version; the sending node continues processing using either its previous local parameters or the newly received parameters, thereby avoiding a full synchronous barrier for every update.

In one implementation, a parameter server architecture is used in which one or more parameter servers collect gradients from worker nodes, apply updates to the global weights, and asynchronously push parameter deltas or new parameter versions back to the workers. Workers compute gradients on local data batches and immediately transmit them to the parameter server without waiting for other workers. The parameter server is configured to apply updates using lock-free techniques or fine-grained locking to maximize throughput. To reduce communication overhead and the size of transmitted updates, the system employs gradient compression, quantization (S500), sparsification, top-k selection, delta encoding, and/or error-compensation schemes so that workers transmit compressed updates while preserving convergence properties. Checkpointing and versioning of parameter updates enable recovery and replay in the event of node failure.

In an alternate embodiment, decentralized asynchronous update protocols such as gossip averaging, ring-based all-reduce with relaxed synchronization, or peer-to-peer parameter exchange are used. Each node periodically selects neighbor nodes and exchanges parameter deltas or model snapshots; each node merges incoming updates using weighted averaging, resilient aggregation rules, or other conflict-resolution mechanisms. Bounded staleness or staleness-aware aggregation is supported by associating version numbers and timestamps with updates, and by scaling or weighting gradients according to their staleness to mitigate the impact of delayed information. Elastic averaging approaches that maintain both local parameters and a moving average of global parameters can be used to allow nodes to drift locally while preserving global consistency.

To address the implications of asynchronous updates on convergence and model quality, the system integrates staleness-aware optimization schemes. Examples include adapting per-update learning rates based on staleness, using momentum correction, applying variance-reduction methods, and employing consistency-regularization losses that penalize excessive divergence among node-local replicas. Where the model is divided into modality-specific modules (S400), asynchronous updates are applied at the module granularity so that each modality-specific module is updated on its own cadence. Progressive training schedules applied to each module (S402) are orchestrated independently, and periodic synchronization points are introduced to realign cross-module parameters and preserve compatibility of embeddings in a shared vector space (S302).

Asynchronous updates are compatible with multimodal processing workflows. In systems that receive inputs from at least two modalities (S300) and generate embeddings in a shared vector space (S302), a node can process modality-specific streams independently and produce local embedding updates. To maintain alignment across asynchronously trained modules, the system can introduce lightweight consistency constraints or alignment losses that are evaluated periodically and used to correct drift. Temporal alignment functions (S304) and attention-based fusion mechanisms (S306) can be adapted to tolerate intermittent parameter staleness by relying on local temporal buffering and staleness-tolerant scoring functions during fusion.

Resource-aware scheduling and dynamic allocation (S102) support asynchronous updates in heterogeneous environments. The system monitors node load, network bandwidth, and update throughput and dynamically reassigns parameter shards or adjusts update frequencies to maintain efficient operation. Where compute or communication resources are constrained—such as when deploying compressed models to edge devices (S502)—updates can be further optimized by applying model pruning (S104) and quantization (S500) prior to distribution, performing sparse updates, or deferring noncritical parameter updates until sufficient bandwidth is available. Specialized hardware for accelerated execution (S1004) can be leveraged to perform local update computation and compression efficiently.

Fault tolerance and reliability are addressed by recording update histories, maintaining redundant replicas of key parameter shards, and allowing nodes to catch up via replay of missed updates. Monitoring components (S900) observe update latency, staleness distribution, and model performance metrics; upon detection of drift or degradation, triggers such as retraining (S902) or periodic benchmarking (S904) are invoked. Security and provenance measures, including authenticated update messages and embedded metadata describing update origin and version (S704), help ensure the integrity of asynchronous updates across nodes.

Practical embodiments include hybrid schemes that combine regular, inexpensive asynchronous updates for most parameters with occasional synchronous consolidation steps for sensitive or highly coupled parameter subsets. For example, modality-specific layers or compact bottleneck layers whose consistency is essential to multimodal fusion are synchronized periodically, while large embedding or feature-extraction layers are updated asynchronously. Automated hyperparameter search (S404) can be employed to select optimal bounds on staleness, update compression ratios, learning-rate schedules, and the cadence of synchronization points, with progressive training schedules (S402) guiding the transition from very asynchronous early-stage training to more consolidated later-stage fine-tuning.

Detailed operational sequences include: a worker node receives a minibatch (optionally from multiple modalities), computes local gradients, compresses the gradients and tags them with a version identifier and timestamp, sends the gradients to a parameter server or peers, optionally applies local updates derived from the computed gradients, and continues processing subsequent minibatches; concurrently, receiving entities apply incoming gradients to global parameters and propagate updates according to configured policies. Metrics describing update propagation delay and staleness are logged and fed to the resource allocator (S102) and to monitoring subsystems (S900) for dynamic adaptation. In federated or privacy-sensitive deployments, asynchronous updates can be performed using secure aggregation, differential privacy mechanisms, or encrypted update channels to preserve client data confidentiality while still enabling collaborative model improvement.

The disclosed asynchronous update mechanisms are interoperable with other system features such as active learning selection (S204), synthetic sample generation (S200), data augmentation (S202), bias detection and reweighting (S600, S602), screening and watermarking of outputs (S700-S704), and deployment strategies for edge inference (S502, S504). By enabling nodes to update weights without global synchronization at every step, the system improves throughput and resilience in distributed training and inference scenarios while incorporating mechanisms—such as staleness-aware optimization, compression with error compensation, periodic synchronization, and monitoring-triggered retraining—to preserve model quality and convergence.

In one embodiment, allocating compute resources dynamically in response to workload changes (S102) comprises monitoring real-time hardware utilization across the distributed compute environment and using the monitored metrics to drive allocation, reallocation, and remediation actions. Real-time hardware utilization is obtained from on-node telemetry agents that sample metrics including processor utilization, accelerator (e.g., GPU, TPU) utilization, memory occupancy and paging rates, on-chip and system-level cache hit/miss rates, network interface throughput and packet error rates, storage I/O rates and latencies, and power and thermal telemetry. The telemetry agents report sampled metrics at configurable intervals to a centralized or hierarchical telemetry aggregator; sampling rates can be adjusted based on the criticality of a workload, varying from sub-second sampling for latency-sensitive inference to multi-second sampling for batch training, and can be configured to reduce overhead via adaptive sampling when utilization is stable.

The monitored metrics are processed by a resource management module that computes utilization statistics and derived indicators such as near-term moving averages, exponentially weighted moving averages, peak-to-mean ratios, and trend slopes. Thresholds and hysteresis windows are applied to these indicators to avoid oscillatory allocation behavior; for example, scaling actions are gated by a requirement that utilization exceed an upper threshold for at least a minimum duration and remain below a lower threshold for a separate minimum duration before deallocation. The module supports multiple policy dimensions, including latency constraints, throughput requirements, cost minimization, energy budgets, thermal limits, and fairness between tenants. Policies can be user-specified or derived automatically via optimization objectives and can be layered (for example, a latency-priority policy that preempts cost-minimization under SLA violation).

A controller uses the processed telemetry to select among allocation actions such as: instantiating additional compute nodes or containers; migrating model partitions across nodes when segmentation of model computation across a distributed set of compute nodes (S100) is employed; resizing the resources of existing virtual machines or containers (CPU shares, memory quotas, accelerator assignment); adjusting batch size or concurrency settings for asynchronous or batched processing (S1000); and switching execution to reduced-latency model architectures (S1002) or to specialized hardware for accelerated execution (S1004). The controller supports both reactive rules (if-then thresholds) and predictive strategies that forecast near-term utilization using time-series forecasting or learned workload models. Predictive allocation enables preemptive scaling to avoid SLA breaches and supports graceful migration of stateful model segments to reduce interruption during reallocation.

Resource allocation actions are coordinated with model optimization mechanisms to reduce overhead and improve fit to available hardware. For instance, when sustained elevated utilization is detected on accelerators, the system invokes pruning of model parameters according to a relevance threshold to reduce computational overhead (S104), applies quantization of model parameters (S500), or selects a quantized, compressed model variant for deployment to edge devices (S502). Conversely, underutilization triggers consolidation of workloads onto fewer nodes and release of idle hardware for cost savings. Allocation decisions explicitly consider memory footprint and memory fragmentation, and employ memory-efficient architectures during inference (S504) to keep the working set within available memory.

The telemetry and allocation subsystem maintains affinity and anti-affinity constraints to optimize data locality, reduce network overhead, and respect co-scheduling requirements for multimodal processing pipelines. When model computation is divided into modality-specific modules (S400), the resource manager can co-locate modules that exchange substantial volumes of intermediate embeddings (S302) or place compute-bound modules on nodes with specialized accelerators (S1004) while assigning communication-intensive modules to nodes offering greater network bandwidth. For workloads that perform fusion of embeddings using attention mechanisms (S306) or that require temporal alignment of streams (S304), the allocation logic accounts for latency between nodes and seeks to minimize end-to-end latency by co-optimizing placement and network path selection.

Security, access control, and privacy considerations are integrated into the monitoring and allocation pipeline. Telemetry data is transmitted and stored with appropriate encryption and access controls; sensitive information is redacted or aggregated as needed. The allocation logic enforces isolation policies, ensuring that multi-tenant workloads cannot request or be placed on hardware that violates regulatory or contractual constraints. Audit logs are maintained describing telemetry events, decisions made by the controller, and the actions performed, enabling later provenance tracking for outputs (S704) and compliance verification.

The system supports closed-loop learning of allocation policies by instrumenting the effects of allocation decisions and using reinforcement learning or supervised learning to tune policy parameters. Observed outcomes such as SLA adherence, energy consumption, and cost are used as reward signals or loss metrics. The learning component suggests allocation rules that balance competing objectives (for example, minimizing latency subject to a cost cap) and proposes placement strategies that reduce the need for future migrations. The allocation framework is integrated with drift detection and retraining triggers (S902) so that sustained changes in workload characteristics automatically influence longer-term provisioning decisions and model retraining schedules.

To minimize disruption during scaling and migration, the allocation subsystem employs phased transitions, including pre-copying of model weights and activation checkpoints, synchronization of input queues, and flow control to avoid oversubscription during handover. For stateful model segments, a state-transfer protocol preserves consistency and bounds downtime. In hardware-constrained environments such as edge deployments, allocation decisions account for device-specific constraints and are configured to offload portions of computation to cloud resources when local hardware utilization exceeds predefined operational or thermal thresholds.

The monitoring and allocation architecture is extensible and exposes APIs for third-party scheduling policies, custom metrics, and custom actions. Operators can define custom probes, composite metrics, and domain-specific alarm conditions. The system integrates with container orchestration frameworks, hypervisors, or bare-metal management layers, and generates human-readable and machine-readable alerts that trigger manual or automated remediation. The overall design ensures that monitoring real-time hardware utilization functions not merely as a passive diagnostic tool but as an active input to dynamic resource allocation (S102), enabling robust, efficient, and adaptive execution of distributed multimodal machine learning workloads.

The resource allocation optimized by a reinforcement learning controller is implemented as a closed-loop control system that observes runtime telemetry, makes allocation decisions, and effects those decisions through a resource manager to realize dynamic compute provisioning S102. In one embodiment, the reinforcement learning controller receives a state vector representing current system conditions including, but not limited to: per-node CPU and GPU utilization, available memory, thermal headroom, network bandwidth and latency between nodes, queue lengths for pending inference or training jobs, sizes and locations of segmented model components S100, current parameter sparsity levels resulting from pruning operations S104, compression formats such as quantization levels S500, and workload characteristics such as request arrival rates, modality mix for incoming inputs S300, and desired service level objectives (SLOs) such as latency, throughput, and accuracy. The state vector further includes higher-level indicators derived from monitoring outputs for distributional changes S900, fairness-related statistics (e.g., class or demographic representation detected via S600), and recent benchmarking results S904. Where multimodal embeddings S302 are used to predict compute and memory demand, summary statistics of those embeddings (for example, embedding dimensionality, density, or computed complexity score) are included in the state.

The action space of the reinforcement learning controller encompasses discrete and continuous actions that directly affect resource allocation and model execution. Example actions include: instantiating or terminating worker instances on particular compute nodes; migrating or reassigning model segments across nodes S100; scaling the number of parallel replicas for throughput-intensive workloads; selecting a latency-sensitive model architecture for a given inference task S1002; selecting specialized hardware accelerators for execution S1004; adjusting per-module training or inference scheduling S402; applying or reverting pruning levels S104; changing quantization parameters S500; and altering batching policies such as asynchronous batch sizes S1000. Actions further include adjusting task placement to favor edge devices S502 when latency or privacy constraints demand, and selecting memory-efficient architectures S504 for constrained devices. The controller can output composite actions comprising multiple resource changes. In distributed embodiments, the controller can operate as a centralized policy that issues allocation plans to a resource orchestration layer, or as a multi-agent system where per-node agents coordinate by exchanging summarized observations and negotiated allocations.

The reinforcement learning controller employs any of several common RL algorithmic families depending on operational requirements. For continuous action spaces with many dimensions, model-free off-policy actor-critic methods such as soft actor-critic (SAC) or deterministic policy gradient (DDPG) variants are suitable; for discrete or mixed actions, proximal policy optimization (PPO) or advantage actor-critic (A2C/A3C) can be applied. In latency-sensitive production deployments, the controller is implemented with a lightweight inference model for the policy so decision latency remains well below the control interval. The policy network itself can be realized as a feedforward neural network, a recurrent network to capture temporal dependencies, or as a transformer that attends over recent telemetry sequences; in embodiments where multimodal features inform decisions, the policy ingests embeddings produced in a shared vector space S302 and processes them via modality-specific encoders before fusion via attention mechanisms S306. Where interpretability is required, the policy is supplemented with a value function and diagnostic heads that predict expected latency, energy consumption, and accuracy impact for candidate allocations.

Reward design reflects the multi-objective nature of compute resource allocation. The primary reward term incentivizes meeting SLOs: a positive reward is assigned when latency targets and throughput requirements are satisfied; negative rewards (penalties) are applied for SLO violations. Auxiliary reward terms penalize monetary cost of resource usage, energy consumption, and device wear (for thermal management), thereby encouraging energy-efficient allocations and selection of specialized hardware S1004 only when justified. To preserve model quality, the reward includes constraints on allowable accuracy degradation, penalizing allocations that rely on aggressive pruning S104 or quantization S500 beyond predefined thresholds, or that reduce the effectiveness of multimodal fusion S306. Fairness-related penalties derived from bias detection S600 can be included to discourage allocations that degrade performance disproportionately for underrepresented groups; alternatively, fairness can be enforced as a hard constraint. Reward shaping can incorporate smooth penalties for migration overhead so that unnecessary movement of segmented model components S100 is avoided. Where multi-objective trade-offs are complex, scalarization techniques or multi-objective RL formulations can be used, or separate reward heads can be learned and combined by a higher-level scheduler.

Training the reinforcement learning controller follows a staged approach. An initial offline training stage uses historical telemetry and simulated workloads to bootstrap the policy. Simulated environments approximate compute node heterogeneity, network conditions, job arrival processes, and the performance impacts of actions such as migration and quantization; these simulations are informed by benchmarking S904 and use surrogate models trained on real measurements. To reduce the sim-to-real gap, domain randomization and conservative policy updates are applied. After deployment, online fine-tuning is performed using risk-constrained exploration strategies: constrained RL algorithms, action masking, and conservative policy iteration prevent destabilizing actions. Experience replay buffers store recent transitions, and prioritized sampling emphasizes rare but important events such as bursty traffic or node failures. When distributional changes are detected via monitoring S900 and retraining triggers S902 are activated, the controller updates its policy by combining recent online experiences with curated historical data. Transfer learning and meta-learning techniques accelerate adaptation when new hardware (S1004) or new model segmentation strategies S100 are introduced.

Integration with system components is accomplished via well-defined interfaces. The controller subscribes to telemetry streams produced by a monitoring layer and publishes allocation decisions to a resource orchestration layer that implements physical actions (e.g., container orchestration, hardware allocation, model segment placement). The orchestration layer performs validation against hard safety constraints before enacting actions. For distributed controller embodiments, a coordination protocol enables per-node agents to agree on placements and to maintain temporal alignment S304 for synchronized data streams; this coordination is implemented through a consensus service or a parameter server. Auditing and provenance features record controller decisions and the rationale (e.g., key state features and estimated reward delta), and these records are used for periodic benchmarking S904 and for human oversight.

Fault-tolerant mechanisms guard against adverse outcomes. Before applying actions that materially change model structure (e.g., pruning S104, quantization S500), the controller tests the changes on a shadow stream or a canary set to verify that accuracy and fairness remain within acceptable bounds. Rollback policies and staged rollouts limit blast radius. To ensure sustained stability, the controller's policy periodically undergoes offline validation against updated test suites that include fairness assessments S600 and content similarity screening where relevant S700. The controller's hyperparameters and architecture are subject to automated hyperparameter search S404 as part of lifecycle management, and insights from this search feed back into controller evolution.

The system further comprises checkpointing model states to optimize recovery after failure. In one embodiment, checkpointing is performed periodically or upon occurrence of predetermined events to capture a consistent snapshot of model parameters, optimizer state, random number generator seeds, accumulated gradients, modality-specific buffers, current training epoch, batch index, and any auxiliary state associated with modality-specific modules S400. Checkpoint conditions can be time-based, iteration-based, based on workload changes detected by the resource allocation subsystem S102, triggered by detection of distributional change S900, or initiated prior to operations that materially change state such as pruning S104, quantization S500, or large-scale model segmentation S100. Checkpointing is further triggered by completion of phases in progressive training schedules S402, completion of hyperparameter search trials S404, or before deployment of compressed models to edge devices S502.

For distributed training across a plurality of compute nodes, checkpoint creation is coordinated to ensure a recoverable consistent global state. In one implementation, nodes participating in segmented model computation S100 negotiate a checkpoint barrier, flush in-flight updates, and locally serialize their shard of the model state. Coordination can be achieved using centralized checkpoint orchestration or decentralized algorithms such as a distributed snapshot protocol to produce a set of per-node checkpoint artifacts that together form a consistent global checkpoint. Metadata recorded with each checkpoint includes node identifiers, assignment of model shards or modality-specific modules S400, embeddings partition identifiers (for embeddings generated in a shared vector space S302), training step counters, and checksums for integrity verification.

To reduce checkpoint storage footprint and I/O overhead, checkpoint artifacts are subjected to size-reduction procedures prior to persistence. Examples include topology-aware pruning S104 that removes parameters below a relevance threshold before serialization, quantizing checkpointed parameters using the same or a compatible quantization scheme as deployed inference S500 and S1002, and performing delta or incremental checkpointing that records only parameters or parameter blocks changed since the previous checkpoint. Compression and encoding are applied, and in some embodiments specialized hardware acceleration S1004 performs on-the-fly compression or encoding to satisfy stringent latency constraints.

Checkpoint storage is configured to balance durability, accessibility, and privacy. Local ephemeral storage on each compute node is used for fast, transient checkpoints, while durable replication to networked object storage, distributed filesystems, or replicated edge repositories is used for extended retention. Storage processes replicate one or more copies of each checkpoint artifact, employing erasure coding or multi-zone replication for fault tolerance. Checkpoints include signed metadata to support provenance tracking S704 and integrity checks. Where privacy or intellectual property protection is required, checkpoint artifacts are encrypted prior to transmission and storage and carry access control metadata and digital signatures.

Recovery after failure proceeds by locating the latest consistent global checkpoint and restoring per-node state from the corresponding checkpoint artifacts. A recovery manager re-instantiates model shard assignments S100, reattaches modality-specific modules S400, restores optimizer state and accumulated gradients, reinstates RNG seeds, and resumes training or inference from the recorded batch index or epoch. If some nodes are unavailable, the system can re-partition model shards across healthy nodes and restore from the available checkpoint artifacts, applying warm-start techniques where only model weights are restored while optimizer state is reinitialized and adjusted via learning rate schedules or automated hyperparameter search S404. In certain embodiments, replay logs of recent parameter updates or gradient accumulation snapshots are maintained to enable fine-grained reconstruction of state beyond the last checkpoint.

Checkpoint policies are adjustable to optimize tradeoffs between checkpoint frequency, recovery time objective, and runtime overhead. Dynamic checkpoint frequency tuning leverages workload signals S102 and monitors such as output distribution change detectors S900 and reliability benchmarks S904. Under conditions of elevated instability or recurrent failures, the system can shorten checkpoint intervals and disable incremental checkpointing to reduce reconstruction complexity. Conversely, when compute or network bandwidth is constrained, the system can extend intervals and rely on a combination of the latest checkpoint and cached update logs to reconstruct state.

Checkpointing is integrated with other system functions. Prior to pruning S104, the system creates a checkpoint to allow rollback if pruning degrades performance. When deploying compressed or quantized models to edge devices S502, checkpoints capture both the original full-precision state and the compressed representation, enabling rollback or re-provisioning. For asynchronous batch processing of multimodal inputs S1000, checkpoints include synchronization metadata and temporal alignment state S304 to preserve consistency across modalities. Checkpoints also store model components associated with fusion mechanisms such as attention-based fusion S306 and shared embedding parameters S302 to ensure that the multimodal inference pipeline can be restored intact.

Security, integrity, and auditability of checkpoints are supported by including checksums, cryptographic hashes, and immutable provenance metadata S704 with each checkpoint artifact. Checkpoint lifecycle management supports retention policies, versioning, and controlled deletion. For generated media or outputs subject to screening S700 or watermarking S702, checkpoint metadata can record provenance tags and watermark embedding parameters so that outputs reproduced after recovery remain traceable.

In implementations where edge devices participate in training or inference, checkpoint transfer is optimized to account for device constraints. The system transfers incremental or compressed checkpoint segments to edge devices S502 and leverages specialized latency-optimized architectures S1002 and accelerated hardware S1004 on edge nodes to apply checkpoints rapidly. Lightweight checkpoint formats and modulo-differencing schemes reduce bandwidth consumption and accelerate warm-start on resource-limited devices.

Pruning S104 is performed after each training epoch and integrated into the training loop. At the end of an epoch, training is temporarily suspended while importance evaluation and pruning are applied, yielding a pruned model state. Optionally, immediate fine-tuning is performed in the subsequent epoch to allow the network to recover accuracy lost by pruning; in such cases the next epoch is initialized with the pruned parameter set. In alternative embodiments, a brief local retraining cycle or warmup is executed following pruning before resuming regular epoch-length training. The per-epoch pruning schedule enables gradual sparsification of the model across multiple epochs and reduces abrupt capacity changes that can destabilize training.

The per-epoch pruning approach is compatible with progressive training schedules S402 and modality-specific modules S400. Progressive schedules can specify an initial warmup period with little or no pruning followed by increasingly aggressive pruning rates after each epoch, or conversely employ early aggressive pruning followed by conservative maintenance pruning. When the overall model is divided into modality-specific modules S400, pruning S104 can be applied independently per module with separate relevance thresholds and schedules, thereby allowing modalities with differing information density or training characteristics to retain appropriate capacity. Module-specific pruning rates can be set according to module sensitivity measured on a held-out validation set or via automated hyperparameter search S404 that optimizes pruning thresholds and schedules jointly with learning rates and other parameters.

Adaptive, safety-oriented mechanisms are included to preserve training stability and final model utility. To mitigate catastrophic degradation, embodiments implement rollback, gradual pruning, and threshold-adaptation techniques. For example, pruning S104 performed after each training epoch is constrained so that the fraction of parameters removed in a single pruning step does not exceed a preconfigured maximum. If validation metrics fall below predefined tolerances following pruning, the system triggers a rollback to the prior-epoch model or relaxes the pruning threshold for subsequent epochs. Rewinding techniques reset optimizer state and selected parameters to earlier checkpoint values while maintaining the pruned topology. Learning-rate schedules and other hyperparameters are adjusted automatically via hyperparameter search S404 to accommodate the altered model capacity after pruning.

Per-epoch pruning integrates with data-centric processes. When active learning S204 or synthetic data generation S200 are in use, pruning can be coordinated with dataset updates so that model capacity adapts to the evolving training set. For example, when new labeled instances selected by active learning are added to the training pool, the pruning threshold can be dynamically reduced to allow the model to grow or retain parameters necessary to represent the new information. Conversely, when redundant or limited-information data are removed or reweighted S602, pruning intensity can be increased to exploit the reduced representational requirements.

The per-epoch pruning regime supports fairness and bias mitigation workflows. Bias detection S600 can identify under-represented subgroups; in response, pruning S104, performed after each training epoch, can be constrained to preserve parameters determined to be critical for performance on under-represented groups, or pruning thresholds can be adjusted on a per-module basis to maintain equitable performance. Retraining with fairness constraints S604 can be carried out after pruning steps to ensure that pruning does not amplify bias.

Implementation details address checkpointing, mask persistence, and provenance. After each epoch pruning S104, the pruned topology and associated masks are persisted to checkpoint storage along with metadata describing the pruning method, thresholds, validators used, and epoch index. This metadata can be embedded in output provenance fields S704 or used by watermarking or screening subsystems S700, S702 to track changes in generated content or to assist in model auditing. Periodic benchmarking S904 after pruning steps is used to evaluate reliability and validate that expected performance metrics are maintained.

When deploying to resource-constrained devices, pruning S104, performed after each training epoch, reduces model size prior to quantization S500 and compression. Embodiments combine per-epoch pruning with subsequent quantization-aware fine-tuning so that quantization S500 and pruning-induced sparsity are jointly optimized for edge inference S502 and memory-efficient architectures S504. The per-epoch pruning schedule is tunable to reach a target sparsity and compute budget at a chosen epoch checkpoint for deployment.

Production monitoring S900 observes distributional shifts and performance drift. If drift is detected at S902 and retraining is required, the saved per-epoch pruning metadata permits resuming training from a known pruning state or adjusting pruning aggressiveness during retraining to better capture new data distributions. Embodiments are configured to disable pruning during retraining triggered by severe drift until the model stabilizes, or to enable an adaptive per-epoch pruning schedule that responds to drift signals.

The training process implements iterative parameter pruning (S104) integrated into a minibatch-driven optimization loop. During training, model parameters are updated in response to each minibatch according to the chosen optimizer and learning rate schedule (S404). A counter increments with each processed minibatch and, when the counter reaches a predefined minibatch threshold, a pruning operation is performed; in other words, pruning is performed after a predefined number of minibatches. The predefined number is a configurable hyperparameter that can be set prior to training or adjusted dynamically based on observed training characteristics; example values include 100, 500, 1,000, or other values selected according to model size, dataset size, and available compute. The predefined number can be expressed in absolute minibatch counts or in equivalent wall-clock intervals when synchronized across distributed compute nodes (S100). In distributed implementations, the minibatch counter is synchronized among participating compute nodes through a coordinated counter or a distributed consensus mechanism so that pruning events occur consistently across the distributed parameter set.

When parameters are selected for pruning, one of several pruning actions is taken according to the chosen embodiment: parameters can be zeroed via masking, physically removed from parameter storage and computation graphs, or replaced with reduced-rank or quantized representations. A binary mask is created and applied to parameter tensors so that subsequent forward and backward passes bypass masked parameters. In embodiments that physically remove parameters, associated optimizer state (momentum buffers, adaptive learning rates) is updated or recomputed to reflect the reduced parameter set; in masking embodiments, optimizer state is either retained or selectively reinitialized for masked-to-unmasked transitions. The mask and metadata identifying pruned structures are persisted in model checkpoints to enable correct loading for subsequent fine-tuning, evaluation, or deployment.

In distributed training contexts (S100), pruning can be executed in several ways. A centralized coordinator aggregates relevance statistics from all nodes and issues a global pruning mask to ensure identical sparsity patterns across replicas. Alternatively, each node performs local pruning based on local statistics and then converges to a globally consistent model via parameter averaging or sparse-allreduce operations. To prevent divergence when nodes prune disjoint parameter subsets, consistency is preserved by exchanging mask metadata alongside parameter updates and by applying deterministic selection rules for parameters on the pruning boundary.

For optimizers that maintain per-parameter state, such as Adam, pruning either preserves the state of masked parameters (when masking is employed) or removes—and optionally reinitializes—the optimizer state for parameters that are pruned. When gradient accumulation across multiple minibatches is employed, the pruning counter is incremented only after an effective minibatch (i.e., after a number of accumulation steps equivalent to one minibatch), ensuring that pruning frequency corresponds to algorithmic mini-batch units rather than raw forward passes.

Pruning operations are instrumented to record metrics used for monitoring and drift detection (S900). Recorded metrics include parameter counts, sparsity percentage, validation accuracy, loss, and compute-time reductions. These metrics are used to trigger further pipeline actions such as automated retraining policies (S902), quantization (S500), or deployment of compressed models to edge devices (S502). Pruned models are compatible with subsequent quantization and compression steps; in one embodiment pruning is followed by quantization-aware fine-tuning so that the reduced parameter set can be more effectively quantized (S500) without incurring disproportionate accuracy loss.

Pruning can be combined with data-centric techniques. For example, synthetic training samples (S200) and data augmentation (S202) can be interleaved with pruning cycles to ensure the model retains generalization across the augmented distribution. Active learning (S204) informs which examples are emphasized during post-pruning fine-tuning to expedite recovery. Fairness-related workflows (S600-S604) are invoked after pruning events to detect emergent biases introduced by parameter removal; if bias metrics exceed thresholds, sample reweighting or retraining with fairness constraints is executed.

Termination of iterative pruning is governed by one or more stop criteria: reaching a target global sparsity, reaching a target compute or memory budget, observing no further acceptable accuracy recovery after consecutive pruning events, or reaching a maximum allowed number of pruning cycles. All pruning hyperparameters and schedules are recorded as part of training provenance metadata (S704) so that models deployed to production or to edge devices retain information necessary for reproducibility, auditing, and future adaptations.

In practical deployments, pruning intervals and thresholds are exposed as tunable parameters within the training orchestration system (S102), enabling dynamic allocation of compute resources in response to reduced computational load (S104 leading to S102). The process is implemented to minimize disruption to streaming or latency-sensitive inference requirements by performing heavier pruning computations asynchronously or during periods of reduced load, or by employing latency-optimized architectures that can accept incremental mask updates without a full model reload (S1002, S1004).

In one embodiment, a distributed training system implements segmentation of model computation across a distributed set of compute nodes (S100), wherein the nodes communicate updates using a fast network interface. Each compute node maintains local model state or partial model state corresponding to the assigned segment of the overall model. During forward and backward propagation, updates comprising gradients, model parameter deltas, or compressed summaries of such information are transmitted between nodes to ensure model consistency and to enable parameter synchronization between modality-specific modules or fusion stages (e.g., those performing embedding generation (S302), temporal alignment (S304), or embedding fusion (S306)). The fast network interface provides a minimal-latency, ample-bandwidth communication substrate that supports exchange of these updates at rates commensurate with the computational throughput of accelerator hardware (S1004) and minimal-delay model architectures selected for inference and distributed training (S1002).

The fast network interface can be implemented using any suitable hardware or protocol that enables efficient bulk and fine-grained data movement. In various embodiments the interface comprises Remote Direct Memory Access (RDMA) capable links, InfiniBand, performance Ethernet (e.g., 25/40/100/200/400 Gbps), optical interconnects, or direct fabric connections between accelerators (e.g., NVLink or PCIe peer-to-peer). The interface supports zero-copy transfers, kernel bypass, and memory registration to minimize CPU intervention and host memory copies, thereby reducing end-to-end latency for update propagation. Support for hardware features such as on-network collective operations or programmable offload engines is leveraged to accelerate common synchronization primitives, including broadcast, reduce, all-reduce, gather and scatter, which are used to implement parameter aggregation schemes and gradient dissemination.

Multiple communication topologies and synchronization strategies are supported. In one arrangement, a parameter-server architecture is used, wherein a subset of nodes or dedicated servers aggregate updates from worker nodes and return updated parameter values. In another arrangement, fully decentralized collective algorithms such as ring all-reduce, tree-based aggregation, or hierarchical aggregation are used to reduce network contention and exploit locality: nodes within the same rack or cluster perform local aggregation before forwarding aggregated updates across higher-level network links. The topology and aggregation algorithm are dynamically selected based on workload characteristics, available bandwidth, latency, and compute node placement, and can be coordinated with dynamic resource allocation mechanisms (S102) to balance communication and computation.

To reduce communication volume and adapt to constrained network conditions, embodiments employ update compression and sparsification techniques. Gradients or parameter updates are pruned according to a relevance threshold to reduce computational and communication overhead (S104), quantized to reduced-precision representations (S500), or encoded as sparse delta structures that contain only non-zero or significant entries. Lossy and lossless compression schemes, adaptive quantization, entropy coding, and threshold-based filtering are used alone or in combination. Compression parameters and sparsity thresholds are negotiated between nodes and are adjusted at runtime in response to detected distributional changes in outputs (S900) or network congestion, with mechanisms for gradual or staged refinement of transmitted updates to preserve convergence.

Communication scheduling, batching, and pipelining are employed to hide latency and improve link utilization. Compact updates are aggregated into batches prior to transmission; larger updates are partitioned and streamed to enable overlap of computation and communication. The system supports asynchronous batching of multimodal inputs and their corresponding gradient flows (S1000), allowing nodes to continue local computation while awaiting remote updates. When strict synchronization is required for particular training phases or modality fusion operations (e.g., synchronizing embeddings generated from multiple modalities (S302) prior to attention-based fusion (S306)), the system can enforce barrier synchronization using a low-latency interface, or employ relaxed-consistency protocols that bound staleness to an application-specific threshold.

Reliability and ordering semantics are provided as required by the training protocol. The network stack implements end-to-end checksums, retransmission strategies, and flow control to tolerate transient link errors. For distributed training regimes tolerant to partial failures, nodes can opportunistically proceed using best-effort updates while reconstruction and recovery are performed in the background. Checkpointing of local model segments and periodic global snapshots are used to enable recovery consistent with the training state; these snapshots are transferred efficiently over a fast, low-latency interface. When operating in edge deployment scenarios with intermittent connectivity (S502), the communication subsystem supports opportunistic synchronization, deferred update propagation, and merging strategies that reconcile divergent parameter states upon reconnection.

Security and provenance features are integrated into the communication fabric. Authentication and encryption of inter-node traffic are supported to protect parameter confidentiality and integrity during transfer. Metadata describing update provenance, version identifiers, and consistency tokens are attached to transmitted updates to facilitate downstream processes such as output provenance tracking (S704), watermark insertion coordination (S702), or auditing of fairness and bias mitigation measures (S600-S604). Quality-of-service mechanisms prioritize latency-sensitive control messages (e.g., synchronization barriers or learning-rate adjustments discovered by automated hyperparameter search (S404)) over bulk model checkpoint transfers.

Topology-aware partitioning and placement techniques are employed to minimize cross-cluster communication and to exploit local interconnects offering enhanced bandwidth. When the model is divided into modality-specific modules (S400), colocating modules that exchange regular updates on nodes interconnected by the fastest links reduces communication overhead. Dynamic resource allocation (S102) adapts node assignment in response to workload changes, relocating model segments or adjusting the degree of parallelism to maintain throughput while avoiding network hotspots. Load balancing policies account for both computational load and anticipated communication volume when making placement decisions.

Instrumentation and monitoring of the communication subsystem collect telemetry such as per-link bandwidth utilization, round-trip latency, packet loss rates, and aggregate update throughput. This telemetry is used to detect distributional changes in outputs (S900) that might indicate congestion-induced staleness or model drift, and to trigger remediation actions such as retraining (S902), adjustment of compression parameters, reconfiguration of aggregation topologies, or migration of model segments. Periodic benchmarking of communication performance and end-to-end training throughput supports selection and tuning of architectures optimized for minimal latency (S1002) and guides decisions regarding use of specialized hardware accelerators (S1004).

The fast network interface provides extensible protocol semantics to enable advanced coordination patterns. Hooks for application-layer callbacks permit integration of active-learning workflows (S204) and data-augmentation pipelines (S202) that require synchronization of dataset metadata or sample-selection signals across nodes. The network further supports distributed streaming of multimodal data with temporal-alignment markers to ensure consistent fusion when inputs from two or more modalities (S300) are received and processed by separate nodes. These markers, combined with deterministic buffering and alignment logic, enable accurate temporal fusion without introducing excessive buffering-induced latency.

Collectively, these mechanisms provide a flexible, efficient communication substrate that enables distributed segmentation of model computation (S100) with robust synchronization, reduced communication overhead through pruning and quantization (S104, S500), dynamic resource adaptation (S102), and compatibility with edge deployment and compressed model inference (S502, S504). Various combinations and permutations of the described communication topologies, compression strategies, scheduling policies, and security features can be employed to address differing tradeoffs among convergence speed, communication cost, robustness, and deployment constraints.

The disclosure describes that, following pruning of model parameters according to a relevance threshold (S104), the system further comprises compressing model weights post-pruning to reduce storage footprint and runtime memory usage while preserving acceptable inference accuracy. Compression is performed using one or more complementary techniques selected according to target deployment constraints (for example, edge memory, bandwidth, and latency requirements specified by S102 and S502). In a first approach, the pruned weight tensor is represented using sparse storage formats such as compressed sparse row (CSR), compressed sparse column (CSC), block-sparse encodings, or run-length encoding. Indices identifying non-zero positions are stored alongside remaining weight values, and the layout is chosen to align with the memory-access patterns of the intended inference engine or specialized hardware (S1004). In alternative or additional approaches, weight clustering is applied to the remaining non-zero weights: centroids are computed via k-means or similar clustering, each weight value is replaced by an index to the nearest centroid, and the centroid table is stored once. This clustering reduces entropy of the weight representation and enables compact index-based storage.

Quantization is applied as another principal compression modality (S500). Quantization can be uniform or non-uniform and can use fixed-point representations (for example, 8-bit, 4-bit, 2-bit, ternary, or binary), logarithmic quantization, or learned quantization codebooks. Quantization parameters (scale, zero-point, or codebook entries) are stored with the compressed model and can be fused with layer parameters to enable efficient dequantization. Quantization-aware fine-tuning can be performed after quantization to recover accuracy lost during discretization; this fine-tuning can follow the progressive training schedules applied to modality-specific modules (S402) or be integrated into the automated hyperparameter search (S404) that selects bit widths and other quantization hyperparameters subject to an accuracy-loss budget.

Lossless entropy coding techniques such as Huffman coding, arithmetic coding, or range coding are applied to further compress the quantized or clustered weight indices and residuals. In one embodiment, the pipeline applies quantization followed by run-length encoding of repeated indices and then entropy coding to produce a highly compact bitstream. Metadata describing the encoding scheme, block sizes, and decoding parameters is embedded in the model package to permit correct reconstruction at load time. The system additionally supports hybrid compression in which some layers (for example, large linear layers or attention projection matrices used in multimodal fusion S306) are compressed using reduced-rank factorization (for example, singular value decomposition or tensor decomposition) while other layers use sparsity-oriented encodings; selection of per-layer compression technique is determined by automated evaluation during an offline optimization stage (S404) that balances model size, expected latency (S1002), and accuracy.

The compression stage is integrated into the overall model lifecycle: after pruning (S104), compression is executed, followed by validation. Validation includes decompressing the model locally or via simulated inference to measure end-to-end performance metrics such as accuracy on validation datasets (including modality-specific consistency checks S804), latency, and memory usage. If performance degradation exceeds a predefined threshold, the system can invoke iterative retraining or fine-tuning of the pruned-and-compressed model, adjust compression hyperparameters, or revert selected compression operations. Iterative procedures include knowledge distillation, in which a teacher model with greater capacity provides soft labels to guide fine-tuning of the compressed student model, thereby restoring accuracy while retaining compression gains.

For deployment to resource-constrained devices (S502), compressed models are packaged with compact runtime decoders or are stored in formats directly consumable by inference runtimes to avoid expensive decompression at load time. For example, block-quantized representations or table-indexed weight clusters can be loaded directly into accelerator-friendly memory layouts on specialized hardware (S1004) to enable inference using memory-efficient architectures (S504) without a full-precision reconstruction step. Where full decoding is necessary, the decompression routine is optimized to stream and decompress only the weight blocks required for a given batch or subgraph, supporting asynchronous batch processing of multimodal inputs (S1000) to minimize peak memory usage.

In some embodiments, compression decisions are made dynamically based on monitoring and feedback. A model optimization component monitors deployment telemetry, including drift in input distributions (S900) and device resource availability, and can trigger automated re-compression with adjusted parameters when constraints change or when model retraining is scheduled (S902). Compression parameters and decision logs can be recorded as part of output provenance metadata (S704) to facilitate reproducibility and auditing. The system further supports multiple compressed variants of a pruned model optimized for different target classes of devices (for example, one variant using 8-bit quantization and sparse CSR for higher-end edge devices, and another using 4-bit clustered quantization for devices with very limited memory) and selects among them at deployment time based on device capability signals (S102, S1004).

Security and integrity measures are provided for compressed weights: checksums or cryptographic hashes of the compressed payload and metadata are generated and stored with the model package to detect tampering. Digital watermarks (S702) and provenance tags (S704) are inserted into the compressed representation in a manner resilient to the applied compression techniques, enabling subsequent identification of generated or redistributed models. Compression routines are incorporated into continuous benchmarking workflows (S904) to ensure that periodic evaluations include the pruned-and-compressed models and that any gradual degradation in accuracy or performance over time is detected and remedied.

Parameter selection for pruning and subsequent compression is compatible with fairness and data-representation objectives: when pruning pursuant to a relevance threshold (S104) that was determined while performing bias detection and reweighting (S600, S602), compression preserves parameters necessary for maintaining fairness constraints; if required, retraining after compression enforces fairness constraints in the loss function (S604). Automated hyperparameter search (S404) can include fairness and reliability metrics as objectives or constraints when selecting compression strategies.

Implementation examples include computer-executable instructions for performing the pruning and compression pipeline stored on a non-transitory computer-readable medium and executed by one or more processors in a distributed compute environment (S100). The instructions implement the sequence of operations: apply pruning to remove parameters below a relevance threshold (S104); transform remaining weights into sparse or clustered representations; quantize values according to selected bit-widths (S500); apply entropy coding; generate and attach decoding metadata; validate decompressed model accuracy and latency; and package compressed models for deployment to edge devices (S502) with supporting runtime decoders or accelerator-ready layouts (S1004). The detailed description contemplates that various combinations and sequences of the described compression techniques can be applied, that compression hyperparameters can be chosen per-layer or per-module (S400), and that the system is capable of adapting compression choices in response to monitored operational constraints and performance targets.

The adaptive threshold $\tau$ can be realized in multiple ways. In one class of embodiments, t is determined to satisfy a resource constraint, e.g., memory, FLOPs, latency, or power consumption. Given a computational budget B (which can be expressed as maximum parameter count, maximum model size, or latency target), $\tau$ is selected so that the aggregate cost of retained parameters $C(\tau)=\Sigma_\{i:\ r\_i\geq\tau\}$ cost_i does not exceed B. The selection can be implemented by sorting parameters by r_i and retaining the top-k fraction whose cumulative cost meets the budget, or by binary search on $\tau$ until $C(\tau)\leq B\pm\varepsilon$. Cost contributions cost_i can be proportional to parameter storage size, associated multiply-accumulate operations, or hardware-specific execution cost for specialized hardware (S1004). In some embodiments, the budget B is dynamically provided by a resource manager that allocates compute resources in response to workload changes (S102), and t is recomputed whenever B is updated.

Per-layer, per-module, and per-modality adaptive thresholds are supported. For models divided into modality-specific modules (S400), separate adaptive thresholds $\tau\hat\{(m)\}$ are maintained for each modality m to account for differing redundancy and importance across modalities. Similarly, progressive training schedules (S402) employ aggressive pruning early in training for layers that converge quickly and apply more conservative pruning for layers that are sensitive to capacity. An embodiment employs a hierarchical pruning policy in which a global $\tau\_g$ sets a baseline, and layer-specific $\tau\_1$ are constrained by $\tau\_1=f\_1(\tau\_g, statistics\_1)$, where statistics_1 include parameter relevance distributions in the layer; f_1 is implemented as a learned mapping or as a heuristic function such as scaling by the layer's median relevance.

Adaptive pruning is compatible with iterative pruning and retraining cycles. In one procedure, an initial pruning decision using $\tau$ removes parameters with r_i<$\tau$, followed by fine-tuning of the remaining parameters to recover performance. The threshold $\tau$ is progressively increased during successive pruning stages to reduce model size stepwise while allowing retraining to compensate for capacity loss. After each retraining, relevance scores r_i are recomputed to reflect updated parameter dynamics, and $\tau$ is re-evaluated. Where fairness or debiasing is required, the retraining step incorporates fairness constraints in the loss function or sample reweighting (S604, S602), and t adaptation considers fairness metrics as part of M to avoid pruning that disproportionately harms underrepresented groups.

Adaptive thresholding can be implemented at training time, at deployment, or both. For deployment to edge devices, t can be adapted to fit device-specific constraints and can be periodically updated in the field in response to monitored distributional changes (S900) or drift triggers that initiate retraining (S902). In memory- or latency-constrained inference, an online adaptation mechanism selects t per incoming batch or per request class to meet latency targets (S1002), for example selecting a stricter t for background or approximate inference and a relaxed t for time-sensitive tasks. Embodiments support asynchronous batches (S1000) in which different batches use different t values depending on their content or required quality.

Computation of $\tau$ and pruning decisions is distributed across compute nodes. In one embodiment, model segmentation across a distributed set of compute nodes (S100) is combined with distributed pruning, in which local nodes compute local relevance distributions and a coordinator aggregates statistics to produce a global $\tau$ or per-segment t values. Aggregation uses communication-efficient summaries, for example histograms or sketches, to reduce overhead. When specialized hardware is used for accelerated execution (S1004), t selection accounts for hardware-friendly pruning patterns such as block or structured pruning to ensure efficient execution on target accelerators.

To avoid catastrophic performance drops, embodiments employ safeguards including minimum retention ratios per layer or per functional block, rollback mechanisms that restore previously saved parameter sets if evaluation after pruning falls below acceptable levels, and selective unpruning whereby previously pruned connections can be reintroduced during retraining when they prove beneficial. The adaptive threshold mechanism supports multiple pruning granularities, including unstructured parameter pruning, structured channel- or neuron-level pruning, and higher-level module pruning.

Adaptive threshold parameters, update schedules, and the selection of relevance metrics are obtained via automated hyperparameter optimization (S404) or meta-learning approaches. In some embodiments, synthetic training samples (S200), data augmentation (S202), or active learning (S204) are used during retraining phases to improve robustness after pruning. After pruning and retraining, further model compression techniques, such as quantization (S500) and compression for edge deployment (S502), are applied. Monitoring components continue to validate model reliability through periodic benchmarking (S904) and screen outputs for similarity or provenance concerns (S700-S704), ensuring that the adaptive pruning policy does not unintentionally degrade downstream properties.

In one embodiment, pruned parameters produced in accordance with the pruning operation S104 are converted from a dense representation into one or more sparse storage formats prior to storage or deployment. The conversion entails identifying the set of parameters that remain after pruning (the non-zero parameter set) and representing the model weights using index-value pairs or compressed index structures instead of full dense arrays. Suitable sparse formats include, but are not limited to, a coordinate list (COO), compressed sparse row (CSR), compressed sparse column (CSC), block-sparse encodings (for example, fixed-size block masks such as 4×4 or 8×8), run-length encoding for contiguous zero stretches, and bitmask-based schemes that store a compact mask indicating nonzero locations together with a dense array of nonzero values. The sparse representation can be stored layer-wise, module-wise (for example, per modality-specific module S400), or globally for the entire model depending on target memory and access patterns.

Metadata describing the sparse format and layout is stored alongside the sparse values and indices to permit correct reconstruction and direct sparse execution. Such metadata can include layer identifier, original tensor shape, storage format identifier (e.g., CSR, COO, block-sparse), number of nonzero entries, index data type, value data type, alignment and padding information required by target accelerators, and pointers or offsets to the index and value arrays. Where progressive training schedules S402 or automated hyperparameter search S404 are employed, versioning metadata is included to track the pruning iteration, threshold values used, and any re-growth or fine-tuning steps, enabling rollback to prior dense or less-sparse states for further training or evaluation.

In embodiments that combine pruning with quantization S500, the nonzero values stored in the sparse format are quantized to a reduced bit width prior to storage to reduce memory footprint further. Quantization codes or lookup tables required for dequantization are stored as part of the metadata. In one variant, values are stored in a per-layer or per-block quantized representation (for example, 8-bit, 4-bit, or variable-bit schemes) with scale and zero-point parameters stored in the layer metadata. In another variant, the index arrays are delta-encoded and entropy-coded (for example using Huffman or arithmetic coding) to reduce the index storage cost when nonzero positions exhibit locality or predictable patterns.

For on-device and edge deployments S502, S504, the sparse storage format is selected to match hardware and software support on the target device. When the target supports sparse linear algebra kernels (for example specialized sparse GEMM kernels on an accelerator or sparse tensor cores), formats such as CSR/COO or block-sparse layouts that are natively supported by the accelerator are preferred. Where native sparse kernel support is lacking, a bitmask plus dense values approach can be used to enable fast gather/scatter style execution with minimal decompression overhead. For highly memory-constrained devices, streamed decompression strategies are used: only those sparse blocks or layers required for a given inference batch are read into memory and decompressed on-the-fly, enabling systems to process large models in limited RAM by paging sparse segments from storage or networked nodes S100 as needed.

Sparse-aware inference proceeds without first reconstructing a full dense parameter tensor in many embodiments. Instead, sparse kernels operate directly on the stored sparse representation to compute activations. For example, a sparse matrix-dense vector multiply can be executed using CSR or COO kernels that iterate over nonzero entries; block-sparse convolutional kernels can compute convolution outputs using only existing nonzero blocks; and sparse attention mechanisms can use index masks to limit computation to stored attention weights. Where hardware lacks efficient sparse kernels, lightweight runtime routines perform partial decompression into cache-sized dense tiles that fit in processor caches, then execute dense kernels on those tiles to amortize decompression cost while still avoiding storage of the entire dense tensor.

The pruning process S104 that precedes sparse storage can be static or dynamic. In static pruning embodiments, a trained dense model is analyzed and parameters below a relevance threshold (for example magnitude thresholding, Taylor approximation of loss impact, or other importance metrics) are zeroed and then converted into sparse format. In dynamic sparse training embodiments, masks and sparse values are updated during training (for example via methods such as RigL or sparse evolutionary strategies), and the sparse representation is maintained and stored periodically to enable checkpointing and eventual deployment. In either case, masks indicating pruned locations can be retained separately from values to allow future re-growth during retraining S604 or to permit efficient monitoring and reweighting of pruned regions during active learning S204.

Layer-wise and structured sparsity variants are described herein. Structured sparsity imposes constraints such as channel-wise, filter-wise, or block-wise pruning that produce regular sparsity patterns amenable to efficient hardware acceleration; such patterns are represented using block index arrays and compressed descriptors describing repeating patterns. Unstructured sparsity permits higher compression ratios but requires more complex indexing; embodiments allow a hybrid approach where performance-sensitive layers use structured block-sparse representations while less performance-sensitive layers use unstructured CSR/COO storage to balance compression and runtime efficiency.

When storing pruned parameters in distributed compute environments S100, sparse formats are chosen to enable efficient transmission and partial loading. For example, sharded sparse tensors include a sharding map in their metadata that indicates which compute node stores each index range. During distributed inference or fine-tuning, compute nodes request only the sparse shards required for their assigned model segments. Checkpointing schemes store sparse tensors in a content-addressable form to support deduplication and to enable efficient synchronization among nodes.

Security and provenance features are integrated with sparse storage. Digital watermarks S702, provenance metadata S704, and similarity screening hashes S700 are embedded in the sparse model metadata without altering the sparse value arrays. Embedding this metadata facilitates tracking of model artifacts as they are deployed to edge devices S502 or stored in model registries.

Efficient conversion routines are provided to transform between sparse formats and between sparse and dense representations. Conversion routines support batching and vectorization and are designed to respect alignment constraints of target accelerators S1004. Where conversion occurs on-device, lightweight implementations use in-place operations and single-pass construction of index arrays to minimize peak memory usage. Tools to validate the integrity of sparse representations (for example checksums, count of nonzero entries versus metadata) are included to ensure correctness prior to inference.

Performance trade-offs and heuristics are described to guide selection of sparse format. Metrics include memory reduction (ratio of stored sparse footprint to original dense size), indexing overhead (bytes per nonzero entry), compute sparsity utilization (fraction of compute avoided by sparsity given kernel implementation), and induced latency from decompression or sparse kernel scheduling. Automated selection procedures S404 can evaluate candidate formats and choose a format per layer or per device that optimizes a weighted objective function combining memory footprint, inference latency, and energy consumption. Heuristics to align block sizes to hardware cache lines and vector widths are used to maximize throughput.

Backward compatibility is supported by storing a compact descriptor that allows legacy runtimes to reconstruct a dense approximation if sparse-aware execution is unavailable. A fallback path reads sparse indices and values and reconstructs the corresponding dense tensors into temporary buffers for use by dense-only kernels, enabling models stored in sparse form to be deployed on a broader set of devices without loss of fidelity.

Techniques for maintaining accuracy when pruning and storing parameters in sparse form include iterative prune-and-finetune cycles, storing intermediate dense checkpoints to permit rollback, and preserving a targeted subset of parameters (for example, parameters identified by sensitivity analysis as highly influential) in dense form while pruning others. Retraining S604 and automated hyperparameter searches S404 are employed to determine optimal sparsity levels per layer that balance performance and model quality. Monitoring S900 and drift detection mechanisms S902 can signal when retraining or re-pruning is required due to distributional changes that affect the efficacy of the sparse parameterization.

Implementation examples include storing per-layer sparse tensors in a compressed archive format where each entry contains layer metadata, an index array in CSR form, and a quantized nonzero value array. At load time, the runtime reads the archive index to determine which layers to stream into memory, uses hardware-accelerated sparse kernels where available, and otherwise applies tiled decompression into caches sized for the target device. In another example, a block-sparse convolutional neural network intended for edge inference is stored using a block mask bitmap per convolutional weight tensor and a packed array of block values in 8-bit quantized form, enabling a runtime to skip entire blocks and utilize block-sparse convolution kernels for significant reductions in memory access and compute.

The sparse storage approach supports lifecycle operations including versioned updates, incremental patching (for example applying compact sparse deltas to update a deployed model), and auditing of pruned regions. Sparse deltas are represented as sparse add or replace patches and can be applied without reconstructing the entire dense model, facilitating updates to bandwidth-constrained edge devices S502. Audit logs record pruning thresholds used, sparsity patterns, and compressed size metrics to support reproducibility and compliance analyses.

The system further comprises monitoring energy consumption and adjusting resource allocation accordingly. In one embodiment energy consumption is measured at multiple levels of the computing stack, including per-compute-node power draw (e.g., wall power measured by an inline meter or via board-level sensors), per-accelerator or per-core energy counters (e.g., RAPL, on-chip sensors), and per-process or per-container energy attribution derived from telemetry and utilization statistics. Telemetry signals are collected at configurable intervals (for example, every 100 ms to 60 s depending on desired responsiveness) and are tagged with time stamps and identifiers that map energy measurements to the corresponding distributed compute nodes and to specific model components or tasks (S100, S400).

Collected energy telemetry is preprocessed to remove noise and to produce smoothed metrics suitable for control. Preprocessing includes low-pass filtering or exponential moving averaging to reduce the impact of transient spikes, outlier detection and removal (S802), and normalization to account for the baseline idle power of each node. The system computes derived metrics such as energy per inference, energy per training step, and cumulative energy consumption over sliding windows. Energy budgets for individual nodes, clusters, or overall deployments are maintained and can be configured by policy. Budgets are expressed in absolute units (for example, joules per hour), in relative terms (for example, percent of available datacenter power), or as performance-energy tradeoff targets (for example, a maximum allowed energy per inference while meeting a latency constraint S1002). Decision logic compares current and predicted energy consumption against configured budgets and thresholds. Predictions are generated using near-term forecasting models that leverage historical telemetry and workload estimates; examples include autoregressive models, lightweight neural predictors, or a model-predictive control (MPC) module. A hysteresis mechanism and minimum dwell times for actions are applied to prevent oscillatory behavior in resource allocation. When a threshold breach or a predicted budget violation is detected, the resource manager selects one or more corrective actions from a policy space that balances energy reduction, latency, and accuracy constraints (S102).

Corrective actions include dynamic scaling of compute resources across the distributed set of compute nodes (S100), including reducing the number of active worker nodes, consolidating tasks onto fewer nodes, or migrating workloads to nodes with better energy efficiency. Scaling is achieved by suspending or terminating nonessential containers, adjusting CPU core affinities, or triggering node-level power states (e.g., c-states, p-states) via DVFS. Resource adjustment operations are coordinated with the segmentation of computation to avoid disrupting ongoing work-tasks are checkpointed or drained in accordance with a controlled handoff policy to ensure consistency.

Model-level adjustments are also performed to reduce energy consumption while preserving acceptable output quality. Example model adjustments include pruning model parameters according to a relevance threshold (S104), switching to quantized variants of the model (S500), or substituting a reduced-complexity modality-specific module (S400) or a reduced-latency architecture (S1002) for inference. The resource manager maintains a catalog of alternative model configurations indexed by expected energy cost, latency, and accuracy. When energy constraints tighten, the manager is configured to algorithmically select an alternative configuration that best satisfies multi-objective constraints, for example by minimizing a weighted sum of energy and accuracy degradation, or by optimizing Pareto frontiers that are precomputed or learned online.

Edge-aware and placement-aware policies enable offloading or redistributing computation to edge devices or to hardware that is more energy efficient. For example, when central nodes approach their energy budgets, the system can deploy compressed models to edge devices (S502) or shift portions of the workload to accelerators that support specialized, energy-efficient inference (S1004). Conversely, when edge devices report constrained energy availability, the manager reduces execution at the edge and prioritizes cloud or datacenter execution. Decisions to offload take into account network transmission cost and latency and are constrained by application-specific service-level agreements.

Workload-aware adjustments account for the modality and processing characteristics of inputs (S300). For multimodal pipelines, the manager can reduce sampling rates, reduce the resolution of incoming modalities, or defer processing of modalities of lesser priority to conserve energy. Temporal batching policies (S1000) are adjusted dynamically: increasing batch sizes can improve throughput and reduce per-unit energy at the cost of added latency, whereas reducing batch sizes favors reduced latency. The manager evaluates such tradeoffs with respect to application latency targets (S1002) and energy budgets.

Control strategies for selecting actions include rule-based thresholds, optimization-based controllers (e.g., constrained convex optimization solved periodically), and learning-based controllers such as reinforcement learning agents trained to minimize energy under QoS constraints. In a reinforcement learning embodiment, the agent observes state vectors containing recent energy telemetry, workload features, and performance metrics, and outputs actions such as scale factors, model switches, or pruning levels. The agent is trained with a reward that penalizes energy consumption and SLA violations, and can be updated online to adapt to changing hardware characteristics. For safety, the system implements fallback policies that guarantee minimal acceptable functionality and prevent actions that would violate essential constraints.

Energy-aware scheduling integrates with the hyperparameter and training schedule optimization processes (S402, S404). For example, training jobs are rescheduled to off-peak periods based on electricity pricing or cumulative energy targets, and learning rates or batch sizes are adjusted to accelerate convergence while reducing overall energy cost. In addition, progressive training schedules are adapted to perform heavier computation when energy is abundant and to perform lightweight fine-tuning or deferred training when energy resources are constrained. During inference, dynamic selection among modalities and progressive-fidelity inference techniques are employed to reduce energy consumption while maintaining output quality.

Monitoring and action execution are recorded and auditable. The system stores energy telemetry, decisions made, and post-action metrics to support retrospective analysis, policy refinement, and compliance reporting. Anomaly detection flags unexpected energy patterns and can trigger alerts or initiate controlled shutdown procedures. Periodic benchmarking (S904) runs representative workloads to recalibrate energy models and update the catalog of model configurations with their associated energy and performance profiles.

Integration with other system-level features ensures coordinated behavior. For example, bias-detection and fairness-aware reweighting (S600, S602) are preserved by constraining the resource allocation policy not to disproportionately degrade processing for particular data subsets. Provenance tracking (S704) and output screening (S700) are maintained irrespective of the deployed model configuration by ensuring metadata and watermarking processes remain enabled or by delegating them to a protected execution tier. Retraining triggers (S902) are balanced against energy budgets so that model updates are scheduled considering both drift detection and energy availability.

Example parameterizations and thresholds are provided by way of illustration: energy sampling intervals of 1 s with 30 s exponential smoothing for real-time control; soft energy budget that triggers model switching at 85% of the budget and hard budget that initiates node consolidation at 95%; minimum dwell time of 60 s for scaling actions; pruning thresholds adjustable in steps (e.g., 10% parameter removal increments) with evaluation of accuracy on held-out batches before committing. These values are configurable and can be adapted to specific deployment requirements.

In summary, the described embodiments implement a closed-loop system that continuously monitors energy consumption at multiple granularity levels, analyzes and predicts consumption trends, and dynamically adjusts compute and model resources—via node scaling (S100, S102), model pruning (S104), quantization (S500), edge deployment (S502), architecture selection (S1002), and specialized hardware utilization (S1004)—to satisfy energy budgets while maintaining required performance and quality of service.

Generated samples are scored and filtered prior to inclusion in the training pool. Scoring can use discriminator outputs, pretrained perceptual embeddings (for example CLIP or modality-specific encoders), or metrics such as Fréchet Inception Distance (FID) adapted for the modality to assess realism and diversity. Samples below quality thresholds are discarded or subjected to additional refinement cycles (for example iterative denoising in diffusion models or adversarial fine-tuning) before being admitted to training. Metadata describing provenance, conditioning parameters, and generation confidence is stored with each synthetic sample for downstream selection and auditing.

Augmented real samples are validated using modality-specific consistency checks S804 and outlier detection S802 to detect transformations that break modality alignment or produce unrealistic artifacts. Augmentation parameters can be applied stochastically according to a curriculum schedule or an adaptive controller that increases augmentation strength as the model becomes more robust or reduces augmentation for rare classes to avoid exacerbating data imbalance. A tunable mixing ratio governs how many augmented real samples versus original real samples are included in each training batch; the ratio can be annealed during training based on validation performance or held constant to satisfy class balance constraints.

Active learning selection S204 operates on a candidate pool comprising real, augmented, and synthetic samples and selects the most informative instances for human labeling or for prioritized inclusion in supervised training. Selection strategies include uncertainty sampling (for example margin sampling, entropy-based selection), query-by-committee, expected model change, expected error reduction, representativeness/diversity-based sampling (for example core-set selection, clustering in embedding space), and hybrid strategies that combine uncertainty and diversity. Embedding-based similarity metrics in a shared vector space S302 are used to cluster the candidate pool and enforce diversity by selecting exemplars from distinct clusters. Selection can be constrained by annotation budget, class balance requirements, or domain-specific coverage metrics.

Active learning is performed iteratively in closed-loop cycles. In each cycle, the current model is evaluated on the unlabeled pool to compute informativeness scores; a subset of top-scoring samples is routed either to human annotators via an annotation interface or, when confidence thresholds permit, assigned pseudo-labels and added to the training set. The model is then retrained or fine-tuned on the expanded labeled set, and the cycle repeats. Query synthesis is supported in some embodiments: generative models S200 are used to synthesize candidate inputs targeted to the model's current weaknesses as identified by active learning metrics, thereby creating bespoke samples that optimally improve model performance when annotated and incorporated into training.

Implementation details include maintaining metadata and provenance records for each sample to enable auditing and to support retraining decisions. The pipeline includes automated monitors that compute distributional statistics and performance metrics on held-out validation sets; those monitors can trigger additional synthetic data generation targeting observed failure modes or invoke further active learning cycles when metrics fall below thresholds. Annotation processes employ hierarchical or multi-stage labeling workflows to reduce human effort, for example by collecting coarse labels first and soliciting fine-grained labels only for samples that remain ambiguous.

The method is configurable for multimodal consistency objectives. When modalities require synchronized transformations, augmentation S202 and synthetic generation S200 enforce alignment by applying identical temporal or spatial transformations to corresponding modalities or by conditioning generation to produce jointly consistent modalities. Loss functions used during training include cross-modal contrastive terms, reconstruction losses, and modality-specific classification or regression losses; active learning selection criteria incorporate cross-modal uncertainty measures derived from these losses.

Alternative embodiments include on-device or distributed implementations where generation S200, augmentation S202, and selection S204 are performed across multiple compute nodes employing dynamic allocation of resources. The method can be embodied as machine-executable instructions stored on a non-transitory computer-readable medium and executed by processors to perform the described steps. Parameters such as augmentation probabilities, synthetic-to-real mixing ratios, selection budget per cycle, quality thresholds for filtering synthetic samples, and stopping criteria for active learning cycles are exposed for tuning and can be automatically optimized using hyperparameter search techniques or reinforcement learning.

Examples demonstrate improvements in sample efficiency: by synthesizing targeted samples in S200 and applying modality-consistent augmentations S202, fewer labeled real examples are required to reach a target accuracy; active learning S204 further concentrates labeling effort on samples that yield the largest expected performance gain. The method reduces annotation cost while maintaining or improving downstream multimodal model generalization, robustness to rare classes, and coverage of edge-case modalities.

Embodiments provide techniques for generating synthetic training samples using text-to-image models and integrating those samples into a multimodal training pipeline. In one embodiment the generation of synthetic samples is performed by a text-to-image generative model such as a diffusion model, an autoregressive transformer conditioned on text embeddings, a generative adversarial network (GAN) with text-conditioning, or a VQ-VAE architecture paired with a language-vision decoder (S200). The text-to-image model accepts a textual prompt or set of prompts and produces one or more images corresponding to the semantic content specified by the prompts. Text conditioning is implemented using pretrained text encoders (for example, transformer-based encoders) to produce text embeddings, which are supplied to the generative model at the conditioning interface. In diffusion-based embodiments, the conditioning embeddings are used together with classifier-free guidance or alternative guidance mechanisms to steer sampling; guidance scales are selectable and can be varied per class or per prompt to trade off fidelity and diversity (examples of guidance scale ranges include approximately 1.5 to 12.0, with preferred ranges depending on downstream performance). Sampling algorithms such as DDIM, DDPM, PLMS or Langevin-type samplers can be used with sampling steps in the range of tens to several hundreds; typical implementations use between 25 and 1000 denoising steps with step schedules tuned to balance image quality and generation throughput.

Prompt formulation and prompt engineering are used to produce diverse synthetic images that cover intra-class variation and environmental conditions. Prompts can include explicit attributes such as color, lighting, pose, background context, camera parameters, and style descriptors (for example, "a detailed photograph of a red bicycle on a rainy street, angled close to the ground, shallow depth of field") to guide generation toward desired visual features. Collections of templates and slot-filled attribute sets are maintained so that combinatorial prompt sets are generated to achieve coverage across relevant attribute dimensions. In certain embodiments, prompts are paired with negative prompts to reduce unwanted artifacts or to suppress concepts not desired in the dataset. Automated prompt expansion techniques are applied to generate variants of prompts using synonyms, paraphrases, and attribute permutations; synonyms and paraphrases are produced via lexical resources or pretrained language models.

To improve visual quality and resolution, generated images are post-processed using super-resolution and denoising models or via upscaling models specialized for photorealistic enhancement. Where required for domain adaptation, style-transfer networks or fine-tuned adapters are applied to align the synthetic images' appearance with the target domain. For example, a photorealism adapter fine-tuned using a limited set of real images can be applied to outputs of the base text-to-image generator to reduce distributional shift between synthetic and real images prior to model training. In other embodiments, multimodal consistency is verified by scoring generated image-text pairs with a joint embedding model (for example, a contrastive language-image model such as CLIP) and retaining samples that exceed a threshold similarity score; thresholds are chosen empirically (for example, a CLIP similarity threshold in the range of 0.25-0.6) or determined by validation performance.

Labeling of synthetic images is performed automatically by deriving labels from the prompts used to generate the images. When fine-grained labels are required, structured prompts embed label tokens or attributes that are parsed post-generation to create target annotations. Bounding boxes, segmentation masks, and keypoint annotations are produced either by directly conditioning the generator to output annotated content (for example, by conditioning on layout maps or paired mask generation) or by applying automated annotation models to synthesized images (for example, pretrained instance segmentation networks). When pixel-level or coordinate annotations are generated automatically, verification steps employing heuristic checks and confidence thresholds are applied; annotations that do not meet confidence criteria are routed for human verification or discarded.

Diversity control mechanisms are implemented to avoid mode collapse and to ensure representation of underrepresented subpopulations. Diversity is enforced by sampling from variations of prompts, by varying random seeds, by sampling across temperature or top-k/top-p parameters in autoregressive generators, or by explicitly specifying attribute ranges. When demographic attributes or other sensitive attributes are relevant, sampling policies ensure stratified generation across those attributes to reduce bias in the synthetic dataset. Generated samples are statistically analyzed for distributional properties and compared to real-world data distributions using metrics such as class-wise frequency, feature-space coverage, Fréchet Inception Distance (FID), Inception Score (IS), or per-class embedding distances; this analysis is used to iteratively refine prompt sets and generation parameters (S600, S602).

Quality control and filtering are applied to remove substandard or undesirable samples prior to inclusion in the training set. Automated filters include perceptual quality estimators, artifact detectors, and similarity checks against known works. Perceptual hashing, similarity scoring, and other near-duplicate detection methods are used to screen outputs for undue similarity with copyrighted or undesirable content and to identify duplicates (S700). Outputs that pass automatic filters are assigned provenance metadata embedded in the image file or associated storage records, including the prompt text, model identifier and version, random seed, generation parameters, timestamps, and a provenance signature or watermark (S704, S702). Watermarking is applied either by augmenting latent representations during generation or by embedding imperceptible digital watermarks post-generation; watermarks include robust identifiers and are associated with the synthetic sample's metadata so that downstream consumers can detect synthetic provenance.

Integration of synthetic samples into training is accomplished through controlled mixing with real data and curriculum schedules that progressively adjust the ratio of synthetic to real samples. Augmentation strategies apply additional transformations such as geometric perturbations, color jitter, and modality-specific augmentations to further enhance generalization (S202). Active learning loops are employed in which a base model is trained on the current dataset and then used to identify regions of input space with elevated uncertainty or poor performance; targeted prompts are generated to produce synthetic samples in those regions, and the model is retrained using the expanded dataset (S204). Confidence-based selection criteria and uncertainty metrics (such as entropy of softmax outputs, Bayesian uncertainty approximations, or ensemble-based disagreement) determine which synthetic samples are requested and prioritized.

Metadata and traceability of synthetic samples are preserved end-to-end. Each synthetic image is associated with an immutable record that stores its generation provenance (model version, prompt, seed, parameters), quality scores, and any applied watermarking or modification steps (S704). Provenance records support auditing, dataset curation, and regulatory compliance. For deployments to edge devices, compressed and quantized variants of models trained with synthetic data are produced and validated for memory and latency constraints prior to deployment (S500, S502, S504). Based on deployment requirements, models are segmented across compute nodes for distributed inference and training, and resource allocation is adjusted dynamically (S100, S102).

Alternative embodiments encompass conditional generation driven by structured attribute vectors rather than free-text prompts, hybrid approaches that combine text-to-image generation with image-based augmentation pipelines, and configurations in which a human-in-the-loop reviews and refines prompt sets and filters. The parameter ranges and algorithm choices cited above are exemplary; practitioners can adjust the number of sampling steps, guidance scales, prompt templates, and filtering thresholds according to validation performance and operational constraints. The described application of text-to-image synthetic sample generation together with the other processing elements provides a practical mechanism to expand training datasets, improve coverage and robustness, mitigate bias, and facilitate reliable multimodal model development while preserving provenance and quality control.

Synthetic samples are generated using video generation models (S200) adapted to produce temporally coherent, multimodal sequences that supplement or augment real training datasets. The video generation models are conditioned on one or more modalities received by the system (e.g., text prompts, audio tracks, still images, depth maps, semantic segmentation maps, motion vectors) to produce synthetic video outputs that exhibit targeted semantic content, motion dynamics, camera viewpoint changes, lighting variations, and other scene attributes. Conditioning modalities are encoded into conditioning vectors and supplied to a spatiotemporal generator that operates across a latent space, the outputs of which are decoded to produce a sequence of frames and synchronized auxiliary modalities such as audio or optical flow when required. In some embodiments the video generation models comprise diffusion-based architectures adapted to temporal domains (for example, latent video diffusion models), generative adversarial networks with 3D or spatiotemporal convolutional generators, transformer-based architectures with temporal attention, convolutional LSTM or recurrent modules for motion propagation, or hybrid combinations thereof. Temporal consistency is enforced during generation by incorporating temporal losses such as optical flow consistency loss, inter-frame perceptual loss, temporal adversarial loss, and motion regularization, and by conditioning generation on previously generated frames or latent motion codes to maintain object identity and smooth motion across frames.

Generated synthetic video samples can be subjected to post-processing and validation prior to inclusion in training sets. Post-processing operations include temporal smoothing, denoising, color and exposure adjustment, camera-shake augmentation, and compositing of generated foregrounds onto real or procedurally generated backgrounds. Quality checks employ automated metrics and learned discriminators to detect mode collapse, unrealistic artifacts, and temporal discontinuities; samples that fail quality thresholds are filtered out or routed for active selection, for example via active learning processes that choose the most informative synthetic instances for labeling or human review (S204). To preserve provenance and enable downstream traceability, metadata describing generation parameters, conditioning signals, model version, and generation timestamps are embedded in the synthetic samples (S704). In some implementations, imperceptible or robust digital watermarks are inserted into generated media (S702) to aid later identification and ensure compliance with usage policies; watermarking can be performed in latent or pixel domains and is designed to survive common transformations.

Sampling strategies for synthetic video generation support diversity and coverage of the target task domain. Strategies include random sampling across conditioning distributions, targeted sampling of rare events, curriculum-based sampling that increases complexity over time, and adversarial sampling in which generators produce difficult examples that challenge the discriminative model. Domain randomization techniques modify lighting, textures, and camera parameters to improve generalization of models trained with synthetic data (S202). In some implementations, synthetic video generation is performed on demand in a distributed compute environment (S100), enabling dynamic scaling of generation capacity in response to training workload changes and facilitating generation localized near training resources. Generated synthetic datasets are validated using modality-specific consistency schemas prior to training to ensure temporal alignment, audio-video synchronization, and semantic coherence (S804), and outlier detection routines remove noisy or substandard synthetic sequences (S802).

When synthetic videos are used for downstream inference model training, architectures and training hyperparameters are optimized (S404) to compensate for differences between synthetic and real data. Techniques such as domain adaptation, adversarial domain alignment, feature-space regularization, and contrastive learning are applied to bridge domain gaps. Embeddings learned from synthetic and real videos are evaluated in shared vector spaces (S302) and, when appropriate, synchronized via temporal alignment functions (S304) so that generated temporal features align with real-world temporal dynamics. Ongoing monitoring of model outputs for distributional changes (S900) includes tracking performance on synthetic-augmented validation sets; detected drift triggers model retraining or refinement of the synthetic generation process (S902).

For deployment to resource-constrained environments, models trained with synthetic video augmentation can be pruned, quantized, or otherwise compressed (S104, S500) and then deployed to edge devices (S502) where inference is performed using memory- and compute-efficient architectures (S504, S1002). To support auditing and compliance, each deployed model is configured to retain links to the synthetic data provenance metadata (S704) and to incorporate screening mechanisms that detect excessive similarity between generated outputs and known works using perceptual hashing or other similarity metrics (S700). Synthetic video generation models, their training datasets, validation criteria, and integration parameters are recorded to enable reproducibility and to support further development cycles.

In one embodiment, the training pipeline performs data augmentation (S202) as part of a preprocessing and dataset preparation stage (S800). Data augmentation (S202) includes image rotations and scaling applied to image-based modalities and, where applicable, corresponding transforms applied to co-registered modalities to preserve multimodal correspondence. Image rotations are applied at fixed angles (for example, ninety-degree increments) or are sampled randomly from a continuous distribution over a defined range (for example, ±30 degrees). Scaling is applied isotropically or anisotropically with scale factors sampled from a predefined interval (for example, 0.8 to 1.2) to simulate changes in object size and camera distance. Rotation and scaling are implemented using interpolation schemes appropriate to the data type: for continuous-valued image channels, bilinear or bicubic interpolation is used; for discrete labels such as segmentation masks or bounding boxes, nearest-neighbor interpolation or discrete coordinate remapping is used and label geometries are adjusted accordingly. When adjusting bounding boxes, polygonal masks, or keypoints, coordinate transforms corresponding to the applied rotation and scaling are computed and stored with the augmented sample to maintain correct supervisory targets.

Is executed deterministically for reproducibility when needed (for example, by seeding pseudo-random number generators) or non-deterministically to increase stochasticity of the training set. Augmented samples are associated with provenance metadata (S704) indicating the augmentation operations performed, parameter values (rotation angle, scale factor), interpolation method, and a unique augmentation identifier. Provenance metadata is embedded in output artifacts and stored in a model training log to permit downstream analysis and potential reversal of augmentation effects. The provenance metadata can also be used by output screening modules (S700) to differentiate between original and augmented content during similarity checks.

To preserve temporal and cross-modal alignment (S304) in sequences or time-aligned datasets, the rotation and scaling transforms are synchronized across frames or across modality-specific streams. For example, when augmenting a video with per-frame RGB and depth streams, the same rotation angle and scale factor are applied to both streams for each augmented instance, and temporal interpolation or buffering is used to avoid introducing inter-frame temporal inconsistencies. When multimodal embeddings (S302) are generated in a shared vector space, the augmentation pipeline ensures that each modality's input to the embedding network reflects the same spatial transform so that the fused embeddings retain semantic correspondence.

Operates in concert with synthetic data generation (S200) and active learning (S204). Synthetic samples generated by generative models (S200) are further diversified by applying rotations and scaling to increase effective coverage of pose and size variance. In active learning loops (S204), the selection of informative instances for labeling can be augmented by generating rotated and scaled variants of candidate samples and evaluating model uncertainty on those variants to better gauge model generalization under geometric perturbations. Where label acquisition is expensive, rotated and scaled augmentations of a single labeled instance are used to expand the labeled set while preserving label integrity via transformed ground truth.

The augmentation module integrates with data validation (S804) and outlier detection (S802). After rotation and scaling, augmented samples are validated against modality-specific consistency schemas (S804) to ensure that pixel value ranges, channel counts, and label formats remain within expected bounds. Samples that violate schema constraints or produce degenerate labels (for example, entirely occluded objects after aggressive scaling or rotation) are identified by the outlier detection routine (S802) and either corrected, discarded, or flagged for human review. Augmentation parameters can be constrained adaptively based on dataset statistics computed during preprocessing (S800) so that the distribution of augmented samples remains representative of feasible real-world variations.

Is parameterized and configurable via a pipeline configuration that specifies allowable rotation ranges, scale intervals, probability of applying a transform, interpolation methods, and constraints for label transformations. The configuration supports per-class or per-region policies so that sensitive classes or objects of limited size are augmented conservatively (for example, limiting scale to prevent loss of visibility) while larger or more tolerant classes receive more aggressive augmentation. The policy engine records configuration versions in training logs to enable reproducible experiments and to support automated hyperparameter search (S404), treating augmentation parameters as tunable hyperparameters.

When training with fairness constraints or bias mitigation (S600, S602, S604), augmentation (S202) including rotations and scaling can be applied selectively to underrepresented subpopulations or scene conditions to rebalance representation. The augmentation scheduler monitors class and subgroup frequencies and applies targeted rotations and scaling to samples from underrepresented groups to increase their effective prevalence in the training set. The application of targeted augmentation is tracked in the training metadata to permit auditing and verification by fairness detection routines (S600).

Is compatible with progressive training schedules (S402) and modality-specific modules (S400). In early training phases, stronger and more varied rotations and scaling are applied to encourage robustness, while in later phases the augmentation magnitude is reduced to fine-tune performance on near-natural distributions. For modular architectures (S400), augmentation is applied selectively per module; for example, the visual module receives geometric augmentations while other modality-specific modules receive transforms appropriate to their data types. The system supports staged augmentation in which combinations of rotations, scaling, color jitter, and other transforms are composed according to a schedule.

Augmented datasets are used to train models that are segmented across distributed compute nodes (S100). Augmentation operations can be performed locally on the compute nodes to reduce data transfer, or centralized augmentation services can generate caches of augmented samples that are distributed to training workers. Augmentation pipelines are optimized to minimize computational overhead, for example by applying lightweight interpolation methods when training on resource-constrained hardware or by leveraging specialized hardware acceleration (S1004). Augmented datasets destined for edge deployment (S502) are optionally precomputed and compressed using quantization (S500) to reduce storage and transfer costs.

During inference, the model can optionally perform test-time augmentation in which input images are rotated and scaled to produce multiple inferences that are aggregated (for example, by averaging or majority voting) to improve robustness. Test-time augmentation parameters are chosen to balance latency constraints (S1002) against desired accuracy gains. In latency-sensitive deployments (S1002, S1004), a smaller set of augmentation transforms or computationally approximated transforms is applied so as to meet inference time budgets.

In one embodiment, a system receives inputs from at least two modalities (S300), such as audio, video, and textual metadata. The received multimodal inputs are preprocessed (S800) to normalize formats, sample rates, and spatial resolutions and to detect and filter outliers and noise (S802). Modality-specific consistency schemas are applied to validate data prior to training (S804), ensuring that paired or aligned data meet expected temporal and semantic constraints. When audio is present as one of the modalities, data augmentation techniques are applied (S202) to expand the effective training set and improve generalization. Audio augmentation specifically includes pitch shifting, implemented by shifting the pitch of an audio signal by a selected number of semitones or by applying continuous pitch-scaling factors while optionally preserving or correcting spectral formants to retain natural timbre. Pitch shifting is performed using time-domain resampling with phase vocoder techniques, frequency-domain modifications such as frame-based time-frequency Fourier transform manipulation (e.g., STFT), or neural vocoder-based transformations. In various embodiments, pitch shifting is applied with random shifts selected from a distribution, for example between −4 and +4 semitones, or according to a variable scaling factor in the range 0.8 to 1.25, with probabilities adjusted per class to balance representation. When audio pitch shifting is applied to paired multimodal examples, temporal alignment functions (S304) synchronize the shifted audio stream with corresponding modalities to preserve cross-modal correspondence; where pitch shifting introduces temporal artifacts due to time-scaling, time-stretching adjustments are applied to maintain frame alignment. Augmentation is performed online during training or offline to produce an expanded dataset (S200), and generative models are further leveraged to generate synthetic training samples that include pitch-altered audio paired with correspondingly adapted visual or textual modalities to preserve semantic consistency.

Generated synthetic samples (S200) include audio samples produced by generative adversarial networks, variational autoencoders, or diffusion-based models conditioned on labels or multimodal context, and these synthetic audio instances can also be subjected to pitch shifting as part of augmentation. In some embodiments, pitch shifting is combined with other augmentation operations such as additive noise, dynamic range compression, equalization, reverberation simulation, and time stretching to emulate diverse recording conditions. Augmentation parameters are selected deterministically for specific classes or adaptively based on dataset imbalance; for example, underrepresented classes can be augmented with larger pitch shift ranges or increased augmentation multiplicity to reduce class skew. Active learning techniques (S204) are employed to select the most informative instances for labeling and augmentation, where samples that produce significant model uncertainty or that occupy sparse regions of embedding space are preferentially augmented and presented for annotation.

Model optimization includes pruning parameters according to a relevance threshold to reduce computational overhead (S104). Pruning is sensitivity-guided and takes into account robustness to augmentation operations such as pitch shifting; weights that are essential for representing pitch-invariant features are preserved. Automated hyperparameter search (S404) optimizes learning rates, augmentation probabilities, pitch shift ranges, and other training parameters using techniques such as Bayesian optimization or population-based training. In embodiments oriented to resource-constrained deployment, model parameters are quantized (S500) and compressed, and compressed models are deployed to edge devices (S502). When audio pitch shifting is used during training, calibration routines are performed to ensure that quantized audio-processing layers maintain acceptable performance for pitch-varied inputs; quantization-aware training can be combined with augmentation so that the model learns to be robust to both numerical precision reductions and pitch alterations. Inference is performed using memory-efficient architectures (S504) selected for minimal-latency operation (S1002) and for execution on specialized hardware (S1004) when available. Asynchronous batch processing of multimodal inputs (S1000) permits augmentation and pre-processing pipelines to run in parallel with inference pipelines to reduce end-to-end latency in deployment scenarios that allow online adaptation.

In distributed training and deployment embodiments, segmentation of model computation across a distributed set of compute nodes (S100) enables augmentation-intensive preprocessing to be offloaded to dedicated nodes. Compute resources are allocated dynamically in response to workload changes (S102); for example, augmentation workers are scaled when active learning (S204) or synthetic sample generation (S200) increases upstream processing demands. The system is configured to employ specialized hardware accelerators for pitch-shifting operations and neural vocoder synthesis to satisfy real-time constraints.

To promote fairness and reduce dataset bias, statistical analysis detects bias in datasets (S600), and samples are reweighted to balance representation (S602). When audio augmentation such as pitch shifting is applied, care is taken to avoid introducing spurious correlations between pitch ranges and protected attributes; pitch-shift strategies can be constrained or conditioned to preserve demographic or identity-related invariants. Retraining with fairness constraints in the loss function (S604) further mitigates systemic bias, and augmentation policies are audited for disparate impact.

Model outputs are screened for similarity with known works using perceptual hashing (S700), and generated audio outputs can be watermarked (S702) or have provenance metadata embedded (S704) to track source and augmentation history, including whether pitch shifting was applied and with what parameters. Data validation and metadata schemas (S804) record augmentation provenance so that downstream consumers and forensic tools can verify augmentation steps.

Monitoring observes outputs for distributional changes (S900). Drift detection mechanisms trigger retraining upon detection of a significant shift in input distributions caused by changes in recording conditions or by increased prevalence of pitch variants in the field (S902). Periodic benchmarking evaluates reliability (S904) across augmented and non-augmented evaluation sets, including tests that probe robustness to pitch shifts, time-stretching, and combined degradations.

Example implementation details include maintaining augmentation policies as configurable pipelines, where audio pitch shifting is implemented as a discrete transformation block with parameters exposed to automated policy search (S404) and active learning selection (S204). Policies are condensed into augmentation schedules that vary over epochs during progressive training (S402), initiating with aggressive augmentation that applies wide pitch-shift ranges and then narrowing to smaller shifts as the model converges to improve fine-grained discriminative performance. Data pipelines are configured to cache augmented variants and synthetic samples (S200) to reduce on-the-fly computation overhead, or to perform augmentation lazily to conserve storage.

In one practical embodiment, audio pitch shifting is constrained to preserve speech intelligibility by applying formant-preserving algorithms when the audio modality corresponds to human speech, with pitch shifts sampled uniformly from −2 to +2 semitones for speech tasks. For music-focused tasks, wider ranges such as −12 to +12 semitones or octave-level shifts can be used, together with harmonic preservation techniques. The system logs augmentation parameters for each training sample, enabling ablation studies and facilitating retraining decisions when monitoring (S900) indicates performance degradation on certain pitch ranges. When deploying to edge devices (S502), a subset of augmentation-aware features or compact front-end models is packaged so the deployed model remains robust to pitch variation without incurring excessive runtime cost.

Wherein augmentation includes multimodal mixing of real and synthetic data, the augmentation pipeline generates, selects, aligns, combines, and validates mixed samples so as to preserve semantic and temporal coherence across modalities while increasing diversity and robustness of the training set. In one embodiment, synthetic samples are produced using generative models such as conditional GANs, variational autoencoders, diffusion models, or autoregressive generators (S200). The generative models can be conditioned on modality-specific context (e.g., text prompts for image or audio generation, scene graphs for video, or sensor metadata for time-series) so that generated modalities maintain correlation with one another or with selected real samples.

Real multimodal datasets undergo preprocessing (S800) that includes normalization, format conversion, and modality-specific feature extraction. Outliers and noisy records are detected and removed or corrected using statistical and rule-based techniques (S802). Data consistency checks based on modality-specific schemas are performed to ensure that each candidate real sample satisfies required alignment, labeling, and temporal coherence constraints prior to mixing (S804).

Selection of candidates for mixing is guided by active learning and informativeness metrics (S204). In one embodiment, an informativeness score is computed for each real sample based on model uncertainty, class rarity, or representation coverage in the embedding space. Samples deemed most informative are preferentially paired with synthetic counterparts. Balancing criteria and reweighting schemes (S602) are applied so that the resulting augmented dataset addresses class imbalance and underrepresented contexts.

Multimodal mixing is performed at multiple granularities and in multiple domains, including raw-data mixing, feature-level mixing, and embedding-space mixing. Raw-data mixing combines signals in their native modalities using operations such as MixUp, CutMix, concatenation, and splicing adapted to each modality. For example, image data are blended with spatial masks, audio waveforms are additively mixed with amplitude normalization, and text is interleaved or paraphrased with portions substituted from synthetic textual samples. Feature-level mixing operates on modality-specific feature vectors or intermediate network activations; linear or attention-weighted interpolations are applied to produce composite features that reflect contributions from both real and synthetic sources. Embedding-space mixing maps modalities into a shared vector space (S302) and performs convex combinations or learned attention-based fusion to produce mixed multimodal embeddings that preserve cross-modal semantics.

When mixing samples that contain temporal content, temporal alignment functions (S304) synchronize streams prior to combination. Temporal warping, dynamic time warping, or learned alignment layers align events, frames, or timestamps so that synthetic and real signals correspond to equivalent semantic moments. Alignment parameters are constrained by domain rules (e.g., frame-rate matching for video, sample-rate matching for audio, or sensor-sampling synchronization) to avoid introducing temporal artifacts.

Cross-modal consistency is enforced during mixing by one or more of the following mechanisms: (i) semantic consistency checks that compare labels, scene descriptors, or abstract annotations and permit mixing only when semantic conflict falls below a threshold; (ii) perceptual similarity checks using pretrained perceptual networks to ensure that blended signals remain plausible for each modality; and (iii) discriminator-based validation when using adversarial generative models so that only synthetic content that the discriminator classifies as sufficiently realistic is admitted for mixing (S200). Perceptual hashing and similarity screening (S700) are applied to detect duplicates or near-duplicates and to avoid creating augmented samples that inadvertently reproduce copyrighted or sensitive material.

Mixing strategies include one-to-one pairing (one real sample mixed with one synthetic sample), many-to-one fusion (multiple synthetic variants combined with a single real sample), and cross-modal substitution (replacing one modality of a real sample with a synthetic modality while leaving other modalities intact). For example, in a three-modality system (e.g., video, audio, text), one embodiment substitutes synthetically generated audio while retaining real video and real captions; another embodiment synthesizes a video conditioned on a real audio track and combines them. Mixing coefficients for interpolation can be sampled from parameterized distributions (e.g., Beta($\alpha$, $\beta$)) to control the relative contribution of synthetic and real data, and these coefficients can be scheduled or adaptively tuned during training.

When labels are present, label mixing rules are applied. For classification tasks, mixed labels can be generated as weighted combinations of source labels (soft labels) consistent with the mixing coefficients. For structured outputs, label consistency is maintained by generating synthetic labels with the same annotation schema as real data, or by deriving labels for mixed samples through annotation transfer and validation procedures. In cases where synthetic content lacks reliable ground-truth labels, pseudo-labeling techniques using current model predictions or teacher models can be employed, subject to confidence thresholds and scheduled refinement.

To accommodate missing modalities, the augmentation pipeline includes strategies for partial mixing. For a missing channel, a synthetic modality is generated and mixed with the available real modalities, or augmentation is performed solely within the available modalities while indicating modality absence in the training signal. Modality-specific modules (S400) are designed to accept mixed inputs and tolerate modality dropout through architectural choices and training regularization.

Generated mixed datasets are curated through automated and manual quality-control stages. Automated screening includes statistical validation against dataset priors, perceptual similarity thresholds (S700), and metadata-based provenance checks (S704). Digital watermarks or provenance markers are inserted into synthetic outputs to support tracking (S702, S704). Samples that fail validation are rejected or queued for human review. A feedback loop using model performance and drift monitoring (S900) informs further synthetic generation and selection: performance gaps or distributional shifts detected during benchmarking (S904) trigger additional targeted generation (S200) and selective augmentation.

Augmented datasets produced by multimodal mixing are used during training according to progressive schedules (S402). Initially, training can emphasize simpler or higher-fidelity mixed samples; as training progresses, the curriculum introduces more challenging or highly blended samples. Automated hyperparameter search (S404) can tune mixing parameters, mixing ratios, augmentation probabilities, and the relative weighting of synthetic versus real data in the loss. Fairness-aware controls (S600, S604) can be incorporated into the augmentation policy so that mixing reduces representational bias: synthetic samples can be generated and mixed to amplify underrepresented subgroups, and reweighting (S602) together with constrained retraining can be applied to enforce fairness constraints.

For downstream deployment, mixed-sample augmentation supports compression- and edge-targeted models by enabling robust training with fewer real samples and by exposing models to broader variability during training. Quantization-aware augmentation (S500) and simulated deployment conditions (e.g., sensor noise, compression artifacts) can be included in the mixing process so the model learns invariances relevant to edge inference (S502, S504). Model retraining triggered by drift detection (S902) incorporates newly generated mixed samples that reflect the observed distributional changes.

Various implementation variants are possible. Mixing can be performed in an online fashion during minibatch preparation or offline to create a persistently stored augmented dataset. The mixing process can be orchestrated across distributed compute nodes with dynamic allocation of generation tasks (S100, S102). Synthetic generation modules can be ensemble-based or conditioned by discriminator critics to increase diversity. Mixing operations can be learned via a neural policy network that selects modalities, coefficients, and augmentation primitives based on current model weaknesses. Hyperparameters for mixing (e.g., proportion of synthetic content, coefficient distributions, allowed semantic divergence) can be bounded within ranges appropriate to the domain; for example, an interpolation coefficient $\alpha$ can be sampled from Beta (0.2, 0.8) for modest blending, or from Beta (0.5, 0.5) for more aggressive mixing, though other parameterizations are supported.

All mixing operations are logged with metadata documenting source sample identifiers, generation model version, mixing parameters, and provenance markers (S704). This metadata supports downstream screening for intellectual property and safety via similarity checks (S700) and facilitates traceability and reproducibility. The augmented mixed data is validated with periodic benchmarking (S904) to ensure that the intended improvements in generalization and robustness are realized; metrics guiding further augmentation include per-class performance, calibration, domain transfer accuracy, and fairness metrics.

The system performs active learning S204 using uncertainty sampling to select the most informative instances for labeling. In an example implementation, uncertainty is quantified for each candidate instance by computing a confidence score from the model's predictive distribution over target labels and ranking instances by increasing confidence (least confidence sampling). Alternative uncertainty measures include margin sampling, whereby the difference between the top two predicted class probabilities is used as an acquisition score, and entropy-based sampling, whereby the Shannon entropy of the predictive distribution is used to quantify uncertainty. Where the model produces continuous or structured outputs, uncertainty is computed using appropriate probabilistic or surrogate measures, such as predictive variance, posterior variance approximations, or expected model change metrics computed from gradient magnitudes with respect to model parameters.

Uncertainty sampling S204 is applied to multimodal inputs S300 by first mapping each input modality to a shared embedding space S302 or by evaluating modality-specific predictive distributions from modality-specific modules S400. In one mode of operation, uncertainty is computed on fused embeddings produced by the fusion mechanism S306 so that a single acquisition score is assigned to each multimodal instance. In another mode, per-modality uncertainties are computed and combined using a weighted aggregation function to produce a composite acquisition score; weights can be static, learned, or dynamically adjusted based on recent model performance per modality. When data streams are temporally aligned S304, uncertainty sampling can incorporate temporal coherence constraints so that temporally adjacent frames or segments with correlated uncertainty are treated together to avoid redundant labeling.

Batch-mode uncertainty sampling is supported to select sets of instances for simultaneous labeling while controlling for redundancy and diversity. For batch selection the acquisition function is modified to penalize similarity among selected samples using clustering, determinantal point processes, or distance-based diversity constraints computed in the shared embedding space S302. A parameterized tradeoff between uncertainty and diversity is provided such that the batch acquisition maximizes combined objective functions, e.g., alpha*uncertainty+(1−alpha)*diversity, where alpha is tunable or found via automated hyperparameter search S404. The batching strategy supports annotation budget constraints, variable labeling costs per modality, and adaptive batch sizes determined by annotation throughput and retraining schedules S402.

Uncertainty estimation techniques that rely on model ensembles or Bayesian approximations are disclosed. In one embodiment, an ensemble of models is maintained and predictive uncertainty is estimated from the variance across ensemble outputs. In another embodiment, Monte Carlo dropout or other approximate Bayesian inference techniques are used at inference time to obtain multiple stochastic forward passes and estimate predictive variance or entropy. Where computational cost must be limited, a lightweight uncertainty estimator is trained to approximate the uncertainty produced by more expensive methods; this estimator can be periodically recalibrated using ground-truthed samples selected via S204.

Active learning S204 is integrated into the training and data pipeline. Selected instances are sent to human labelers or an automated labeling system; labeled instances are incorporated into the training set and used to retrain or fine-tune the model according to progressive training schedules S402. Retraining occurs immediately upon receipt of new labels (online or incremental updates) or at scheduled intervals triggered by a retraining policy, for example when a minimum batch of newly labeled samples is accumulated or when drift is detected S902. The system supports warm-start retraining using previously learned parameters and applies automated hyperparameter search S404 to select learning rates, regularization parameters, and other training settings appropriate for the expanded labeled set.

The active learning loop enforces stopping criteria and budget-aware controls. Stopping criteria include attainment of a predefined performance metric on a validation set, saturation of uncertainty reduction across subsequent acquisition rounds, exhaustion of labeling budget, or convergence of the model under periodic benchmarking S904. Budget-aware controls manage per-instance annotation costs and prioritize instances that maximize expected model improvement per unit of labeling cost. Where fairness constraints S604 are enforced, sample selection incorporates reweighting S602 or employs constraint-aware acquisition that favors underrepresented subpopulations identified by bias detection S600; for example, selection explicitly includes uncertain instances from underrepresented groups to improve equitable performance.

Annotation management components track provenance and labeling metadata in accordance with output tracking S704. Each selected instance and its label are stored with an acquisition score, uncertainty measure, timestamp, annotator identifier, and any preprocessing steps S800 or validation checks S804 performed prior to labeling. This metadata supports downstream auditing, reproducibility, and potential dispute resolution, and can be embedded as provenance metadata S704.

In resource-constrained deployments, uncertainty sampling S204 is adapted to operate under limits on compute and annotation throughput. Latency-optimized architectures S1002 and specialized hardware S1004 are used to compute uncertainty and selection decisions in near real time for streaming or interactive applications. Computationally efficient uncertainty proxies, e.g., predicted confidence from a compact surrogate classifier or reduced-rank approximate uncertainty estimators, are employed when full Bayesian or ensemble methods are impractical. The selection process can also be offloaded across distributed compute nodes S100 to parallelize uncertainty estimation and acquisition scoring.

The active learning component supports configurable acquisition policies and thresholds. Threshold-based policies select all instances with uncertainty above a tunable threshold; percentile-based policies select the top k % most uncertain instances; and budget-based policies select the most uncertain instances until budget exhaustion. Thresholds and policy parameters can be static, scheduled to change over training epochs, or dynamically adjusted via automated controllers that monitor validation performance and annotation throughput. Confidence calibration techniques are optionally applied so that uncertainty scores are well-calibrated across classes and modalities; calibration methods include temperature scaling, isotonic regression, and Platt scaling.

Security and quality controls are integrated into the active learning workflow. Outlier detection S802 is applied prior to uncertainty estimation to filter anomalous or noisy instances that could unduly bias acquisition. Instances flagged as outliers can be routed to specialized review queues or excluded from selection. The system is further configured to screen outputs for similarity with known works S700 and to apply watermarking S702 when generated or synthesized content is used during active learning, thereby maintaining provenance and rights management.

Multiple embodiments support selection at different granularities. For temporal data, uncertainty sampling operates on fixed-length segments, on event-level detections, or on aggregated sequences; temporal alignment S304 ensures that selected segments maintain coherence across modalities. For spatially localized modalities (e.g., images), uncertainty-based region proposals are used to request localized annotations (bounding boxes, segmentation masks) instead of whole-image labels, thereby improving annotation efficiency.

The active learning S204 module is extensible and interoperable with other system components. It exposes interfaces for annotation services, model training pipelines S402, data stores containing preprocessed inputs S800, and monitoring components S900 that track drift and trigger retraining S902. Logging of acquisition decisions and downstream model improvements enables closed-loop optimization of acquisition strategies via automated hyperparameter search S404 or meta-learning approaches that learn acquisition policies from past active learning rounds.

In embodiments, datasets used to train and validate multimodal models are prepared through a structured labeling workflow in which labeling is performed by expert annotators. Expert annotators are selected based on domain-specific qualifications, certifications, prior experience, or demonstrated proficiency on calibration tasks, and are provided with detailed annotation guidelines and exemplar annotations to promote consistency. The guidelines define annotation schemas for each modality, describe temporal alignment conventions, specify label taxonomies and confidence scoring mechanisms, and include instructions for handling ambiguous or missing data. Expert annotators are organized into role-specific teams (for example, image specialists, audio specialists, and text specialists) or into cross-modal teams depending on the requirements of the multimodal labeling tasks (S300). Inter-annotator agreement metrics are tracked and used to identify annotators requiring retraining or remediation; adjudication workflows are used to resolve disputes, with senior experts or consensus panels assigned to reconcile differing annotations.

Labeling is integrated with active learning pipelines (S204) to reduce labeling cost while maximizing model performance. In such pipelines, the model identifies the most informative unlabeled instances based on uncertainty, diversity, or expected model-change criteria, and expert annotators label those selected instances. Active learning selection operates across modalities, prioritizing samples that improve alignment in the shared embedding space (S302) or that reveal temporal synchronization challenges (S304). Expert annotators annotate raw multimodal inputs, corrected synchronized streams, or model-proposed labels that annotators confirm or modify. Feedback from expert annotations is used to update model weights and to refine selection criteria for subsequent active learning rounds.

Prior to annotation, input data is preprocessed (S800) and validated against modality-specific consistency schemas (S804) that encode expected value ranges, sampling rates, format constraints, and temporal synchronization tolerances. Expert annotators are trained to detect and flag outliers and noise that could require removal or special handling (S802). For time-series or temporally dependent modalities, expert annotators can mark alignment anchors or event boundaries to support automated temporal alignment functions (S304) and to guide fusion mechanisms that operate on aligned embeddings (S306). Where synthetic training samples are generated to augment scarce classes or edge cases (S200), expert annotators review and label synthetic samples to ensure fidelity and to prevent distributional artifacts; synthetic samples can be iteratively refined based on expert feedback.

Quality control measures include periodic benchmarking of annotator output against gold-standard references, calculation of annotation quality metrics (such as precision, recall, and F1 relative to gold labels), and continuous monitoring for drift in annotation behavior. Expert annotators participate in calibration exercises at regular intervals to maintain consistent interpretations of labeling rules; automated tools flag annotators whose labels deviate from cohort norms for targeted retraining. Annotation interfaces present contextual information from multiple modalities simultaneously when required, allow annotators to label temporal segments and frame-level attributes, and support comment fields and uncertainty flags to capture edge cases for later review.

To address fairness and representation concerns, annotated datasets undergo statistical analyses to detect bias (S600). Expert annotators are tasked with labeling attributes relevant to fairness analyses or marking content types that could introduce bias, subject to applicable ethical and legal constraints. When biases are detected, samples are reweighted (S602), additional targeted annotation tasks are commissioned to enrich underrepresented groups, and the model is retrained with fairness constraints incorporated into the loss function (S604). Expert annotator input is used to validate the effectiveness of mitigation strategies by assessing whether reweighted or augmented datasets achieve higher fairness metrics without unacceptable degradation in utility.

Annotation workflows are designed to support continuous model improvement and operational retraining triggers. Annotation metadata, including annotator identifiers, timestamps, annotation confidence, and adjudication outcomes, are stored and used in monitoring pipelines that detect distributional changes in incoming data (S900). When drift is detected, expert annotators are mobilized to label newly collected data to support incremental retraining (S902). Periodic benchmarking exercises that include gold-standard annotation sets ensure ongoing evaluation of model reliability (S904). Expert annotators also support screening outputs for similarity with known works (S700) by reviewing flagged outputs and assisting with the tuning of perceptual hashing thresholds; they also confirm and annotate suspected matches to known works for downstream watermarking or provenance tracking workflows (S702, S704).

Annotation systems support scalability and efficiency through dynamic allocation of human and compute resources. Annotation tasks are queued and routed based on annotator expertise, workload, and geographic or temporal availability; compute resources for annotation-assisted tooling (for example, model-assisted pre-labeling or on-the-fly alignment suggestions) are allocated dynamically in response to workload changes (S102). For large-scale annotation efforts, model parameters are pruned or quantized to enable fast on-premises prediction that assists annotators (S104, S500), and compressed models are deployed to edge devices used by remote annotators where necessary (S502) to minimize latency and costs during annotation.

Detailed records of annotation provenance and quality are maintained to support auditability and downstream uses such as liability assessment, regulatory compliance, and model explanation. Annotation provenance includes the annotation timestamp, annotator identity, version of the annotation schema, the tool version used for annotation, and any post-annotation adjudication steps. Such provenance data is embedded as metadata where appropriate (S704) and can be linked to model training runs to facilitate reproducibility and traceability. In embodiments that involve producing user-facing generated content, expert annotators participate in establishing thresholds and policies for output screening and watermarking policies (S700, S702) and provide labeled examples used to train or calibrate automated screening models.

The foregoing annotation practices are compatible with modality-specific module architectures and progressive training schedules (S400, S402). Expert annotations are used to train or fine-tune modality-specific modules and to guide fusion layers that operate on shared embeddings (S302, S306). Hyperparameter optimization leverages annotated validation sets to identify appropriate learning rates and model parameters (S404). When inference with minimal latency is required, annotations are used to prioritize optimization of classes and features critical to runtime performance, and to select latency-optimized architectures or specialized hardware mappings for deployment (S1002, S1004). Collectively, these practices ensure that labeled data produced by expert annotators effectively supports the training, evaluation, deployment, and ongoing maintenance of reliable multimodal systems.

Validating synthetic data using a discriminator model is performed after or during generation to assess fidelity, diversity, and adherence to modality-specific consistency schemas (S804). The discriminator model is trained concurrently or sequentially with the generator using labeled examples of real and synthetic data, and is configured to output one or more quality scores per synthetic instance. Quality scores can represent a scalar probability that an instance is real, a vector of modality-specific quality measures, or a set of diagnostic indicators (e.g., artifact likelihood, semantic coherence, temporal consistency). The discriminator model can be implemented as a single multimodal network that consumes fused embeddings (S302, S306) or as an ensemble of modality-specific discriminators that each evaluate a particular modality and produce a combined validity decision.

Validation proceeds by processing each synthetic instance through preprocessing (S800) and outlier/noise detection (S802) prior to discriminator evaluation. Preprocessing normalizes modalities, applies modality-appropriate transformations, and computes embeddings in a shared vector space (S302). Where temporal modalities are present, synchronization functions (S304) and temporal consistency checks are applied to ensure that temporal relationships match those observed in real data. The discriminator consumes either the preprocessed raw modalities or the computed embeddings and produces validation outputs. Validation outputs are compared against one or more thresholds, and instances that fail to meet the thresholds are flagged for rejection, human review, or targeted refinement.

A feedback loop is established between discriminator validation and generator refinement. Samples flagged as deficient are aggregated and analyzed to identify systematic generation errors such as mode collapse, class imbalance, or modality-specific artifacts. The results of this analysis guide retraining or fine-tuning of the generator, adjustment of generation parameters, and augmentation of the generator training set with real or synthetic corrective samples. When the discriminator is trained adversarially, gradients or surrogate signals derived from discriminator feedback are propagated to the generator to improve realism. In non-adversarial configurations, discriminator outputs are used as supervisory signals in a reinforcement or selection mechanism that preferentially retains superior synthetic samples.

Multiple validation criteria and metrics are combined to evaluate synthetic data. Quantitative metrics include distributional similarity measures (e.g., Fréchet Inception Distance or modality-appropriate equivalents), class-conditional coverage, precision and recall in embedding space, and calibration of predicted labels. Qualitative measures include perceptual similarity metrics and human evaluation when appropriate. The discriminator model can be augmented with auxiliary classifiers to assess attribute-level correctness and with temporal or spatial consistency modules for time-series, video, or spatially structured data. Validation decisions can be made using a weighted fusion of metric outputs, threshold rules, or learned decision networks.

To support multimodal use cases, discriminator validation is configured to check cross-modal coherence. Embeddings generated in a shared vector space (S302) are compared for alignment across modalities; cross-modal mismatches that exceed allowable tolerances trigger rejection or targeted correction. Attention mechanisms (S306) used during fusion can be repurposed or mirrored in the discriminator to focus evaluation on salient cross-modal correspondences. For example, a discriminator can verify that textual descriptions semantically correspond to visual content, and that audio and visual streams are temporally synchronized and semantically consistent.

Validated synthetic data is tagged and stored with provenance metadata (S704) indicating discriminator scores, validation thresholds satisfied, and any remediation actions taken. Synthetic samples whose confidence scores exceed acceptance thresholds are incorporated into training pipelines and data augmentation processes (S202), either directly or via active learning loops (S204) that select the most informative synthetic instances for labeling or inclusion. Samples with confidence scores below acceptance thresholds, or that are borderline, can be queued for human annotation, used as adversarial examples to strengthen discriminators and generators, or retained in a review corpus for continual improvement.

Mechanisms for controlling the acceptance threshold and for continuous monitoring of validation performance are included. Thresholds can be static, adaptively adjusted based on observed discriminator calibration, or dynamically tuned in response to downstream model performance on benchmarking tasks (S904). Monitoring components observe distributional properties of both real and synthetic datasets (S900) and trigger retraining of discriminator and generator models when drift or degradation is detected (S902). The system supports auditability by logging discriminator model versions, validation outcomes, and subsequent impacts on model training and inference.

When deployment to resource-constrained environments is required, validated synthetic data is used for training compressed or quantized models (S500), which are then deployed to edge devices (S502) using memory-efficient architectures (S504). The discriminator validation pipeline can be executed offline in resource-rich environments before models are trained for edge deployment, or a lightweight validation proxy can be included in edge-adjacent pipelines to ensure ongoing data quality. Screening outputs for similarity to known works using perceptual hashing (S700) and insertion of digital watermarks into generated media (S702) can be integrated with discriminator validation to enforce intellectual property and provenance constraints.

Alternative embodiments include modality-specific discriminator configurations, ensembles of discriminators for robustness, and human-in-the-loop validation invoked when discriminator confidence falls below configurable thresholds. The discriminator is trained using supervised, semi-supervised, or self-supervised approaches and incorporates domain-specific priors or constraints to improve sensitivity to relevant artifacts. The validation framework is extensible to additional modalities by adding corresponding preprocessing, embedding, and discriminator modules while preserving a common interface for quality scoring and metadata tagging.

In one embodiment, synthetic training samples are generated by one or more generative models (S200) and are subjected to an ethical compliance filtering stage prior to inclusion in any training dataset or other downstream use. The filtering stage analyzes each synthetic sample using a combination of automated classifiers, rule-based checks, and heuristic screens configured to detect categories of concern, including but not limited to personally identifiable information, explicit sexual content, hate speech, violent imagery, illicit activity, privacy violations, defamation, and potential copyright infringement. Automated classifiers operate on the modalities present in a sample: for image or video samples, the classifiers include object, face, and scene detectors as well as nudity and violence detectors; for text samples, the classifiers include natural language content classifiers and named-entity recognizers; and for audio samples, the classifiers include speech-to-text transcription followed by text classifiers and, where applicable, speaker recognition. Multimodal consistency checks combine signals from multiple modality-specific detectors to adjust the overall risk score for a synthetic sample (S302, S306).

Perceptual similarity checks are applied to detect samples that closely resemble known copyrighted works or private content. Such checks utilize perceptual hashing or embedding similarity comparisons against one or more reference corpora (S700). A synthetic sample whose perceptual hash or embedding similarity exceeds a configurable threshold is flagged for additional review or rejection. Metadata and provenance information produced when the sample was generated are inspected for signs of improper seeding, prompt leakage, or reuse of sensitive prompts. Samples that fail provenance integrity checks are quarantined and logged for audit.

A confidence-based scoring mechanism combines the outputs of multiple detectors to assign each synthetic sample an ethical compliance score. The scoring mechanism supports configurable thresholds that enable multiple operational modes: an automated-only mode in which samples scoring below a permissive threshold are blocked while samples scoring above an acceptance threshold are automatically accepted; a human-in-the-loop mode in which samples with intermediate scores are routed to a human reviewer; and a quarantine mode in which samples that exceed a critical-risk threshold are retained for detailed analysis and incident-response workflows. The human review stage captures structured feedback that is logged and used to refine the automated classifiers and to adjust thresholds over time.

Filtering can be applied at multiple points in a pipeline. In one implementation, filtering occurs immediately after generation (S200) and before any augmentation (S202) or active learning selection (S204) to prevent amplification of problematic content through augmentation. In another implementation, a lightweight pre-filter removes outputs that are unambiguously unacceptable, followed by a more computationally intensive, multimodal filter executed after augmentation to capture issues that arise when real and synthetic data are combined. The pipeline supports re-synthesis or transformation of flagged samples: when a sample is flagged for a remediable issue (for example, a minor privacy exposure or an incidental copyrighted texture), the generative model can be re-prompted with constraints or the sample can be automatically edited to remove the problematic elements and then re-evaluated by the filter.

The filtering stage interfaces with multiple system components to provide robustness and traceability. Filter decisions and associated scores are recorded in a provenance log (S704) that links each retained synthetic sample to generator parameters, prompts, embedding identifiers, timestamps, and filter artifacts to support audits and incident investigation. Upon detection of similarity to known works, the system is configured to insert or check for digital watermarks (S702) to facilitate downstream attribution and rights management. Outputs of the filtering stage feed back into bias and fairness evaluation modules; aggregate statistics from filtered samples are consumed by bias-detection routines (S600) to determine whether the generative model disproportionately produces problematic content for particular cohorts, and to trigger reweighting (S602) or retraining with fairness constraints (S604) where indicated.

From an implementation standpoint, the ethical filter is designed for scalable deployment. Filtering tasks can be parallelized across distributed compute nodes and integrated with dynamic resource allocation to handle bursts in synthetic sample generation (S100, S102). Compute-intensive checks such as full-resolution image similarity or ensemble language-model classification can be scheduled on specialized hardware to reduce latency (S1004). To balance throughput and resource cost, the system employs a cascade architecture in which inexpensive, recall-oriented detectors run first and more expensive, precision-oriented detectors are invoked only for candidates that pass earlier stages. Pruning and model compression techniques (S104, S500)

are applied to reduce the footprint of on-device filtering modules while preserving detection performance.

The ethical filtering framework supports configurable policy profiles that encode legal, organizational, or application-specific requirements. Policy profiles dictate which categories are disallowed, what confidence thresholds apply, whether human review is required, and retention policies for logs and quarantined samples. Administrators can version and propagate policy changes across deployments; when a policy change increases the scope of prohibited content, the system can trigger retrospective audits that re-evaluate previously accepted synthetic samples and initiate appropriate remediation or retraining workflows (S902).

The system provides mechanisms for continuous improvement. Filter performance is periodically benchmarked using curated test suites that include known adversarial and edge-case examples (S904). False positive and false negative rates are measured and used to update classifier models and to tune thresholding logic. Active learning (S204) is applied to the filtering classifiers themselves: particularly informative or ambiguous samples identified in production are sampled for annotation, added to the training pool, and used to retrain the detectors so as to reduce future human-review burden. In parallel, the generative model(s) producing synthetic samples are fine-tuned or constrained to reduce the generation of ethically problematic content at source, thereby minimizing the burden on downstream filters.

Finally, the filtering module is designed to integrate with broader safety and governance capabilities. Alerts and audit trails from the filtering stage are surfaced to governance dashboards, compliance teams, and incident-response systems. Where regulation or contractual terms require demonstrable safeguards, the provenance logs and benchmark reports provide evidence that synthetic samples were evaluated and that disallowed content was prevented from entering training or production datasets. The architecture supports extensibility so that new detection models, policy rules, and external reference corpora can be incorporated over time without disrupting ongoing generation and training activities.

In one set of embodiments, data augmentation of real multimodal datasets is performed in feature space rather than in input (raw-signal) space, as an implementation of applying data augmentation techniques to real multimodal datasets (S202). Feature-space augmentation operates on embeddings (S302) or other intermediate representations produced by modality-specific encoders, and can be applied to one or more modalities independently or jointly to produce augmented training samples that preserve semantic or label-related properties while increasing coverage of the representation manifold.

Feature-space transformations include linear and nonlinear perturbations of embedding vectors. Linear interpolations such as mixup are performed by selecting two embeddings $x\_i$ and $x\_j$ and computing $x'=\text{alpha } x\_i+(1-\text{alpha}) x\_j$ with alpha sampled from a Beta distribution; labels are combined accordingly as $y'=\text{alpha } y\_i+(1-\text{alpha}) y\_j$. Extrapolation can be implemented similarly using alpha outside [0,1] to push samples toward less-populated regions of the embedding space. Affine transforms such as scaling, translation, and rotation can be applied in subspaces defined by principal component analysis (PCA) or independent component analysis (ICA), where directions of largest variance or independent latent directions are identified and scaled by sampled factors to create $x'=x+\Sigma\_k \text{ beta}\_k u\_k$, with $u\_k$ denoting basis vectors and beta_k sampled from a distribution with magnitude constrained by a threshold derived from the training covariance.

Noise injection methods perturb embeddings with additive noise whose statistics are chosen to reflect intrinsic embedding uncertainty. Isotropic Gaussian noise $x'=x+\varepsilon$, $\varepsilon\sim N(0, \sigma^2 I)$, is suitable when the embedding distribution is approximately spherical. Anisotropic noise using the empirical covariance $\Sigma$ yields $x'=x+Lz$ where $\Sigma=LL^T$ and $z\sim N(0, I)$. Adversarial perturbations in feature space are computed using gradients of a loss L with respect to the embedding: $x'=x+\varepsilon*\text{sign}(\nabla\_x L(x, y))$, where $\varepsilon$ is selected to preserve label semantics; iterative projected gradient steps are employed to explore difficult decision-boundary regions for robustness training.

Manifold-aware traversals generate augmented features by moving along directions that lie on or near the learned data manifold. A learned generator or decoder (for example, the decoder portion of a variational autoencoder (VAE) or a diffusion model) maps latent-space perturbations to augmented embeddings: $z=\text{encoder } (x)$; $z'=z+\text{delta}$; $x'=\text{decoder } (z')$. Delta can be sampled from the prior distribution of z or from learned direction vectors corresponding to semantically meaningful changes (e.g., changing object scale or background). When a pretrained generative model is used to synthesize embeddings or reconstruct inputs from perturbed latents, this falls within generating synthetic training samples via generative models (S200) while remaining specific to feature-space augmentation.

Cross-modal feature-space augmentation mixes or transfers variations between modalities. For a paired multimodal example $(x\_a, x\_b)$ where $x\_a$ is an image embedding and $x\_b$ is an audio embedding, a transformation can be applied to one modality conditioned on the other: $x\_a'=x\_a+f(x\_b;$ theta$)$, where f is a learned conditioning network. Cross-modal mixup blends embeddings across modalities to create hybrid samples that encourage the fusion module (S306) to learn robust associations. Care is taken to maintain label consistency or to compute composite labels when mixing semantically different instances.

Modality-specific feature-space transformations are tailored to the characteristics of each modality. For visual embeddings, manipulations in a latent image representation (e.g., from a VAE or a convolutional encoder) implement feature-space color jitter, geometric distortions, or object-level occlusion by modifying channel-wise or spatial latent maps. For audio embeddings such as log-Mel or learned audio embeddings, time-frequency masking and frequency shifts are implemented directly in the spectro-temporal feature domain. For text embeddings, augmentation is performed by perturbing token embeddings, applying dropout to embedding dimensions, interpolating between sentence embeddings, or replacing embedding vectors with vectors corresponding to semantically similar tokens identified in the embedding space. For sensor or time-series modalities, warping and local stretching of segments can be applied in embedding sequences while preserving temporal order.

Label preservation and label-aware augmentation strategies are described. For classification tasks where transformations are expected to preserve class identity, augmentation magnitude is constrained by distance thresholds: $d(x, x')<=\text{tau}$, where d is a metric such as cosine distance or Mahalanobis distance computed using the empirical covariance of the embedding distribution. When labels are mixed (e.g., mixup), soft labels are computed and used in training. For tasks where semantic labels change under transformation (e.g., altering speaker identity in audio), augmentations are applied only when the resulting label is known or can be synthesized reliably.

Selection and scheduling of feature-space augmentation is integrated with progressive training schedules (S402) and automated hyperparameter search (S404). Strength parameters (e.g., sigma for noise, alpha distributions for mixup, epsilon for adversarial perturbations) are treated as tunable hyperparameters discovered via grid search, Bayesian optimization, or bandit-based search; hyperparameter optimization can be constrained by validation performance on a held-out set or by fairness and robustness metrics. Progressive augmentation schedules gradually increase augmentation magnitude during training phases to avoid destabilizing early representation learning, for example by annealing a multiplier g(t) such that transformation magnitude at epoch t is m(t)=m_max*g(t) with g(0)≈0 and g(T)=1.

Feature-space augmentation modules can be implemented as explicit components in the training pipeline, receiving embeddings produced by modality-specific encoders (S300, S302) and outputting augmented embeddings that are consumed by downstream fusion (S306) and task heads. Such modules can be stateless-applying randomized transformations per batch- or stateful, containing learned parameters that adapt during training. Learned augmenters are trained adversarially or with reconstruction/contrastive objectives to ensure augmented samples are plausible; when adversarial training is used, a discriminator or critic provides feedback to constrain deviations from the data manifold.

Quality control and safety measures are described for feature-space augmentation. Prior to using augmented samples for training, validation routines verify modality-specific consistency and plausibility via schemas or constraints (S804). Statistical checks detect outliers or implausible embeddings introduced by augmentation (S802); examples falling beyond a set of predefined Mahalanobis distance thresholds or failing a pretrained modality consistency classifier are discarded or downweighted. Measures for detecting and mitigating bias introduced by augmentation are integrated into the pipeline: statistical analysis monitors representation shifts across protected attributes (S600), sample reweighting balances augmented classes or subgroups (S602), and retraining with fairness constraints is performed when necessary (S604).

Feature-space augmentation is combined with active learning (S204) and sample selection strategies. Augmented instances can be used to expand the candidate pool for human labeling or to refine uncertainty estimates: for an unlabeled instance, multiple augmented variants are generated and their model predictions are aggregated to estimate epistemic uncertainty; instances exhibiting substantial disagreement are prioritized for labeling. Augmented data provenance is tracked using embedded metadata that records augmentation type, parameters, and origin to support reproducibility and downstream screening (S704). If required, augmented outputs can be watermarked or otherwise flagged (S702) to indicate synthetic origin.

Monitoring and lifecycle management practices account for distributional effects of augmentation. During deployment, monitoring for distributional changes (S900) includes tracking whether incoming embeddings resemble training-time augmented distributions; triggers for model retraining (S902) or adjustment of augmentation strategies are defined based on drift metrics. Periodic benchmarking (S904) evaluates whether augmentation improves robustness, generalization, and fairness objectives across tasks and modalities.

Concrete parameter examples include: using Beta (0.2, 0.2) for mixup alpha sampling in image-text tasks; setting PCA-based traversal magnitudes to no more than 1.5 times the standard deviation along selected principal components; applying isotropic Gaussian noise with sigma chosen as a percentile (e.g., 5th-10th) of intra-class embedding distances to preserve class identity; constraining adversarial perturbation epsilon to maintain cosine similarity >=0.85 with the original embedding. Empirical tuning of these values is performed as part of S404 automated hyperparameter search and validated via S804.

These feature-space transformation techniques enable efficient, flexible augmentation for multimodal systems while facilitating control over semantic fidelity, computational cost, and deployment constraints. The described methods can be combined, parameterized, and adapted per modality or task to achieve desired trade-offs between data diversity, label preservation, robustness, and fairness.

The method, system, and apparatus described herein further include using bootstrap sampling to increase data diversity. In one embodiment, prior to or in conjunction with generating synthetic training samples via generative models S200 and applying data augmentation techniques to real multimodal datasets S202, bootstrap sampling is applied to the available training corpus to produce multiple resampled datasets that increase diversity and support robust model estimation. Input data from at least two modalities S300 is preprocessed S800, including normalization, tokenization, feature extraction, and any modality-specific cleaning. Following preprocessing S800 and detection and filtering of outliers and noise S802, bootstrap sampling is performed on the cleaned and validated data S804 to produce a plurality of bootstrap resamples. Each resample can be created using sampling with replacement from the validated dataset, with sample sizes equal to, or a fraction of, the original dataset size depending on computational and statistical tradeoffs.

Bootstrap resampling can be stratified to preserve class proportions or other relevant strata within the multimodal data. For temporally correlated modalities, a block bootstrap or moving-block bootstrap can be used to preserve temporal dependencies while still generating diverse resamples for training. Temporal alignment functions S304, which synchronize data streams for multimodal inputs S300, operate in conjunction with bootstrap procedures to ensure that resamples maintain consistent cross-modal correspondences: when a sample is selected for one modality, the temporally aligned or otherwise associated samples from the other modalities are simultaneously selected to form coherent multimodal training instances. In another variant, modality-specific bootstrap is performed independently for each modality, followed by reassembly of multimodal pairs or tuples using alignment constraints enforced by S304.

The bootstrap procedure can be integrated with generative augmentation S200 and conventional augmentation S202 in multiple ways. In a first variant, bootstrap resamples are used as input sets for generative models that produce additional synthetic examples; each resample can seed a separate generative-model instantiation or a separate training pass of a single generative model, producing a diverse set of synthetic samples that reflect sampling variability. In a second variant, augmentation transformations S202 are applied to each bootstrap resample, yielding a combinatorially larger set of augmented instances. In a further variant, active learning S204 selects the most informative instances for labeling from among bootstrap resamples by evaluating model uncertainty or expected model change on resampled data; bootstrap-derived uncertainty estimates (e.g., via bagging ensembles) inform selection to maximize label efficiency.

Bootstrap sampling can also be exploited to support uncertainty estimation and model ensembling. Multiple models or multiple training runs trained on different bootstrap resamples can be aggregated (bagged) to produce a more robust predictor and to provide empirical estimates of predictive variance and confidence intervals. These ensemble- or bootstrap-derived uncertainty estimates can be used downstream for bias detection S600, sample reweighting S602, retraining with fairness constraints S604, output screening S700, or triggering retraining upon drift detection S902. For example, when bootstrap ensembles indicate elevated variance for a particular subgroup, the system can increase sampling density for that subgroup through additional bootstrap resamples or targeted synthetic generation S200 to reduce disparity.

Implementation of bootstrap sampling is compatible with distributed computation across a set of compute nodes S100. Bootstrap resamples are generated in parallel across compute nodes, with each node responsible for creating and processing one or more resamples, thereby leveraging segmentation of model computation S100 for throughput and scalability. Dynamic allocation of compute resources S102 can respond to workload changes by provisioning nodes for additional bootstrap resampling and corresponding training tasks. To reduce overhead, pruning of model parameters S104, quantization S500, and other compression techniques are applied to models trained on bootstrap resamples, and compressed models are deployed to edge devices S502 for inference S504. When employing bootstrap in a distributed setting, synchronization mechanisms and data sharding strategies are used to ensure reproducibility and to minimize cross-node communication overhead; for example, a seed management service provides pseudo-random seeds to each node to allow deterministic resample recreation when needed.

Bootstrap sampling can be parameterized according to application requirements. Parameters include the number of bootstrap resamples (B), resample size relative to the original dataset (n*), stratification criteria, block length for temporal bootstrap, and sampling weights. Sampling weights can be non-uniform to bias resamples toward underrepresented classes or other regions of interest, thereby complementing reweighting methods S602 and addressing dataset bias detected via statistical analysis S600. Hybrid strategies combine bootstrap sampling with importance sampling for targeted diversity, or with oversampling/undersampling schemes as part of a broader data balancing pipeline.

During training, modality-specific modules S400 are trained on bootstrap resamples either independently or within a coordinated progressive training schedule S402. Progressive schedules begin with coarse-grained training on smaller or heavily-augmented bootstrap resamples and progress to fine-tuning on larger or less-augmented resamples. Automated hyperparameter search S404 includes bootstrap-aware evaluation, wherein hyperparameter performance is assessed across a set of resamples to select configurations that generalize well under data variability. Employing bootstrap ensembles naturally facilitates model calibration and enables estimation of generalization error without requiring additional holdout datasets.

Bootstrap sampling further supports active maintenance and monitoring of deployed systems. Monitoring outputs for distributional changes S900 and triggering retraining upon drift detection S902 employ bootstrap-based control charts or bootstrapped confidence intervals to robustly detect shifts in output distributions. Upon detection of drift, retraining is prioritized using resamples that emphasize newly observed data regions or subpopulations. Periodic benchmarking S904 leverages bootstrap resampling to quantify the stability of performance metrics and to provide statistical bounds on changes over time.

When generating media outputs, bootstrap-derived ensemble predictions can be screened for similarity with known works using perceptual hashing S700, and provenance mechanisms S704 or watermarks S702 can be applied consistently across ensemble-generated outputs. For deployment scenarios requiring minimal latency, bootstrap operations can be performed offline or in a lightweight streaming form, and near-real-time architectures S1002 and specialized hardware S1004 can be selected to accommodate any on-device resampling or ensemble inference needs.

Alternative embodiments include using bootstrap resampling as an internal component of data augmentation pipelines without retaining all intermediate resamples, employing approximate or partial bootstrap techniques to reduce storage and compute demands, and combining bootstrap with synthetic minority oversampling techniques or GAN-based augmentations to address extreme class imbalance. The bootstrap procedures disclosed are applicable across modalities and can be modified to respect modality-specific constraints (for example, image blocks for visual data or waveform segments for audio) while preserving cross-modal alignment S304. The techniques described can be implemented in software, firmware, hardware, or any combination thereof, and can be realized using conventional programming languages and machine learning frameworks, executed on general-purpose processors, accelerators, or distributed clusters as appropriate.

In one embodiment, the active learning component S204 selects unlabeled instances for manual annotation using diversity sampling to maximize the representativeness of each labeling batch. Input data are first preprocessed S800 and passed through noise and outlier detection S802; instances that fail modality-specific consistency schemas S804 are held out or corrected prior to selection. For each remaining unlabeled instance, modality-specific encoders S400 generate per-modality representations which are temporally aligned when appropriate using temporal alignment functions S304 and then projected into a shared embedding space S302. Fusion mechanisms such as cross-modal attention S306 are used to produce a consolidated embedding for each multimodal instance; alternatively, concatenation or a learned projection of the per-modality embeddings can be employed to preserve modality-specific structure while enabling cross-modal distance computations.

Diversity sampling is implemented by computing pairwise similarity or distance metrics in the shared embedding space, for example cosine similarity or Euclidean distance after L2 normalization. Multiple diversity-driven selection strategies are employed individually or in combination. In one strategy, clustering (e.g., k-means or hierarchical clustering) is applied to the unlabeled embeddings, and one or more representatives are selected from each cluster to ensure coverage across the data manifold. Representatives can be selected as cluster centroids, medoids, or the most uncertain example within a cluster. In another strategy, a core-set or k-center greedy algorithm is applied to maximize the minimum distance between selected samples and the already-labeled pool, thereby producing a diverse covering set that reduces redundancy. A probabilistic diversity sampler such as a Determinantal Point Process (DPP) can alternatively be used to stochastically favor subsets exhibiting increased pairwise diversity while allowing tunable control over subset size and diversity strength.

Because purely diversity-based selection can overlook instances for which the model expresses uncertainty, hybrid acquisition functions integrate diversity and uncertainty. For each unlabeled instance, the current model computes an uncertainty score—for example, predictive entropy, margin, variance from a Bayesian approximation, or ensemble disagreement. A combined acquisition score is formed as a weighted sum or as a multiplicative fusion of normalized uncertainty and a diversity term (for example, the inverse of average similarity to the current labeled set or cluster-based representativeness). A tunable parameter alpha controls the tradeoff between uncertainty and diversity. In batch-mode active learning, the acquisition procedure greedily or via submodular optimization maximizes the combined objective to produce batches that are both informative and diverse.

Batch selection procedures incorporate constraints and heuristics tailored to multimodal settings. For temporal data, diversity sampling enforces coverage across time windows identified by S304 so that selected batches do not cluster in a limited temporal interval. For multimodal heterogeneity, modality-aware diversity ensures that the sample set includes coverage across modality combinations (e.g., image+audio, text+video) by computing diversity metrics on modality-specific embeddings in addition to the fused embedding and enforcing per-modality quotas or weighted selection. Fairness considerations from dataset analysis S600 lead to reweighting schemes S602 in the acquisition function so that underrepresented groups or classes are preferentially included in the diverse batch, reducing selection bias prior to retraining.

Efficient implementation of diversity sampling at scale uses approximate nearest neighbor structures (e.g., FAISS) or sampling via coresets to avoid $O(n^2)$ pairwise computations. Embeddings are pruned or quantized S500 for memory and compute efficiency; compute-intensive operations are distributed across compute nodes S100 with dynamic resource allocation S102 to respond to changes in pool size, and accelerated via specialized hardware S1004. To maintain rapid acquisition when required, selection is performed on compact proxies of the full embedding or by streaming approximate diversity estimators S1000,S1002.

Selected instances are optionally augmented S202 or supplemented with synthetic samples generated by generative models S200 to increase local density around rare but salient regions identified by diversity sampling. After labeling, the newly labeled set is used to retrain or fine-tune the multimodal model under any fairness constraints encoded in the loss function S604. Retraining schedules can be progressive S402 and guided by automated hyperparameter search S404, and models can be compressed and deployed to edge devices S502,S504 where necessary. Continuous monitoring S900 evaluates the effect of diversity-based acquisition on downstream performance; drift detection S902 and periodic benchmarking S904 provide feedback to adapt the diversity sampling hyperparameters (e.g., cluster count, alpha weighting, batch size) over time so as to maintain labeling efficiency and model reliability.

In one embodiment, the method further comprises storing augmented data in cloud storage. Synthetic training samples generated via generative models (S200) and real-data augmentations applied to multimodal datasets (S202) are persisted to a cloud-based object store using a structured naming convention that encodes modality, augmentation type, source dataset identifier, timestamp, and version. Each stored augmented sample is associated with metadata that includes a provenance record (S704) linking the sample to the generation or augmentation operation (for example, an identifier of the generative model instance used under S200 or the augmentation parameters applied under S202), a perceptual-hash fingerprint for similarity screening (S700), a fairness annotation indicating any reweighting or balancing applied (S602), and schema validation flags from modality-specific consistency checks performed prior to storage (S804).

In certain implementations, storing augmented data in cloud storage involves compressing or quantizing augmentation artifacts to reduce storage and transfer costs. Compression and quantization are performed according to a configurable policy that balances fidelity and storage efficiency, and the chosen policy is recorded in the metadata. The cloud storage pipeline supports multipart upload and checksumming to ensure data integrity, and provides server-side or client-side encryption to protect data at rest and in transit. Access control lists and role-based access control entries govern which compute nodes and processes are permitted to read, write, or delete particular augmentation artifacts, and audit logs are maintained to record access and modification events.

The cloud storage is organized to facilitate distributed training and inference workflows. Augmented datasets are partitioned into shards that correspond to distributed compute nodes or training jobs, enabling downstream operations such as segmenting model computation across a distributed set of compute nodes (S100) and allocating compute resources dynamically in response to workload changes (S102). A manifest file or index is stored alongside each shard to list contained samples and associated metadata, allowing training orchestrators to select relevant shards according to training schedules (S402), active learning selections (S204), or fairness-driven sampling strategies (S602).

To support active learning and iterative refinement, the cloud storage system exposes APIs that allow the selection engine (S204) to mark individual augmented samples for labeling, reannotation, or deletion. Labeled augmented samples are versioned and linked back to their original augmentation provenance to maintain traceability. When bias detection processes are run (S600), reweighting decisions (S602) and retraining triggers (S902) operate over the stored augmented corpus, and the history of fairness-constrained retraining (S604) is recorded in training run metadata linked to the cloud-stored dataset snapshots.

Storing augmented data in cloud storage also enables downstream screening and content-safety operations. Before an augmented sample is propagated to model training pipelines, the stored artifact can be screened for similarity with known works using perceptual hashing (S700) and can be watermarked (S702) or tagged with provenance metadata (S704). These screening steps are performed as part of the cloud ingestion pipeline, and flagged samples are quarantined in a restricted bucket or routed to a separate queue for human review.

Integration with preprocessing and validation is supported by writing preprocessed outputs and validation results to the cloud store. For example, outlier and noise detection (S802) performed during preprocessing (S800) results in classification of augmented samples as accepted, flagged, or rejected; acceptance status and validation reports are stored alongside the corresponding augmented artifacts so that downstream training and benchmarking processes (S904)

operate on vetted datasets. Modality-specific consistency schemas (S804) are enforced upon upload; if a sample fails validation, the cloud storage pipeline can trigger automated remediation, such as re-running augmentation with alternate parameters or routing the sample to a human-in-the-loop correction workflow.

For deployments targeting edge devices, augmented datasets stored in cloud storage can be used to produce compressed model artifacts and calibration data that are subsequently deployed to edge nodes (S502). The cloud storage service supports lifecycle rules that prepare and stage training subsets optimized for latency-sensitive inference architectures (S1002) and for utilization with specialized hardware (S1004). In some embodiments, augmented data intended for on-device personalization is encrypted with keys accessible only by designated edge devices, enabling private fine-tuning without exposing raw augmented samples to unrelated parties.

The cloud storage environment supports efficient retraining and drift mitigation. Monitoring systems detect distributional changes in model outputs (S900), and when drift is identified the system triggers a retraining workflow (S902) that pulls relevant augmented samples and recent real-data samples from cloud storage. Retraining runs and benchmarking results (S904) are stored with references to the exact augmented dataset snapshot used, enabling reproducible evaluation and rollback to prior model versions if needed.

To reduce redundancy and storage footprint, deduplication and delta-encoding are applied at upload time to augmented artifacts that share underlying raw data or augmentation parameters. The cloud storage retains both full-resolution artifacts and lightweight embeddings generated in a shared vector space (S302), enabling downstream retrieval and fusion (S306) tasks to operate on embeddings for efficiency while preserving links to the full augmented media when full-fidelity samples are required for training or evaluation.

Operationally, storing augmented data in cloud storage is integrated with orchestration components that coordinate model partitioning (S100), progressive training schedules (S402), and hyperparameter optimization (S404). Training orchestrators retrieve augmented shards based on workload and schedule, and can dynamically scale compute allocations (S102) while leveraging the cloud-stored augmented corpus to ensure that each training job receives the appropriate balance of synthetic and augmented real samples. The cloud storage further supports tagging augmented data according to experiment identifiers, which facilitates automated hyperparameter search tracking and comparison of alternative augmentation strategies.

In alternative embodiments, the cloud storage subsystem offers hybrid configurations in which augmented data is cached at the edge for rapid access while authoritative copies are maintained in the cloud; these configurations enable asynchronous batch processing of multimodal inputs (S1000) and selection of latency-optimized inference architectures (S1002) without sacrificing centralized governance or provenance. All stored augmented artifacts are subject to retention and deletion policies consistent with privacy requirements and data governance rules; automated workflows can purge or anonymize augmented samples when required by policy, and policy-driven retention metadata is recorded with each stored sample to ensure compliance.

Retraining can be scheduled at fixed time intervals (for example, nightly or weekly), upon accumulation of a threshold quantity of newly labeled instances, or under a hybrid policy that combines time-based and volume-based triggers. In some embodiments, periodic retraining is performed whenever the labeled-instance buffer reaches a configurable capacity or when monitored output distributions indicate drift beyond predefined bounds (S900). In other embodiments, periodic retraining is executed at predetermined intervals irrespective of drift detection, ensuring regular model refreshes to incorporate recent labeled data.

To reduce computational overhead while incorporating new labels, the retraining process supports incremental and full retraining modes. In incremental mode, the model weights are warm-started from a previously saved checkpoint and updated using only the newly labeled instances or a curated subset combining new samples with a limited replay set drawn from prior data. In full retraining mode, the model is trained from the complete consolidated corpus. The choice between incremental and full retraining is determined automatically based on the relative size of new data, measured performance degradation, or resource availability as reported by resource allocation and scheduling components (S102).

The retraining pipeline integrates data augmentation (S202) and synthetic sample generation (S200) to enrich the labeled set and improve generalization, particularly when new labels are scarce or class imbalance is observed. Class reweighting or sample resampling strategies (S602) are applied during training to address representation disparities detected by bias analysis (S600). Fairness constraints are incorporated into loss functions (S604) during retraining to mitigate identified biases while preserving overall performance.

When retraining involves multimodal models, newly labeled multimodal instances are preprocessed (S800), validated with modality-specific schemas (S804), and synchronized temporally where applicable (S304). Modality-specific modules (S400) are trained on their corresponding labeled subsets following progressive schedules (S402) before embeddings are fused in a shared vector space (S302) using attention mechanisms or other fusion strategies (S306). The retraining process accommodates asynchronous batches (S1000) and supports specialized latency-optimized architectures (S1002) during inference stages while maintaining a more expressive training architecture.

To optimize resource utilization during periodic retraining, computation can be segmented across distributed compute nodes (S100) and compute resources can be allocated dynamically (S102) according to current workload. Model pruning (S104), quantization (S500), and other compression techniques can be applied pre- or post-retraining to reduce memory and execution costs for subsequent deployment. Automated hyperparameter search (S404) can be invoked during retraining to adjust learning rates and other parameters, and progressive training schedules (S402) can be used to stabilize training when integrating heterogeneous labeled data.

Retraining workflows include evaluation and benchmarking stages (S904) to assess reliability, robustness, and adherence to performance targets. Evaluation metrics are computed on held-out validation sets and newly labeled test instances; additional checks screen outputs for similarity to known works using perceptual hashing (S700) and insert or verify digital watermarks (S702) to assert provenance. If evaluation indicates unacceptable degradation or bias, retraining parameters, data selection policies, or model architectures are adjusted and a subsequent retraining cycle is scheduled.

After retraining completes and evaluations meet acceptance criteria, updated models are prepared for deployment. Compression and quantization steps (S500), together with memory-efficient inference architectures (S504), are applied for edge deployment targets, and compressed models are distributed to edge devices (S502). The deployment pipeline records metadata linking the deployed model to the labeled data, training configuration, and evaluation results (S704), enabling traceability and supporting rollback or targeted updates. Periodic retraining on newly labeled instances thus forms a continuous maintenance loop that incorporates data validation (S804), active selection (S204), bias mitigation (S600-S604), monitoring (S900-S902), and evaluation (S904) to maintain model performance and reliability across changing operational conditions.

A unified data pipeline is disclosed in which real and synthetic data are integrated to produce training corpora for multimodal models. Raw inputs from physical sensors and user-provided datasets, including image, audio, text, and sensor streams, are ingested and preprocessed (S800). Pre-processing includes normalization, unit conversion, temporal resampling, modality-specific feature extraction, and data partitioning into streams intended for real-data channels and synthetic-data channels. Outlier detection and noise filtering (S802) are applied to both real and synthetic sources; samples that deviate from modality-specific consistency schemas are flagged and either corrected or removed (S804) prior to downstream use. Metadata describing provenance, generation parameters, and expected distributions is attached to each sample and propagated through the pipeline (S704).

A dynamic mixing subsystem integrates real and synthetic samples into unified minibatches for training. The mixing subsystem supports multiple strategies, including fixed-ratio mixing, curriculum-based schedules, adaptive importance sampling, and class- or feature-aware balancing. In one embodiment an initial training phase uses an increased proportion of synthetic samples to establish robust feature extractors, followed by gradual annealing to raise the proportion of real samples to fine-tune model calibration. In another embodiment the mixing proportion is adjusted automatically in response to validation metrics: when domain discrepancy metrics escalate, the subsystem increases the share of real data or employs domain adaptation techniques. Sample weights reflecting confidence, provenance, or relevance are assigned and incorporated into loss functions to bias learning toward more reliable real instances while retaining the coverage benefits of synthetic data.

Model optimization is performed with automated hyper-parameter search (S404) across architectures, mixing ratios, augmentation intensities, and loss-weight schedules. The search evaluates metrics that measure not only task accuracy but also domain generalization, calibration, and fairness. To manage computational load and enable scalability, model computation is segmented across a distributed set of compute nodes (S100), and compute resources are allocated dynamically in response to workload changes (S102). Additional model pruning and parameter-relevance-based reduction techniques (S104) are employed during training to reduce overhead while preserving performance on both synthetic and real distributions.

Bias detection and correction are incorporated to ensure ethical and robust behavior. Statistical analysis is performed on the integrated dataset to detect representation imbalances and distributional biases (S600). Samples are reweighted or synthetically generated to increase representation of underrepresented subpopulations (S602). Models are retrained with fairness constraints embedded in the loss function or via post-processing calibration to mitigate identified biases (S604). Provenance metadata (S704) is used to track the origin of samples for auditing purposes, and digital watermarks or perceptual hashes are inserted into synthetic media to distinguish synthetic outputs from real data and to screen for similarity with known works (S700, S702).

Validation and quality control are enforced at multiple stages. Prior to model ingestion, modality-specific consistency schemas validate that each sample satisfies expected structural and semantic constraints (S804). During and after training, periodic benchmarking against held-out real-world test sets and synthetic challenge sets evaluates task performance and robustness (S904). Monitoring for distributional shifts in either real or synthetic input streams is maintained in production; upon drift detection, automated retraining triggers can initiate model updates using newly acquired labeled real instances and selectively generated synthetic data targeted to the drift region (S900, S902).

The pipeline supports multiple operational and configuration variants. Synthetic generation can be performed offline to populate large pretraining corpora or online in response to model failures identified through active learning or monitoring. Mixing strategies utilize sample-level metadata to enforce strict separation or to control blending of synthetic and real samples in accordance with regulatory or provenance requirements. Domain-adaptive loss terms, such as adversarial domain discriminators or moment-matching objectives, are incorporated to reduce domain shift between synthetic and real distributions. In some embodiments, separate discriminators are trained to estimate synthetic realism and to weight or reject synthetic instances that are unlikely to benefit downstream performance.

Extensive logging of dataset composition, generation parameters, augmentation histories, and model performance metrics is maintained to facilitate reproducibility and regulatory compliance. The pipeline enables experiments that quantify the marginal utility of synthetic data by selectively enabling or disabling synthetic channels, varying generation diversity, and measuring the effect on held-out real-world performance, fairness metrics, and robustness to distributional shifts. This structured integration of real and synthetic data within a unified pipeline supports scalable, auditable, and adaptive training of multimodal models suitable for deployment across cloud and edge environments.

In embodiments where augmentation parameters are adjusted adaptively based on validation accuracy, the training pipeline includes a monitoring component that computes one or more validation metrics on a held-out validation set at regular intervals (for example, after each epoch or after every M training iterations). The validation metric(s) can include top-l accuracy, top-k accuracy, area under the ROC curve, F1 score, or modality-specific performance measures (e.g., word error rate for audio, mean IoU for segmentation), and a scalar aggregated score can be computed when multiple metrics are used. A moving average or exponentially weighted moving average of the validation metric is maintained to reduce sensitivity to transient noise and to provide a smoothed signal for adaptation decisions.

Augmentation parameters comprise any tunable quantities of the applied augmentation transformations (S202), for example probability of applying a given augmentation, magnitude or strength (e.g., rotation angle range, crop scale range, color jitter amplitude), the mix ratio in mixup/cutmix, sampling temperature for synthetic sample generation (S200), or modality-specific augmentation schedules. Each augmentation parameter is associated with bounds and a minimum allowable value to prevent degenerate data that undermines learning. At each adaptation point, the system compares the current smoothed validation metric against a reference performance value (for example, the best historical validation metric, the metric at the previous adaptation point, or a target threshold). If the metric has risen by at least a positive delta, one or more augmentation parameters are increased (either multiplicatively or additively) to encourage greater regularization and robustness. Conversely, if the metric has degraded beyond a negative delta, the system reduces augmentation strength to allow the model to fit the current training distribution more readily.

When augmentation policies span many parameters (for example, when composing multiple augmentation operators or when per-class or per-modality parameters are used), bandit or reinforcement learning controllers can be employed. A controller samples augmentation parameter vectors according to a policy; after a training interval, the validation accuracy is used as a reward signal to update the controller (for example, using policy gradient, REIN-FORCE, or Thompson sampling). Exploration versus exploitation is managed via 8-greedy schedules, temperature annealing, or uncertainty-aware acquisition functions so that the system does not prematurely converge to suboptimal augmentation regimes.

Adaptive adjustment is performed at a cadence selected to balance responsiveness and stability. Brief cadences (per mini-batch or per few iterations) enable rapid reaction to transient overfitting but increase sensitivity to noise; longer cadences (per epoch or every K epochs) reduce oscillation. To prevent oscillatory behavior, hysteresis thresholds, minimal dwell times between parameter changes, and damping factors are applied. When an augmentation change produces a substantial validation performance drop, a rollback mechanism restores the prior parameter set or initiates a finergrained search around the previous configuration. Parameter histories and associated validation metrics are logged and analyzed to compute trends and to seed subsequent searches.

When multimodal inputs are processed (S300), augmentation adaptation is modality-aware. Separate augmentation parameter sets are maintained for each modality, and adaptation decisions are based on modality-specific validation metrics or on a weighted aggregate reflecting the importance of each modality to final task performance. Additionally, cross-modal consistency constraints are enforced during augmentation: paired samples across modalities are augmented in ways that preserve alignment where required (for example, applying time-warping consistently across audio and video streams), and adaptation logic accounts for these constraints when proposing parameter updates.

The adaptive augmentation subsystem interacts with other training subsystems. It can be coordinated with active learning (S204) by increasing augmentation diversity when validation gains stagnate to encourage better generalization on selected informative instances. It can be integrated with dataset balancing and fairness procedures (S600, S602) by applying per-subpopulation augmentation intensities that are adapted to reduce performance disparities observed on validation partitions corresponding to protected or underrepresented groups. It can also be constrained by content-similarity and output-screening modules (S700) so that augmentation does not produce examples that exceed a perceptual-hash similarity threshold to existing copyrighted works or otherwise violate provenance constraints.

Practical implementation details include specifying an adaptation scheduler that defines adaptation points, a validation evaluation routine that computes the metrics, an update module that determines new parameter values by rule-based, search-based, or gradient-based methods, and a safety module that clips and validates proposed parameter changes. Example parameter ranges and update heuristics are provided: for a rotation augmentation, angle_range$\in[0°, 30°]$; on a validation improvement >0.5% increase over the moving average, increase angle_range by 2° up to the maximum; on a validation decrease >0.5%, decrease by 5% multiplicatively; for augmentation application probability p$\in[0,1]$, increment p by 0.05 when validation improves and decrement by 0.1 when validation declines below threshold. These numerical values are illustrative and can be tuned via automated hyperparameter search (S404) or learned by the controller.

To ensure reproducibility and to facilitate deployment, the system stores checkpoints of model weights together with the associated augmentation parameter set at the time of checkpointing. During inference and when exporting models for edge deployment (S502), the final augmentation policy used for training is recorded as metadata so that downstream evaluation and retraining cycles (S902) can take into account the training-time data distribution. Periodic benchmarking (S904) and drift monitoring (S900) are used to determine when the adaptive augmentation mechanism should be reactivated or recalibrated in response to changing input distributions.

In one embodiment, the prior claimed system or method further comprises a multi-stage data augmentation pipeline configured to improve model generalization, class balance, and robustness across modalities. The multi-stage data augmentation pipeline is integrated into the overall training and deployment workflow and is interposed between initial data collection and model training. The pipeline includes a preprocessing stage (S800) configured to normalize incoming data, detect and filter outliers and noise (S802), and validate data using modality-specific consistency schemas prior to further processing (S804). Preprocessing ensures that subsequent augmentation operations operate on inputs that meet minimum quality and consistency requirements for each modality.

An active selection stage is incorporated to prioritize labeling and reduce annotation costs (S204). Active learning criteria include model uncertainty, expected model change, diversity measures in embedding space, and representativeness relative to the overall dataset. Embeddings in a shared vector space (S302) are employed to compute diversity and redundancy, and temporal alignment functions (S304) are applied when selecting time-correlated data. Selected samples are forwarded for human labeling or higher-fidelity synthetic refinement, and the newly labeled examples are reintegrated into the augmentation pipeline in subsequent iterations.

Validation and fairness checks are applied throughout the multi-stage pipeline. Generated and augmented samples are screened for unwanted similarity to known works using perceptual hashing or similar content-similarity detection (S700), and synthetic outputs are watermarked or otherwise tagged (S702) to preserve provenance (S704). Dataset statistics are analyzed to detect bias (S600), and sample reweighting or resampling (S602) is applied, followed by retraining with fairness constraints embedded in the loss function when necessary (S604). Validation also includes automated modality-specific consistency checks (S804) and periodic benchmarking of the resulting models (S904) to ensure augmentation is producing net performance gains.

Various embodiments include selectable degrees of automation: all augmentation stages can be executed automatically, or human-in-the-loop review points can be inserted after synthetic generation or active selection stages. The pipeline supports asynchronous processing of multimodal inputs (S1000) and preserves temporal alignment for time-series or synchronized modalities (S304). Implementation is configurable by modality, application domain, and available compute resources, and is extensible with additional stages or alternative augmentation techniques without departing from the multi-stage augmentation concept.

Further comprising prioritizing underrepresented modalities for synthetic data generation is achieved by monitoring modality-specific representation metrics and dynamically allocating generative resources to modalities exhibiting representation deficits. In one embodiment, the system computes a modality representation score for each modality using one or more of: the proportion of available labeled samples of the modality relative to a target distribution, the coverage of modality-specific feature space measured via embedding occupancy in the shared vector space (S302), the empirical contribution of the modality to downstream task performance measured by ablation or leave-one-modality-out evaluation, and the diversity of samples within the modality as measured by intra-modality pairwise distances or cluster counts. These metrics are periodically aggregated to form a prioritization metric Pm for each modality m, where Pm is computed as a weighted combination of representation deficit, diversity deficit, and performance sensitivity. Modalities with Pm exceeding a configurable threshold are designated as underrepresented and are placed on a prioritized queue for synthetic data generation (S200).

To ensure that synthetic samples improve model performance and do not introduce artifacts or bias, generated samples undergo modality-specific validation and filtering prior to inclusion in training sets (S804). Validation includes automated quality checks such as perceptual similarity scores, modality-specific consistency checks, classifier confidence thresholds, and adversarial detection filters. Where human-in-the-loop review or active learning (S204) is available, it is applied to a subset of generated samples, with informative instances selected for labeling or curation. Samples failing validation are either discarded or subjected to post-processing, such as style transfer or augmentation (S202), to bring them within acceptable modality constraints.

Prioritization interacts with data augmentation and active selection workflows to maximize utility. For example, when a modality is prioritized, the system applies targeted data augmentation techniques (S202) to both real and synthetic samples of that modality to increase diversity, applies active learning (S204) to select informative real instances for labeling, and adjusts sample weights during training to reflect the intended balance. The prioritization mechanism also interfaces with pruning and efficiency mechanisms (S104, S500) to ensure that additional synthetic data does not impose undue computational burden: for instance, priority-driven generation is throttled when resource allocation policies indicate elevated utilization, or it triggers dynamic allocation of additional compute nodes (S100, S102) to accommodate increased generation and training workloads.

A feedback loop is established to measure the effect of prioritized synthetic generation on representation and task performance. After retraining with the augmented dataset, monitoring components evaluate changes in modality representation scores, per-modality performance metrics, and fairness indicators (S600). If representation deficits improve and task performance increases for the previously underrepresented modality, the prioritization metric Pm is reduced, lowering the rate of further synthetic generation for that modality. If improvements are not observed, the system escalates priority, adjusts generative model conditioning, or invokes alternative strategies such as collecting additional real-world data or applying reweighting in loss functions (S602, S604). Drift detection (S900) and periodic benchmarking (S904) ensure that prioritization adapts to evolving data distributions and does not perpetuate stale biases.

Implementations can incorporate constraints and safeguards to avoid over-reliance on synthetic data for certain modalities. For example, a maximum synthetic-to-real ratio is enforced per modality, and provenance metadata is embedded in generated samples to enable downstream screening and copyright compliance (S704, S700). Digital watermarks or metadata tags inserted into synthetic outputs (S702, S704) are used to track provenance and ensure that downstream consumers can distinguish synthetic from real samples. Policies require human validation for critical modalities or for certain classes of sensitive content prior to automated inclusion in training corpora.

The prioritization mechanism is configurable and extensible. Weighting factors in the prioritization metric are adjustable manually or are determined automatically via hyperparameter search (S404) to optimize target objectives such as accuracy, fairness, or resource utilization. Prioritization decisions can be made centrally or in a distributed fashion across compute nodes performing segmentation of model computation (S100); in distributed embodiments, each node maintains local modality statistics and coordinates via a parameter server or aggregator to produce global prioritization decisions. Generation can be scheduled or triggered by events; event triggers include detection of sudden modality drift, degradation in modality-specific performance, or the introduction of a new modality that requires bootstrap samples.

In embodiments focused on multimodal fusion, prioritization leverages the shared embedding space (S302) and synchronization mechanisms (S304) to ensure that synthetic samples for prioritized modalities are temporally and semantically aligned with complementary modalities where applicable. For example, when synthetic audio is generated to augment underrepresented audio modalities, the system generates or selects temporally aligned synthetic or real visual frames to preserve modality correlations during training, and fuses embeddings using attention mechanisms (S306) during model updates. This cross-modal alignment reduces the risk that synthetic samples degrade fusion behavior and supports consistent multimodal representations.

Edge deployment and inference considerations are addressed by controlling the volume and complexity of synthetic data used during training to meet constraints of latency-sensitive architectures (S1002) and compressed models deployed to edge devices (S502). For instance, when the downstream target is a memory- or compute-constrained model (S504, S502), prioritization policies factor in the necessity to maintain model compactness and generalization without introducing training artifacts that increase model size or inference cost. Quantization-aware training and pruning strategies (S500, S104) can be combined with prioritized synthetic augmentation to retain efficient inference performance while improving modality representation.

Alternate embodiments include prioritization that targets submodalities or classes within a modality, adaptive thresholds that decay over time to prevent oscillations in generation rates, and multi-objective prioritization that jointly optimizes for accuracy, diversity, and fairness. The system is configured to expose APIs for external policy modules to influence prioritization based on domain knowledge, regulatory constraints, or user preferences. All generated and curated datasets are logged with provenance and versioning information to support reproducibility and auditing, and prioritized generation decisions are recorded for retrospective analysis and compliance review.

Label propagation operates on the constructed graph by initializing node label distributions using existing labeled instances and propagating label information to unlabeled nodes using iterative diffusion. In a basic formulation, label distributions are propagated according to a normalized adjacency matrix or graph Laplacian operator; propagation can be performed using closed form solutions (e.g., harmonic functions) or iterative updates with a damping/teleportation parameter alpha that controls the balance between retaining initial labels and smoothing across the graph. Soft labels are maintained for unlabeled nodes and updated until convergence or until change falls below a predefined tolerance. Propagation can be performed separately for each class label or using multi-class soft label vectors per node.

The active learning selection strategy utilizes the outputs of label propagation to identify informative instances for human labeling. Selection criteria include, without limitation, (i) uncertainty in the propagated label distribution as measured by entropy or the margin between top class probabilities, (ii) disagreement between propagated labels and model predictions, (iii) influence or centrality metrics that quantify how many other unlabeled nodes would be affected if a node's label were revealed, and (iv) local neighborhoods characterized by limited label confidence where propagation yields diffuse or multimodal label distributions. Instances selected for oracle labeling are then annotated by human annotators; newly labeled instances are incorporated into the labeled set and label propagation is rerun to update soft labels across the graph. This iterative loop combines the benefits of active querying with semi-supervised learning to maximize information gain per labeled example.

To support multimodal inputs, the propagation graph is constructed using multimodal similarity measures. Embeddings from modality-specific modules S400 are concatenated or fused using attention mechanisms S306 to produce joint node representations used for edge weighting. Alternatively, a multiplex graph representation is used in which each layer corresponds to a modality and inter-layer coupling encodes cross-modal correspondences; propagation is then performed across the multiplex graph to transfer labels via cross-modal edges, enabling label transfer from well-labeled modalities to sparsely labeled ones. Temporal alignment S304 ensures that nodes representing the same event across modalities are coupled, permitting propagation across time-synchronized instances.

In scenarios with severe class imbalance or potential dataset bias, label propagation within the active learning loop is combined with bias detection S600 and reweighting S602 mechanisms. For example, propagation confidence and class prior estimates are monitored to detect over-amplification of dominant classes, and corrective reweighting factors are applied to edge weights or to the propagated label distributions to enforce balanced representation. When additional measures are required, retraining with fairness constraints S604 is performed using the expanded labeled set produced by the active learning and propagation cycle.

Scalability and computational efficiency are addressed by segmenting model computation across distributed compute nodes S100 and by allocating compute resources dynamically S102. Large graphs can be partitioned and label propagation executed in parallel on subgraphs with boundary communication, or approximate propagation methods such as localized propagation, truncated random walks, or mini-batch propagation can be used to reduce memory and compute overhead. Model pruning S104 and quantization S500 can be applied to the encoders that generate embeddings to reduce resource consumption during iterative active learning cycles. Where appropriate, specialized hardware S1004 is utilized for accelerated execution of propagation and embedding computations.

Active learning with label propagation can incorporate synthetic training samples S200 and augmented real samples S202 to improve graph connectivity for rare classes. Synthetic or augmented instances are inserted as additional nodes and connected to real instances based on embedding similarity; propagation then leverages these synthetic nodes to spread label information into sparse regions of the graph. Confidence thresholds and validation using modality-specific consistency schemas S804 are applied before including synthetic nodes in the labeled propagation set to avoid polluting the graph with synthetic examples of insufficient fidelity:

The label propagation mechanism supports different stopping criteria for active learning, including reaching a target accuracy on a validation set, reaching a budgeted annotation cost, or observing diminishing returns in propagated label confidence or downstream model improvement. Periodic benchmarking S904 evaluates model reliability as new labels are incorporated. Distributional monitoring S900 is executed to detect drift; upon detection of significant drift, the active learning with propagation loop is reactivated or adjusted, and model retraining is triggered S902.

Implementation options include using continuous soft labels produced by propagation as pseudo-labels for supervised retraining, with pseudo-labeled instances weighted by propagation confidence to reduce the effect of noisy labels. For tasks requiring stringent label assurance, only instances that exceed a stringent-confidence threshold are converted to hard labels automatically, while borderline instances are routed for human annotation. Hyperparameter search S404 can tune propagation parameters such as alpha, neighborhood size k, edge weighting schemes, and selection batch sizes to optimize annotation efficiency and model performance. Progressive training schedules S402 are employed to incorporate newly labeled and pseudo-labeled data without destabilizing previously learned weights.

Mechanisms for provenance tracking S704 and output screening S700 are integrated such that labels assigned by propagation are recorded with metadata specifying their source and confidence, and propagated or pseudo-labeled data can be watermarked or otherwise tracked throughout the training pipeline. Combining label propagation with an active learning framework delivers substantial reductions in annotation cost, enhanced utilization of unlabeled multimodal data, and robust performance when incorporated with the system-level resource management, fairness, and deployment measures described herein.

A system or method for aligning and integrating multimodal inputs is implemented by receiving inputs from at least two modalities S300. In one embodiment, the modalities include, but are not limited to, audio, video, text, sensor telemetry, and user interaction signals. Each modality is received via a respective input capture pipeline that performs modality-specific preprocessing S800, such as normalization, tokenization, filtering of noise and outliers S802, and validation against modality-specific consistency schemas S804. Preprocessing includes operations such as resampling for audio or sensor streams, frame extraction and resizing for video, text normalization and sentence segmentation for text, and calibration of sensor timestamps to a common reference clock. Preprocessing can also generate modality-specific confidence metrics that are carried forward and used by downstream fusion stages.

The fused embedding produced by the attention-based fusion module conditions downstream generative components. Generative heads include autoregressive decoders, variational decoders, diffusion decoders, or other generative architectures that take the fused embedding as context. During generation, mechanisms such as cross-attention can be used to allow the decoder to selectively attend back to modality-specific representations. Training of the overall system can be staged or end-to-end: in staged training, modality encoders and projection heads are pretrained (for example, using the techniques of S200, S202, and S204 for synthetic augmentation and active learning) to produce stable shared embeddings before joint training of temporal alignment and fusion; in end-to-end training, gradients flow through preprocessing, encoders, alignment modules, and fusion modules into the generative head. Progressive training schedules S402, curriculum learning, and automated hyperparameter tuning S404 can be applied to optimize convergence. Loss terms combine contrastive alignment loss, temporal alignment consistency loss, reconstruction or likelihood losses for generation, perceptual or adversarial losses, and auxiliary classification or regression losses where supervised signals exist.

Robustness and practical deployment considerations are supported by multiple optional features. To tolerate asynchronous or missing data, attention masks and imputation strategies are used and the system can process inputs in asynchronous batches S1000. To support latency-sensitive inference, architectural choices such as selecting latency-optimized blocks, reducing attention complexity, or deploying specialized hardware S1004 and S1002 are viable options. For distributed training and inference, model computation can be segmented across compute nodes S100 and compute resources allocated dynamically S102 based on workload; model pruning S104 and quantization S500 can be applied to reduce computational overhead and enable deployment of compressed models to edge devices S502. Privacy-preserving embodiments include on-device preprocessing and encoding with only embeddings transmitted for fusion and generation.

Examples of parameter choices and implementation details include using multi-head attention with 4 to 32 heads, embedding dimensions in the range of 256 to 4096, temporal windows spanning from tens of milliseconds to several seconds depending on modality, and buffered alignment windows that trade off latency for alignment robustness. Optimization strategies include Adam or AdamW optimizers with weight decay, learning rate schedules, and automated hyperparameter search S404 to select learning rates, batch sizes, and regularization coefficients. Evaluation of alignment and fusion quality uses metrics such as cross-modal retrieval accuracy, temporal alignment error (e.g., mean absolute offset), generation quality metrics (e.g., FID, BLEU, or human ratings), and reliability monitoring S900 with drift detection and triggers for retraining S902. The described method supports numerous variations and combinations of the foregoing elements while still performing the core functions of receiving inputs from at least two modalities S300, generating embeddings in a shared vector space S302, synchronizing data streams via temporal alignment functions S304, and fusing the embeddings using attention mechanisms S306.

Outlier and noise detection is performed on both video and audio modalities (S802). For video, outlier detection includes identifying frames with excessive motion blur, occlusion, or sensor artifacts; for audio, outlier detection includes clipping, excessive background noise, or intermittent dropouts. Identified outliers and noise are filtered or down-weighted prior to subsequent processing. Data validation is applied using modality-specific consistency schemas (S804) to ensure that video and audio segments satisfy expected temporal continuity, metadata consistency, and channel integrity before being used for training or inference.

The model architecture is organized into modality-specific modules (S400), including a video module and an audio module. The video module includes a convolutional or spatiotemporal convolutional neural network, a 3D convolutional network, or a vision transformer to extract frame-level and temporal features. The audio module includes convolutional neural networks operating on spectrogram representations, recurrent architectures, or attention-based encoders to extract acoustic features. Each module is trained using progressive training schedules (S402). Initial stages train foundational feature extractors on modality-specific tasks, and subsequent stages fine-tune higher-level representations. Automated hyperparameter search and optimization (S404) select learning rates, optimizer parameters, regularization schedules, and architecture hyperparameters for both modules and for joint fusion components.

Embeddings from the modality-specific modules are projected into a shared vector space to permit cross-modal reasoning and downstream tasks (S302). The projection can include linear layers, non-linear transformations, or learned projection heads that produce fixed-dimension embedding vectors for video segments and for corresponding audio segments. Temporal alignment functions synchronize the video and audio embeddings by accounting for differences in sampling rates and potential temporal offsets (S304). Alignment can be performed using explicit timestamp alignment, cross-correlation over learned feature sequences, dynamic time warping, or learned alignment networks that predict offset corrections. Temporal alignment supports processing of multimodal events that can occur at slightly different times across modalities.

Output screening and provenance tracking are integrated into generation and inference workflows. Generated audio-visual outputs are screened for similarity with known works using perceptual hashing and similarity thresholds (S700). Digital watermarks are inserted into generated media to indicate provenance or to embed model identifiers (S702). Metadata embedding and provenance tracking record generation context, model version, and source datasets (S704), enabling auditability and compliance with content policies.

Operational reliability is maintained by continuous monitoring of outputs for distributional changes (S900). Drift detection mechanisms observe shifts in input data distributions, model confidence, or task performance and trigger model retraining upon detection of significant drift (S902). Periodic benchmarking against held-out and real-world datasets evaluates reliability and robustness (S904). Automated retraining workflows incorporate newly labeled data, augmented synthetic samples, and updated fairness constraints to restore or improve performance.

Specific implementation variations include using a spatiotemporal convolutional network for the video module and a transformer encoder over log-mel spectrogram frames for the audio module; configuring the temporal alignment S304 to use a learned offset prediction network when camera and microphone clocks are unsynchronized; implementing fusion S306 via cross-attention where query vectors are derived from the video embedding and key/value vectors from the audio embedding (or vice versa); pruning S104 using magnitude-based sparsification followed by structured pruning of channels or layers; quantization S500 supporting 8-bit asymmetric quantization and optional post-training calibration; and deploying S502 with on-device runtime supporting streaming input and partial model execution to a server when connectivity permits. These and other embodiments provide flexible means to process and fuse video and audio modalities in distributed, privacy-aware, and resource-constrained environments while maintaining fairness, provenance, and operational reliability.

The multimodal system is configured to receive inputs comprising image and text modalities (S300). Image inputs include one or more still images, frames from video, or other two-dimensional visual data, and can be provided in common raster formats such as JPEG or PNG or as raw pixel tensors. Text inputs include natural language captions, annotations, metadata, transcripts, or other character-based representations. Prior to downstream processing, the image and text inputs are preprocessed (S800) by modality-specific pipelines. For image inputs, preprocessing optionally includes resizing, cropping, color normalization, contrast adjustment, conversion to a fixed-size tensor, and optional application of noise-reduction or super-resolution filters. For text inputs, preprocessing optionally includes tokenization, lowercasing, removal of stop words where appropriate, subword segmentation, and mapping tokens to indices in a vocabulary. Outlier detection and noise filtering are applied to both modalities to remove corrupted images, truncated text, or mismatched pairs (S802). Validation of input consistency is performed using modality-specific schemas, for example by asserting that image resolution and associated caption length fall within acceptable ranges, or that language encoding is supported prior to training or inference (S804).

Preprocessed image and text data are encoded into embeddings in a shared vector space (S302). Image encoding is performed by an image encoder such as a convolutional backbone, a vision transformer, or other learned feature extractor that outputs a fixed- or variable-length embedding vector for each image or image region. Text encoding is performed by a language encoder such as a transformer-based text model, recurrent encoder, or a lightweight embedding layer that maps tokens or sentences into vector representations. Encoders are configured so that image and text embeddings are compatible in a common embedding dimensionality or projectable into a shared space via learned projection layers. Temporal or alignment relationships between image and text streams are synchronized where applicable (S304). For example, when images are temporally indexed with timestamps and text corresponds to time-aligned captions or transcripts, a temporal alignment function aligns image frames with the appropriate text segments; when inputs are non-temporal pairs such as an image and its caption, alignment includes association by pair identifiers or metadata.

Training datasets combine real multimodal examples and synthetic samples (S200, S202). Synthetic training samples are generated by generative models to augment underrepresented image-text combinations, for example by generating synthetic captions for images using a captioning model or by synthesizing images conditioned on text prompts via a generative image model. Data augmentation techniques applied to real multimodal datasets include image augmentations (random cropping, flipping, color jitter, geometric transformations) and text augmentations (back-translation, synonym replacement, span masking) to improve generalization (S202). Active learning strategies select the most informative instances for manual labeling or reweighting, based on uncertainty, diversity, or influence metrics, thereby reducing labeling cost while improving model robustness (S204).

Monitoring mechanisms observe output distributions and performance metrics during deployment. Distributional changes and model drift are detected by monitoring embedding distributions, calibration metrics, and task-specific accuracy, and are used to trigger retraining workflows when drift exceeds predefined thresholds (S900, S902). Periodic benchmarking evaluates reliability against held-out or synthetic test sets to ensure continued adherence to performance targets and safety constraints (S904). When retraining is triggered, the system is configured to incorporate newly collected labeled data, active learning-selected examples, and fairness-driven reweighting to update model parameters.

Examples of operation include: a retrieval system where an image query is encoded and matched against a corpus of text-indexed items by projecting both image and text into the shared vector space (S302) and computing similarity scores; an image captioning pipeline where fused multimodal representations are decoded into fluent text via an autoregressive decoder; and a multimodal classifier where attention-based fusion provides joint representations used by a classification head. In each example, preprocessing (S800), embedding generation (S302), alignment (S304), fusion (S306), and downstream task-specific layers cooperate to produce the desired output. Implementation details can vary, including choice of encoder architectures, embedding dimensionalities, attention head counts, and optimization schedules, without departing from the described teachings.

Positive training pairs for the contrastive objective are selected by temporal or semantic alignment: temporally co-occurring or otherwise aligned samples are identified using temporal alignment functions (S304) and designated as positives. In multimodal video-and-audio examples, frames or audio segments whose timestamps fall within an alignment window are treated as positive pairs; where synchronous capture is absent, alignment is established via metadata, synchronization signals, or learned alignment models. Augmentation strategies (S202) are applied to create additional positive variants within each modality; augmentations include geometric transforms for image data, spectro-temporal perturbations for audio, token masking or paraphrase generation for text, and synthetic sample generation (S200) to expand the set of positives. The contrastive training procedure supports both cross-modal positives (different modalities corresponding to the same semantic event) and within-modal positives (augmented views of the same instance) to enhance robustness and cross-modal alignment.

The contrastive loss can be instantiated as a cross-modal InfoNCE loss or a supervised contrastive loss. For a given anchor embedding a and a positive embedding p, similarity is computed using a similarity metric such as cosine similarity; the loss encourages greater similarity for (a,p) while penalizing similarity between a and a set of negative embeddings N drawn from the current minibatch or from a larger memory of prior embeddings. In one implementation, the loss for anchor a is $$L(a) = -\log\left(\exp\left(\operatorname{sim}(a,p)/\tau\right)/\operatorname{sum}\_{x \in \{p\}\cup N} \exp\left(\operatorname{sim}(a,x)/\tau\right)\right),$$

Where tau is a temperature hyperparameter that controls concentration of the distribution. Temperature, batch size, embedding dimensionality, and projection head architecture are treated as tunable hyperparameters and can be optimized automatically (S404). Normalization of embeddings to unit norm prior to similarity computation is used to avoid scaling artifacts and to favor angular similarity in the shared vector space (S302).

Negative sampling strategies include in-batch negatives, large-batch training, and external memory mechanisms. In-batch negatives exploit other samples in the same synchronous or asynchronous batch (S1000). When training across distributed compute nodes (S100), negatives are gathered across nodes using communication-efficient protocols or a distributed memory queue. A momentum encoder and memory queue (MoCo-style) represent alternatives that decouple queue size from batch size and enable maintenance of a large, diverse set of negatives while avoiding excessive communication cost. Hard negative mining is applied by selecting, from candidate negatives, those with highest similarity to the anchor subject to label constraints; mining is performed dynamically during training to emphasize difficult contrasts.

To align multimodal modalities, separate contrastive terms are defined for each ordered modality pair and combined into a multi-term loss. For example, given modalities A, B, and C, the total contrastive objective is the sum of losses for the A↔B, A↔C, and B↔C pairs, with optional weighting to account for modality reliability or data balance. Cross-modal attention mechanisms (S306) can be employed either during encoding or as part of a late-fusion stage to refine embeddings used for contrastive comparisons; attention generates context-aware projections so that embedded vectors capture both modality-specific features and cross-modal correspondences. When semantic labels are available, supervised contrastive terms or class-aware sampling are incorporated to cluster same-class instances across modalities while preserving instance-level discrimination.

Training schedules for contrastive construction of the shared vector space are adaptable and follow progressive training curricula (S402). Early training prioritizes coarse alignment using strong augmentations and large learning rates; subsequent stages reduce augmentation strength, fine-tune projection heads, and adjust learning rates found via automated search (S404). To mitigate overfitting to spurious correlations or dataset biases, dataset-level analyses (S600) and sample reweighting (S602) are combined with fairness-aware regularizers; the contrastive loss is augmented with constraints that enforce parity of representation quality across protected subpopulations or modalities, and the model is retrained with fairness constraints embedded in the loss (S604).

Implementation considerations to enable efficient and robust contrastive training include hardware and runtime choices. Distributed segmentation of model computation across compute nodes (S100) and dynamic allocation of compute resources (S102) support large-scale contrastive training with large effective batch sizes. Latency-optimized and memory-efficient architectures (S1002, S504) are selected for encoders and projection heads to reduce training and inference cost. Quantization (S500) and compression can be applied after training to produce deployable models for edge devices (S502) while retaining quality in the shared vector space. When asynchronous batching (S1000) is employed, steps are taken to ensure consistency of positives and negatives across asynchronous boundaries and to synchronize embedding normalization and momentum encoders as required.

During and after training, validation of the constructed shared vector space is performed via modality-specific consistency checks (S804), retrieval-based evaluation where queries from one modality retrieve corresponding instances from another, and standard benchmarking procedures. Monitoring for distributional shift (S900) over incoming data streams and triggering retraining upon drift detection (S902) preserves alignment quality over time. Periodic benchmarking (S904) and screening of generated outputs for similarity to known works (S700) complement the contrastive training workflow by ensuring robustness, generalization, and compliance with content constraints.

Variations and alternatives include replacing the InfoNCE formulation with other contrastive or metric-learning objectives, employing hierarchical contrastive losses that operate at multiple temporal or semantic scales, and integrating auxiliary supervised tasks to provide additional alignment signals. The projection head architecture, embedding dimensionality, temperature schedule, negative sampling mechanism, and use of momentum queues are all tunable parameters whose selection depends on dataset size, modality characteristics, and deployment constraints; example ranges and choices are provided during training experimentation to enable replication and optimization (S404). When combined with preprocessing (S800), augmentation (S202), synthetic data generation (S200), temporal alignment (S304), modality-specific modules (S400), and fusion mechanisms (S306), contrastive training constructs a robust shared vector space (S302) that supports downstream multimodal retrieval, classification, and generation tasks.

In one embodiment, synchronizing data streams via temporal alignment functions S304 is carried out using a dynamic time warping (DTW)-based alignment procedure. Multimodal inputs S300, which include audio, video, textual transcripts, accelerometer streams, physiological signals, and other modality-specific time series, are first preprocessed S800 to produce time-ordered feature sequences. Preprocessing S800 can include normalization, filtering, and downsampling or upsampling to reduce noise and to place raw signals on comparable scales. Outliers and noise are detected and filtered at S802 prior to alignment to avoid distortion of distance measures used by DTW. Optionally, modality-specific consistency schemas S804 are applied to validate data integrity before alignment.

Feature extraction is performed for each modality to generate sequences of feature vectors suitable for comparison. In some embodiments the feature extraction precedes embedding generation; in other embodiments the system generates embeddings S302 for each modality using an encoder network, and DTW is applied directly to the resulting embeddings. Where embeddings S302 are produced, they are generated in a shared vector space such that intra-modality and inter-modality distances are meaningful for the DTW distance metric. Each modality produces a sequence $X=\{x1, x2, \ldots, xN\}$ and $Y=\{y1, y2, \ldots, yM\}$, where N and M represent the number of time steps for respective modalities.

A cost matrix C of size N-by-M is computed, where each element $C(i,j)$ represents a distance metric between xi and yj. The distance metric can be Euclidean distance, cosine distance, Mahalanobis distance, or another suitable dissimilarity measure selected based on modality characteristics and downstream fusion requirements. To reduce sensitivity to local amplitude differences, feature vectors are standardized prior to distance computation. The DTW algorithm then computes a cumulative cost matrix D with $D(i,j)=C(i,j)+\min\{D(i-1,j), D(i,j-1), D(i-1,j-1)\}$, subject to appropriate boundary conditions. A warping path $P=\{(i1,j1), (i2,j2), \ldots, (iK,jK)\}$ that minimizes the cumulative cost from $D(N,M)$ back to $D(1,1)$ is identified by backtracking through D.

One or more global constraints are applied to limit pathological alignments and improve computational efficiency. Example constraints include a Sakoe-Chiba band, an Itakura parallelogram, or an adaptive window based on the expected maximum temporal offset between modalities. The width of the constraint window is chosen according to prior knowledge of the sensors, estimated sampling-rate differences, or is learned from training data. In embodiments requiring strict monotonicity or continuity, the DTW implementation enforces monotone-increasing indices and restricts step sizes to prevent excessive compression or stretching of sequences.

Once the optimal warping path P is obtained, a temporal alignment function is defined that maps time indices of one modality to corresponding indices of the other modality. This mapping can be used to warp one sequence to the temporal grid of the other sequence, to resample embeddings to a common timeline, or to compute synchronized pairs for subsequent multimodal fusion S306. Interpolation techniques, such as linear interpolation or spline interpolation, are applied when the warping produces non-integer mapped indices, thereby producing a continuous synchronized representation. The synchronized sequences are then forwarded to a fusion module S306, such as an attention mechanism that consumes temporally aligned embeddings to generate fused multimodal representations.

When more than two modalities are present, pairwise DTW alignments are computed between a designated reference modality and each other modality, producing a set of alignment functions. Alternatively, multisequence DTW techniques or progressive alignment strategies are employed to derive a global alignment across all modalities. If a shared reference timeline is preferred, a master timeline is constructed by aggregating modality-specific timelines after pairwise warping, with conflicts resolved by median or weighted averaging of mapped time points.

To reduce computational overhead inherent in DTW, several optimizations can be applied. Bound-based techniques and early abandoning accelerate distance computations by pruning candidate paths that cannot improve the current best cost. Multiscale or hierarchical DTW approximations compute coarse alignments at reduced dimensionality or at decreased sampling rates and refine the alignment locally at higher resolution. FastDTW and other linear-time approximations provide favorable trade-offs between alignment accuracy and computational cost and can be selected when latency-sensitive inference is required. The system can dynamically select between exact DTW and approximate methods based on available compute resources, latency constraints S1002, or detected drift in modality timing characteristics S900.

Dynamic allocation of compute resources S102 and segmentation of model computation across distributed compute nodes S100 are orchestrated to support DTW processing at scale. For example, large cost matrix computations are partitioned across nodes, or coarse alignment is handled on edge devices via quantized models S500 and compressed representations S502 while detailed refinement is performed in the cloud. Pruning model parameters S104 and selecting latency-optimized model architectures S1002 further reduce the computational footprint of alignment operations in resource-constrained deployment scenarios S502.

During training, the temporal alignment via DTW can be integrated into progressive training schedules S402 and used as a differentiable or semi-differentiable component by employing soft-DTW or other differentiable alignment approximations. Such integration enables end-to-end optimization of encoders that produce embeddings S302 better suited for alignment and fusion. Active learning S204 strategies can prioritize selection of temporal alignment edge cases or misaligned examples for annotation and retraining, thereby improving robustness of the DTW-based synchronization over time. Where fairness constraints S604 or dataset reweighting S602 are applied, DTW-based alignment preserves temporal correspondences while allowing adjustments to training sampling to ensure balanced representation across demographic or other attributes present in the multimodal data.

The aligned outputs produced by DTW-based temporal alignment S304 are subject to downstream monitoring S900. Distributional changes in timing relationships between modalities trigger recalibration of alignment parameters or retraining S902. Periodic benchmarking S904 assesses alignment accuracy and its impact on multimodal fusion performance. For provenance and compliance, alignment metadata, including warping paths, distance measures, constraints, and interpolation methods, are embedded into output records S704 to enable reproducibility and auditing of the synchronization process.

The attention fusion module (S306) implements a multi-head attention mechanism in which the shared-space embeddings X are linearly projected into sets of queries Q, keys K, and values V using learned projection matrices for each head. For head h, the projections are $Q\_h=X W\_q\hat{\ }h$, $K\_h=X W\_k\hat{\ }h$, and $V\_h=X W\_v\hat{\ }h$, where $W\_q\hat{\ }h$, $W\_k\hat{\ }h$, and $W\_v\hat{\ }h$ are trainable parameters. Each head computes a scaled dot-product attention score matrix $A\_h=\text{softmax}((Q\_h K\_h\hat{\ }T)/\text{sqrt}(d\_k))$, where $d\_k$ is the dimensionality of the key vectors for that head. The context for head h is $C\_h=A\_h V\_h$. The outputs of H heads are concatenated and projected with an output weight matrix $W\_o$ to produce the fused embedding $Y=\text{Concat}(C\_1, \ldots, C\_H) W\_o$. Residual connections and layer normalization are applied around the multi-head attention block to facilitate stable training.

In multimodal fusion embodiments, the projections that produce Q, K, and V are modality-aware. For example, embeddings from modality m are projected with modality-specific matrices $W\_q\hat{\ }\{h,m\}$, $W\_k\hat{\ }\{h,m\}$, and $W\_v\hat{\ }\{h,m\}$ so that cross-modal interactions are explicitly learned. In cross-attention variants, queries are formed from one modality while keys and values are formed from another, enabling asymmetric attention in which one modality attends to another modality's representations. Hierarchical attention architectures are also supported, where intra-modality self-attention is applied first and followed by inter-modality cross-attention, or vice versa, with intermediate fusion modules (S306) positioned between stages.

And positional encodings are incorporated prior to attention so that attention scores respect temporal correspondence. Positional encodings are added to embeddings or included via learned temporal embedding vectors. When asynchronous data processing is used (S1000), attention computations include masking to ignore missing or out-of-range positions and to enforce causality or other temporal constraints. Attention masks are configured to be modality-specific and time-dependent to accommodate variable sampling rates or intermittent sensor availability.

To reduce computational overhead, embodiments apply pruning and head selection techniques (S104) to the multi-head attention module. Head importance is assessed during training or via post-training analysis, enabling removal of redundant heads and reduction of projection dimensionality while preserving accuracy. Quantization (S500) and weight compression are applied to the projection matrices and attention parameters to enable deployment of the fused model to edge devices (S502). For reduced-latency inference, efficient attention approximations and sparse attention patterns are selectable, and specialized hardware acceleration (S1004) and latency-optimized architectures (S1002) are utilized to meet performance constraints.

Training of the attention fusion module is compatible with progressive training schedules applied to modality-specific modules (S402) and automated hyperparameter search (S404). Training includes regularization techniques such as dropout on attention weights, label smoothing, and head dropout to improve generalization. Active learning (S204) and synthetic sample generation (S200) are used to augment the training set for modalities with scarce labeled data. During training, fairness considerations such as dataset reweighting (S602) and fairness-constrained loss functions (S604) are applied to the outputs produced after attention fusion to mitigate bias across modalities or demographic groups.

The attention fusion implementation supports monitoring and maintenance features. During deployment and operation, the fused model outputs are monitored for distributional changes (S900). Upon drift detection, retraining is triggered (S902) and the attention parameters are reoptimized. Generated outputs are screened for similarity to known works (S700) and watermarked (S702) where applicable. Provenance metadata (S704) documenting the modalities, attention configuration (e.g., number of heads H, head dimension d_k), and temporal alignment parameters are embedded in output records for traceability.

The attention fusion module supports numerous configurable variants. The number of heads H, per-head dimensionality d_k, projection-matrix sharing strategies (shared across modalities versus modality-specific), choice of relative versus absolute positional encodings, cross-attention versus self-attention ordering, and masking strategies are all selectable hyperparameters. These variants can be selected based on application constraints such as compute budget, latency requirements, memory limits, and fairness goals. In distributed implementations, attention computation can be segmented across compute nodes (S100), with resources dynamically allocated in response to workload changes (S102) to meet throughput and latency objectives.

Because the composite sequence E contains tokens from multiple modalities, the attention weight matrix A permits cross-modal interactions: a query token originating from modality i can attend to key/value tokens originating from modality j, thereby producing cross-modal contextualized representations within the same self-attention mechanism. This contrasts with architectures that implement only modality-specific self-attention followed by separate cross-attention stages; the disclosed cross-modal self-attention permits simultaneous intra- and inter-modality information exchange within each attention layer S306. To control or bias cross-modal versus intra-modal interactions, learned attention bias terms, modality-aware gating, or structured attention masks can be applied to A. For example, modality bias vectors b_i,j can be added to the pre-softmax attention logits to favor or attenuate attention flow between particular modality pairs, or binary masks can block attention between certain tokens for privacy or efficiency reasons.

To reduce computation and permit scalable deployment, the cross-modal self-attention can be implemented with sparse attention patterns, local attention windows, or reduced-rank approximations. Hierarchical cross-modal self-attention variants are contemplated in which early layers attend locally within modality segments to produce compact representations, and later layers perform global cross-modal self-attention across compressed tokens. Attention pruning S104 can be applied to attention heads or attention weights whose contribution falls below a relevance threshold; heads can be pruned post-training or during training using sparsity-inducing regularizers. Quantization S500 and model compression techniques can be applied to the attention projection matrices and intermediate tensors to enable deployment of the fused model to constrained edge devices S502 and to perform inference using memory-efficient architectures S504.

Cross-modal self-attention can be trained end-to-end using supervised, self-supervised, or multi-task objectives. Loss terms include classification loss for downstream tasks, contrastive losses to align modality embeddings in the shared space S302, and attention regularization terms that encourage desirable attention distributions (for example, entropy penalties to avoid uniform attention or KL penalties to enforce sparsity). Data preparation techniques such as generating synthetic training samples S200, applying data augmentation S202, and performing active learning S204 are used to improve generalization of cross-modal attention mechanisms, particularly when modality co-occurrence is scarce. During training, progressive training schedules S402 and automated hyperparameter search S404 tune the number of attention heads, head dimensionality, and attention dropout rates.

Variants of the cross-modal self-attention architecture disclose modality-specific input modules S400 that produce embeddings via modality-tailored front-ends prior to concatenation, while preserving capacity for cross-modal exchange in subsequent shared attention layers S306. The modality-specific modules are trained with progressive schedules S402, and the shared cross-modal attention layers are fine-tuned after the modality modules reach a target performance. In another variant, cross-modal self-attention is combined with cross-attention blocks in which queries are restricted to a target modality and keys/values are drawn from other modalities; this hybrid approach balances computational cost against targeted cross-modal influence.

Attention interpretability techniques can be applied to the cross-modal attention weights to provide diagnostics of which modalities or tokens contribute to particular predictions. Monitoring mechanisms S900 can analyze attention distributions over time to detect distributional changes that indicate drift, and trigger retraining S902 when attention patterns deviate significantly from those observed during validation. Fairness and bias detection procedures S600, followed by reweighting S602 or constrained retraining S604, can be applied if cross-modal attention preferentially amplifies or suppresses information from particular demographic or content categories.

For deployment, cross-modal self-attention implementations can be parallelized and distributed across compute nodes (segmenting model computation S100) and can leverage specialized hardware for accelerated execution S1004. To achieve real-time performance, reduced-latency model architectures S1002 and asynchronous batch processing S1000 are used. Attention computations are fused with optimized kernels to reduce memory accesses, and mixed-precision arithmetic accelerates projections while preserving accuracy. When model outputs include generated media, downstream screening S700 together with watermarking S702 and provenance tracking S704 are integrated to manage intellectual property and safety concerns.

Numerous implementation details and hyperparameters are contemplated. Example hyperparameters include 8 to 32 attention heads, head dimensions in the range of 32 to 128, layer depths from 2 to 24, and attention dropout rates between 0.0 and 0.3. Positional encodings are implemented as sinusoidal, learned, or relative; relative positional encodings are advantageous for variable-length temporal alignment across modalities. Loss-balancing weights are tuned to ensure that cross-modal objectives and modality-specific tasks are balanced during multi-task training. Additional embodiments incorporate gating mechanisms that multiply the output of cross-modal self-attention by learned modality gates to modulate the influence of cross-modal context for each modality token.

The described cross-modal self-attention fusion forms a general-purpose mechanism for fusing multimodal embeddings S302, enabling rich intermodal reasoning while supporting practical considerations such as synchronization S304, computational efficiency S100/S104/S500, deployment S502/S1004, and governance and reliability measures S600-S704 and S900-S904.

In one embodiment, embeddings generated in a shared vector space S302 are normalized prior to fusion S306 to promote numerical stability, to make similarity computations modality-invariant, and to prevent large-magnitude embeddings from dominating attention or other fusion operations. The normalization can be performed on a per-embedding basis, on a per-modality basis, or across a temporal window after synchronization S304. For example, each embedding vector e can be transformed to e' according to $e'=e/(\|e\|2+\varepsilon)$, where $\|\bullet\|2$ denotes the L2 norm and $\varepsilon$ is a positive constant such as 1E-8 to avoid division by zero. Alternatively, embeddings can be projected onto a unit hypersphere by spherical normalization, or standardized by subtracting a mean and dividing by a standard deviation computed per modality or per batch.

Normalization can be implemented with fixed operators or with learnable layers. Fixed operators include L2-normalization, L1-normalization, min-max scaling, and z-score normalization. Learnable normalization layers include Layer Normalization and Batch Normalization variants adapted for vectors rather than convolutional feature maps. For Layer Normalization, an embedding e is normalized as $e'=\gamma\odot((e-\mu)/\sqrt{(\sigma^2+\varepsilon)})+\beta$, where $\mu$ and $\sigma^2$ are the mean and variance of the embedding elements, $\gamma$ and $\beta$ are learnable scale and shift parameters, and $\odot$ denotes elementwise multiplication. The choice between fixed and learnable normalization depends on downstream fusion S306; learnable normalization can adapt to dataset statistics during training, while fixed normalization provides deterministic behavior at inference and is computationally lighter for resource-constrained deployments S502.

Normalization can be applied at different points in the pipeline. In one approach, normalization is performed immediately after the embeddings are generated S302 and before temporal alignment S304 so that alignment functions operate on normalized inputs. In another approach, temporal alignment S304 is performed first to preserve temporal structure, and normalization is applied per aligned timestep immediately prior to fusion S306. When processing asynchronous or variable-rate modalities S1000, normalization is applied per-sample or per-chunk after resampling or alignment to ensure consistency across modalities. For sequence embeddings (e.g., audio frames, video frames, or token-level text embeddings), normalization can be applied per-frame, per-token, or across the entire sequence depending on whether relative magnitudes between timesteps are semantically meaningful for the fusion operation.

When attention mechanisms are used for fusion S306, normalizing embeddings to unit norm converts dot-product attention into a form proportional to cosine similarity, which can improve training stability and retrieval-like behavior. In such cases, scaling factors or temperature parameters $\tau$ can be included to control softmax sharpness, yielding attention weights $a(i,j)=\text{softmax}((e'i\cdot e'j)/t)$. The temperature $\tau$ can be treated as a hyperparameter selected via automated hyperparameter search S404 or implemented as a learnable parameter calibrated during training. Smaller t values produce more peaked attention distributions, while larger t values produce softer attention. Combining normalization with temperature scaling provides explicit control over the effective similarity metric used by attention components.

Normalization can also be modality-specific to balance contributions from modalities with different embedding distributions. For instance, a modality with elevated intrinsic embedding norms can be down-weighted by normalizing its embeddings independently so that inter-modality attention or fusion layers treat modalities more equitably. This balancing can be combined with sample reweighting and fairness-aware retraining S602, S604 to remedy biases arising from disproportionate modality influence. In mixed-precision or quantized deployments S500, S502, preserving controlled embedding ranges via normalization reduces sensitivity to quantization error and improves robustness of fused representations on resource-constrained hardware S1004.

When embeddings are identically zero or near-zero, the normalization operator should detect negligible norms and either bypass normalization or replace the embedding with a slight random perturbation or a learned default vector to avoid NaNs. Implementations should also clamp norms to a predefined interval [n_min, n_max] prior to normalization to prevent extremely large or near-zero norms from destabilizing training. For learnable normalization layers, moving averages of mean and variance can be stored for inference, or batch statistics can be fused into affine parameters to enable efficient on-device execution S502 without access to batch data.

Training losses and regularization can be adapted to account for normalization. Contrastive or cross-modal alignment losses often assume normalized embeddings; for example, an InfoNCE loss typically expects unit-norm embeddings so that logits represent cosine similarities. When normalization is applied, the loss functions can be simplified or otherwise tuned (e.g., with temperature t) to reflect the changed similarity scale. Regularizers that penalize deviation of embedding norms from a target value can be introduced to encourage consistent magnitudes when partial or selective normalization is employed. Gradient flows through normalization operations should be considered; for fixed normalization, gradients propagate through the division operation, while for certain statistical normalizations (e.g., batch or layer norm), gradients also update running statistics and affine parameters.

Normalization strategies can be combined with other preprocessing operations S800, S802, such as outlier filtering and modality-specific consistency checks, to ensure embeddings are computed from validated inputs. For generative augmentation S200 or synthetic training samples, normalization applied consistently to both real and synthetic embeddings reduces domain shift and improves generalization. During model compression and deployment S500, S502, normalization operators can be replaced with approximations or fused into preceding linear layers to reduce inference overhead; affine parameters from learned normalization layers can be absorbed into preceding projection layers when the projection is linear and parameters are fixed for inference.

In a system implementation, normalization is implemented as a discrete processing block preceding the fusion module S306. The block accepts embeddings from one or more modality-specific modules S400, applies the selected normalization algorithm (fixed or learnable), and emits normalized embeddings for fusion. Control logic allows selection of normalization type, $\varepsilon$ and $\tau$ values, per-modality or global normalization, and whether to normalize temporally per timestep or across sequences. These configuration parameters are set manually, selected by automated hyperparameter search S404 during development, or adapted online using validation signals and drift monitoring S900; when distributional changes require updated normalization statistics, the system triggers model retraining S902.

Example parameter settings found effective in some embodiments include L2-normalization with $\varepsilon$ in the range 1E-8 to 1E-4 for single-precision models, temperature $\tau$ in the range 0.05 to 0.5 for contrastive attention operations, and Layer Normalization initialized with $\gamma=1$ and $\beta=0$. For edge deployments S502, fixed L2-normalization with unit-sphere projection is preferred for its computational simplicity and predictable numerical range. For large-scale distributed training where embeddings are generated across compute nodes S100, normalization parameters and running statistics can be synchronized periodically or aggregated to maintain consistency across workers; alternatively, per-worker normalization with later calibration reduces communication overhead.

Normalization prior to fusion can be combined with modality-wise gating or attention priors to selectively emphasize particular normalized embeddings according to context, computational budget, or downstream task. Such gating mechanisms use normalized similarity scores as inputs to lightweight controllers that decide whether to include, weight, or skip particular modality embeddings in the fusion operation, enabling adaptive multimodal processing that balances accuracy and resource usage.

In one embodiment, the shared vector space referenced in S302 is implemented as a reduced-dimensional differentiable manifold learned by a neural network encoder such that multimodal inputs received by the system (S300) are mapped onto points on the manifold in a manner that preserves semantic relationships and cross-modal correspondence. The manifold is parameterized implicitly by the weights of one or more neural network components, for example modality-specific encoders (S400) and a shared projection head, which together define a continuous mapping from input data domains to coordinates on the learned manifold. Each modality-specific encoder is configured to produce an intermediate representation that is then mapped by the shared projection head into the manifold coordinates that constitute the embeddings in the shared vector space (S302).

Training objectives are selected to induce manifold structure that satisfies one or more geometric and topological constraints. These objectives include reconstruction losses, contrastive losses, triplet or N-pair losses, neighborhood-preserving losses, and variational regularizers. For example, an autoencoder or variational autoencoder architecture can be used, wherein modality-specific decoders reconstruct modality-specific signals from manifold coordinates, thereby encouraging the manifold to encode sufficiency for reconstruction. Contrastive learning objectives bring paired or semantically similar cross-modal samples into proximity on the manifold while separating dissimilar samples, producing clusters and geodesic distances that reflect semantic similarity across modalities. Neighborhood-preserving losses, such as local isometry or Laplacian regularization, are applied to maintain local relationships present in each modality in the manifold embedding. In another implementation, a triplet loss is used in combination with hard negative mining to shape local margins and inter-cluster separation on the manifold.

Regularization terms are used to constrain manifold smoothness and capacity. Explicit regularizers can penalize curvature, enforce Lipschitz continuity, or penalize large embedding changes with respect to slight perturbations in input space. Manifold capacity can be controlled by selecting the dimensionality of the projection head and by applying sparsity or reduced-rank constraints on representation layers. In addition, manifold topology can be encouraged through auxiliary losses that preserve known structural relations, such as hierarchical labels or temporal ordering information provided by synchronized data streams (S304). For temporal data, pairwise temporal proximity constraints or sequence-based reconstruction losses ensure that temporally adjacent observations map to proximal regions of the manifold, facilitating temporal continuity.

The neural network architecture can include elements designed to explicitly parameterize manifold geometry. For example, the projection head can produce both a coordinate vector and a local metric tensor estimate, enabling downstream components to compute geodesic distances or curvature-dependent operations. Alternatively, the manifold can be modeled implicitly using a generator network (S200) that maps reduced-dimensional latent coordinates to ambient-dimensional data samples; training the encoder and generator jointly enforces that manifold coordinates correspond to valid data-generating factors. Probabilistic formulations such as variational methods provide uncertainty estimates for manifold coordinates and permit sampling-based regularization that smooths the learned manifold.

Alignment and fusion of modality-specific manifolds into a coherent shared manifold are addressed by cross-modal loss terms and by architectural design. In one approach, modality-specific encoders (S400) are trained with both modality-specific reconstruction objectives and cross-modal alignment objectives so that their outputs are congruent when representing the same underlying semantics. Attention mechanisms (S306) are applied to the manifold coordinates during fusion operations to weigh contributions from modalities according to context or confidence. When asynchronous sampling occurs, asynchronous batching techniques (S1000) and temporal alignment functions (S304) are used during training to pair or sequence inputs so that the learned manifold captures cross-modal correspondences even in the presence of timing offsets.

Data augmentation and synthetic data generation are used to improve manifold coverage and robustness. Generative models (S200) are employed to synthesize additional multimodal samples that populate underrepresented regions of the manifold, while data augmentation techniques (S202) produce local perturbations that enforce manifold smoothness and resilience to noise. Active learning techniques (S204) identify unpopulated or ambiguous regions of the manifold where additional labeled data would most improve representation quality.

Practical training regimes leverage progressive schedules (S402) and automated hyperparameter search (S404) to balance the multiple objectives that define the manifold. For example, early training phases prioritize reconstruction to establish a stable coordinate system, while later phases emphasize contrastive alignment to sharpen cross-modal correspondences. Automated search optimizes projection dimensionality, contrastive margin, temperature parameters, and regularization strengths to obtain desired manifold properties such as cluster compactness, minimal curvature, and robust generalization.

To mitigate bias and ensure equitable representation on the manifold, dataset analysis (S600) and sample reweighting (S602) are employed during training. Fairness constraints are inserted into the loss function (S604) to ensure protected groups are represented equitably across manifold regions. Outlier detection (S802) and modality-specific data validation schemas (S804) ensure that corrupted or inconsistent inputs do not distort manifold topology.

For deployment, learned manifold embeddings enable efficient inference. Manifold coordinates produced by the encoder are quantized (S500) and compressed for edge deployment (S502) while retaining semantic fidelity. Latency-optimized inference architectures (S1002) and memory-efficient execution strategies (S504) are selected to compute manifold coordinates on specialized hardware (S1004) with minimal overhead. The learned manifold supports downstream tasks including similarity search, retrieval, classification, and generative sampling; outputs are screened for similarity to known works (S700), watermarked (S702), and have provenance metadata attached (S704).

Multiple variations and alternatives are contemplated. The manifold can be learned in a supervised, self-supervised, or semi-supervised manner; it can be explicit (with a decoder/generator) or implicit (defined by discriminative objectives); metric learning and probabilistic embeddings can be combined; and the projection head can be shared or partially modality-specific. The particular combination of loss terms, architectural choices, and training regimen can be adapted to the modalities involved, data availability, compute constraints, and downstream application requirements.

In one embodiment, a multimodal processing system receives inputs from at least two modalities S300 and performs synchronization of the incoming data streams using temporal alignment functions S304, wherein synchronization adapts based on modality-specific lag. For each modality feed, the system associates a timestamp and a source identifier at ingestion, and maintains a per-modality timing profile representing nominal sampling rate, jitter, average latency, and recent observed delay. The timing profile is continually updated from observed inter-arrival times, hardware clock offsets, and network round-trip time measurements so that modality-specific lag estimates reflect current operating conditions.

Modality-specific lag is estimated using a combination of techniques. In one approach, pairwise cross-correlation is computed between fixed-length windows of modality-specific signals, where cross-correlation peaks indicate relative time offsets; a running median filter or an exponentially weighted moving average is applied to successive offset estimates to reduce sensitivity to transient spikes. In another approach, the system computes alignment by maximizing similarity in a learned embedding space S302 across modalities: embeddings for temporally proximate samples are compared, and the offset that maximizes a cross-modal similarity score is taken as the lag estimate. A hardware-assisted timestamping mechanism can be used when available to produce precise timestamps and to facilitate clock synchronization across capture devices using Network Time Protocol (NTP), Precision Time Protocol (PTP), or explicit clock-offset exchange.

Adaptive synchronization uses the modality-specific lag estimates to control a set of synchronization mechanisms. A first mechanism is dynamic buffering: incoming samples from faster modalities are buffered until corresponding samples from slower modalities arrive, with buffer size adjusted in real time based on the estimated lag and its variance. To bound latency, the system enforces an adaptive maximum wait time derived from the lag distribution; if samples from a slow modality do not arrive within the maximum wait time, the system proceeds using interpolation, extrapolation, or imputation for the missing modality, and a confidence weight reflecting the degree of extrapolation is attached to the fused result. A second mechanism is temporal resampling: samples are upsampled or downsampled via interpolation methods (linear, spline) or via learned temporal converters to align sampling rates among modalities. A third mechanism is learned time-warping: a differentiable alignment network predicts per-sample time shifts (continuous-valued delays) that are applied to embeddings prior to fusion S306; parameters of the alignment network are trained jointly with downstream objectives so that the network compensates for systematic modality-specific delays.

Attention-based fusion S306 is augmented with latency-aware gating. Attention scores are modulated by per-sample alignment confidence derived from the synchronization module S304; samples that required substantial temporal adjustment or extended buffering are down-weighted during fusion. This modulation is implemented by multiplying attention logits by a confidence scalar or by incorporating confidence as an additional input to the attention mechanism. When fusion occurs in a shared vector space S302, the synchronization module is configured to shift or warp embeddings in time prior to fusion so as to present temporally consistent contexts to the attention layers.

Adaptive synchronization is applied at multiple processing stages. At initial preprocessing stages S800/S802, timestamps are corrected and outlier temporal samples are filtered. At intermediate representation stages, embeddings S302 are adjusted via learned offset parameters. At the decision or output stage, outputs produced from asynchronously aligned batches S1000 are annotated with alignment metadata S704 indicating the degree of temporal adjustment and the original capture times to facilitate downstream provenance and auditing. If the system detects sustained drift in modality-specific lag beyond configured thresholds, a drift handling routine employing monitoring S900 triggers recalibration steps such as clock resynchronization, increased buffer capacity, or model retraining S902.

Training procedures incorporate modality-specific lag adaptation to improve robustness. Synthetic time-shifted training samples are generated S200 by applying randomized temporal offsets and jitter patterns to modalities during training; data augmentation S202 simulates network-induced delays and capture-device latency profiles so the synchronization mechanisms and learned alignment networks generalize to realistic lag scenarios. Loss functions include an alignment consistency term that penalizes disagreement between synchronized modalities after fusion; when ground-truth temporal correspondences are available, supervised alignment losses are applied directly to predicted time shifts. Active learning S204 is employed to select informative instances where alignment is uncertain for manual labeling or refinement of timing profiles.

When deployed to resource-constrained environments or edge devices S502, synchronization adapts to device-specific limitations. Lightweight estimators compute lag using packet arrival statistics and basic moving averages, while heavier alignment networks and cross-correlation computations may be offloaded to cloud nodes when near-real-time connectivity permits. The system selects minimal-latency inference architectures S1002 depending on the allowable synchronization buffer size and the real-time constraints of the application. Where latency budgets are strict, the synchronization controller prioritizes minimal buffering and uses predictive extrapolation in place of waiting for delayed modalities, with the system logging confidence metrics and triggering retraining S902 if predictive errors exceed thresholds.

For multimodal streams characterized by bursty or missing data, the synchronization module generates histograms and variance estimates of modality-specific lag, which are provided to fairness and reliability checks S600/S604 and to monitoring processes S900/S904. The system can reweight samples S602 during training to reflect the effective information content after temporal adjustments, and can impose fairness constraints to prevent systematic underrepresentation of modalities that tend to lag. In some embodiments, fallback strategies allow modality-specific modules S400 to operate independently for temporary intervals, with their outputs reconciled once alignment is restored.

Implementation details include sliding alignment windows with sizes that adapt to observed lag variance, configurable interpolation and extrapolation policies, mechanisms to detect and correct clock skew, and secure embedding of alignment metadata S704 to ensure provenance. The synchronization controller exposes tunable parameters such as target end-to-end latency, maximum buffering time, confidence thresholds for attention modulation, and drift sensitivity. The described synchronization adapts to modality-specific lag to provide robust, near-real-time, and auditable multimodal fusion across a range of deployment scenarios.

The system further comprises a frame-to-frame correspondence calculation module configured to compute spatial and temporal correspondences between successive frames of one or more input modalities and, where applicable, between modalities, to enable temporally coherent representation, alignment and fusion. When the system receives inputs from at least two modalities (S300), the frame-to-frame correspondence calculation is performed as a distinct processing stage that produces correspondence maps, matching indices, motion vectors, or transformation fields which describe how pixels, features, or embeddings in a reference frame correspond to those in a target frame. The correspondence outputs are consumed by the temporal alignment functions (S304) to synchronize data streams and by the embedding generation stage (S302) and the embedding fusion stage (S306) to enforce temporal consistency during fusion.

Frame-to-frame correspondence calculation can be implemented using dense optical flow estimation, sparse feature matching, or learned correspondence estimators. In one embodiment, dense correspondence maps are computed by a convolutional neural network trained for optical flow prediction (for example, architectures similar to FlowNet or PWC-Net), which takes two consecutive image frames and outputs a per-pixel flow field. The predicted flow is used to warp embeddings or raw pixels from the previous frame into the current frame's coordinate frame prior to fusion, thereby reducing temporal misalignment and improving downstream fusion accuracy. In another embodiment, sparse correspondences are computed by extracting keypoints and descriptors (for example, SIFT, ORB, or learned local descriptors) from successive frames, matching descriptors using nearest-neighbor search with ratio tests, and refining matches using geometric constraints such as RANSAC to produce robust correspondence sets. These sparse correspondences can be used to compute homographies, affine transforms, or piecewise warping fields that approximate frame-to-frame motion.

For multimodal inputs where modalities capture complementary views of the same scene (for example, RGB video and depth maps, or video and thermal imagery), cross-modal frame-to-frame correspondence calculation establishes matches not only within each modality over time but also across modalities. Cross-modal correspondences are computed by mapping modality-specific features into a shared embedding space (S302) and performing similarity search across embeddings from different modalities and adjacent frames. The system can compute correspondences at multiple spatial scales by generating multi-scale pyramids of frames and performing correspondence estimation at coarse-to-fine resolutions to capture both large displacements and fine details. When embeddings are used, the correspondence module outputs matching indices or soft correspondence matrices indicating the affinity between embedding locations across frames and modalities; these matrices are used by attention-based fusion mechanisms (S306) to weight contributions from temporally adjacent embeddings.

To increase robustness, correspondence calculation incorporates regularization and consistency constraints. Cycle-consistency checks enforce that a correspondence from frame A to frame B followed by a correspondence from frame B back to frame A returns approximately the original point, and correspondences that violate cycle-consistency beyond a threshold are rejected or downweighted. Smoothness priors penalize abrupt spatial variations in dense flow fields to suppress noise, and occlusion reasoning identifies regions where correspondences are unreliable due to occlusion by estimating forward-backward flow consistency or using learned occlusion masks. Photometric and feature-based losses are applied during training of learned correspondence networks to encourage accurate matches; such losses include photometric reconstruction error after warping, descriptor matching loss, and supervised or self-supervised geometric consistency losses.

The frame-to-frame correspondence calculation module supports temporal interpolation and motion compensation operations. Warping operations employ the computed correspondence fields to reproject embeddings, features, or raw pixels from neighboring frames into a reference frame for aggregation. Temporal interpolation utilizes these correspondences to synthesize intermediate frames or embeddings by blending warped inputs according to motion-aware weights. These operations enable the system to perform temporally coherent augmentation of training data (S202) and to generate enhanced inputs for downstream modules, including modules divided by modality (S400) and modules trained with progressive schedules (S402). The module also supplies motion cues that can be used as additional input channels to the modality-specific networks to facilitate more accurate dynamic scene understanding.

In training and inference pipelines where reduced-latency or resource-constrained execution is required, the correspondence calculation can be adapted to the available compute budget. Lightweight, approximate correspondence estimators (for example, block matching or pyramid-based correlation layers with limited search range) are used for latency-sensitive inference (S1002), while more accurate learned models are used offline for training or when resources permit. Computation of correspondences can be partitioned and distributed across compute nodes (S100) or executed asynchronously in batches (S1000) to balance throughput and latency. Where specialized acceleration hardware is available (S1004), the correspondence computation is mapped onto accelerators (for example, GPUs, NPUs, or FPGAs) and optimized using quantization (S500) and memory-efficient architectures (S504) to meet deployment constraints, including deployment of compressed correspondence models to edge devices (S502).

The system integrates correspondence calculation into automated training workflows. Synthetic training samples generated by generative models (S200) are used to augment the diversity of motion patterns and occlusion scenarios encountered during training, and active learning (S204) selectively identifies frames or frame pairs where correspondence estimates are uncertain for additional annotation or higher-fidelity processing. During training, correspondences are used to define temporal consistency loss terms that penalize discrepancies between model outputs on temporally adjacent frames after applying the correspondence-based warping, thereby encouraging temporally stable predictions and reducing flicker in generated outputs. Fairness and bias-detection modules (S600) use correspondence-derived motion statistics to ensure representation of dynamic behaviors across different demographic or environmental conditions, and reweighting or constrained retraining (S602, S604) can be applied when disparities are detected.

The correspondence module supports multiple output formats and interfaces to downstream modules. Outputs can include dense flow fields, sparse match lists with confidence scores, correspondence affinity matrices, occlusion masks, and motion descriptors. Downstream fusion modules (S306) use these outputs to compute attention weights that incorporate motion-aware priors, enabling attention mechanisms to favor temporally consistent sources. Temporal alignment functions (S304) utilize correspondence outputs to correct for acquisition delays, rolling-shutter distortions, or sensor-specific time offsets by warping or shifting data streams according to estimated correspondences and timing metadata. Metadata and provenance information associated with correspondence computations, including confidence measures and algorithm versioning, are embedded with outputs (S704) and used by screening or watermarking processes (S700, S702) to support traceability and content integrity.

Implementation variations include end-to-end differentiable pipelines where correspondence networks are trained jointly with embedding generation and fusion networks, and cascaded pipelines where correspondence is computed independently and supplied as auxiliary input. In the joint training variant, correspondence estimation layers are integrated into the architecture that generates shared embeddings (S302) and are optimized using combined supervision consisting of task losses, photometric reconstruction losses, and temporal consistency losses. In the cascaded variant, the correspondence module is provided as a modular service that can be updated or replaced without retraining downstream models, enabling deployment flexibility and progressive upgrades.

Failure modes and mitigation strategies are addressed by implementing correspondence confidence estimation and fallback mechanisms. Regions exhibiting insufficient correspondence confidence are identified and either excluded from motion-based fusion or supplemented with alternative fusion cues such as appearance similarity or learned priors. Temporal buffering and asynchronous batching (S1000) are employed to smooth transient correspondence errors by aggregating evidence across multiple frames. Periodic benchmarking (S904) assesses correspondence accuracy and drift, and drift detection (S902) triggers model retraining or recalibration when performance degrades.

The frame-to-frame correspondence calculation can be extended to three-dimensional correspondences for modalities that capture 3D structure, for example depth, LiDAR, or stereo. In this mode the module computes scene flow or 3D point correspondences and employs rigid or non-rigid transformation estimation to align 3D representations across time. In such embodiments, correspondence outputs are expressed as 3D displacement vectors or transformation matrices and are used to inform multi-view fusion and temporal smoothing of 3D embeddings. The system is configured to incorporate sensor-specific preprocessing (S800), noise filtering (S802), and modality-specific validation schemas (S804) prior to correspondence computation to improve match quality.

Examples of parameter choices and training regimes include progressive schedules (S402) that begin with synthetic, noise-free sequences and gradually introduce real-world noise and occlusions, automated hyperparameter search (S404) to tune correspondence network architectures and loss weights, and quantization-aware training (S500) when correspondence models are to be deployed on resource-limited edge devices (S502). The correspondence calculation supports monitoring of distributional changes (S900) by tracking motion statistics and correspondence confidence distributions; significant shifts trigger retraining workflows (S902) to maintain reliable temporal alignment and fusion performance.

Further comprising semantic consistency validation is incorporated into the multimodal processing pipeline to detect, quantify and remediate semantic conflicts and inconsistencies between content received from different modalities. Semantic consistency validation is performed after or in parallel with preprocessing S800, outlier and noise filtering S802, and modality-specific validation S804, and before or during training and inference operations. In one implementation, inputs from at least two modalities S300 are preprocessed (S800), filtered for outliers (S802) and validated for modality-specific consistency schemas (S804). Thereafter, modality representations are generated as embeddings in a shared vector space S302 and synchronized using temporal alignment functions S304 when applicable. The embeddings are fused using attention mechanisms S306 and provided to a semantic consistency validation module that computes one or more consistency scores describing the degree to which the modalities convey mutually compatible semantic content.

The semantic consistency validation module computes consistency using multiple complementary techniques. In a first technique, cross-modal semantic similarity is computed using cosine similarity or other distance metrics between corresponding embeddings S302. A pairwise similarity score is computed for each semantically paired element (for example, an image region and a caption phrase) and aggregated to form an overall semantic similarity metric. In a second technique, cross-modal entailment or inference models (for example, a transformer trained for cross-modal entailment) are applied to determine whether the semantic content of one modality entails, contradicts, or is neutral with respect to the semantic content of another modality. In a third technique, structured semantic validation is performed by mapping modal content to a knowledge graph or ontology and checking for logical or factual inconsistencies between mapped entities and relations. In a fourth technique, rule-based and schema-based checks validate expected correspondences (for example, object labels detected in an image must appear in an associated caption, or timestamped audio events must align temporally with detected visual events using S304).

A semantic consistency score Scons is computed as a weighted combination of multiple component scores: Scons=$\alpha$*Sembed+$\beta$*Sentail+$\gamma$*Skg+$\delta$*Smeta, where Sembed is an embedding similarity score computed from S302, Sentail is an entailment/conflict score derived from cross-modal classifiers, Skg is a knowledge-graph consistency score, Smeta is a metadata- and provenance-based consistency score, and $\alpha$, $\beta$, $\gamma$, $\delta$ are weighting coefficients selected via automated hyperparameter search S404. Thresholds for Scons are stored and dynamically adapted based on monitored output distributions S900 and drift detection S902. One or more thresholds Tgood, Twarn, Tbad are defined such that Scons$\geq$Tgood indicates strong semantic consistency, Twarn$\leq$Scons<Tgood indicates probable inconsistency requiring remediation, and Scons<Tbad indicates severe inconsistency that triggers sample rejection or human review.

Actions taken in response to semantic consistency validation outcomes are integrated with other components of the system. When Scons>Tgood, the sample proceeds to downstream training or inference (including progressive training schedules S402 and memory-efficient inference S504). When Twarn$\leq$Scons<Tgood, the sample is queued for active learning S204, annotated or relabeled by human annotators, or subjected to automated correction procedures such as generation of alternative captions or metadata via generative models S200 and data augmentation S202. When Scons<Tbad, the sample is filtered from the training set, reweighted to reduce its influence on model updates (S602), or logged with provenance metadata S704 for auditing. Samples flagged for human review are recorded along with the semantic inconsistency indicators and provenance information so that subsequent labeling, correction, or rejection actions are traceable.

Semantic consistency validation is provided both as an offline preprocessing stage and as an online runtime check. In offline training data preparation, semantic consistency validation is integrated with S800, S802, and S804 to improve dataset quality prior to training. Samples that fail consistency checks are used to inform active learning S204 selection, synthetic sample generation S200, or dataset rebalancing measures that address representational bias S600 and fairness constraints S604. During training, a semantic consistency loss term Lsem is added to the primary task loss Ltask to penalize model behavior that produces semantically inconsistent outputs. The combined loss is expressed as Ltotal=Ltask+$\lambda$ Lsem, where $\lambda$ is a tunable hyperparameter determined by S404. Lsem is implemented as a contrastive loss that encourages matching cross-modal pairs to be closer in the shared embedding space S302 than mismatched pairs, or as a divergence between distributional outputs produced by different modal pathways.

At inference time, semantic consistency validation can operate in real-time as an additional check on generated outputs. For example, when an on-device model deployed to an edge device S502 produces multimodal outputs (text with images, captions for video frames, or fused audiovisual summaries), the semantic consistency module evaluates whether the generated text is consistent with the visual content. If a generated output is flagged as inconsistent, the system can take remedial actions such as suppressing the output, inserting a disclaimer, re-querying a fallback model, or requesting human moderation. Selection of reduced-latency architectures S1002 and specialized hardware S1004 can be used to meet performance constraints when semantic consistency validation is performed at inference. Under constrained compute, a lightweight consistency check based on fast embedding comparisons S302 can be employed, while more expensive entailment or knowledge-graph checks are deferred to cloud resources, leveraging S100 segmenting computation across distributed nodes and S102 dynamic allocation of resources.

Implementation details of the semantic consistency validator include use of cross-modal transformers and attention fusion layers S306 to compute context-aware embeddings; graph neural networks for knowledge-graph-based checks; and probabilistic graphical models for temporal consistency verification of streaming data synchronized via S304. The validator records consistency scores, decision rationales, and corrective actions in audit logs tied to provenance metadata S704. The audit logs are employed to monitor distributional changes S900, trigger retraining S902 when systematic inconsistencies are observed, and evaluate reliability via periodic benchmarking S904. Thresholds, weights, and loss-scaling parameters undergo automated tuning via S404 and can be adjusted in response to drift detection S900 and fairness monitoring S600 to mitigate unintended biases that are revealed by consistency checks.

Semantic consistency validation further supports data governance and intellectual property screening. Outputs and training candidates that exhibit close semantic similarity to known copyrighted works are identified by combining perceptual hashing and similarity screening S700 with semantic checks; suspected matches are either blocked, marked for review, or watermarked S702. The provenance metadata S704 associated with consistent and inconsistent samples supports downstream auditing, reporting, and compliance.

Hardware and deployment variations are contemplated. Semantic consistency validation can be executed entirely in a centralized training environment, in a hybrid cloud/edge configuration where compact on-device checks run on S502 and comprehensive checks run in the cloud using specialized hardware S1004, or distributed across compute nodes in accordance with S100 and S102. Where computation is distributed, intermediate embeddings and consistency indicators are communicated using secure, bandwidth-efficient encodings; large knowledge-graph queries and entailment models are evaluated on nodes provisioned dynamically.

Semantic consistency validation processes include an image-caption pair workflow and a multimodal video workflow. In the image-caption workflow, an object detector extracts entities from an image and maps them to canonical identifiers using a knowledge base; the caption is semantically parsed and its entities are mapped similarly. Embeddings are generated (S302) and aligned temporally or contextually as needed (S304). The validator computes entity overlap, embedding similarity, and entailment, producing Scons. If Scons falls below a chosen threshold, the caption is either corrected via S200 or flagged for relabeling via S204; the sample can be reweighted (S602) or removed pending manual review. In the video workflow, audio event detection and visual event detection are temporally aligned using S304; cross-modal fusion (S306) yields time-indexed semantic representations that are validated for causal and temporal consistency (for example, a spoken descriptor must not label an object before it appears). Violations trigger targeted remediation strategies and logging, and influence progressive training schedules (S402) to emphasize temporal coherence.

The semantic consistency validation component is extensible and configurable. New modal validators, ontologies, entailment models, and rule sets can be added to address domain-specific semantics. Confidence thresholds and remediation policies are configurable per application and can be optimized via S404. The component interacts with dataset balancing S602 and fairness retraining S604 so that remediation strategies do not introduce or exacerbate bias. All decisions, metrics, and corrective actions emitted by the semantic consistency validation are recorded to support monitoring S900, benchmarking S904, and provenance tracking S704, and to enable traceable model updates triggered by detected drift S902.

The encoder outputs are projected or mapped into a common embedding space using learned projection layers and normalization operations so that embeddings arising from different modalities are comparable and amenable to downstream fusion (S302). The decoder portion is configured to reconstruct, predict, or translate target-modality signals from the shared latent representation. In a training regimen, the decoder is tasked with reconstructing the original modality inputs, predicting complementary modalities, or generating supervisory signals that enforce cross-modal consistency. Loss functions used during training include reconstruction losses for each modality, cross-modal prediction losses, contrastive or metric-learning losses that draw semantically related cross-modal embeddings closer while pushing unrelated embeddings apart, and optionally auxiliary classification or regression losses relevant to downstream tasks.

Training of the encoder-decoder model follows progressive schedules tailored to each modality-specific module (S402). Progressive training includes curriculum learning in which simpler tasks or modalities are learned first and more complex cross-modal interactions are introduced progressively, and includes staged freezing and unfreezing of encoder and decoder parameters. Automated hyperparameter search and optimization techniques are used to tune learning rates, weight decay, and architectural hyperparameters (S404). During large-scale training, distributed computation strategies are employed, including segmenting model computation across a distributed set of compute nodes (S100) and allocating compute resources dynamically in response to workload changes (S102). Model pruning according to relevance thresholds and structured sparsification is supported to reduce computational overhead during both training and inference (S104).

The encoder-decoder based embedding generation supports multiple training and inference variants. In a self-supervised pretraining variant, the encoder-decoder is trained to reconstruct masked or corrupted modality inputs, to predict future frames or tokens, or to perform cross-modal prediction tasks that require the decoder to generate one modality from another; the pretrained encoder provides embeddings that can be fine-tuned for downstream tasks. In a supervised variant, paired labeled data is used to jointly optimize task-specific objectives alongside reconstruction or contrastive objectives to produce embeddings that are both semantically informative and generatively capable. The bottleneck dimensionality, reconstruction loss weighting, and contrastive margin parameters are tunable to balance information retention against compactness in the shared embedding space.

Where privacy, provenance, and content integrity are concerns, outputs generated by the decoder or downstream generative components are screened for similarity with known works using perceptual hashing or other similarity measures (S700). Generated media are embedded with digital watermarks (S702) and provenance metadata to enable later verification and to track the origin of generated content (S704). The system includes monitoring components that track output distributions and trigger retraining when distributional drift is detected, thereby maintaining embedding fidelity and downstream task performance over time (S900, S902). Periodic benchmarking and reliability evaluations are conducted to assess performance regressions and recalibrate training or deployment strategies (S904).

The encoder-decoder architecture supports modular decomposition where modality-specific encoders and decoders are independently updatable or replaceable (S400). Such modularity permits targeted retraining when a particular modality domain changes, reduces the need to retrain the entire cross-modal system, and enables incremental integration of new modalities. Progressive training schedules and automated hyperparameter optimization (S402, S404) facilitate this modular updating without destabilizing previously learned cross-modal alignments.

During inference, attention-based fusion and decoder conditioning enable the system to flexibly produce task-specific outputs. For example, the decoder can be conditioned to generate a single-modality reconstruction, a fused multimodal prediction, or a downstream classification decision. When operating on edge devices, quantized encoder and decoder weights, sparse representations, and memory-efficient decoding strategies reduce latency and energy consumption while preserving acceptable accuracy (S500-S504). In cloud-based deployments that require increased throughput, model computation can be segmented and dynamically scaled across compute nodes to balance latency, throughput, and cost (S100-S104).

Embodiments include safeguards and feedback loops that ensure data quality and ethical operation. Statistical analyses detect dataset imbalances and biases (S600), sample reweighting and fairness-aware retraining are applied to mitigate identified issues (S602, S604). Output screening, watermarking, and provenance tracking reduce risks associated with generated content (S700-S704). Continuous monitoring of operational outputs enables automated detection of performance drift and supports scheduled or event-driven retraining to preserve alignment with evolving real-world data distributions (S900-S904).

Implementation choices for the encoder-decoder vary depending on application requirements. Encoders can employ multi-scale convolutional backbones, transformer encoders with positional encodings, or hybrid architectures that combine local feature extraction with global attention. Decoders can be structured as autoregressive generative models, non-autoregressive reconstruction networks, or cross-modal transformers. Attention fusion layers can be implemented as multi-head attention blocks, gated fusion units, or learned weighting schemes. Synchronization modules for temporal alignment can include learned time-warping layers, dynamic time warping approximations implemented as differentiable modules, or timestamp-based alignment followed by interpolation. Loss combinations include weighted sums of modality reconstruction losses, cross-modal contrastive losses, and task-specific supervised losses; hyperparameter search (S404) determines optimal weightings and architectural hyperparameters.

Training pipelines incorporate mixed-precision arithmetic, gradient checkpointing, and distributed data-parallel or model-parallel strategies to scale training efficiently across hardware resources (S100, S102, S1004). Pruning and quantization are applied post-training or during training (e.g., quantization-aware training), and sparsity patterns are structured to preserve hardware efficiency (S104, S500). For continual learning scenarios, the architecture supports incremental updates to encoder or decoder modules and employs mechanisms to reduce catastrophic forgetting, including replay buffers, elastic weight consolidation, and regularization-based approaches.

The described encoder-decoder based embedding generation supports a range of applications including cross-modal retrieval, multimodal classification, sensor fusion for robotics, translation between modalities, and generative media synthesis. The shared embedding space produced by the encoder-decoder facilitates downstream tasks by providing compact, semantically meaningful representations that capture both intra-modality structure and cross-modality relationships (S302). The combination of attention-based fusion (S306), synchronization (S304), and modular training and deployment strategies (S400-S404, S500-S504, S100-S104, S1000-S1004) yields a flexible, scalable system capable of operating across cloud and edge environments while maintaining robustness, fairness, and content provenance controls (S600-S704, S900-S904).

The disclosure further contemplates hierarchical fusion of multi-level embeddings to improve integration of information across modalities and feature hierarchies. In some embodiments, inputs from at least two modalities (S300) are provided to modality-specific encoders (S400). Each modality-specific encoder produces a set of embeddings at multiple representational levels, for example early-stage, mid-stage and late-stage embeddings corresponding to early, intermediate and late layers of the encoder. The multi-level embeddings for a given modality are projected into a shared vector space (S302) by level-specific projection layers or learned linear transformations so that embeddings across modalities and across levels are compatible for subsequent fusion operations.

Temporal synchronization of the modality streams is performed prior to fusion using temporal alignment functions (S304) so that multi-level embeddings corresponding to the same temporal region of the input are processed jointly. Where spatial or temporal downsampling produces differing resolutions across levels and modalities, upsampling and downsampling operations or learned interpolation layers are applied to obtain level-aligned representations. Level alignment can be performed with attention-based alignment modules that compute correspondences between time steps and spatial locations across levels and modalities.

Hierarchical fusion is performed in a staged manner. In a first stage, intra-modality fusion aggregates multi-level embeddings within each modality to form a set of modality-level aggregated representations. This intra-modality fusion is implemented using multi-head self-attention, gated recurrent aggregation, feature pyramid networks, residual connections, or combinations thereof. For example, level-specific embeddings for a modality can be concatenated and passed through a level-attention module that computes attention weights for each level via a softmax over learnable level-query vectors; the weighted sum constitutes the intra-modality aggregated representation. Auxiliary supervision such as reconstruction or contrastive losses can be applied to level-aggregated outputs to encourage informative level contributions during training.

Fusion modules incorporate level-aware gating mechanisms to control information flow from each level and modality. Gates can be scalar or vector-valued and are computed by compact neural networks that take as input level embeddings, global context vectors, and temporal signals. The output gates modulate the contribution of each level in the fused representation. In some embodiments, hierarchical fusion employs top-down and bottom-up pathways to enable iterative refinement: an initial bottom-up aggregation produces candidate modality representations that are then refined by top-down attention informed by top-level semantic embeddings. Iterative refinement can be unrolled for a fixed number of steps or performed until specified convergence criteria are met.

To promote efficient representation and limit computational overhead, the hierarchical fusion architecture supports sparse attention and selective pruning of levels or modalities. A relevance thresholding mechanism prunes level contributions that fall below a learned importance threshold (S104). The remaining levels are combined in the fusion pipeline. Progressive training schedules (S402) are applied so that coarse levels are trained first and finer levels are introduced afterward, enabling the system to focus on stable coarse-level signals before integrating detailed features. Auxiliary losses applied at each level encourage discriminative and reconstructive properties and facilitate stable gradient propagation through the hierarchy.

The fused multi-level representation can be passed to downstream prediction or generation heads. When temporal consistency is required, temporal smoothing or temporal attention layers operate on sequences of fused representations. For deployment-sensitive embodiments, compressed fusion modules are obtained via quantization (S500) and pruning, and the fused architecture can be adapted for reduced-latency inference by selecting specialized latency-optimized architectures (S1002) and by distributing computation across compute nodes (S100) or specialized hardware (S1004). Training regimes can leverage synthetic samples (S200), data augmentation (S202), and active learning (S204) to improve robustness of the hierarchical fusion to domain shifts.

Hierarchical fusion provides interpretability and provenance tracking by exposing level-wise attention maps and gate activations that indicate which levels and modalities contributed to particular outputs. These artifacts can be logged and screened for similarity with known works (S700) or recorded in metadata (S704). Fairness-aware embodiments apply dataset bias detection (S600) and sample reweighting (S602) to level-specific training data to prevent hierarchical fusion from reinforcing unwanted biases; fairness constraints are incorporated into auxiliary losses for level and modality outputs (S604).

Alternative embodiments implement hierarchical fusion with explicit multi-scale transformer architectures, feature-pyramid convolutional networks, or hybrid transformer-CNN modules. Hyperparameters such as number of levels, attention head counts, gating dimensionality, and auxiliary loss weights are determined via automated hyperparameter search (S404) and can be adjusted dynamically during training. The hierarchical fusion framework is thereby extensible and amenable to deployment across edge devices (S502) and to monitoring and retraining procedures triggered by distributional changes (S900, S902) to maintain reliable performance in deployed systems.

The system receives inputs from at least two modalities S300 and performs real-time synchronization of streaming inputs S304 prior to or concurrently with generation of embeddings S302 and subsequent fusion S306. Each incoming data packet or frame is associated with a source timestamp, which can be provided at the sensor or applied at the point of ingestion. Where source clocks are independent, clock synchronization is performed using one or more synchronization protocols (for example PTP, NTP, or application-layer clock exchange) to map source timestamps to a common reference timeline. Alternatively or additionally, the system supports insertion of sequence numbers, event markers, or watermarks S702 to assist in alignment when absolute timestamps are unavailable or unreliable.

To accommodate network jitter and variable arrival times, the system maintains per-modality jitter buffers that hold a bounded amount of recent data pending alignment. Buffer sizes are chosen to satisfy real-time constraints, balancing end-to-end latency against the probability of late arrivals. Adaptive buffer sizing is supported: the system continuously monitors observed end-to-end latency, jitter statistics, and packet loss, and dynamically adjusts buffer depth to maintain target synchronization accuracy within specified latency budgets. In reduced-latency configurations the system operates with minimal buffering and employs predictive techniques (for example, trajectory extrapolation or use of the most-recent embeddings) when data is late or missing, preventing stalls in downstream processing.

When inputs arrive out-of-order or with missing samples, the system applies configurable policies. A first policy drops frames that are late or outside the acceptable time window and proceeds with available synchronized frames to meet hard real-time deadlines. A second policy reconstructs missing data using interpolation or model-based synthesis (for example, using a learned temporal imputation model trained via synthetic training samples S200 to simulate missing intervals). A third policy triggers a reduced-latency fallback model or a reduced-fidelity processing path (for example, using quantized models S500 or edge-deployed compressed models S502) to maintain responsiveness while awaiting delayed full-fidelity data.

The alignment process yields synchronized sets of modality-specific data items or synchronized embeddings S302, each tagged with a common alignment timestamp or an alignment confidence score. The confidence score is computed from factors including timestamp agreement, buffer lateness, cross-correlation peak prominence, and network statistics. Fusion S306 is then applied to the synchronized embeddings using attention mechanisms or alternative fusion strategies. The attention mechanisms incorporate temporal masks and weighted positional encodings derived from the alignment confidence score to prioritize inputs exhibiting greater alignment confidence and stronger synchronization. In progressive training and deployment scenarios S402, the synchronization module S304 is co-trained with the downstream fusion module S306 so the fusion model develops robustness to residual misalignment and learns to exploit alignment confidence metrics.

In distributed implementations where segmentation of model computation S100 is performed across compute nodes, real-time synchronization S304 is coordinated across nodes. Shared timeline information and alignment offsets are propagated using reduced-latency control channels. Compute nodes can exchange brief alignment heartbeats and per-stream latency summaries to enable dynamic allocation of compute resources S102 for synchronization tasks (for example allocating additional CPU or hardware acceleration S1004 to the node performing alignment or buffering). Where synchronization computations are offloaded to specialized hardware (for example FPGAs or dedicated DSPs), the system supports hardware-assisted timestamping at ingress and hardware-based interpolation or resampling to reduce software overhead and latency.

For streaming modalities with differing sampling rates or temporal resolution, the temporal alignment function is configured to support resampling, decimation, and interpolation operations to map modality data to the synchronization grid. For example, audio samples are aggregated to match video frame timestamps, LIDAR sweep data are associated with the nearest inertial measurement timestamps and resampled, and sensor readings are downsampled or upsampled using sinc interpolation or learned temporal upsampling networks. When exact temporal correspondence is not achievable, the system annotates fused outputs with temporal uncertainty metadata and applies conservative fusion rules that require higher confidence for time-sensitive decisions.

Latency and reliability monitoring S900 is integrated into the real-time synchronization pipeline. Runtime metrics—including end-to-end synchronization error, proportion of dropped frames, mean alignment latency, and variance of alignment offsets—are computed and stored for telemetry. Thresholds on these metrics trigger corrective actions such as increasing buffer sizes, switching to alternative transport paths, invoking model retraining S902 upon detection of persistent drift, or escalating the issue to operators. Periodic benchmarking S904 is performed to validate synchronization performance under representative loads and network conditions.

Security and provenance considerations are incorporated: timestamps and alignment metadata are signed or accompanied by integrity tokens to prevent tampering, and embedded provenance metadata S704 records the alignment decisions and buffer events for post-hoc auditing. In multimedia generation contexts, similarity screening S700 and watermarking S702 can be applied after fusion and generation to trace outputs back to aligned inputs and to record alignment confidence as part of output metadata.

Alternative embodiments provide for asynchronous batch processing S1000 in which stringent real-time constraints are relaxed. In such embodiments, synchronization S304 aggregates streams into larger batches according to alignment windows and executes more computationally intensive cross-modal alignment procedures offline. By contrast, strict real-time embodiments emphasize reduced-latency model architectures S1002, quantized models S500, and edge deployment S502 to achieve synchronization and fusion within tight latency budgets while maintaining acceptable alignment accuracy.

The foregoing description of real-time synchronization of streaming inputs S304 illustrates various mechanisms, policies, and implementations that enable robust temporal alignment across diverse modalities S300, support downstream embedding generation S302 and fusion S306, and integrate with distributed computation, resource management, and deployment considerations such as S100, S102, S1004, S500, and S502. Modifications and combinations of the described techniques will be apparent to those skilled in the art and are intended to fall within the scope of one implementation.

Timestamping of samples can be performed at the source or at the first network hop; in embodiments where only source timestamps are provided, the server-side alignment module (S304) compensates for clock offset and drift by using synchronization protocols and by estimating relative timing differences across streams. Clock synchronization techniques implemented on the server include, for example, Precision Time Protocol (PTP), Network Time Protocol (NTP) corrections, GPS-sourced time references, pulse-per-second (PPS) signals, and server-side clock offset estimation using two-way time exchange. The temporal alignment module (S304) further implements continuous clock drift estimation and correction so that extended-duration streams remain aligned despite varying drift rates between capture devices.

Server-side temporal alignment (S304) can apply one or more algorithmic approaches, alone or in combination, to align multimodal streams. Example approaches include dynamic time warping (DTW) to nonlinearly align sequences having temporal distortions, cross-correlation-based lag estimation to obtain fixed offsets, phase-based alignment for periodic signals, Kalman filtering or other state-estimation techniques to fuse noisy timestamps, and interpolation or resampling to convert data streams to a common temporal grid. The server can perform multirate signal processing when modalities have different native sampling rates by executing anti-aliasing filtering and resampling on the server before computing temporally aligned sample sets. In some embodiments the server implements adaptive windowing that adjusts buffer sizes and alignment latency according to measured network conditions and application-defined latency constraints.

Performing temporal alignment on-server permits centralized management of alignment policies and enables deployment of computationally intensive alignment techniques that prove impractical on constrained edge devices. The server can dynamically allocate compute resources (S102) to the alignment module (S304) in response to fluctuating ingress workload, scale alignment parallelism via distributed compute node segmentation (S100), and apply model pruning or parameter reduction (S104) to alignment-related models when resource constraints demand. The server can also select latency-optimized architectures (S1002) and utilize specialized hardware accelerators (S1004), such as GPUs, FPGAs, or dedicated DSPs, to accelerate resampling, filtering, and alignment computations while meeting real-time deadlines.

Server-side temporal alignment supports handling of asynchronous batches (S1000) and can be combined with queuing and batching strategies to increase throughput while meeting latency targets. In one embodiment, the server collects multiple aligned instances into micro-batches and processes them through embedding and fusion pipelines; in another embodiment, streaming inference with per-sample alignment is used to minimize end-to-end latency. The server also implements segmentation of the alignment workload across distributed nodes (S100), where each node aligns a subset of modalities or a partition of the time axis, and the server reconciles aligned outputs to produce a globally consistent timeline.

Various robustness measures can be applied on the server while performing temporal alignment (S304). Packet loss or missing frames from a given modality can be addressed via forward or backward interpolation, by inserting null-aligned placeholders, or by employing imputation models that predict missing observations conditioned on available modalities and historical context. The server can further apply outlier detection and noise filtering (S802) prior to or during alignment to prevent corrupt samples from degrading alignment accuracy. Confidence metrics associated with alignment decisions can be generated and attached as metadata to aligned sequences, enabling downstream components to weight or ignore aligned regions whose confidence falls below a predefined threshold.

Security, privacy, and compliance considerations are addressed in embodiments in which sensitive raw data is transmitted to the server for alignment. The server can receive only time annotations and compact feature sketches from edge devices and perform alignment on encrypted or homomorphically transformed representations when security constraints require it. As an alternative, the system is configured to transmit encrypted raw data and to perform decryption and alignment within a secure enclave on the server. Server-side alignment also enables centralized auditing and provenance tracking (S704) of alignment operations, including logs of timestamp corrections, synchronization events, and alignment algorithm versions.

Fallback and hybrid approaches are supported. If server-side alignment is unavailable or network conditions preclude sending sufficient data to the server, the system can execute local on-device alignment at the edge and transmit pre-aligned segments to the server. In hybrid embodiments, coarse alignment can be performed at the edge, followed by fine-grained server-side alignment (S304) when the aligned data arrives, thus balancing privacy, bandwidth, and accuracy trade-offs.

In one embodiment, multimodal inputs are received (S300) and processed to obtain modality-specific embeddings that are subsequently fused using attention mechanisms (S306). The attention fusion is performed with modality masking to control the contribution of each modality to the fused representation. A modality mask is associated with each input sample or time step prior to computation of attention weights. Each modality mask can be a binary mask, a multi-level discrete mask, or a continuous-valued gating vector. The mask is applied within the attention computation so that attention scores corresponding to masked-out modalities are suppressed or excluded, thereby preventing attended information from those modalities from influencing the fused embedding.

The modality masks can be generated by one or more of the following mechanisms. In some embodiments, a deterministic mask is computed from modality availability metadata, where missing or corrupted modalities are indicated and the mask zeros out attention to those modalities. In other embodiments, a learned mask generator network receives modality health signals (such as signal-to-noise ratios, sensor status indicators, or downstream confidence scores) and outputs per-modality mask values. The mask generator is trained jointly with the fusion network using backpropagation so that the learned masks optimize downstream objectives. In yet other embodiments, the mask values are computed from the embeddings themselves, for example by computing a relevance score for each modality embedding (for example via a compact multilayer perceptron applied to each modality embedding) followed by sigmoid or softmax normalization to produce a soft mask.

The modality mask is integrated into multi-head attention at multiple points. In one embodiment, modality-specific masks are applied to the attention score matrix prior to softmax normalization: given queries Q, keys K, and values V derived from modality-specific embeddings, the attention score matrix $A = QK^T/\sqrt{d_k}$ is computed in the usual manner and then elementwise multiplied by a mask matrix M that encodes allowed modality-to-modality attentions. Entries of M corresponding to disallowed crossmodal attentions are assigned sufficiently large negative values (for example negative infinity or a large negative constant) so that, after softmax, those entries are effectively zero. In an alternative embodiment, the mask is applied after softmax by multiplying the attention probability matrix by a normalized mask so that allowed modalities retain their normalized attention mass while disallowed modalities receive zero weight; when this approach is used, re-normalization across the remaining modalities is performed to conserve probability mass.

The mask is configurable at multiple granularities. A coarse-grained mask operates at the modality level, enabling or disabling all attention interactions for an entire modality. A finer-grained mask operates at the token, region, or time-step level within a modality, allowing selective attention to specific parts of a modality (for example, masking individual audio frames or image patches). Fine-grained masking can be derived from modality-internal confidence measures, segmentation outputs, or saliency detectors. Masks can also be time-dependent and synchronized with temporal alignment functions (S304) so that masking decisions reflect temporally aligned segments across modalities.

Modality masking can be static at inference time to handle permanently absent modalities (for example when a sensor is not present), or dynamic and stochastic during training as a regularization technique. Stochastic modality masking randomly drops one or more modalities for certain training instances (akin to Dropout but applied at modality granularity) to force the fusion mechanism to learn robust cross-modal representations and avoid over-reliance on any single modality. When stochastic masking is used, curriculum or annealing schedules can be employed: early training can apply heavier modality dropout to encourage independent modality competence, while later stages reduce dropout to enable fine-grained cross-modal cooperation. Progressive training schedules (S402) can coordinate with modality masking so that modality-specific modules (S400) are pre-trained before integrated masked fusion is enabled.

When the attention mechanism uses multiple attention heads, modality masks are configured on a per-head basis, enabling certain heads to focus on intra-modal relationships while other heads focus on cross-modal interactions. Head-specific masking can be learned or configured manually; for example, a subset of heads is constrained to attend only within a modality to preserve modality-specific features, while other heads are allowed to attend across modalities to capture cross-modal correlations. In addition to hard masking, soft gating factors are applied per head to scale attention contributions in a differentiable manner.

To implement modality masking efficiently, the attention computation is restructured to exploit block-sparse operations. Keys, queries, and values from different modalities are concatenated in modality order, and the modality mask is represented as a block mask that disables entire key blocks corresponding to masked modalities for particular queries. This permits efficient use of sparse attention kernels and reduces computational and memory overhead when one or more modalities are masked. Pruning of model parameters according to a relevance threshold (S104) and quantization of parameters (S500) are coordinated with modality masking to further reduce compute during masked inference, for example by skipping computation of projection matrices for masked modalities.

Modality masking also supports graceful handling of asynchronous multimodal inputs and processing in asynchronous batches (S1000). When modalities arrive or are processed at different rates, the mask signals which modalities are present for a given fusion step. Temporal alignment (S304) is used where appropriate to align available modalities; when alignment cannot be achieved for certain time steps, modality masking prevents misaligned or stale modality data from corrupting fused representations. For streaming applications, the mask generator can incorporate latency and freshness indicators to discount stale modality contributions.

During training, loss functions incorporate objectives that encourage desired mask behavior. For example, a sparsity penalty can be applied to mask outputs to promote minimal reliance on multiple modalities unless necessary. Alternatively, a diversity-promoting penalty can be introduced so that different heads use complementary modality combinations. When fairness or bias concerns arise, the mask generator can be constrained or regularized so that masking does not systematically ignore modalities that are critical for under-represented groups. Dataset balancing (S602) and fairness-constrained retraining (S604) can be combined with masking to promote equitable model behavior.

When modality masking is used in conjunction with output screening and provenance tracking (S700-S704), the mask state for each fused output is recorded as metadata that accompanies the generated content. This mask metadata indicates which modalities contributed to the fused embedding and is useful for later auditing, provenance, or watermarking. Recording mask states also facilitates post-hoc analysis of model performance under different modality-availability scenarios and supports triggering retraining upon drift detection (S902) by revealing modality-specific distributional changes.

During inference on resource-constrained devices (S502), modality masking reduces computation by disabling attention and projection computations for masked modalities. Hardware-aware routing can skip memory loads and arithmetic for masked modalities; selection of reduced-latency architectures (S1002) and utilization of specialized hardware (S1004) can be combined with modality masking to meet real-time constraints. For deployment, compressed models (S502) that include a mask generator with a compact parameter footprint enable robust multimodal fusion while minimizing edge resource usage.

A pre-trained model is used to validate cross-modal alignment between embeddings generated from at least two modalities (S300, S302). In one embodiment, inputs from the modalities are preprocessed (S800) and synchronized via temporal alignment functions (S304) prior to embedding generation. The pre-trained model can be a multimodal contrastive model trained to map heterogeneous inputs into a shared vector space, or a classifier or regressor trained to predict an alignment score for pairs or sets of modality-specific embeddings. Embeddings produced by the system (S302) are supplied as inputs to the pre-trained model, which produces an alignment metric that quantitatively indicates the degree of semantic correspondence across modalities. The alignment metric can be a scalar similarity score, a probability estimate, a distance measure, or a categorical label indicating aligned/non-aligned status.

In training-phase embodiments, the pre-trained model is applied as an auxiliary evaluator during progressive training schedules (S402). The evaluator computes an alignment loss term that is combined with primary task losses; for example, the negative logarithm of the alignment probability or a margin-based loss derived from the pre-trained model output can be added to the overall objective. Outputs of the pre-trained model can be used to reweight training samples (S602) by increasing the effective importance of samples that the pre-trained model indicates are poorly aligned, thereby focusing subsequent training on resolving alignment errors. Alternatively, the pre-trained model can be used to select samples for active labeling (S204) by flagging instances with alignment deficiencies for prioritized human annotation.

In inference-phase embodiments, the pre-trained model performs runtime validation of fused outputs (S306). After modality-specific embeddings are fused using attention mechanisms or other fusion strategies, the pre-trained model evaluates alignment and produces an alignment confidence score. If the score falls below a configurable relevance threshold, corrective actions are taken, including triggering resynchronization (S304); invoking a fallback model architecture selected for reduced latency or enhanced robustness (S1002); or routing the instance for post-processing such as similarity screening (S700) or watermark insertion (S702). The configurable relevance threshold is determined empirically using validation sets or via automated hyperparameter search (S404).

The pre-trained model can be implemented in multiple forms with tradeoffs between accuracy and computational overhead. For deployment to resource-constrained devices, the pre-trained model can be quantized (S500) and deployed with compressed parameters (S502). A memory-efficient architecture (S504), such as a lightweight transformer, distilled network, or linear-projection comparator, can be used so that alignment validation is feasible at the edge without undue latency. Alternatively, alignment validation can be offloaded to a distributed set of compute nodes (S100) where the model is hosted on specialized hardware (S1004) for accelerated execution; in such architectures, compute resources can be allocated dynamically in response to workload changes (S102) to maintain service-level alignment verification.

The pre-trained model can be frozen or fine-tuned depending on application requirements. In frozen deployments, the model parameters remain fixed during system training and it operates as an external validator that provides consistent alignment judgments across experiments. In fine-tuned deployments, the pre-trained model is adapted using a limited calibration dataset drawn from the target domain to reduce domain shift. Calibration can be performed using synthetic training samples generated via generative models (S200) and augmented real data (S202) to cover rare edge cases, and guarded by fairness constraints (S604) and bias detection (S600) during recalibration to prevent the validator from amplifying undesirable dataset biases.

The validation procedure supports multiple alignment evaluation modes. Pairwise validation computes alignment scores for each pair of modality embeddings using similarity metrics such as cosine similarity, Euclidean distance, or learned similarity functions. Joint-set validation processes n-tuples of embeddings and produces a joint alignment probability, useful when more than two modalities are present. Temporal validation applies the pre-trained model to sequences of aligned embeddings to detect temporal misalignment or drift; temporal alignment functions (S304) are used in conjunction with the pre-trained model so that temporal consistency is evaluated as part of the alignment score.

When the pre-trained model indicates misalignment, automated remediation options are available. A first option is to reweight or prune training samples that exhibit insufficient alignment according to a relevance threshold (S104), removing noisy or inconsistent pairs from the training set. A second option is to trigger retraining or incremental fine-tuning (S902) of the multimodal model using additional labeled or synthetic data selected through active learning (S204). A third option is to route the instance through alternative processing pipelines, including models optimized for edge inference (S1002) or batched asynchronous processing (S1000), to allow slower but more reliable validation.

Validation outputs from the pre-trained model are logged and used for monitoring and benchmarking. Distributional changes detected in alignment scores over time can trigger model retraining (S902) or prompt scheduled benchmarking (S904). Alignment metadata can be embedded in generated outputs to enable provenance tracking (S704) and subsequent auditing. For screening against known works, the alignment validation stage can be combined with perceptual hashing (S700) to identify outputs that are aligned in content but potentially infringing.

Implementation details include calibrating thresholds on held-out validation sets, applying temperature scaling or isotonic regression to calibrate probabilistic outputs, and periodically re-evaluating the pre-trained model itself to prevent validator drift. The pre-trained model is configured to expose an API that accepts modality identifiers, timestamps, and modality-specific confidence scores and returns an alignment report containing an alignment metric, a recommended action, and an uncertainty estimate. Variations include ensemble validators composed of multiple pre-trained models, weighted voting schemes, and cascaded validators in which a lightweight model screens instances and a heavier model performs detailed validation when necessary.

In summary, cross-modal alignment validation using a pre-trained model is integrated at multiple points in the multimodal processing pipeline: as an auxiliary loss during training (S402), as a runtime guard for fused outputs (S306), as a selection mechanism for active learning (S204) and for retraining (S902), and as a monitoring signal during deployment and maintenance. The pre-trained model is deployed in quantized or distributed configurations (S500, S100, S1004) and is configured to trigger downstream remediation steps such as sample reweighting (S602), pruning (S104), retraining (S902), or routing to alternative inference architectures (S1002).

The fused representation is optionally refined through additional transformer layers, recurrent aggregation, or pooling operations to produce a compact, integrated feature vector. Pooling strategies include mean or max pooling over time, attention-based pooling that weights token contributions, learnable pooling such as set- or sequence-aware pooling layers, and hierarchical pooling that preserves coarse-to-fine structure. A learned bottleneck projection is used to reduce dimensionality and regularize the representation. During training, auxiliary tasks (for example, contrastive alignment objectives or modality reconstruction losses) are applied to the fused representation to encourage semantic alignment and robustness.

As part of its operation, the system outputs an integrated feature vector for downstream tasks and exposes the resulting compact vector as the canonical multimodal descriptor for downstream consumption. The integrated feature vector is exported to downstream classifiers, regressors, sequence decoders, retrieval indices, control modules, or generative decoders. For classification, the integrated vector is passed to one or more task-specific heads comprising fully connected layers, softmax or sigmoid activations, and task-appropriate loss functions. For retrieval or similarity tasks, the integrated vector is stored in a vector index and compared using cosine similarity or Euclidean distance. For generative tasks such as captioning or synthesis, the integrated vector conditions autoregressive decoders or diffusion priors.

The integrated feature vector can be produced at multiple operational points to trade off latency and fidelity. Reduced-latency embodiments select reduced-depth encoders and lighter fusion heads (S1002) and quantize parameters (S500) to meet inference constraints. For edge deployment, the integrated vector is generated by compressed models deployed to edge devices (S502) and inference is performed using memory-efficient architectures (S504). Model compression techniques such as pruning according to relevance thresholds (S104), quantization (S500), and knowledge distillation are compatible with the fusion pipeline and can be applied while preserving the semantics of the integrated vector. Hardware-accelerated execution (S1004) can be utilized to meet real-time throughput requirements.

The integrated feature vector is annotated with provenance metadata (S704), perceptual hashes for output screening (S700), or digital watermarks (S702) prior to external use or storage. In production settings, the distribution of integrated vectors is monitored (S900), and retraining is triggered upon drift detection (S902). Fairness and bias mitigation operations, such as dataset reweighting and constrained retraining (S602, S604), are applied during model updates to ensure that downstream behavior conditioned on the integrated vector complies with policy and regulatory requirements.

Alternative embodiments include variations in the fusion strategy (for example, early fusion of raw features, mid-level fusion of embeddings, or late fusion of task outputs), different alignment techniques, and adjustable integrated vector dimensionality. The integrated feature vector can be generated deterministically or stochastically (for example, by sampling from a learned latent distribution) and can carry auxiliary modality-confidence scores or attention-based attribution maps to facilitate interpretability and downstream decision-making.

The attention mechanism used for fusion incorporates task-specific weights so that, for a given downstream task or objective, the attention computation is biased or parameterized by a task embedding or task identifier. In one embodiment, each task t is associated with a learnable task weight vector or task embedding $e\_t$. When computing attention over modality embeddings, the queries, keys and/or values are conditioned on $e\_t$, causing the attention scores to reflect task preferences for modalities or features. Concretely, modality embeddings $m\_i$ are projected to keys $k\_i$ and values $v\_i$; a query $q\_t$ is constructed as a function of the global context and $e\_t$ (for example $q\_t=W\_q [context; e\_t]+b\_q$). Attention weights $a\_\{t,i\}$ are obtained via softmax$((q\_t·k\_i)/sqrt(d)+g\_\{t,i\})$ where $g\_\{t,i\}$ is an additional task-modality bias term derived from $e\_t$, and temperature scaling can be applied.

Alternatives include generating per-task attention head parameters via a compact task-conditioned hypernetwork, using multiplicative gating in which each modality representation is multiplied by a task-specific gating coefficient, or employing separate attention heads per task and aggregating their outputs. Regularization on task-specific weights, such as L2 penalties or sparsity-inducing norms, helps prevent overfitting and encourages the attention mechanism to focus on the most informative modalities for each task.

Task-specific attention weights are learned jointly with the remainder of the model via backpropagation, or are subsequently adapted during fine-tuning stages using higher learning rates applied to task parameters. In multi-task scenarios, shared attention parameters are constrained via a reduced-rank factorization that decomposes parameters into a task-agnostic basis and task-specific coefficients, reducing parameter overhead while retaining task specificity. When latency or memory constraints arise (for example during deployment to edge devices), the attention mechanism is pruned or quantized after training, and task-specific weights are compressed via knowledge distillation into compact gating networks.

Hyperparameter search can be nested within the progressive schedule by treating schedule parameters (for example, number of epochs per stage, freeze/unfreeze timing, and per-stage learning rates) as tunable hyperparameters. In one embodiment, a two-level optimization is performed: an outer loop searches over schedule hyperparameters using a budgeted search strategy, while an inner loop optimizes model weights for each candidate schedule. Validation metrics for assessing hyperparameter quality include task-specific validation loss or accuracy, multimodal alignment scores (such as cosine similarity in a shared embedding space), robustness metrics (for example worst-group performance), and computational constraints (latency, memory). Multi-objective optimization techniques are used to balance predictive performance against deployment constraints.

To reduce search time and resource consumption, surrogate models or reduced-fidelity approximations guide the search. Examples include training with fewer epochs, reduced-resolution inputs, or smaller model proxies, followed by extrapolation of performance to full-scale models. Population-based training techniques continuously mutate hyperparameters and replace poorly performing configurations with better ones, enabling dynamic adaptation of learning rates and other parameters during training. Checkpointing and warm-starting permit reuse of previously trained weights when exploring proximal hyperparameter configurations, accelerating convergence.

Parameter grouping permits fine-grained control of learning rates, enabling different parameter sets (e.g., modality encoders, shared layers, task-specific attention parameters) to be assigned distinct optimizers or learning-rate schedules. Warmup schedules can be applied selectively to newly added layers (such as modality adapters or task heads) while maintaining reduced learning rates for pretrained layers. Gradient clipping, mixed-precision training, and distributed gradient accumulation strategies are compatible with the automated search to ensure stable training across a wide hyperparameter range.

Monitoring and selection mechanisms are integrated so that the automated hyperparameter search evaluates candidate configurations on hold-out validation sets and periodically prunes underperforming configurations. When a candidate reaches a predefined performance threshold, it is promoted to longer, higher-fidelity evaluation or subjected to additional fine-tuning rounds with more aggressive regularization. The final selected configuration is retrained on combined training and validation data or undergoes a calibration phase to finalize task-specific attention weights and other parameters.

The combined application of dividing the model into modality-specific modules (S400), applying progressive training schedules (S402), and optimizing learning rates and parameters via automated hyperparameter search (S404) produces several operational benefits: faster convergence owing to staged learning, more effective utilization of modality-specific priors, reduced catastrophic interference between modalities, enhanced task-adaptive fusion via task-specific attention weights, and systematically tuned hyperparameters that balance performance and deployment constraints. These techniques can be implemented within existing deep learning frameworks and orchestrated by a training pipeline that schedules pretraining, fine-tuning, hyperparameter search, evaluation, and model selection.

The modules of the claimed method comprise an image encoder, a text encoder, and an audio encoder (S400). The image encoder is configured to receive image inputs and to perform feature extraction using one or more convolutional and/or transformer-based layers to produce a fixed- or variable-length image embedding. In one embodiment, the image encoder includes cascaded convolutional blocks, residual connections, pooling operations, positional encodings, and normalization layers, and outputs spatial feature maps or a pooled global feature vector that is projected into a shared embedding dimension (S302).

The text encoder is configured to receive tokenized textual inputs and to generate text embeddings using one or more recurrent, convolutional, or transformer-based language modules. The text encoder is configured to perform subword tokenization, apply embedding lookup, positional encoding, self-attention layers, and a final projection into the shared embedding dimension (S302).

The audio encoder is configured to receive raw waveform or time-frequency representations (such as spectrograms or mel-frequency cepstral coefficients) and to generate audio embeddings using temporal convolution, recurrent layers, and/or temporal attention mechanisms. The audio encoder projects its output into the shared embedding dimension (S302).

Prior to encoding, modality-specific preprocessing is performed on each input stream to normalize and condition data for downstream processing (S800). Image preprocessing can include resizing, color normalization, cropping, and artifact removal; text preprocessing can include tokenization, lowercasing, and removal of extraneous control characters; audio preprocessing can include resampling, denoising, silence trimming, and conversion to spectrogram representations (S802). Modality-specific consistency schemas validate the formats and basic properties of each modality prior to training and inference to ensure consistency across datasets (S804).

Training of the modality-specific modules follows progressive schedules and curriculum strategies that gradually increase task complexity and modality interactions (S402). Training is initiated with modality-specific pretraining on large unimodal datasets, proceeds with modality-pair fine-tuning, and concludes with full multimodal joint training. Automated hyperparameter search and optimization techniques are applied to identify optimal learning rates, regularization parameters, and architectural hyperparameters for each encoder and for the fusion modules (S404). To improve sample efficiency and generalization, the training pipeline incorporates synthetic training samples generated by generative models (S200), data augmentation techniques applied to real multimodal datasets (S202), and active learning to select informative instances for labeling (S204).

During model optimization and deployment preparation, computational efficiency techniques can be applied to the encoders. Model pruning according to relevance thresholds can reduce parameter counts and computational overhead while maintaining task performance (S104). Quantization of model parameters and activations can be applied to reduce memory footprint and accelerate inference (S500). Compressed models can be deployed to edge devices with constrained resources (S502) and executed using memory-efficient architectures and minimal-latency configurations (S504, S1002). Where appropriate, specialized hardware accelerators such as neural processing units, GPUs, or FPGAs can be utilized to accelerate execution of the encoders and fusion modules (S1004). For distributed training and inference, model computation can be segmented across a distributed set of compute nodes with dynamic allocation of resources in response to workload changes to maintain throughput and latency targets (S100, S102).

The described image, text, and audio encoders can be configured in various combinations and can interoperate with modality-specific modules and shared components; they can also be adapted to support additional modalities, alternative encoder architectures, and different fusion strategies without departing from the underlying principles of mapping modality-specific representations into a shared vector space and performing attention-based fusion to produce multimodal outputs (S302, S306).

The method, wherein progressive training schedules use curriculum learning. In one embodiment, progressive training schedules S402 applied to modality-specific modules S400 are implemented as curriculum learning schedules that present training samples, subtasks, or modalities in an order of increasing difficulty or complexity so as to accelerate convergence, improve final generalization, and reduce catastrophic interference between modalities. The curriculum can be defined at one or more granularities, including individual training examples, mini-batches, classes or labels, sub-tasks (for example, localization before classification), temporal segments of multimodal sequences, or entire modalities. A curriculum controller selects and sequences training inputs and tasks according to a curriculum policy that can be hand-designed, parameterized, or learned.

Difficulty metrics for examples or tasks can be computed using one or more criteria, including label-noise estimates, model confidence or entropy on a sample, loss magnitude under a current model, estimated annotation difficulty, amount of modality-specific missing data, degree of cross-modal misalignment as measured by temporal alignment error S304, and external heuristics such as signal-to-noise ratio for audio or image blur measures. Examples can be ranked by these difficulty scores and presented in increasing order, or grouped into bins of progressively greater difficulty. Difficulty can also be derived from synthetic transformations produced during data augmentation S202, with samples that are less distorted presented earlier in the curriculum and more heavily augmented or adversarially perturbed samples introduced later.

The curriculum policy is either static or adaptive. In a static curriculum, the schedule is predetermined (for example: train with easy examples for the first T epochs, introduce medium-difficulty examples for the next T epochs, and include hard examples for the remaining epochs). In an adaptive or self-paced curriculum, the system monitors performance metrics such as per-example loss, validation accuracy, or competence measures and adjusts the selection probability of each example or task. A common adaptive strategy raises the probability of presenting examples whose loss falls below a dynamic competence threshold, thereby exposing the model to harder examples only after it demonstrates sufficient competence on easier ones. Competence thresholds can be scalar or vector-valued to support per-modality or per-module progression, and can be increased according to a predetermined function (e.g., linear, exponential) or in response to observed validation performance plateaus.

Curriculum learning can be applied at the module level for modality-specific modules S400 by assigning distinct curricula to each modality. For example, a vision module can be trained initially on static single-frame classification tasks before exposure to spatiotemporal examples, while a language module can begin with brief, syntactically basic sentences and progress to longer, semantically complex passages. Module-level curricula can be coordinated to enable staged joint training: early phases freeze certain modules while others are trained, followed by gradual unfreezing and joint fine-tuning. This staged unfreezing supports transfer of learned representations and prevents destabilization of weaker modules during initial training. Progressive freezing and unfreezing can be combined with automated hyperparameter optimization S404 that adjusts learning rates and regularization parameters for each stage.

When training multimodal fusion components such as shared embedding generators S302 or attention-based fusion mechanisms S306, curriculum schedules can first teach each modality to produce robust unimodal embeddings before exposing the fusion layers to noisy or adversarial cross-modal inputs. For example, a training schedule can: 1) train each modality-specific module separately with its own curriculum until a competence threshold is reached; 2) train pairwise fusion heads on aligned, easy examples; and 3) train full multimodal fusion on increasingly difficult cross-modal alignment cases, including those requiring reasoning across modalities. Temporal alignment functions S304 can be simplified in early curriculum stages (e.g., coarse alignment) and progressively refined as the fusion mechanism learns to handle finer-grained temporal relationships.

Curriculum learning can be combined with sample reweighting and active learning S204. The curriculum controller is configured to upweight medium-difficulty samples that maximize expected information gain or to request labels selectively for examples near the curriculum transition boundary. When fairness constraints are present, curricula can be designed to balance representation across demographic or domain subgroups by scheduling underrepresented examples earlier or by maintaining a minimum exposure rate, thereby reducing bias amplification during staged training and supporting subsequent fairness detection and mitigation operations S600-S604.

Implementation details include a curriculum-aware data loader that computes or fetches difficulty scores, maintains per-example state (e.g., seen count, current weight), and samples mini-batches from a distribution that evolves over the course of training. The curriculum controller can interface with the optimizer to adjust learning rates, weight decay, or gradient clipping at curriculum-stage boundaries; such adjustments can be driven by automated hyperparameter search S404. Typical hyperparameters include an initial competence level (for self-paced learning), competence growth rate, stage duration measured in epochs or training iterations, minimum and maximum sample exposure rates, and thresholds for unfreezing modules. Example ranges found effective in practice include competence growth rates that increase linearly from 0.1 to 1.0 over 10-50 epochs, stage durations of 1-20 epochs depending on dataset size, and per-example sampling frequency limits to avoid overfitting to easy samples.

Curriculum learning can be implemented using teacher-student paradigms. A teacher model or module proposes curricula based on difficulty estimates or external feedback, while student modules follow the curriculum and report competence metrics. The teacher can be implemented as a separate lightweight model trained to predict which samples most effectively improve student performance, or as a heuristic scheduler. Reinforcement learning techniques can be employed to learn curricula policies that maximize validation performance throughout training, with rewards defined by downstream task metrics or convergence speed.

The curriculum framework supports multi-objective optimization in which curricula are tuned to simultaneously optimize accuracy, latency (for example when selecting reduced-latency architectures S1002), and resource usage in distributed training scenarios S100. Curriculum stages can be synchronized with dynamic resource allocation S102 so that earlier, less computationally demanding stages execute on constrained nodes while later compute-intensive fusion stages leverage additional compute resources. Curriculum-induced stage durations and compute assignments are therefore co-optimized.

Failure modes and mitigation strategies are described. Overly aggressive curricula that expose the model to hard examples too early can slow convergence; adaptive competence-based progression and validation-monitored stage transitions mitigate this risk. Excessive focus on easy examples can lead to poor generalization; to guard against this, curricula should include a persistent fraction of hard or diverse samples (a "mix-in" strategy) and periodically perform curriculum resets or annealed sampling to increase exploration. Curriculum schedules should be evaluated on holdout sets representing the full difficulty spectrum and on modality-specific benchmarks to ensure balanced performance.

Variants include curricula defined by curriculum shaping, where the difficulty function changes form over time (for example, from syntactic to semantic difficulty), and meta-curricula that govern multiple subordinate curricula for different tasks or domains. Curriculum learning can be combined with other progressive training methods such as knowledge distillation, progressive resizing of input resolution, progressive augmentation intensity, and progressive model growth (adding layers or capacity as training proceeds). These variants can be applied per-module S400 or globally and interact with quantization and edge deployment S500-S502 by enabling smaller models to be trained first and distilled into compressed architectures for deployment.

Example pseudocode summary: initialize per-example difficulty scores; for each training iteration, compute current competence threshold; sample mini-batch by selecting examples with difficulty below threshold with probability $p\_easy$ and above threshold with probability $1-p\_easy$; perform forward/backward updates on targeted module(s); update per-example statistics and competence estimate; if module competence exceeds unfreeze threshold, unfreeze downstream fusion layers and adjust learning rates. Logging and validation checkpoints monitor progression and enable rollback or curriculum adjustment.

The curriculum learning embodiment described can be applied across a wide range of multimodal systems, including vision-language models, audio-visual architectures, sensor fusion pipelines, and multi-task agents. By structuring progressive training schedules S402 around curricula that expose modules to gradually increasing complexity, the training method improves stability, reduces required labeled data for a given performance target (especially when combined with synthetic sample generation S200 and active selection S204), and facilitates efficient deployment of robust models to production and edge environments.

As used in the method, training of a module is stopped upon meeting predefined convergence criteria. In one embodiment, each modality-specific module (S400) is trained according to a progressive training schedule (S402) while a convergence monitor continuously evaluates one or more convergence metrics computed on held-out validation data or streaming validation signals. Convergence metrics include, for example, a validation loss, a validation accuracy or F1 score specific to the modality, the magnitude or moving average of gradient norms, the rate of change of model parameters, or a composite metric combining several measures. Convergence criteria can be expressed as absolute thresholds (e.g., validation loss below a threshold s), relative thresholds (e.g., percent change in validation metric below 8 over a window of N training iterations), patience-based early stopping (no improvement above 8 for N consecutive validation checks), or statistical tests indicating that recent improvements are not significant at a chosen confidence level. In some embodiments, multiple criteria are combined using logical operators so that stopping occurs only when a set of conditions is satisfied, thereby reducing spurious early stops.

The convergence monitor can operate locally within a training process or as a distributed service coordinating across compute nodes when model computation is segmented across a distributed set of compute nodes (S100). In distributed implementations the convergence monitor aggregates validation metrics from the workers, applies smoothing or windowing functions to reduce variance, and makes a stopping decision for the affected module. Upon deciding to stop training of a module, the system performs one or more state-management actions: creates and stores a checkpoint of the module weights and optimizer state, freezes the module weights to prevent further updates during downstream joint-training phases or inference, and records metadata describing the convergence event and the criteria satisfied. Checkpointing facilitates later resumption of training if required.

Stopping training of a converged module can be integrated with dynamic resource management. For example, when training of a given module is stopped, the system can reallocate compute resources (S102) previously assigned to that module to other modules still undergoing training, to hyperparameter search tasks (S404), to data augmentation or synthetic sample generation (S200, S202), or to accelerated evaluation routines. In resource-constrained deployments, frozen modules undergo further processing by pruning routines (S104) or quantization pipelines (S500) to reduce model size and computation prior to deployment (S502). In embodiments targeting edge inference, the system can trigger conversion of the stopped-and-frozen module into a memory-efficient architecture or a compressed artifact suitable for edge execution (S504, S502).

When modality-specific modules are later fused (S306) into a multimodal model, stopping individual modules upon convergence is coordinated to preserve overall system performance. If fusion training or joint fine-tuning is required, the system can selectively unfreeze modules according to joint validation metrics in the shared embedding space (S302) or on the basis of temporal alignment performance (S304). To prevent degradation of fused performance, the convergence monitor can include cross-module checks that evaluate the impact of freezing a module on end-to-end metrics; if an adverse impact is detected, the system can delay stopping or schedule additional joint training. Where inference latency is a priority, stopping and freezing modules can be combined with selection of reduced-latency architectures (S1002) and with utilization of specialized hardware for accelerated execution (S1004).

Implementation details include placement of convergence checks at configurable intervals (for example, after each epoch, after M mini-batches, or upon completion of validation sets). The convergence logic can be implemented as callbacks in the training loop, as a centralized controller in distributed training, or as part of an automated training scheduler that interfaces with hyperparameter search (S404). Thresholds and patience parameters can be learned or tuned automatically via meta-optimization; alternatively, adaptive thresholds can be employed, where the system tightens stopping criteria as training progresses. For robustness, convergence detection can employ smoothing (moving averages), outlier rejection, or confidence intervals to reduce sensitivity to transient validation noise.

The system also supports reversible stopping policies. If downstream monitoring of deployed or fused-model outputs indicates distributional changes or performance drift (S902, S900), the system is configured to trigger retraining of previously stopped modules. Resumption can use the stored checkpoint and can commence on-demand or after a retraining criterion is satisfied (for example, a drift magnitude exceeding a threshold). Prior to resumption, the system is configured to re-evaluate training schedules and resource allocation to determine whether full retraining, incremental fine-tuning, or targeted parameter updates are most appropriate. In some embodiments, stopping upon convergence is combined with fairness and bias controls (S600-S604): when convergence is detected, the system evaluates fairness-related metrics on validation subsets and, if fairness constraints are not met, continues or reconfigures training with reweighting or constrained loss terms rather than stopping.

These measures collectively enable adaptive, per-module early stopping that reduces unnecessary computation, supports efficient allocation of training resources, and preserves or improves end-to-end multimodal performance, while providing mechanisms for reliable resumption and downstream optimization, including pruning, quantization, and deployment to resource-constrained platforms.

Hyperparameter optimization (S404) can be carried out using Bayesian optimization. In such implementations, a surrogate probabilistic model is maintained to approximate the relationship between hyperparameter configurations and an objective metric, for example validation loss, accuracy, inference latency, or a composite score combining multiple objectives. The surrogate model can be a Gaussian process, a random forest, a Bayesian neural network, or another regression model that provides both a mean prediction and an uncertainty estimate for unseen hyperparameter settings. The surrogate is iteratively updated as actual evaluations of the underlying multimodal model or modality-specific modules (S400) become available.

An acquisition function defines which hyperparameter configuration should be evaluated next based on the surrogate model's predictions and uncertainties. Representative acquisition functions include Expected Improvement (EI), Probability of Improvement (PI), UCB (a confidence-bound strategy), and information-theoretic criteria such as mutual information. The acquisition function is optimized to select the next configuration to evaluate, balancing exploration of uncertain regions of the hyperparameter space against exploitation of regions expected to yield improvements. Optimization of the acquisition function can be performed using gradient-based methods, multi-start local search, evolutionary algorithms, or grid/latin-hypercube seeding followed by local refinement.

The hyperparameter space subject to Bayesian optimization can include continuous, integer, categorical, and conditional parameters. Continuous parameters include learning rates, weight decay coefficients, and momentum terms.

Integer parameters include the number of layers, the number of attention heads, and batch sizes. Categorical parameters include optimizer choice, activation function, or fusion strategy for combining modality embeddings (S306). Conditional parameters are supported by modeling conditional dependencies in the search space or by employing surrogate models and acquisition functions adapted for hierarchical parameter structures (for example, tree-structured Parzen estimators or bespoke encodings of categorical variables). Encoding schemes such as one-hot, ordinal embedding, or learned embeddings can be used to represent categorical variables in the surrogate model.

Bayesian optimization can be applied at multiple granularities. In one approach it is applied globally to tune hyperparameters that span the entire multimodal architecture, including fusion parameters (S306) and shared optimizer settings. In another approach, hyperparameter optimization is performed per-modality or per-module (S400), whereby distinct Bayesian optimization processes tune parameters specific to modality-specific modules while a higher-level Bayesian optimizer tunes inter-module fusion and system-level parameters. Progressive training schedules (S402) can be integrated with the Bayesian loop so that coarse evaluations use brief, reduced-fidelity training runs and promising configurations are escalated to longer, higher-fidelity training. Multi-fidelity Bayesian optimization variants, including Hyperband-accelerated Bayesian optimization (BOHB) or successive halving guided by surrogate models, reduce computation by allocating more resources to promising candidates based on intermediate performance signals.

To accommodate distributed computation (S100) and dynamic allocation of compute resources (S102), Bayesian optimization is implemented within an asynchronous parallel evaluation framework. An asynchronous Bayesian optimization controller issues hyperparameter configurations to a pool of worker nodes for evaluation; completed evaluations are returned to the surrogate model, which is updated incrementally. Batch and asynchronous candidate-selection techniques, such as q-EI or fantasizing/adaptive-Thompson-sampling approaches, are used to preserve sample efficiency under parallelism and to reduce idle resources. Acquisition evaluations and surrogate updates are coordinated to ensure scalability across distributed compute nodes.

Practical considerations for robustness and efficiency include initialization strategies, stopping criteria, and mechanisms for handling noisy evaluations. The initial set of hyperparameter evaluations can be obtained through random sampling, Latin hypercube sampling, or by seeding with configurations drawn from prior experiments. Stopping criteria can consist of a fixed budget of evaluations, convergence of the surrogate's expected improvement below a threshold, attainment of a target performance level, or identification of resource constraints. Noisy objective evaluations—arising from stochastic training or variable data subsets—are handled by modeling observation noise in the surrogate, performing repeated evaluations, or using acquisition functions designed to be robust to noise.

Bayesian optimization can be augmented with domain knowledge and constraints. Priors over hyperparameter regions can encode previously observed useful ranges (e.g., typical learning rates or dropout probabilities), and hard or soft constraints can prevent selection of configurations that violate latency or memory budgets (for example, constraints based on target edge device capacities when deploying compressed models (S502) or memory-efficient architectures (S504)). Multi-objective Bayesian optimization techniques are employed when tradeoffs are desired; for example, simultaneously optimizing accuracy and inference latency (S1002) produces a Pareto front of solutions for selection based on deployment priorities.

Integration with automated hyperparameter search (S404) includes logging, reproducibility, and federated or centralized experiment management. Each hyperparameter evaluation records configuration details, random seeds, training and validation metrics, resource usage, and provenance metadata for subsequent analysis and retraining. Checkpointing and warm-start capabilities allow continuation of interrupted evaluations and sharing of learned parameters across similar configurations to accelerate evaluation. Early-stopping heuristics based on intermediate learning curves or extrapolation reduce wasted computation by terminating poorly performing trials early.

Regularization is applied separately to each modality-specific module (S400) so that modality-dependent characteristics and failure modes are addressed without unduly constraining other modules. For each module a tailored regularization term is added to the training objective; the total loss for training is the sum of the task loss and the per-module regularization terms. Per-module regularization can take the form of standard L2 (weight decay) or L1 penalties on the parameters of the respective module, dropout applied to module-specific layers, spectral norm constraints on weight matrices, batch- or layer-normalization regularizers, or structured sparsity penalties (for example group-lasso) that encourage channel- or block-wise sparsity appropriate to the module architecture.

The selection and configuration of the regularizer for a given module are determined according to the modality and module architecture. For example, a convolutional visual module is configured to employ a combination of channel-wise group-lasso and spatial dropout to encourage sparse and robust feature maps, whereas a language transformer module is configured to use layerwise weight decay combined with spectral norm constraints and attention-dropout. Audio or sensor modules are configured to apply temporal smoothing penalties to recurrent or convolutional kernels to encourage temporally coherent filters. Embedding modules that generate shared vector representations (S302) include explicit embedding-norm regularization to bound embedding magnitudes and prevent any single modality from dominating during later fusion (S306).

Regularization strengths and types are configurable per-module and can be adjusted during training according to progressive schedules (S402). During early stages of training stronger regularization (larger weight decay, higher dropout) can be applied to modules prone to overfitting, with schedules that anneal regularization coefficients as modules converge. Conversely, during fine-tuning a smaller or different regularizer can be applied to feature extractors while more aggressive regularization is applied to newly added classifier heads. These per-module schedules can be coordinated with progressive training of modules (S402) so that modules brought online at different times receive appropriate regularization profiles.

Automated hyperparameter search (S404) is used to select regularization hyperparameters on a per-module basis. The automated search treats each module's regularizer type and magnitude as distinct hyperparameters and performs joint or hierarchical optimization to identify combinations that optimize validation metrics while respecting constraints such as model size, latency, and fairness. The optimizer can create separate optimizer parameter groups for each module so that learning rates, momentum, and weight decay are applied independently during backpropagation (for example, by partitioning optimizer param_groups so that per-module weight decay is applied only to the parameters of that module).

Per-module regularization is integrated with model compression and pruning operations (S104, S500). Structured sparsity or magnitude-based regularizers applied module-wise facilitate module-specific pruning that preserves modality-relevant capacity; pruning thresholds and schedules can differ across modules so that, for example, a vision module retains capacity for multidimensional visual features while a speech module is pruned more aggressively. When quantization-aware training is required for deployment to edge devices (S502), module-specific quantization regularizers and straight-through estimators are applied during training to minimize accuracy loss in each module and to ensure compatibility with memory-efficient inference architectures (S504). Regularization terms that encourage parameter distributions suitable for reduced-bit representations are applied exclusively to modules targeted for aggressive compression.

Where modules interact through cross-modal objectives (for instance via attention-based fusion (S306) or contrastive alignment of embeddings (S302)), regularization is still applied separately but coordinated with cross-module losses. For example, a module-specific reconstruction or denoising regularizer can be combined with a separate, smaller cross-modal alignment regularizer; the modular regularizers prevent individual modules from overfitting to the cross-modal objective while the alignment term ensures consistent embedding geometry. In systems that perform active learning or synthetic augmentation (S200, S204), per-module regularization can be adapted based on the provenance and noise characteristics of the training samples (S800, S802), applying stronger regularization to modules that receive noisier inputs.

Implementation details for per-module regularization include associating explicit regularization-coefficient metadata with each module so that training code applies the appropriate penalty during gradient computation; maintaining module-specific optimizer groups; and exposing module-level regularization schedules and hyperparameters to automated search and monitoring systems (S900, S904). Early stopping criteria together with module-specific validation metrics are used to terminate or relax regularization for a module once that module's validation performance plateaus. During asynchronous or distributed training (S100, S1000), modules trained on different compute nodes use locally tuned regularization parameters that are reconciled periodically through centralized hyperparameter management (S102, S404).

Per-module regularization also enforces application-level constraints, such as fairness or interpretability. Fairness constraints (S604) are instantiated as per-module reweighting or regularizers that penalize disparities arising from a specific modality; for example, a modality that correlates with a protected attribute is regularized more strongly to reduce its influence, or a dedicated adversarial regularizer is applied to that module to remove sensitive information. Interpretability objectives impose sparsity or structured constraints on specific modules to encourage localized, human-interpretable features.

Finally, monitoring and lifecycle management adjust per-module regularization in response to drift and operational signals. Distributional change detectors (S900) and retraining triggers (S902) can initiate re-tuning of module-specific regularizers when a particular modality's input distribution shifts. Periodic benchmarking (S904) measures the effect of module-level regularization on end-to-end reliability and efficiency; these measurements feed back to automated hyperparameter search (S404) and progressive training schedules (S402) to maintain an optimal balance between generalization, resource usage, and deployment constraints (S1002, S504).

In an embodiment of the method, training samples are dynamically reordered at runtime based on per-sample loss gradients to prioritize examples that are currently most informative for model update. For each incoming sample or mini-batch, a per-sample loss is computed during the forward pass. During or immediately after the backward pass, a per-sample gradient metric is derived for each sample. The gradient metric can be the L2 norm of the sample gradient with respect to a selected subset of model parameters, the maximum absolute gradient value across parameters, a weighted combination of gradient norms across layers, or an influence estimate derived from a first-order approximation. Per-sample gradient metrics are stored in an auxiliary data structure, e.g., a bounded priority buffer, a sliding window, or a reservoir with timestamps, that maintains recent gradient statistics for the training corpus or for the data shard processed by the current compute node.

A score is assigned to each sample based on the stored gradient metric and, optionally, on secondary measures such as recent loss magnitude, label uncertainty, age since last selection, and representational diversity. The score can be computed as a smoothed moving average: $score\_t = alpha*metric\_t+(1-alpha)*score\_\{t-1\}$, where alpha is a smoothing coefficient (for example 0.05 to 0.5). A decay term can be applied to reduce the priority of samples that have been repeatedly selected and thereby avoid overfitting. Samples with scores above a configurable threshold tau, or within the top-k percentile of scores, are preferentially scheduled into upcoming mini-batches.

Dynamic reordering can be applied at different granularities. In one mode, mini-batch composition is altered by selecting top-scoring samples for the leading positions within a batch to ensure they contribute to the early gradient aggregation. In another mode, the order of entire mini-batches is rearranged so that batches containing a greater concentration of top-scoring samples are processed earlier during an epoch. Micro-batching techniques can be used to approximate per-sample gradients in computationally constrained settings: a large mini-batch is subdivided into micro-batches, and gradient statistics are accumulated per micro-batch to infer sample-level or group-level priorities. When full per-sample gradients are infeasible, proxy metrics such as loss magnitude, change in loss across iterations, or gradient-sign agreement with recent model updates can be used to approximate informativeness.

To support distributed training, each compute node periodically shares summarized gradient statistics or top-k sample identifiers with a centralized scheduler or via a decentralized gossip protocol. The scheduler merges these summaries into a global prioritization map and returns reordering directives to the nodes. To reduce communication overhead, nodes send compact representations such as quantized gradient norms, sketches, or hashed identifiers of top-ranked samples. Synchronization frequency is tunable: synchronous reordering occurs every N iterations to maintain consistency across nodes, while asynchronous reordering permits local nodes to operate with slightly stale priority information to increase throughput.

The dynamic reordering mechanism includes safeguards to prevent bias amplification and catastrophic forgetting. A fairness-aware constraint may enforce minimum selection frequencies for underrepresented classes or demographic groups, and constrained optimization may be used to keep the selection distribution close to a specified target distribution. A minimum reserve is maintained: a fraction r of each mini-batch is sampled uniformly at random from the entire dataset or from a rebalanced pool to preserve coverage. Additionally, a cap on how often any single sample can be promoted by the priority mechanism within a rolling window prevents over-sampling of outliers or noisy examples.

Integration with active learning is achieved by combining gradient-based reordering with uncertainty and informativeness metrics used in labeling workflows. Samples exhibiting significant gradient scores together with elevated predicted label uncertainty can be flagged for human labeling or placed into a priority training queue. The system also incorporates labeled-unlabeled interplay: for semi-supervised training, unlabeled samples with substantial gradient signals can be pseudo-labeled and assigned reduced selection weight relative to confirmed labels until confidence thresholds are satisfied.

Samplemini-batch $B\_t$
Computepredictions $\hat{y}\_i\hat{\ }t$ for $i \epsilon B\_t$
Computelosses $\ell \_i\hat{\ }t$ for $i \epsilon B\_t$
Computeweighted batch loss $L\_B\hat{\ }t = \Sigma\_\{i \epsilon B\_t\} \ w\_i\hat{\ } \ell \_i\hat{\ }t/\Sigma\_\{i \epsilon B\_t\}w\_i\hat{\ }t$
$\leftarrow$Optimizer $(L\_B\hat{\ }t, \theta\hat{\ }t)$
Computegroup metrics $\mu\_group\hat{\ }t$ and bias indicators $b\_i\hat{\ }t$ using updated predictions
Computeproposed raw weights $\tilde{w}\_i\hat{\ }\{t+1\}=g(w\_i\hat{\ }t, \ell \_i\hat{\ }t, b\_i\hat{\ }t)$
$=$Clip$((1-\alpha) \ w\_i\hat{\ }t+\alpha \ \tilde{w}\_i\hat{\ }\{t+1\}, \ w\_min, \ w\_max)$
Ifsynchronization required (S100), synchronize weights across nodes
Ifconvergence criteria met, break Embodiments can schedule weight updates less frequently than parameter updates to reduce computation or communication overhead; for example, weights can be updated once per epoch while parameters are optimized per mini-batch. Alternatively, weight updates can be triggered adaptively in response to measured distributional drift (S900).

Alternative embodiments use a meta-learning approach in which a separate reweighting network r_φ(•) parameterized by q is trained jointly or alternately with the primary model parameters θ. The reweighting network takes as input features derived from x_i, y_i, model confidence, and subgroup metadata m_i to output a weight w_i=r_φ(x_i, y_i, ŷ_i, m_i). The reweighting network is trained to minimize a validation loss or fairness metric; its parameters φ are updated by backpropagating through the weighted training updates (meta-gradient), enabling automated learned reweighting that adapts iteratively during training.

Iterative reweighting is extensible to multimodal inputs received from at least two modalities (S300) by maintaining modality-specific or modality-group weights and combining them with per-sample or per-group weights. Embedding synchronization (S304) and fusion mechanisms (S306) provide additional signals, such as cross-modal disagreement, that inform weight updates. Progressive training schedules (S402) and automated hyperparameter searches (S404) tune reweighting hyperparameters such as η, α, τ, and clipping bounds.

Iterative reweighting is also compatible with provenance tracking and output screening (S700, S702, S704). Instances whose provenance indicates potential copyright or ethical concerns can be assigned reduced initial weights or excluded, and the iterative reweighting process will continue to adjust these assignments based on observed model behavior.

These embodiments enable a practitioner skilled in the art to implement iterative reweighting during training to reduce dataset bias, balance representation, and satisfy fairness constraints while maintaining training stability and computational efficiency. Tunable parameters, bounds, and smoothing mechanisms are provided to ensure convergence and to permit deployment across a range of environments, including distributed compute clusters and resource-constrained edge devices.

An audit logging facility is provided to record and maintain provenance and fairness-related information for events and state changes that occur across the data collection, preprocessing, training, deployment and inference lifecycle. The audit logs capture, for each recorded event, a timestamp, an event type identifier, identifiers for the subject model and dataset, the relevant pipeline component(s) (for example data preprocessing (S800), outlier filtering (S802), modality-specific validation (S804), bias detection (S600), reweighting (S602), retraining (S604), training operations such as synthetic sample generation (S200) or active learning selections (S204), model segmentation or distribution across compute nodes (S100), hyperparameter search results (S404), parameter pruning thresholds (S104), quantization parameters (S500), and deployment targets including edge device identifiers (S502)). Each log entry further includes one or more artifact references such as content hashes or cryptographic digests of datasets, model binaries, or configuration snapshots, and links to embedded provenance metadata (S704) where available.

During model training and optimization, the audit logs record training configuration snapshots including model architecture identifiers, modality-specific modules (S400), progressive training schedules (S402), any automated hyperparameter search results (S404) and the hyperparameters ultimately selected, pruning operations and thresholds (S104), and intermediary model checkpoints. Fairness-related constraints applied during training (for example fairness-regularization terms or constrained loss formulations referenced by S604) are recorded, including their mathematical form, coefficient values, and the training epochs at which they were engaged. The audit logs also include performance and fairness metrics for validation and test runs at each checkpoint (for example accuracy, false positive/negative rates per subgroup, demographic parity, equalized odds), enabling reconstruction of model behavior over training time.

When models are compressed or prepared for deployment, operations such as quantization (S500), model compression, and packaging for edge deployment (S502) are logged with details on the compression parameters and resulting model size and performance tradeoffs. For edge and memory-efficient inference (S504), the logging facility supports storing aggregated or sampled inference records suitable for bandwidth- and privacy-constrained devices: these records include the model version, anonymized or aggregated per-modality input statistics, inference timestamps, and fairness-relevant outcome distributions. Logs produced on-device are cryptographically signed where feasible and uploaded asynchronously in batches (S1000) or according to a reduced-latency policy (S1002) using specialized hardware-assisted secure channels (S1004), with any local masking or anonymization steps recorded.

The audit logs are designed to be tamper-evident and support chain-of-custody requirements: each log entry includes a cryptographic signature or hash chain pointer, an identifier of the logging agent, and optional anchoring into an external immutable store or ledger. Access control metadata is recorded for each log entry to track which principals have queried or exported fairness logs. Retention policies, archival actions, and purge events are also logged to maintain compliance with data governance rules.

To preserve individual privacy while enabling fairness tracking, the logging facility supports configurable anonymization and aggregation modes. Per-instance identifiers can be replaced with reversible pseudonyms held in a secure secrets store, or with irreversible digests when linkage is not required. Differential privacy mechanisms can be applied to aggregated fairness metrics before export; the audit logs record the parameters of such privacy-preserving mechanisms (for example epsilon values and noise seeds) so that auditors can interpret reported metrics correctly.

The audit logs are queryable via programmatic interfaces and are structured to support automated fairness reporting and compliance checks. Predefined queries and report templates compute historical trends of fairness metrics, correlate fairness metric changes with pipeline events (for example a data augmentation run (S202) or a hyperparameter change (S404)), and identify model versions and datasets associated with specific fairness degradations. Alerts and triggers are configurable to generate notifications or to initiate automated remediation actions such as reweighting (S602) or retraining (S902, S604) when logged fairness metrics cross configurable thresholds. The logs also feed into periodic benchmarking and reliability evaluations (S904) and support retrospection during model governance reviews.

For multimodal systems, each log entry includes modality-specific schema fields as defined by the validation schemas (S804), and records synchronization and temporal alignment operations (S304) and fusion decisions (S306) that are relevant to fairness analyses (for example when performance disparities are modality-dependent). The logging facility is configured to integrate with output screening and provenance tools (S700, S702, S704) so that detected similarity, watermarking, or provenance annotations are linked to subsequent fairness audits.

The audit logs support both human review and automated analysis. They are stored in a structured machine-readable format to permit statistical aggregation and downstream machine learning analyses for meta-monitoring of fairness over fleets of models and deployments. Aggregated log summaries can be generated on demand or on a scheduled basis and can be retained separately to satisfy regulatory archival requirements while sensitive raw logs remain access-controlled and encrypted.

Upon generation of a bias detection event, the system initiates a retraining workflow (S604) that is configured to mitigate the detected bias. Retraining is triggered automatically by the detection component, or is gated by a configurable human-in-the-loop approval step. The retraining workflow accepts as input the recorded metadata describing the bias event, the currently deployed model parameters, and the relevant datasets or data slices flagged by the detection process. The retraining workflow also consults deployment constraints such as latency targets or compute budgets to select an appropriate retraining strategy.

One retraining strategy comprises dataset-level interventions. The system can rebalance the training set by reweighting samples according to inverse-probability or fairness-aware weighting schemes (S602). In one example, sample weights w_i are assigned as a function of subgroup representation such that $w\_i=f (1/(p\_g+epsilon))$, where p_g is the empirical proportion of subgroup g in the training set and epsilon is a nonzero constant to avoid instability. Alternative weighting strategies include loss reweighting based on subgroup-specific error rates or importance sampling to preferentially include underrepresented or poorly performing instances. When reweighting alone is insufficient, the retraining workflow can augment data for underrepresented subgroups by generating synthetic training samples using generative models (S200) or by applying targeted augmentation techniques to existing multimodal datapoints (S202). Active learning (S204) can be invoked to solicit labels for the most informative or uncertainty-inducing instances, prioritizing examples that reduce the observed disparities.

Human oversight and governance are supported throughout the bias-detection-triggered retraining pipeline. The system presents interpretable explanations for detected biases, displays representative counterexamples, and recommends candidate mitigation steps (for example, reweighting, synthetic augmentation, or fairness-constrained loss). Operators can accept, modify, or reject automatic remediation recommendations. Governance rules require human approval for retraining that exceeds a defined scope (for example, models that affect safety-sensitive decisions or when mitigation requires collection of new sensitive-attribute labels).

In embodiments involving multimodal systems, bias detection and retraining operate across modalities. The system preprocesses inputs (S800), detects and filters outliers (S802), and validates modality-specific consistency schemas (S804) prior to retraining. Bias metrics are computed per modality and on fused outputs; when bias is localized to a particular modality, retraining focuses on modality-specific modules (S400) using progressive schedules (S402) without retraining the entire multimodal fusion stack. Embeddings generated into a shared vector space (S302) are examined for subgroup separability as a diagnostic signal; where separability indicates representational bias, adversarial or regularization approaches target the embedding layers and the attention-based fusion mechanisms (S306) during retraining.

Finally, continuous improvement is supported by automated hyperparameter optimization (S404) that selects reweighting coefficients, fairness regularization strengths, augmentation intensities, and learning rate schedules for retraining runs. The system can maintain a historical record of retraining outcomes and use that record to inform future bias detection thresholds and remediation strategies, thereby improving the efficiency and effectiveness of bias-triggered retraining over time.

The system further comprises validation on third-party ethical benchmarks, wherein outputs and intermediate model artifacts are evaluated against independently maintained benchmark suites to establish conformity with externally defined ethical criteria. In one embodiment, the validation module obtains benchmark definitions and test data from one or more third-party providers and executes a standardized evaluation pipeline that computes a plurality of ethical metrics, such as demographic parity, equalized odds, false positive/false negative rate disparities, toxicity scores, privacy leakage measures, and robustness indicators. Results from the third-party benchmark evaluations are stored together with provenance metadata (S704) and a cryptographic signature or timestamp supplied by the third-party provider to authenticate the origin and integrity of the benchmark results.

The benchmark validation is integrated into both the training and deployment workflows. During training, after generating synthetic training samples (S200) and/or applying data augmentation to real multimodal datasets (S202), the model is evaluated on the third-party ethical benchmarks prior to progressing to subsequent training stages. If metric values exceed a predefined relevance or compliance threshold, automated mitigation actions are triggered, which can include reweighting samples to balance representation (S602), applying fairness constraints within the loss function and retraining (S604), pruning or adjusting model parameters (S104), or altering the data selection via active learning (S204). Validation outcomes and any corrective actions are logged to enable auditing and to provide a traceable record of conformity efforts (S704).

The third-party benchmark validation module supports multimodal inputs (S300) by applying modality-specific consistency and evaluation schemas (S804) before executing benchmark tests, and by mapping modality-specific ethical concerns into a unified reporting framework. For multimodal embedding and fusion architectures (S302, S306), benchmark tests include assessments of cross-modal bias propagation, where synthetic or real-world multimodal test instances are evaluated to detect whether biases in one modality degrade fairness or safety in fused outputs. Temporal alignment functions (S304) are used when benchmarks include temporally correlated scenarios to ensure that temporal consistency requirements are met.

Benchmark selection and configuration are configurable and extensible. The system maintains a registry of approved third-party benchmarks and their associated versions, test suites, and metric definitions. A verifiable chain of custody is maintained for benchmark artifacts and evaluation results via embedded metadata (S704) and optional secure logging. Benchmark versions, evaluation timestamps, and metric thresholds are recorded and surfaced in compliance reports to facilitate audits by regulators or contracting parties. The system can optionally require benchmarks to be listed in an approved registry or to meet predefined accreditation criteria before being used as a gating benchmark.

Reporting from third-party benchmark validation includes detailed breakdowns by demographic slices, modalities, and scenario types, enabling targeted identification of weaknesses. When bias or other ethical issues are detected, the system provides automated remediation pathways such as dataset rebalancing, targeted data collection, adaptive loss reweighting (S602), adversarial debiasing, and constrained optimization approaches integrated into training (S604). Remediation actions are evaluated in subsequent benchmark runs to confirm effectiveness before approval for deployment. If remediation proves insufficient, the system restricts deployment to contained or monitored environments and/or applies additional output screening such as perceptual hashing or content similarity checks (S700) and watermarking (S702) to ensure traceability.

The third-party benchmark validation further interfaces with model deployment controls. Compressed and quantized models intended for edge deployment (S500, S502) are subjected to the same benchmark validations in representative edge execution environments to confirm that optimization and quantization have not introduced unacceptable ethical degradations. Latency-optimized inference architectures and specialized hardware paths (S1002, S1004) are included in the validation matrix where deployment targets differ. Validation results can be used to select appropriate model variants for given target environments, thereby preventing deployment of variants that fail to meet ethical benchmarks under realistic runtime constraints.

Multiple embodiments allow flexible automation levels: fully automated pipelines that execute third-party benchmark validation and take predefined corrective actions, or semi-automated pipelines that escalate failed validations to human reviewers. Audit logs, benchmark artifacts, and validation outcomes are retained in the system to support post-hoc analyses, reproducibility of evaluations, and regulatory compliance. The system supports exporting validation reports in machine-readable and human-readable formats and can expose validation status via APIs to external governance dashboards.

Alternative implementations include federated or distributed evaluation of third-party benchmarks where sensitive data cannot be centralized. In such implementations, the system coordinates distributed execution of benchmark tests across compute nodes (S100) and aggregates metric summaries while preserving data locality and privacy. Aggregated results and signed attestations from participating nodes are combined to produce an overall benchmark compliance decision.

The described integration of validation on third-party ethical benchmarks provides continuous, auditable, and externally anchored assurance that model behavior conforms to independently defined ethical standards, and enables automated and human-mediated responses to deficiencies detected during training, evaluation, deployment, and in-service monitoring (S900, S902, S904).

Fairness constraints are dynamically updated by a closed-loop process that continuously monitors model behavior and input data distributions and adjusts constraint parameters in response to detected bias or distributional changes (S600, S900). A monitoring component computes group- and cohort-specific performance metrics (e.g., false positive rate, false negative rate, calibration error, disparate impact) across modalities and time windows, and applies statistical tests to detect significant deviations from target fairness criteria (S600, S900). Upon detection of bias or drift that exceeds configurable thresholds, the system generates an update signal that is consumed by a fairness-management module that adjusts one or more parameters of the fairness constraints applied during learning and inference (S902, S604).

Dynamic updating is driven by both offline batch processes and online streaming updates. For offline pipelines, a retraining scheduler triggers full or partial retraining of modality-specific modules (S400) or the fused multimodal model when persistent bias is detected, using reweighted or augmented datasets (S602, S200, S202) and fairness-aware loss functions (S604). For online or latency-sensitive deployments, the system supports incremental updates to constraint parameters and lightweight on-device adaptations that do not require full model replacement, for example by adjusting per-group calibration layers, thresholding rules, or output post-processing steps on edge devices (S502, S504, S1002). Asynchronous batch processing and event-driven updates are supported to accommodate streaming inputs and heterogeneous latency requirements (S1000).

Human-in-the-loop and governance controls are incorporated to manage automated changes. Update proposals generated by automated monitors are logged with provenance metadata (S704) and are either subjected to approval workflows or auditing prior to deployment to production, or are applied automatically under predefined policy conditions. Each applied update is recorded along with the data, metrics, and the update rationale so that subsequent benchmarking and reliability evaluation can attribute model changes to specific fairness interventions (S904).

To improve the signal for updating constraints, the system augments the training dataset with synthetically generated samples targeted at affected groups or selectively requests new labels via active learning to reduce uncertainty in minority cohorts (S200, S204). Data augmentation and modality-specific validation schemas are used to ensure that synthetic or newly labeled samples are consistent and do not introduce spurious correlations (S202, S804). When the model processes multiple modalities, fairness constraints are applied and tuned per modality (S300, S400) and coordinated via the fusion module (S302, S306) so that modality-specific biases are mitigated without degrading cross-modal performance.

Automated hyperparameter search and progressive training schedules are employed to identify stable configurations for dynamic updates. The system explores schedules, learning rates, and constraint magnitudes via automated search and validation loops that evaluate both fairness and utility metrics (S404, S402). Stability mechanisms—such as threshold hysteresis, minimum update intervals, and constraint smoothing—are applied to prevent oscillatory behavior arising from transient measurement noise or temporary distributional fluctuations (S900). Confidence-based gating and statistical significance testing are performed before committing updates to reduce the risk of overfitting to ephemeral patterns.

When model compression and edge deployment are relevant, updated fairness constraints are incorporated during compression and quantization to preserve fairness guarantees in the deployed artifacts (S500, S502). The fairness-management module maintains lightweight adaptive components or configuration parameters that can be transmitted to edge devices to adjust inference-time behavior without redeploying the full compressed models.

Dynamic updating is integrated with routine reliability monitoring and drift-triggered retraining. If monitoring determines that updates to fairness constraints do not remediate measured disparities, the system escalates to more substantial interventions including more comprehensive retraining, architecture adjustments, or changes to data-collection policies (S902, S904). The system supports multiple fairness definitions (e.g., demographic parity, equalized odds, calibration) and can select or weight definitions dynamically based on application policy, regulatory requirements, and empirical performance, with the choice and rationale recorded for auditability.

Implementation details include maintaining per-group counters and running estimates of metric variances, computing confidence intervals for disparity measures, and using those estimates to determine the magnitude and direction of constraint updates. The fairness-management module exposes APIs for external governance tools and for human review, and is configurable to operate in fully automated, semi-automated, or manual modes depending on application sensitivity. All updates and their impacts on model outputs are logged and associated with provenance metadata to enable post-hoc analysis and remediation if unintended consequences arise (S704).

Human review of outputs for bias is incorporated as an integral stage of the system workflow. In one embodiment, outputs produced by the model are first screened automatically for similarity to known works and for indications of biased content using perceptual hashing and statistical bias-detection modules (S700, S600). Instances flagged by the automated screening are queued for human review. Human reviewers operate via a review interface that presents the model output alongside contextual information including the input data, the model provenance metadata (S704), the similarity score from perceptual hashing (S700), any watermarking information (S702), the model version, and relevant dataset statistics used during training. The review interface provides reviewers with tools to annotate the output with labels relating to types of bias (for example, demographic stereotyping, underrepresentation, offensive content), a severity score, and recommended corrective actions (for example, accept, modify, redact, escalate for legal review, or mark for retraining). Reviewers can also tag the output with rationale notes and attach links to example reference materials that justify the labeling.

Human review can be implemented in a tiered review pipeline. In a first tier, a single reviewer assesses the flagged instance and assigns a preliminary label and action. If the preliminary label meets or exceeds a configured severity threshold or if reviewer confidence is below a configured threshold, the instance is escalated to a second-tier panel for consensus review. Consensus review requires agreement by a configurable majority of reviewers or agreement by reviewers with designated expertise in fairness and bias mitigation. All reviewer decisions, timestamps, reviewer identifiers (anonymized or pseudonymized as required), and associated annotations are recorded in an audit log that is linked to the output's provenance metadata (S704). The audit log permits traceability of decisions and supports compliance and post-hoc analysis.

Feedback collected from human review is fed into downstream processing in multiple ways. Instances labeled for retraining are added to a curated training dataset with human-provided bias labels and corrective annotations. The system applies active learning (S204) to prioritize which model outputs or which input distributions are most informative for human annotation efforts, thereby reducing labeling cost while improving fairness. During retraining, sample reweighting (S602) is applied to increase representation of underrepresented groups or contexts indicated by human reviewers. Retraining is performed with fairness constraints incorporated into the loss function (S604) and with validation against modality-specific consistency schemas (S804), such that corrective actions recommended by human review are reflected in subsequent model updates.

In another embodiment, human review acts as a safety valve prior to deployment of generated content to end users or downstream systems. Outputs that pass automated screening but are intended for impact-sensitive use cases are routed to human reviewers for pre-release approval. The system provides configurable policies that determine which outputs require mandatory human review based on factors such as detected bias score, target audience sensitivity, regulatory context, or deployment environment (for example, edge devices with limited capacity (S502) or automated decision systems with significant consequences). The policy engine records policy-triggering conditions in the provenance metadata (S704) and enforces gating so that content is not released until required human approvals are recorded.

Human reviewers can also participate in the calibration of the automated bias-detection algorithms. Periodic sampling of human review annotations is used to evaluate and update the statistical models that detect bias (S600) and the thresholds for perceptual-hashing similarity (S700). Automated retraining of the bias-detection classifiers can be scheduled in response to drift detection (S902) or to maintain performance as measured by periodic benchmarking (S904) against curated fairness test suites. The system further supports continual-learning workflows in which human annotations are incorporated incrementally, enabling the bias detectors and the main multimodal model to evolve while preserving historical auditability.

Operational considerations for human review are included to facilitate scalable, reliable, and privacy-preserving implementation. Reviewer assignment logic balances workload and expertise, ensures separation of duties when required, and enforces access controls to sensitive data. Review workflows respect data minimization and privacy policies by redacting personally identifiable information where possible, and by limiting the amount of contextual data exposed to reviewers consistent with legal and regulatory constraints. To improve efficiency, the review interface can present suggested labels generated by the bias-detection models and allow reviewers to accept, edit, or override suggestions; these interactions are used to compute reviewer agreement metrics and model calibration statistics.

Alternative embodiments include constrained human review budgets with prioritized queuing: the system uses confidence scores from the bias-detection modules to allocate human review resources to the highest-risk outputs, while outputs assessed as minimal risk are handled solely by automated mechanisms. In another variation, reviewer feedback is aggregated and used to produce synthetic training samples (S200) that exemplify corrected behavior; these synthetic samples are combined with real augmented multimodal data (S202) during retraining to improve generalization to edge cases identified by human reviewers. The human review workflow can be adapted to different modalities by providing modality-specific annotation tools and consistency schemas (S804) so that reviewers for image, audio, or text modalities apply appropriate evaluation criteria.

This human-in-the-loop approach enables continuous improvement of fairness and bias mitigation across the model lifecycle. By combining automated screening (S700), statistical bias detection (S600), sample reweighting and retraining with fairness constraints (S602, S604), and explicit human review and oversight tied to provenance and watermarking mechanisms (S704, S702), the system provides traceable, auditable, and actionable controls to detect, remediate, and prevent biased outputs.

In one embodiment wherein reweighting S602 uses adversarial debiasing, the dataset is annotated with one or more protected attributes a_i (for example, gender, race, age group) and is first analyzed under S600 to identify empirical disparities across the protected attributes using statistical tests such as differences in means, chi-square tests, disparate impact ratios, differences in true positive rates, false positive rates, or other task-specific fairness metrics. Upon detection of unacceptable disparity, the reweighting S602 module is configured to produce per-sample weights $w\_i$ that are learned via an adversarial learning process to reduce bias during subsequent model training and retraining S604.

In a representative implementation, the training set is represented as D={(x\_i, y\_i, a\_i)} where x\_i represents the multimodal input(s) (for example, embeddings produced in a shared space S302 or raw modality-specific features), y\_i represents the target label, and a\_i represents the protected attribute. A primary predictive model f\_$\theta$ (the predictor) produces outputs ŷ\_i=f\_$\theta$(x\_i) and internal representations r\_i (for example, the output of an intermediate layer or the fused embedding S306). A parametric weighting network g\_$\varphi$ receives as input either x\_i, r\_i, or both, and outputs a scalar score s\_i=g\_$\varphi$(x\_i, r\_i). Scores s\_i are converted to non-negative weights w\_i by a stabilizing normalization, for example:

W\_i=exp(s\_i/$\tau$)/2\_j exp(s\_j/$\tau$),

Where $\tau$ is a temperature parameter that controls the sharpness of the weight distribution; alternative normalizations such as applying a sigmoid followed by renormalization or clipping can be used. A regularizer R(w), for example an entropy penalty or an L2 constraint, can be applied to prevent extreme concentration of mass on a subset of examples.

Adversarial reweighting is realized as a min-max optimization. The weighting network g\_$\varphi$ is trained adversarially to identify and emphasize examples that exacerbate predictive disparity, while the predictor f\_$\theta$ is trained to minimize task loss under those adversarially selected weights. The optimization can be expressed as:

$$\text{Min}\_\theta \ \text{max}\_\varphi \ L\_\text{advrew}(\theta, \varphi) =$$
$$\text{min}\_\theta \ \text{max}\_\varphi \ \sum\_i \ w\_\varphi(x\_i, r\_i) \cdot L\_\text{task}(f\_\theta(x\_i), y\_i) +$$
$$\lambda \cdot R(w\_\varphi),$$

Subjectto $\Sigma\_i \ w\_i$=Nand $w\_i \geq 0$,

Where L\_task is a supervised loss (for example, cross-entropy for classification or mean-squared error for regression), $\lambda$ is a regularization coefficient, and N is the number of training examples (or another normalization constant). The inner maximization trains g\_$\varphi$ to place emphasis on samples or subpopulations that cause the largest weighted task loss, effectively approximating a worst-case or distributionally robust reweighting over groups defined by protected attributes. The outer minimization trains f\_$\theta$ to perform well under the worst-case weighting, thereby reducing sensitivity to spurious correlations and reducing disparity measured at S600.

An alternative adversarial architecture combines reweighting g\_$\varphi$ with an explicit adversary h\_$\psi$ that attempts to predict the protected attribute a\_i from representations r\_i. In this variant, the predictor and representation layers are trained to both minimize the weighted task loss and to maximize the adversary loss so that representations are invariant to protected attributes. The joint objectives can be written:

$$\text{Min}\_\theta \ \text{max}\_{\varphi, \psi} \ \sum\_i \ w\_\varphi(x\_i, r\_i) \cdot L\_\text{task}(f\_\theta(x\_i), y\_i) - \mu \cdot$$
$$L\_\text{adv}(h\_\psi)(r\_i), a\_i +$$
$$\lambda \cdot R(w\_\varphi),$$

WhereL\_adv is the adversary loss (for example, cross-entropy for protected attribute classification), u is a weighting factor that controls the strength of representation invariance, and the negative sign indicates adversarial pressure on $\theta$ to increase the adversary loss (or, equivalently, use of a gradient reversal layer during backpropagation). This combined approach leverages reweighting to shift emphasis to problematic samples and adversarial representation learning to remove attribute information from latent representations, providing complementary mechanisms toward fairness objectives S604.

Training proceeds by alternating optimization steps. For example, for each outer training iteration:

Hold θ fixed and perform k steps of gradient ascent on φ (and optionally ψ) to increase the weighted task loss (and adversary objectives if included), constrained by the chosen normalization and regularization; and To prevent pathological solutions (for example, concentrating weight on a few mislabeled or noisy examples), the reweighting mechanism includes one or more of the following: clipping weights to a predefined interval [w_min, w_max]; entropy regularization R(w)=−Σ_i w_i log w_i to encourage distributional spread; L2 penalties on g_φ parameters; or bounding the effect of weight updates per iteration. Data preprocessing and noise filtering S802 and S804 are applied prior to reweighting to remove or correct corrupted labels and outliers, thereby preventing adversarial emphasis from being misdirected toward noise.

Fairness metrics and loss constructions used in conjunction with S604 retraining can be directly integrated into the adversarial reweighting objective. For example, g_φ can be tasked with maximizing a measurable disparity metric D(•) (for example, D=|TPR_group0−TPR_group1|) rather than simply maximizing weighted task loss; this is achieved by defining the adversarial objective as max_φ D_w(θ, φ), where D_w measures disparity under weights w_φ. Alternatively, the adversary h_ψ can be trained to maximize protected-attribute classification accuracy, while the predictor is trained to minimize that accuracy concurrently with minimizing weighted task loss. In either case, the min-max process produces a predictor that is robust to adversarial emphasis on discriminatory examples and that complies with fairness constraints during subsequent S604 retraining.

The adversarial reweighting framework is modality-agnostic and can operate on modality-specific modules (S400) or on fused embeddings (S302, S306). In a multimodal pipeline, g_φ can accept concatenated modality-specific embeddings or attention-weighted fusion outputs; it can also be implemented as modality-specific weighting subnetworks whose outputs are combined to produce a final per-sample weight. The adversarial components can be co-located with the predictor on the same compute nodes or distributed across compute nodes in accordance with segmentation and dynamic allocation policies S100, S102. Training can leverage specialized hardware S1004 and quantization techniques S500 to reduce computational overhead.

During deployment and monitoring, the system inspects post-deployment outputs (S900) for residual or emergent disparities, triggers retraining S902 when drift or fairness regressions are detected, and employs the adversarial reweighting S602 process as part of automated retraining S604. Hyperparameters relevant to adversarial reweighting include the temperature τ for normalization, regularization coefficient λ, adversary weight μ, learning rates for g_φ and f_θ, clipping thresholds [w_min, w_max], and the schedule for alternating optimization; these are selected via automated hyperparameter search S404 and validated through periodic benchmarking S904. Variations include using multiple adversaries focusing on different protected attributes, group-wise reweighting constrained to known demographic strata, or incorporation of counterfactual augmentation S200 to generate underrepresented examples that g_φ prioritizes.

An automated bias detection subsystem S600 monitors datasets and model behavior to identify systematic disparities across defined demographic, contextual, or modality-dependent subgroups. The subsystem receives preprocessed data streams and labeling information from the preprocessing stage S800 and from training and inference logs generated by deployed models. The subsystem computes a suite of statistical measures for each candidate sensitive attribute or proxy attribute, including but not limited to distributional divergence metrics (for example, Kullback-Leibler divergence, Jensen-Shannon divergence), two-sample tests (for example, Kolmogorov-Smirnov tests), contingency analyses (for example, chi-square tests), mean and variance comparisons, and calibration and error-rate metrics (for example, false positive rate, false negative rate, precision, recall) across subgroups. For models that produce continuous-valued scores, the subsystem derives calibration curves and computes group-wise expected calibration error. For classification tasks, the subsystem computes per-group confusion matrices and derives disparity metrics (for example, difference and ratio measures of true positive rate, false positive rate, and selection rate).

Automated detection is driven by configurable policies that specify which attributes to evaluate, acceptable disparity thresholds, significance levels for statistical tests, and the cadence of analysis. Policies are defined in a declarative policy store and include both absolute and relative thresholds (for example, no more than a 5% absolute difference in false negative rate between any two demographic groups, or a maximum relative disparity ratio of 1.2). The subsystem applies multiple-hypothesis correction where appropriate and annotates statistical results with confidence intervals and p-values. When a metric crosses a configured threshold or a statistical test rejects a null hypothesis indicating distributional or performance disparity, the subsystem flags the event as a bias alert.

The automated pipeline integrates unsupervised and supervised techniques to discover candidate sensitive attributes. When explicit attribute labels are unavailable, the subsystem employs clustering of embeddings generated in a shared vector space S302 to identify latent subpopulations. For multimodal inputs S300, embeddings are computed for each modality and fused S306 prior to clustering or, alternatively, modality-specific clustering is performed and results are cross-referenced. The subsystem evaluates discovered clusters against outcome and error metrics to detect cluster-specific performance degradations or representation gaps.

Remediation actions are automated through configurable response policies that map detection outcomes to corrective procedures. For moderate representation imbalance, the system can automatically reweight samples S602 during training by adjusting sample weights inversely proportional to subgroup frequencies or to estimated error contributions. For labeling deficiencies, the system can trigger active learning S204 to select informative instances from underrepresented groups for human annotation, and generate synthetic samples S200 via generative models to augment scarce subpopulations. Data augmentation techniques S202 are applied selectively to preserve natural variation while increasing representation for specific subgroups.

For algorithmic mitigation, the subsystem supports automated retraining S604 with fairness-aware loss terms. The pipeline can insert constraint terms or regularizers (for example, demographic parity, equalized odds, or calibrated fairness penalties) into the loss function and execute progressive training schedules S402 to balance fairness objectives against accuracy. Hyperparameter optimization S404 can be invoked automatically to tune tradeoff parameters (for example, fairness regularization weights) subject to multi-objective criteria that include both performance and disparity metrics. Retraining is orchestrated across distributed compute nodes using resource allocation mechanisms S102 and segmented computation S100 for scalability.

The system maintains an evidence log for each detection event that includes the raw metrics, statistical test outputs, data slices used, model versions, and timestamps. The log facilitates explainability and supports human review workflows in which flagged events are presented with visualizations of subgroup distributions, calibration plots, and example inputs. Where automated remediation is performed without immediate human intervention, the system supports staged rollouts and shadow deployments to measure the effect of corrective actions on both overall performance and subgroup metrics prior to full deployment. Embedding provenance and metadata tracking (for example, tracing via S704) are maintained to ensure reproducibility of analyses and to support auditability.

Automated bias detection is integrated with output screening and content-level controls. For generative outputs, the subsystem screens output similarity to known works S700 to detect overfitting that could disproportionately affect subgroups. Detection alerts that remain unresolved escalate according to policy, requiring human-in-the-loop review before certain classes of outputs are released; in other cases, automated watermarking S702 and provenance embedding S704 are applied as mitigations to indicate source and variant generation provenance.

The subsystem is implemented as a set of modular services that expose APIs for ingestion of data slices, model telemetry, and configuration policies. Analysis jobs are scheduled and run asynchronously to avoid impacting inference latency, and are instrumented with scalable compute orchestration capable of allocating resources dynamically S102. For latency-sensitive checks, lightweight estimators and streaming approximations are executed in near real time and produce provisional alerts that are subsequently validated by more computationally intensive batch analyses. Results of bias detection and remediation are stored in a versioned registry to enable longitudinal benchmarking S904 and to support triggers for model retraining S902 and redeployment of compressed models S502 where appropriate.

In one embodiment the system further comprises mechanisms for providing personal data protection by applying differential privacy techniques at multiple stages of data processing, model training, inference, deployment and monitoring. Prior to training, during preprocessing S800 the system enforces modality-specific consistency schemas S804 and applies statistical analysis to detect and filter outliers and noise S802 while limiting per-user contribution and aggregating or discretizing sensitive fields to bound sensitivity. Where raw personal data are retained for transient processing, local differential privacy can be applied at the data collection point so that each user-contributed sample is perturbed on-device before it is transmitted to downstream components such as distributed compute nodes S100 or asynchronous batch processors S1000. In another approach, data are collected and aggregated in a trusted environment and central differential privacy mechanisms are applied during training.

During training, differential privacy is integrated into parameter update mechanisms. For gradient-based learning, this can be implemented via differentially private stochastic gradient descent (DP-SGD), in which per-sample gradients are clipped to a predetermined L2 norm bound C to limit sensitivity, noise sampled from a Gaussian mechanism with variance proportional to $C^2$ is added to the aggregate gradient, and the resulting noisy gradient is used to update modality-specific modules S400. Privacy accounting, for example via Rényi or moments accountant techniques, tracks the cumulative privacy loss $(\varepsilon, \delta)$ across training steps and across distributed computation segments S100 and dynamic resource allocations S102 so that automated hyperparameter search S404 and progressive training schedules S402 remain within an overall privacy budget. When training is performed in a distributed manner across multiple compute nodes S100, secure aggregation protocols and cryptographic primitives can be employed in combination with DP-SGD so that node-level updates are aggregated without exposing individual contributions; noise can be added either locally at each node (local DP) or centrally after aggregation (central DP) based on trust assumptions and performance trade-offs.

Differential privacy is applied to multimodal processing S300 by bounding per-modality sensitivity and calibrating noise insertion at appropriate representations. For example, embeddings generated in a shared vector space S302 are clipped and noised prior to storage or cross-modal fusion S306 to limit leakage of personal attributes. Temporal alignment outputs S304 and attention-based fusion weights S306 are privatized by adding calibrated noise to attention scores or by privatizing the selection functions used in fusion so as to prevent reconstruction of sensitive input sequences. When synthetic training data are generated S200 for augmenting scarce modalities, the generative models themselves are trained under differential privacy constraints so that synthetic samples do not inadvertently reproduce real private records; DP mechanisms in the generator or in the post-generation sampling step are tuned to balance fidelity and privacy.

Active learning pipelines S204 and data selection components are adapted to incorporate differential privacy by privatizing query selection metrics and limiting the number of queries per user or per account. For example, informativeness scores used to select instances for labeling can be computed in a differentially private manner (clipping and noising aggregate statistics) and combined with reweighting S602 operations so that label acquisition does not leak sensitive information. Data augmentation S202 operations that mix or transform real samples are performed after privacy-preserving transformations or on DP-sanitized datasets to maintain overall privacy guarantees.

Model compression and deployment stages are made privacy-aware. Pruning model parameters S104, quantizing model parameters S500, and compressing models for edge deployment S502 are performed on models trained under a differential privacy regime to avoid post hoc reconstruction attacks on compressed weights. In some embodiments, pruning criteria are applied to noisy, privacy-preserving gradients or to privacy-accounted importance scores to ensure that the act of pruning does not reintroduce privacy risks. For edge devices S502 and latency-sensitive inference architectures S1002, local differential privacy is used to perturb outputs or embeddings returned to servers, or secure aggregation of model updates is combined with DP mechanisms in federated update cycles, with model adaptation schedules governed by privacy budget considerations and by specialized hardware constraints S1004.

Monitoring, auditing, and lifecycle management integrate privacy accounting and enforcement. Output monitoring for distributional changes S900 includes tracking privacy expenditure alongside utility metrics; when drift is detected and retraining is triggered S902, the system consults the privacy ledger to determine available budget and to schedule retraining that meets privacy constraints. Periodic benchmarking S904 and reliability evaluations report both model performance and cumulative privacy loss so that decisions on model updates, rollback, or deletion are informed by both accuracy and privacy. Provenance metadata S704 and watermarking S702 are stored in a privacy-preserving manner and do not disclose raw personal information; metadata fields are sanitized or differentially privatized prior to external disclosure.

Privacy-sensitive components such as screening outputs for similarity with known works S700, watermark insertion S702, and tracking output provenance S704 are designed to minimize leakage and comply with personal data protection requirements. For example, perceptual hashes used in screening are constructed on DP-sanitized representations, and watermarking protocols avoid embedding identifiers that could expose original personal data. Data retention and data deletion operations are governed by per-subject contribution limits and privacy-preserving forgetting mechanisms; where full removal from all model parameters is infeasible, differential privacy and bounded contribution during training reduce the risk of memorization.

Automated hyperparameter search S404 is extended to include privacy-aware objectives and constraints: search spaces include clipping norm C, noise multiplier $\sigma$, sampling rate q, and target ($\epsilon$, $\delta$) values. Optimization balances utility metrics obtained via benchmarking S904 with privacy costs computed by the privacy accountant. Progressive training schedules S402 are configured to allocate larger privacy budgets to early coarse training phases and smaller budgets to fine-tuning phases, or, alternatively, reserve budget for later personalization steps that occur on-device under local DP. In embodiments that use active learning S204 or selective synthetic data generation S200, the system factors the privacy cost of label acquisition and generative sampling into selection heuristics to optimize sample efficiency under privacy constraints.

Implementation details include examples of noise calibration and accounting: using a Gaussian mechanism, noise standard deviation $\sigma$ is chosen in relation to the clipping norm C and target $\delta$ such that the per-step ($\epsilon$_step) satisfies theoretical bounds (for example, $\sigma \approx C*\mathrm{sqrt}(2\ \ln(1.25/\delta))/\epsilon$_step for single-step guarantees); composition over T steps is tracked via advanced composition or Rényi DP to yield overall ($\epsilon$_total, $\delta$_total). Per-user contribution is limited by subsampling and by enforcing a maximum number of contributed examples per subject; privacy amplification by subsampling is leveraged in distributed setups S100 and asynchronous batching S1000 to improve utility for a given privacy budget. Privacy accounting is stored in a tamper-evident privacy ledger and exposed to policy components that govern retraining triggers S902, model release decisions, and external reporting.

The system supports configuration in which differential privacy is applied selectively to the most sensitive modalities or to vectors and features identified as carrying personally-identifying information, while less-sensitive components are trained using traditional non-private techniques to preserve utility. In all cases the tradeoff between model accuracy and privacy is made explicit and controllable via hyperparameters, and the system provides tooling for administrators and auditors to evaluate privacy-utility tradeoffs, enforce legal privacy obligations, and ensure that outputs and deployed models conform to the personal data protection guarantees required by regulation or policy.

Model fairness is scored using equality metrics by computing, for each sensitive attribute and for each defined subgroup, one or more equality-oriented statistical measures and combining those measures into one or more composite fairness scores that are used to evaluate and control model behavior. Inputs received from at least two modalities S300 are processed to produce predicted labels or continuous predictive scores Y and, when available, ground truth labels Y. A sensitive attribute A is identified (for example, demographic attributes such as race, gender, age, or any attribute designated by policy); A can be categorical or continuous. For categorical A with values {a1, a2, . . . , aK}, subgroup-specific statistics such as $P(\hat{Y}=1|A=ai)$, true positive rate $TPR(ai)=P(\hat{Y}=1|Y=1, A=ai)$, false positive rate $FPR(ai)=P(\hat{Y}=1|Y=0, A=ai)$, positive predictive value $PPV(ai)=P(Y=1|\hat{Y}=1, A=ai)$, and calibration measures are computed from validation or hold-out data. For continuous A, binning or smoothing procedures are applied to produce comparable subgroup partitions prior to computing the same statistics, or continuous measures such as the correlation between A and residuals are computed.

Equality metrics explicitly computed include, but are not limited to: demographic parity difference $DPdiff=\max\_ai\ P(\hat{Y}=1|A=ai)-\min\_ai\ P(\hat{Y}=1|A=ai)$; disparate impact ratio $DIR=\min\_ai\ P(\hat{Y}=1|A=ai)/\max\_ai\ P(\hat{Y}=1|A=ai)$; equalized odds disparities measured as $\max\_ai,\max\_aj|TPR(ai)-TPR(aj)|$ and $\max\_ai,\max\_aj|FPR(ai)-FPR(aj)|$; equality of opportunity measured as $\max\_ai,\max\_aj|TPR(ai)-TPR(aj)|$ when focusing on true positive parity; predictive parity differences measured as $\max\_ai,\max\_aj|PPV(ai)-PPV(aj)|$; and calibration error measured per group as the expected absolute difference between predicted score and empirical outcome, $E[|\mathrm{score}-P(Y=1|\mathrm{score},A=ai)|]$. Where appropriate for multi-class outputs, these metrics are computed per target class and aggregated across classes with user-configurable weights.

Per-group confusion matrices are assembled to compute the aforementioned measures. Statistical significance and uncertainty estimates for each metric are obtained via bootstrapping or analytical variance formulas; confidence intervals are computed and used to flag groups with insufficient sample sizes for alternative handling. Hypothesis tests, such as two-proportion z-tests or chi-square tests, are applied to detect statistically significant differences among subgroups. These analyses, constituting bias detection and statistical analysis S600, produce numeric disparity values, p-values, and confidence bounds that inform downstream mitigation decisions.

A composite fairness score F_composite is constructed by normalizing each selected equality metric to a common scale and combining them via a weighted sum or worst-case aggregation. For example, for N selected metrics m1 . . . mN with observed disparities d1 . . . dN and normalization constants r1 . . . rN (where ri represent acceptable reference disparities), a normalized disparity vector $n\_i=\mathrm{clamp}(di/ri, 0,1)$ is computed and $F\_composite=1-\mathrm{sum}\_i(w\_i*n\_i)$ where w_i are metric weights summing to 1. Alternative aggregation strategies include $F\_min=\min\_i(1-n\_i)$ to emphasize worst-case subgroup performance or $F\_geometric=\mathrm{product}\_i(1-n\_i)$ to penalize multiple moderate disparities. Thresholds on F_composite or on individual normalized disparities are set to determine pass/fail or to trigger mitigation workflows.

When the fairness evaluation indicates unacceptable disparity according to configured thresholds, automated mitigation actions are initiated. One mitigation action comprises sample reweighting S602 where training samples are assigned weights w(x) to reduce measured disparities. Example reweighting schemes include inverse-probability weighting $w(x) \propto 1/P(A=ai)$ to equalize group prevalence, or optimization-based weighting where weights are chosen by solving a convex program that minimizes weighted disparity subject to constraints on effective sample size. Another mitigation action comprises retraining the model with fairness constraints S604 by augmenting the standard loss L_task with a fairness regularizer L_fair that penalizes disparity: L_total=L_task+λ*L_fair. L_fair can be instantiated as the squared normalized disparity for one or more equality metrics, e.g., L_fair=sum_i α_i*(di/ri)^2, where α_i are per-metric coefficients and λ is a tunable Lagrange multiplier. Constrained optimization approaches are also supported, where equality metrics are enforced as hard constraints using Lagrangian optimization and dual ascent during training to satisfy conditions such as |TPR(ai)-TPR (aj)|≤ε for all ai, aj.

Fairness scoring and mitigation are integrated into progressive, modular training schedules. In architectures divided into modality-specific modules S400, fairness scoring is applied at the per-modality level and across fused outputs. Embeddings generated in a shared vector space S302 and fused via attention mechanisms S306 are evaluated both at per-modality outputs and at the fused decision layer; fairness disparities observed at either level can trigger targeted interventions such as modality-specific reweighting, modality-specific retraining using progressive schedules S402, or adaptation of the fusion mechanism (for example, reweighting attention heads to reduce the disproportionate influence of modality-specific features correlated with sensitive attributes). Temporal alignment functions S304 and asynchronous batching S1000 are accounted for when constructing evaluation datasets to ensure comparisons among subgroups are temporally consistent.

Intersectional fairness is supported by evaluating equality metrics not only on single sensitive attributes but also on combinations of attributes (for example, A1×A2) to capture intersectional disparities. When attribute combinations exhibit substantial cardinality or are continuous, dimensionality reduction, clustering, or targeted sampling is used to identify meaningful intersectional groups prior to metric computation. If sample size constraints prevent reliable statistical estimation for a particular intersectional cell, rules direct the system to either aggregate adjacent cells or trigger targeted data collection via data augmentation (S202) or synthetic sample generation (S200).

Calibration and score-based fairness are incorporated into scoring routines when models produce continuous probability outputs. Group-wise calibration curves and Brier scores are computed; calibration disparities are translated into calibration penalty terms for inclusion in L_fair. If calibration differences are the primary source of disparity, postprocessing techniques such as group-wise score recalibration or threshold adjustment are applied as corrective steps that preserve model utility while improving equality metrics.

All fairness computations are logged with provenance metadata S704 identifying the dataset snapshot, model version, evaluation code, and hyperparameters so that fairness scores are reproducible and auditable. Where required, screening outputs for similarity with known works S700 and watermarking S702 are performed in parallel but do not interfere with fairness scoring pipelines. Periodic benchmarking S904 includes fairness metrics among standard reliability checks, and automated hyperparameter search S404 can include fairness score optimization objectives to identify Pareto-optimal trade-offs between task accuracy and fairness.

Implementation details include scalable computation of per-group statistics using distributed processing framework S100 that partitions evaluation data across compute nodes; dynamic resource allocation S102 to accommodate bursty monitoring loads; and pruning or quantization S104, S500 applied to deployed models S502 only after verifying that fairness metrics remain within acceptable bounds following compression. The fairness scoring module exposes configuration parameters including the set of equality metrics to compute, subgroup definitions, normalization constants ri, metric weights w_i, threshold values for triggering S602/S604/S902, and procedures for handling groups with limited sample counts; these parameters are stored with the model configuration and can be varied by jurisdiction or policy.

The system further comprises publishing a fairness report that documents detected fairness concerns, remedial actions taken, and metrics demonstrating the effect of those actions. In embodiments where bias is detected by statistical analysis (S600), the system generates a machine-readable and human-readable fairness report that includes a summary of the statistical tests applied, the p-values and effect sizes observed, the sensitive attributes and groups analyzed, the distribution of labels across groups, and visualizations such as group-wise confusion matrices and calibration plots. The fairness report also records preprocessing steps (S800) and outlier filtering (S802) applied to the data used in the analysis, and references any synthetic samples (S200) or augmented data (S202) used to support privacy-preserving disclosure or to demonstrate robustness of fairness measurements.

The fairness report enumerates mitigation steps that were applied in response to bias detection, including sample reweighting or resampling strategies (S602), constrained retraining procedures (S604), and any modifications to model architecture or training schedules (S400, S402). For each mitigation, the report specifies the exact algorithmic parameters used (for example the reweighting function, constraint weighting in the loss, number of retraining epochs), the date and model version at which the mitigation was applied, and before-and-after performance and fairness metrics (e.g., demographic parity difference, equalized odds, disparate impact ratio, group-specific false positive and false negative rates). Where automated hyperparameter search (S404) is employed to select mitigation parameters, the report records the search space and the selected settings.

The fairness report includes a provenance section that links the reported findings to the specific dataset partitions, model checkpoints, and inference logs used in evaluation. Provenance metadata is embedded or linked using secure identifiers so that evaluations can be reproduced; in some embodiments the provenance is recorded using embedded metadata or auditable logs (S704). To protect sensitive or proprietary information, published fairness reports are redacted or aggregated and employ privacy-preserving techniques such as differential privacy or disclosure limitation; when full raw data cannot be disclosed, the report indicates which summaries are derived from synthetic data (S200) or from aggregation procedures.

Publication of the fairness report can be triggered by one or more conditions: on-demand after a manual audit, periodically as part of routine benchmarking (S904), immediately following detection of distributional changes or drift (S900) that are accompanied by detected fairness degradation, or automatically after a mitigation cycle completes (for example after reweighting (S602) and retraining (S604)). The report format supports both push and pull distribution: it can be published to an internal compliance portal, transmitted to designated stakeholders via secure channels, or published to external registries or public dashboards where regulator or public visibility is required. The system supports multiple file formats (e.g., JSON for machine-readability, PDF for reports, and images for plots) and can include digital signatures or other integrity protections for the published artifacts.

Where models are deployed to edge devices (S502) or executed using memory-efficient inference architectures (S504, S1002), the fairness report includes deployment-specific analyses, such as per-device or per-region performance disparities and the impact of quantization (S500) on fairness metrics. The report ties each fairness finding to the corresponding deployed model version and to any compression or optimization steps (S500, S1004) that affect behavior, and it recommends deployment remediation such as selective rollback, constrained update schedules, or edge-specific recalibration.

The fairness report further documents governance actions and recommendations: prioritized remediation steps, acceptance criteria for re-deployment, monitoring thresholds to be added to runtime monitoring (S900), and suggested data collection strategies to improve representation. Where active learning (S204) is used to select new labeled data, the report can propose targeted acquisition strategies aimed at under-represented groups and include estimates of sample sizes required to achieve specified fairness improvements. The report also records who performed or authorized each mitigation, the timestamps of operations, and links to audit logs to support accountability.

In alternative embodiments the fairness report is machine-actionable: metadata fields in the report are consumed by automated pipelines that instantiate reweighting (S602), schedule retraining (S604), or adjust inference routing to reduced-latency or more conservative model variants (S1002) pending remediation. The system supports configurable publishing policies that define the audience, content granularity, frequency, and retention period for fairness reports, enabling compliance with legal, regulatory, or internal governance requirements while minimizing exposure of proprietary information.

In one embodiment, model outputs are routed, after inference, to a bias detection module (S600) that evaluates generated content against one or more bias metrics. The bias detection module (S600) receives an output instance together with any available contextual metadata, including inferred or explicit protected attribute indicators, provenance metadata (S704), and temporal identifiers. The module computes statistical measures such as differences in class-conditional output rates, demographic parity deltas, equalized odds deviations, and distributional divergences (e.g., KL divergence or Jensen-Shannon divergence) between the current output distribution and a reference distribution derived from a held-out, validated corpus. The monitoring module (S900) or benchmarking procedures (S904) update the reference distribution periodically. Where direct attribute annotations are unavailable, the module can employ auxiliary attribute inference models to estimate attribute distributions and associated uncertainty, and propagate that uncertainty into the bias metrics.

Compares each computed metric to one or more configurable relevance thresholds. Thresholds can be absolute values, statistical significance levels (e.g., p-values), or dynamic bounds computed using sliding-window baselines that account for temporal drift as detected by monitoring components (S900). If one or more metrics exceed their associated thresholds, the module flags the corresponding output as potentially biased. Flagging is performed with graded severity labels (e.g., minor/moderate/severe) based on the magnitude of the metric exceedance and on contextual constraints such as the target domain, regulatory requirements, or user preferences. All flagging decisions and their supporting metrics are recorded in provenance metadata (S704) to enable auditability.

Upon detection of potential bias, the system applies one or more filtering actions according to a policy rule set. Filtering actions include (i) suppressing the output from delivery, (ii) substituting the output with an alternative generated by a constrained or conditioned generation routine, (iii) annotating the output with a warning or explanatory metadata for downstream consumers, (iv) routing the output to a human reviewer or moderator workflow, and (v) applying post-hoc corrective transformations such as neutralization or paraphrasing algorithms. Policy selection can be deterministic or mediated by a policy-ranking model that balances latency constraints (S1002), user-specified tolerances, and the cost of human review. When suppression or substitution is applied, the system records the rationale and the corrective action in provenance metadata (S704).

The bias detection and filtering pipeline is integrated across multiple deployment contexts. In reduced-latency edge deployments, a lightweight bias detector variant is configured to run on-device to perform coarse-grained checks and apply immediate, minimal-cost filtering actions (e.g., annotating or suppressing outputs), while deferring comprehensive statistical analysis to upstream servers. In cloud or increased-throughput settings, the bias detection module (S600) can leverage batched analysis and more computationally intensive tests, and coordinate with distributed compute management (S100) to scale processing. When compressed models are deployed to constrained hardware (S502, S504), the system can offload detailed bias analysis and heavier corrective generation to remote services while maintaining a minimal on-device filter for essential safety checks.

Implementation-specific embodiments detail how thresholds and decision rules are configured and updated. Thresholds are tuned via automated hyperparameter search (S404) using historical labeled instances of biased and non-biased outputs to optimize trade-offs between false positive and false negative filtering. The system supports multiple operating modes including conservative (favoring suppression), permissive (favoring delivery with annotation), and human-in-the-loop (favoring review) modes, selectable per application or user. Continuous monitoring (S900) collects aggregate statistics on the frequency and types of flagged outputs, enabling automated adjustment of thresholds and policies based on observed drift, new use-cases, or changes in regulatory guidance.

To enable interpretability and compliance, the bias detector provides explainability artifacts with each filtering decision. These artifacts include the computed metrics, confidence intervals, the rule or model that produced the decision, and provenance identifiers linking the output to its training data and model version (S704). The system also inserts machine-readable watermarks or labels into generated media (S702) that indicate the content was filtered or modified for fairness reasons and facilitate downstream auditing and tracking.

In certain embodiments, filtering is combined with screening against external knowledge or reference sets (S700) to detect stereotype propagation or harmful similarity to known problematic examples. For example, perceptual hashing or embedding similarity comparisons can identify outputs that reproduce sensitive stereotypes present in previously flagged content; such matches can increase the severity score and trigger stronger filtering or human review.

The integrated filtering workflow supports audit logs and reporting for compliance, research, and improvement purposes.

The system permits customization of bias detector behavior according to legal, cultural, or application-specific norms. Administrators can specify protected classes, acceptable disparity tolerances, and remediation preferences. The bias detector module supports extensible detectors, including statistical tests, learned fairness classifiers, and domain-specific rule sets, allowing the system to evolve as new definitions of fairness emerge. All such customizations are versioned and recorded in the provenance store (S704) to ensure traceability of the filtering behavior over time.

The systems and methods described herein further comprise stakeholder feedback integration. In one embodiment, stakeholder feedback integration accepts explicit and implicit feedback from one or more stakeholders, such as end users, domain experts, content owners, regulators, and system operators. Explicit feedback includes labeled corrections, annotations, quality scores, preferences, content removal requests, and structured survey responses. Implicit feedback includes usage signals such as selection, dwell time, click-through rates, and downstream corrective actions. Feedback is captured via user interfaces, application programming interfaces, and telemetry collection agents, and is associated with corresponding multimodal inputs, generated outputs, and contextual metadata using embedded provenance tags (S704). Captured feedback is stored in a feedback repository that is indexed and versioned for traceability and auditability, and the associated metadata contains timestamping, stakeholder identity or pseudonym, confidence or trust score, and applicable regulatory or contractual constraints.

Feedback data is preprocessed (S800) to remove personally identifying information where required and to perform sanitization for safety and privacy, including application of anonymization, differential privacy mechanisms, and encryption at rest and in transit. Preprocessing further comprises filtering out noise and outlier feedback (S802) based on statistical consistency checks, minimum engagement thresholds, and automated heuristics. Validated feedback items are validated against modality-specific consistency schemas (S804) to ensure that labels, annotations, or preference indications conform to expected formats and ontologies. A feedback quality score is computed for each item using statistical metrics and historical stakeholder reliability, and this score is stored alongside the feedback record.

Feedback is transformed into representations that can be incorporated into model training and evaluation pipelines. For multimodal systems, feedback items are embedded into a shared latent representation (S302) using modality-specific encoders; textual comments are token-embedded, audio comments are converted to speech embeddings, and image annotations are encoded as spatial feature maps, with the resultant feedback embeddings mapped into the same vector space as input and output embeddings. Feedback embeddings are synchronized temporally when relevant (S304) and fused with input and output embeddings using attention mechanisms (S306) to produce joint feedback-aware representations. These fused representations are used to augment training samples or to condition inference in downstream model executions.

Stakeholder feedback integration supports both automated and human-in-the-loop update pathways. In an automated pathway, feedback is used to generate candidate training samples via generative augmentation techniques (S200) and to extend the active learning loop (S204), whereby the system selects the most informative instances for labeling or re-labeling. Selection criteria incorporate feedback quality scores, model uncertainty, and representational coverage to prioritize items that most reduce model error or bias. Samples prioritized by the active learning process are routed to human annotators or domain experts for verification before inclusion in training datasets.

In a human-in-the-loop pathway, feedback that is either of substantial impact or whose confidence is uncertain triggers review by designated stakeholders, who confirm, modify, or reject suggested changes. Review outcomes are recorded and propagated back into the feedback repository. The system supports conflict-resolution workflows in which contradictory feedback from different stakeholders is reconciled using weighting schemes that account for stakeholder roles, expertise levels, contractual rights (e.g., content-owner takedown requests), and regulatory obligations. Weighting is applied either by reweighting samples (S602) or by imposing constraints within the loss function during retraining (S604), enabling the model to honor prioritized stakeholder directives while preserving overall performance.

Stakeholder feedback integration is tightly coupled with monitoring and maintenance processes. Continuous monitoring for distributional changes (S900) incorporates stakeholder feedback signals as indicators of drift or failure modes; a surge in negative feedback or a pattern of similar corrections can trigger model retraining (S902), targeted evaluation, or rollback. Periodic benchmarking (S904) includes human-provided evaluation sets derived from stakeholder feedback to assess real-world performance and to validate that stakeholder concerns have been addressed. Retraining schedules are progressive and staged to minimize disruption, with progressive rollout strategies tested in held-out validation environments before full deployment.

Integration with fairness and bias mitigation mechanisms is provided such that feedback from under-represented or protected stakeholder groups is detected and amplified to correct representational imbalances. Feedback-driven reweighting (S602) and retraining with fairness constraints (S604) are applied when statistical analyses (S600) indicate systemic bias or when stakeholders explicitly flag fairness concerns. The system maintains an auditable trail of bias detection findings, corrective actions taken, and outcomes of subsequent benchmarking to demonstrate compliance with governance policies.

Stakeholder feedback integration informs deployment and inference planning. When models are deployed to edge devices (S502) or executed with memory-efficient architectures (S504), feedback-driven updates are packaged as incremental model deltas, quantized parameters (S500), or lightweight fine-tuning modules that can be distributed with minimal bandwidth and compute overhead. For asynchronous processing scenarios (S1000), feedback ingestion, validation, and training-update cycles are decoupled from real-time inference to prevent latency impacts; inference architectures optimized for reduced latency (S1002) are chosen so runtime responsiveness is preserved while feedback-driven model improvements are staged for offline or controlled release.

System orchestration dynamically allocates compute and storage resources (S102) to support feedback processing workloads, including compute-intensive tasks such as embedding generation, attention-based fusion (S306), and large-batch retraining. Model segmentation across distributed nodes (S100) enables parallel processing of feedback data and retraining workloads, and specialized hardware accelerators (S1004) are utilized when available to accelerate feedback incorporation cycles. Pruning (S104) and quantization (S500) strategies are applied after retraining to reduce model size for deployment, and validation ensures that feedback-driven corrections are preserved.

Security, provenance, and intellectual property considerations are addressed by screening outputs for similarity with known works (S700) and by embedding provenance metadata (S704) to record which stakeholder feedback influenced a particular model output or behavior. Digital watermarks and controlled disclosure mechanisms (S702) are employed to indicate when outputs have been altered as a result of stakeholder feedback or to enforce contractual obligations. Access control and logging ensure only authorized stakeholders can submit, view, or act on feedback items, and cryptographic signatures are used to authenticate stakeholder inputs that require strong assurance.

Multiple modes of feedback aggregation and prioritization are provided, including batch aggregation in which feedback is accumulated over a collection period prior to processing, and stream aggregation in which urgent feedback items are processed immediately. Thresholds and gating rules determine when accumulated feedback is sufficient to trigger retraining or policy modifications, reducing oscillatory adjustments while enabling timely responses to significant stakeholder concerns. The system includes configurable governance policies that define stakeholder categories, trust levels, mandatory handling procedures for safety or legal notices, and escalation paths for unresolved disputes.

Illustrative examples include a content generation platform that receives copyright owner takedown notices and uses stakeholder feedback integration to remove or modify model outputs and to retrain with respect to flagged samples; a clinical decision support system where expert clinician corrections are incorporated through active learning and progressive training schedules (S402) to improve diagnostic accuracy while maintaining auditable records; and a consumer-facing recommendation system that uses implicit engagement signals and explicit user ratings to rebalance representations and retrain models on an accelerated schedule when significant shifts in preferences are observed.

Stakeholder feedback integration is implemented via modular software components exposing APIs for ingestion, validation, embedding, fusion, storage, and governance. Modularization divides the model into modality-specific modules (S400), routing feedback relevant to a given modality to the corresponding module for targeted updates. Automated hyperparameter search (S404) is invoked to tune learning rates and update strategies in response to feedback-driven training cycles, and benchmarking (S904) verifies that updates meet performance, fairness, and reliability targets prior to production rollout.

One implementation provides systems and methods for detecting and mitigating bias in training data and trained models by applying fairness constraints that are based on legal standards. In one embodiment, multimodal inputs are received (S300) and undergo preprocessing (S800), including normalization, feature extraction, and modality-specific validation (S804). Outlier detection and noise filtering (S802) are applied to remove corrupted or anomalous samples prior to downstream fairness analysis (S600). If the dataset lacks adequate representation for legally protected groups identified from applicable statutes, regulations, or case law, synthetic samples are generated (S200) and data augmentation techniques are applied to real multimodal datasets (S202) to increase representation of underrepresented cohorts. Active learning (S204) is employed to select the most informative instances for manual labeling, with selection criteria biased toward reducing representation gaps for groups implicated by legal standards.

Is performed by computing statistical measures over the preprocessed data and model outputs. Suitable statistical tests include, without limitation: group-wise comparisons of outcome rates (e.g., proportions, means), chi-squared tests for categorical outcomes, t-tests or ANOVA for continuous outcomes, Kolmogorov-Smirnov tests for distributional differences, bootstrap confidence intervals for disparity estimates, and computation of domain-specific metrics such as disparate impact, average odds difference, equal opportunity difference, and predictive parity. Thresholds for these metrics are mapped to legal standards; for example, in jurisdictions where the "four-fifths" or 80% rule is applied to disparate impact assessments, a constraint is defined such that the ratio of favorable outcome rates for any protected group to a reference group does not fall below 0.8. The system is configured so that such mappings are editable to reflect jurisdiction-specific legal standards and include statutory citations, regulatory guidance, or authoritative case law references that indicate required thresholds or accepted metrics. Thus, fairness constraints are based on legal standards and are programmatically translated to numerical constraints used in training and evaluation.

Fairness constraints are based on legal standards in that the selection of protected attributes, the choice of fairness metrics, and the numeric thresholds $\varepsilon\_j$ are derived from jurisdictional legal requirements and authoritative guidance. For example, a jurisdiction that defines protected characteristics to include race, national origin, and gender results in those attributes being extracted or inferred (subject to allowable data collection practices), used to segment datasets, and included in group-wise tests. For jurisdictions that prescribe specific statistical tests, the system implements those tests and maps their outputs to pass/fail criteria. For jurisdictions that use more qualitative standards, the system translates qualitative requirements into conservative quantitative constraints and documents the translation method for regulatory review.

The system supports multiple practical techniques to achieve fairness constraints derived from legal standards. These include: augmentation of underrepresented groups via S200 and S202 so that training data reflect required population mixes; domain adversarial debiasing where an adversary attempts to predict protected attributes and the main network is trained to minimize such predictability subject to task performance; post-processing adjustments of outputs to equalize acceptance rates across groups (where legally permissible); and calibrated score adjustments constrained by legal thresholds. All techniques are logged with provenance metadata (S704) indicating the source of changes, the legal rationale for selected thresholds, and versioning information for audit.

Monitoring and lifecycle management ensure ongoing compliance. After deployment, outputs are monitored for distributional changes (S900). If drift or emergent disparities are detected relative to previously established legal thresholds, triggers (S902) initiate investigation, data collection, or retraining. Periodic benchmarking (S904) evaluates reliability, accuracy, and fairness metrics; benchmarks are compared to the legally grounded constraints and historical baselines. Retraining workflows integrate newly labeled data, potentially selected by active learning (S204) to target regions where fairness violations are likeliest, and reapply the reweighting and constrained optimization procedures.

The detailed design affords configurability so legal teams and compliance officers can specify, per jurisdiction, the mapping from legal standards to enforceable constraints. A compliance module accepts inputs identifying applicable laws and regulatory guidance, maps these to protected attributes and numerical thresholds, and produces a constraints specification consumed by the training and monitoring subsystems. The module records the mapping rationale, evidentiary references, and decision history to create an auditable trail. Where legal standards change, the compliance module allows updating of constraint specifications and reinitiates evaluation and retraining processes.

Example parameterizations include: selecting disparate impact ratio as the primary fairness metric with a legally mandated minimum ratio of 0.8; defining L_fairness as the squared difference between group positive prediction rates and the overall positive rate; setting $\lambda$ via cross-validation to achieve no more than a specified drop in overall accuracy while meeting the fairness constraint; and using inverse-propensity weighting with clipping to avoid extreme sample weights. These parameterizations are illustrative; actual values, metrics, and methods are set according to the specific legal standard(s) applicable to the deployment.

All steps, including preprocessing (S800, S802, S804), bias detection (S600), reweighting (S602), retraining with fairness constraints based on legal standards (S604), and ongoing monitoring (S900, S902, S904), are configured to produce documentation sufficient for regulatory compliance reviews. The documentation includes data lineage, fairness metric calculations, selected thresholds with legal citations, training logs showing optimization histories, and evaluation reports demonstrating adherence to the legal-based constraints.

The system further comprises output balancing by demographic distribution. This output-balancing function operates as a post-processing and/or in-training mechanism that adjusts model outputs to satisfy one or more demographic distributional criteria. In one approach, group-specific calibration functions are applied to raw model scores to align the distribution of predicted labels with a target demographic distribution derived from population priors, validated datasets, or stakeholder-defined policies. In another approach, the model training objective is augmented with a constrained optimization term that penalizes deviations of the output distribution across demographic groups from a target distribution; the penalty weight and constraint parameters are selected via automated hyperparameter search S404. Implementation of output balancing includes applying per-group scaling factors, learned monotonic score transformations, or adaptive thresholds that equalize positive prediction rates across demographic groups, with such transformations regularized to preserve ranking within groups and to minimize impact on overall accuracy.

Output balancing by demographic distribution can be executed as a real-time module in the inference pipeline or as an offline calibration stage. In a real-time embodiment, fused embeddings and model logits are forwarded to an output-balancing module that maintains demographic population models and dynamically adjusts outputs based on observed demographic attributes or demographically inferred proxies. For privacy-preserving implementations, demographic attributes can be represented as anonymized metadata S704 or inferred with differential privacy techniques; demographic-aware adjustments are computed using aggregated statistics rather than individual-level attributes. When demographic attributes are unavailable or unreliable, the system can utilize provenance metadata S704 and screening outputs S700 to detect correlations between generated outputs and known works or demographic indicators, and then apply distributional balancing using inferred groupings subject to statistical confidence thresholds computed by S600.

During training, output balancing is integrated through sample reweighting S602 and a fairness-constrained loss S604 so that the learned model inherently produces outputs closer to the desired demographic distribution, reducing the magnitude of post-hoc adjustments. Progressive training schedules S402 introduce balancing constraints gradually: first optimizing for accuracy on the fused embeddings, then progressively enforcing distributional parity constraints to avoid catastrophic drops in performance. Automated hyperparameter search S404 tunes progressive schedule parameters, regularization strengths for balancing penalties, and per-group calibration function complexity. When synthetic augmentation S200 is used to increase representation for a demographic group, the balancing module tracks synthetic-to-real sample ratios and applies weighting to prevent overfitting to synthetic characteristics.

For edge deployment, model compression techniques such as parameter quantization S500 and memory-efficient architectures S504 are applied, and the resulting compressed models are deployed to edge devices S502. Output balancing by demographic distribution can be performed locally on edge devices using lightweight calibration tables or remotely as part of a hybrid architecture to preserve rapid responses S1002 and to utilize specialized hardware S1004 when necessary. In asynchronous batch processing scenarios S1000, output balancing can operate on batches to compute aggregated demographic statistics and apply group-level corrections while maintaining throughput.

The system records provenance metadata S704 for each output, including the demographic balancing adjustments applied, parameter versions, and the dataset statistics used to derive target distributions. This provenance information supports auditing, screening for similarity with known works S700, and post-deployment analysis. The balancing module exposes tunable parameters for stakeholders to specify target distributions, allowable trade-offs between fairness and accuracy, and acceptable confidence intervals for demographic inference. Implementation variations include reserved balancing modes that enforce strict demographic parity, modes that prioritize equal opportunity, and modes that minimize disparate impact while preserving calibration. The detailed mechanisms described above can be combined, reordered, or substituted with equivalent means without departing from the inventive concept, including alternative statistical tests for bias detection S600, alternative regularization schemes in fairness-constrained retraining S604, and alternative calibration methods for per-group score adjustment.

The system detects bias in datasets using statistical analysis (S600) and, in response to identified imbalances, reweights samples to balance representation using class rebalancing (S602). In one embodiment, bias detection (S600) comprises computing per-class frequency distributions across one or more modalities and one or more label ontologies, estimating deviation from a target distribution (for example, a uniform distribution or a deployment-specific prior), and flagging classes whose observed frequency differs from the target distribution by more than a predefined threshold. The class rebalancing reweighting (S602) applies a weight $w\_c$ to each training sample whose class label is c, the weight being a function of class frequency $N\_c$ and total number of samples $N\_total$. In one form, the weight is set inversely proportional to class frequency; for example, $w\_c=N\_total/(C*N\_c)$, where C is the number of classes. Alternative weight schedules include square-root inverse frequency $\omega\_c=sqrt(N\_total/(C*N\_c))$ to reduce variance introduced by extreme weights, or effective-number weighting $w\_c=(1-beta)/(1-beta^{N\_c})$, where beta is a hyperparameter close to but less than 1, selected to control the degree of rebalancing.

Can be applied at different granularities. In one implementation, weights are computed globally on the entire training corpus once prior to training and stored as a class-to-weight map. In another implementation, class weights are computed per epoch or per training iteration to accommodate streaming data or incremental dataset updates detected during preprocessing (S800). Per-batch rebalancing computes weights using the empirical distribution within each minibatch and rescales sample contributions to the batch-loss, such that for a minibatch B the loss contribution of sample i with class $c\_i$ is multiplied by $w\_{c\_i}$. Where multiple label hierarchies exist, hierarchical class rebalancing can assign weights at different levels of the hierarchy and combine them multiplicatively or via a convex combination.

When multimodal inputs are processed (S300), class rebalancing can be applied in a modality-aware manner. The system maintains separate class frequency estimates and corresponding weights per modality, and computes a composite weight for a multimodal training instance by combining modality-specific weights (for example by taking the maximum, the product, or a weighted sum). Alternatively, the rebalancing module conditions weights on modality presence vectors so that rare class occurrences in a particular modality receive additional emphasis during training. Where modalities exhibit differing label noise characteristics or label sparsity, class rebalancing can be coupled with modality-dependent confidence scaling to account for noise and to avoid overemphasizing noisy labels.

Is compatible with and can be combined with other imbalance mitigation techniques. Oversampling of minority classes, undersampling of majority classes, and synthetic sample generation using generative models (S200) can be employed in concert with reweighting to achieve a desired effective class distribution. For example, generated samples for underrepresented classes can be assigned the class rebalancing weight but reduced by a generation-confidence factor to reflect potential distributional shift introduced by synthetic data. Data augmentation techniques (S202) can be selectively applied more aggressively to minority class examples to increase their effective representation while maintaining class rebalancing weights.

The reweighting module supports dynamic adjustment. A scheduler can modulate the strength of class rebalancing as training progresses: initially applying stronger weighting to accelerate minority-class learning and then annealing weights toward uniformity to stabilize convergence. The system can automatically tune the beta parameter for effective-number weighting or the annealing schedule via automated hyperparameter search (S404). Validation metrics monitored during training, including class-wise precision, recall, F1, and fairness metrics such as demographic parity or equal opportunity, guide adjustments to the reweighting parameters.

Implementation considerations include numerical stability and gradient variance. Extremely large class weights can increase gradient variance and destabilize training; to mitigate this, the system clips weights to a maximum w_max or normalizes weights to have mean 1 within each batch. Weight-smoothing techniques, such as mixing class weights with uniform weights via a parameter alpha (for example $w'\_c=alpha*w\_c+(1-alpha)*1$), are supported. Logging and explainability components record applied weights and their impact on per-class losses over time to facilitate auditing and provenance tracking (S704). Optionally, the system can expose class-rebalancing parameters and per-class statistics through an API to enable downstream operators to tune behavior for specific deployment constraints, including latency-sensitive inference architectures (S1002) and edge deployments (S502).

The similarity-screening module maintains an indexed repository of known works that includes perceptual hash tables, embedding indexes (for example, approximate nearest neighbor indexes such as HNSW), and metadata records identifying copyright owners, license terms, and exemplar representatives. Comparison is performed by computing a distance or similarity metric between the generated output's fingerprint(s) and entries in the repository. In some embodiments the system computes one or more of Hamming distance for binary perceptual hashes, cosine similarity for dense embeddings, or normalized edit distance for text; similarity thresholds are set or configurable per modality or per use case. For example, a pHash Hamming distance threshold is configurable within a range of 0 to 64 bits, with one or more exemplary thresholds at or below 10 bits for strong matches; cosine similarity thresholds are configurable within the range 0.5 to 0.99 with exemplary match detection at or above 0.9. Matches that meet or exceed the respective threshold are flagged as potential copyright conflicts. The module also supports ensemble decision logic that combines results from multiple fingerprint types and weights them to reduce false positives or false negatives.

When a generated output is not flagged by the similarity-screening module as closely similar to a known work, or when any flagged match is resolved in favor of permissible use, the output proceeds to a watermarking module to insert persistent provenance information (S702). The watermarking module supports multiple techniques that differ in robustness, visibility, and payload capacity. For visual media, the module applies robust invisible watermarks using transform-domain embedding (e.g., DCT- or DWT-based methods), spread-spectrum approaches, or neural-network-based watermark encoders that alter latent representations before final rendering. For audio, the module applies inaudible spread-spectrum watermarking, phase coding, or echo hiding. For text, the module inserts subtle paraphrasing tokens, non-semantic zero-width Unicode markers, or syntactic watermark sequences designed to survive downstream transformations. The watermark payload can include a unique output identifier, model identifier, model version, timestamp, and an integrity signature.

To ensure integrity, the watermark payload is cryptographically protected prior to embedding. In one embodiment the system computes a cryptographic signature or message authentication code (MAC) over the payload using a private key or secret key stored in a secure key management service; the signature and payload are then encoded with forward error correction (for example, Reed-Solomon) to tolerate distortion and embedded using the selected watermarking algorithm. Embedding strength and redundancy parameters are configurable to balance fidelity and robustness; exemplary embedding energy values and redundancy rates are selected based on empirical robustness tests across expected channel distortions (e.g., compression, resizing, re-encoding). The watermarking module also supports insertion of visible or semi-visible watermarks where required by policy or rights-holder preference, with configurable opacity, placement, and content.

Upon watermark insertion, the system writes a provenance record and embeds machine-readable metadata into the output as well (S704). For image and video outputs, the system writes metadata using standardized containers or metadata schemas such as XMP, EXIF, or container-level metadata tracks; for audio, the system writes ID3, RIFF INFO, or other applicable metadata tags; for documents or structured textual outputs, the system attaches accompanying sidecar metadata in JSON-LD following W3C PROV or schema.org conventions. The metadata record includes at least one persistent identifier for the output, the watermark payload identifier, the generating model identifier and version, a timestamp, a digest of the output (for example, SHA-2 or SHA-3), and a pointer to the rights and licensing record or to the rights repository index entry. When privacy constraints exist, the system encrypts the metadata; access to decrypted metadata is gated by authentication and authorization checks.

The provenance record is persisted in one or more durable stores that support audit and verification processes. Embodiments include persisting provenance records in centralized relational or NoSQL stores, append-only logs, or distributed ledgers to provide immutability and non-repudiation. Each persisted record references the embedded watermark identifier and includes the cryptographic signature used during embedding so that a verifier can extract the embedded payload from an output and validate the signature against the public key or verification credential. The verification process includes extraction of the watermark payload from a suspect output, decoding and error-correction, validation of the cryptographic signature, comparison of the embedded digest to a newly computed digest of the candidate output, and lookup of the persisted record to confirm the mapping between watermark identifier and provenance metadata.

The system further implements policy-driven actions based on the results of the similarity-screening and provenance checks. If the similarity-screening module flags an output as likely derived from a known copyrighted work, predefined responses include halting distribution, presenting licensing options, prompting for human review, reducing fidelity for downstream release, or annotating the output with a rights-warning. If an output passes similarity screening but lacks a valid watermark or provenance record when one is expected by policy, the output can be quarantined, re-processed to embed missing provenance, or subjected to additional scrutiny. All policy-driven actions are logged to provide an auditable trail linking detection events, decisions, notifications to end users or rights-holders, and any remediation steps taken.

To minimize false positives and enable scaling, the pipeline supports active learning and threshold tuning. Matches are triaged by a machine-learning classifier trained on prior true-positive and false-positive detections to predict whether an automated block should be applied or human review is required. The corpus of known works is continuously updated via automated ingestion of rights-holder registries, crawler results, and user-submitted exemplar works, and the similarity index is incrementally reindexed to support near-real-time detection. The watermarking and metadata insertion modules expose application programming interfaces that integrate with inference services so watermarking and recording occur automatically as part of the generation workflow.

Multiple alternative embodiments are contemplated. In one embodiment, metadata and watermark identifiers are stored only off-line, with reference pointers embedded in outputs to protect user privacy. In another embodiment, the system is implemented in distributed form with watermarking performed at the edge and provenance records synchronized to a central store. The modules are implemented in hardware, firmware, or software and executed on general-purpose processors, GPUs, or specialized accelerators. The disclosed techniques enable configurable trade-offs among detection sensitivity, embedding robustness, data privacy, and computational cost while providing verifiable, auditable copyright compliance for generative multimodal outputs (S700, S702, S704).

In one embodiment, perceptual hashing for screening outputs for similarity with known works S700 is implemented using a discrete cosine transform (DCT)-based perceptual hash. Visual media to be screened are first normalized by conversion to a luminance representation (e.g., conversion from RGB to Y or equivalent grayscale), and then resized to a fixed resolution NxN (commonly 32x32 or another selected size) to remove fine-scale detail and standardize scale. A two-dimensional DCT is computed over the NxN block to produce frequency-domain coefficients. A submatrix comprising the lowest-frequency coefficients (for example the top-left 8x8 block or another selected MxM region, excluding or including the DC coefficient depending on the embodiment) is extracted to capture the perceptual content while discarding fine-scale noise. The extracted coefficients are then optionally quantized and transformed into a one-dimensional coefficient vector in a fixed, predetermined order.

A robust binary fingerprint is generated by applying a thresholding operation to the coefficient vector. In one implementation, the median (or mean) of the selected coefficients is computed and each coefficient is compared to that median: coefficients with values greater than the median are mapped to a logic "1," and coefficients less than or equal to the median are mapped to a logic "0," producing a fixed-length bitstring(the perceptual hash). Alternative thresholding schemes (e.g., adaptive thresholds, quantization bins, signed-magnitude encoding) can be employed to adjust sensitivity to particular transformations. The resulting perceptual hash is stored in a hash repository together with metadata identifying the corresponding known work S704 and additional provenance information.

For video content, the DCT-based perceptual hashing is applied to one or more key frames extracted according to a frame-selection policy (uniform sampling, scene-change detection, or content-aware selection). Frame-level hashes are aggregated into a video-level signature by concatenation, by taking a majority or median bit per bit-position across sampled frames, or by constructing an ordered sequence of frame hashes indexed to their temporal positions. For audio content, a similar approach is applied after transforming the audio into a time-localized Fourier representation (e.g., STFT) or a mel-spectrogram and applying an appropriate one- or two-dimensional DCT (or a modified DCT such as MDCT) to spectro-temporal blocks; spectro-temporal coefficients corresponding to the smallest frequency components are selected and thresholded to produce a fixed-length audio perceptual hash. Multimodal outputs are represented by modality-specific DCT-based hashes, which can be compared independently to modality-specific repositories or concatenated and compared using a composite similarity metric.

To enable scalable search, the repository of known-work hashes is indexed using techniques suitable for binary vectors, including locality-sensitive hashing, binary tree indices, bitset-based acceleration, or hardware-accelerated bitwise operations. For large repositories, approximate nearest-neighbor search or multi-stage filtering (coarse filter followed by exact Hamming comparison) is employed to reduce computational cost.

To reduce false matches arising from near-duplicate or benign transformations, a multi-tiered decision process can be implemented. An initial DCT-based perceptual hash comparison (S700) yields candidate matches; for candidates within a relaxed threshold, a secondary, higher-fidelity comparison is performed using more discriminative features (e.g., larger coefficient windows, cross-correlation of DCT coefficient patterns, or content-aware feature matching). If a match is confirmed beyond a stricter threshold, downstream actions are triggered such as inserting digital watermarks (S702), logging and storing provenance metadata (S704), alerting human reviewers, or applying licensing or blocking policies. Matches that do not meet confirmation criteria can be recorded for feedback into active learning (S204) or for updating the known-work repository.

The perceptual hashing pipeline is designed for integration with the broader system. Hash computation can be performed as part of preprocessing S800 or in a dedicated screening stage. For throughput optimization, the DCT computations and thresholding operations are parallelizable across compute nodes and can be distributed in accordance with segmented computation strategies S100 and dynamic resource allocation S102. For latency-sensitive deployments, perceptual hashing can run on specialized hardware S1004 or be optimized into reduced-latency inference architectures S1002. To preserve privacy and protect repository contents, hashes stored in the repository can be salted, encrypted, or transformed with a cryptographic hash prior to storage; salted or cryptographically transformed fingerprints enable secure comparisons without revealing underlying content while still allowing equality or near-equality assessments through controlled protocols.

Configuration and maintenance of the DCT-based perceptual hashing subsystem include procedures for selecting parameter defaults; for reweighting or re-indexing repository entries to correct for dataset bias (S600-S604); and for retraining or recalibrating thresholds using curated validation sets. Periodic evaluation (S904) measures detection recall and precision across benchmark datasets and, when distributional changes are detected (S900), retraining or parameter adjustment is triggered (S902). The system is extensible to additional or alternative frequency-domain transforms and can combine DCT-based hashes with other perceptual hashing algorithms to improve coverage across varied transformations and content types.

In one embodiment, the system further comprises maintaining an up-to-date database of copyrighted works configured to support automated screening, provenance tracking, and rights management for generated and ingested content. For each copyrighted work the database stores one or more content fingerprints (including perceptual hashes for images and audio, robust video fingerprints, and cryptographic hashes for exact-match detection), modality-specific embeddings generated in a shared vector space (S302) to enable semantic similarity searches, and human- and machine-readable metadata including author/owner identifiers, registration and publication dates, license terms, rights-holder contact information, jurisdictional information, and provenance records (S704). The database is organized to permit both exact-match and near-duplicate detection operations, supporting queries that combine fast hash-lookup for confident matches (S700) with approximate nearest-neighbor search over embeddings for paraphrase or derivative detection.

Content ingestion to the database is performed by an automated pipeline that collects candidate copyrighted works from multiple sources, including publisher feeds, copyright office registries, content distribution platforms, contributor uploads, and web crawlers. Incoming items are preprocessed (S800) to extract modality-specific features, to normalize formats, to validate the presence and integrity of metadata (S804), and to generate perceptual and cryptographic fingerprints. Where multiple modalities are present (S300), the ingestion pipeline generates and stores modality-specific fingerprints and cross-modal embeddings so that later similarity checks can be performed across text, audio, image and video modalities. The ingestion pipeline applies outlier detection and noise filtering (S802) to identify corrupted or malformed files and to route such items to human review or to quarantine.

Updates to the database are applied incrementally and continuously to ensure records remain up-to-date. Update sources include scheduled synchronization with publisher and registry feeds, push notifications from registered providers, automated recrawling of priority domains, manual curator inputs, and event-driven feeds such as DMCA takedown notices and registration updates. A versioning system records each change to a work's record, including timestamps and the source of the update, enabling rollback and auditing of changes. The update orchestration is distributed across compute nodes and leverages segmented model computation and distributed storage (S100) with dynamic resource allocation (S102) so that ingestion throughput scales with workload and so that fingerprinting and embedding computations are parallelized while maintaining consistency of the index.

To support reduced-latency similarity checks performed during generation and screening, the database maintains both an offline archival store and one or more online indices optimized for fast lookup. Exact-match indices employ hashed keys and inverted indexes for rapid retrieval. Embedding indices leverage approximate nearest neighbor libraries (for example FAISS or HNSW) and are sharded and replicated to enable distributed query processing. The online indices are periodically rebuilt or incrementally updated to incorporate new embeddings using background processes that prune obsolete entries and entries with limited relevance according to configurable retention and relevance thresholds (S104). Edge deployments can cache compact subsets of the database or receive compressed indices to facilitate local inference with reduced round-trip time (S502, S1002, S1004), and the system supports on-demand streaming of index updates to such caches.

Provenance and rights management are integrated into the database so that when a match is detected during screening the system can retrieve the full rights profile for the matched work, including licensing terms, contact points, and permitted uses. Provenance records (S704) are cryptographically timestamped and chained to enable later verification of when and how a particular record was used in screening or generation decisions. Where required, the system can insert watermarks or metadata into generated media (S702) to carry provenance information forward, and can record any remediation actions taken (for example redaction, suppression, or attribution insertion).

Quality control and legal compliance are supported by machine-assisted and human-in-the-loop workflows. Statistical analysis tools detect systematic gaps or biases in the copyright database (S600), for example under-representation of works from particular jurisdictions or creators; corrective actions include targeted ingestion campaigns, reweighting of samples for downstream model training (S602), and retraining of models with fairness constraints (S604). A review and appeals process enables rights-holders to submit corrections or to contest matches; submitted corrections are validated and incorporated through prescribed verification steps that maintain an audit trail.

Operational maintenance of the database is performed by an orchestration layer that continuously monitors index health and matching performance metrics (S900), triggers reindexing and model retraining when distributional drift is detected (S902), and evaluates reliability through benchmarking and scheduled testing (S904). The orchestration layer also enforces access control and privacy-preserving practices: content that is restricted by contract or law can be stored in encrypted partitions with restricted query capabilities, and queries against sensitive records can be mediated by policy checks and logging.

The database is exposed to other system components through APIs that support synchronous and asynchronous queries. At generation time the content-generation pipeline queries the database to screen candidate outputs prior to release; during training the pipeline consults the database to exclude copyrighted works from training sets or to tag training examples with rights metadata (S200, S202). The database also supports batch export and reporting functions for compliance audits and for feeding downstream systems that perform watermarking (S702), provenance embedding (S704), or deployment of filtered models to edge devices (S502).

In embodiments, the inserted digital watermarks (S702) are configured to be invisible during normal viewing so they do not produce perceptible artifacts to a typical human observer under customary viewing conditions for the content type. Invisible watermarks are embedded and parameterized so that, when rendered by standard display or playback pipelines, the watermark signal remains below perceptual thresholds defined by one or more objective and subjective metrics. Objective thresholds can include peak signal-to-noise ratio (PSNR) values typically above 35-45 dB depending on modality and compression expectations, structural similarity index (SSIM) values that remain within a tight delta (for example >0.95) of the unwatermarked content, and measured differences in perceptual models such as VMAF or LPIPS below preconfigured deltas. Subjective thresholds can be established using mean opinion score (MOS) studies in which the watermarked and unwatermarked media are indistinguishable to a panel of human evaluators at the chosen confidence level. The system can store and apply these thresholds as validation constraints during watermark insertion (S702) and as acceptance criteria during automated screening (S700).

Watermarks can be embedded in multiple domains to achieve invisibility while maintaining detectability and robustness. For visual imagery and video, embedding methods include spatial-domain techniques that alter luminance or chrominance components under local just-noticeable-difference (JND) thresholds, frequency-domain methods that modify mid-frequency transform coefficients (for example DCT or wavelet bands) where changes are less perceptible yet robust to typical compression, and latent-space methods that inject imperceptible perturbations into intermediate generator representations when synthetic samples are produced (S200). For audio, embedding occurs in frequency bands masked by dominant signals according to psychoacoustic masking models, or by modifying phase or minimal-energy components under audibility thresholds. For text, invisible watermarking includes insertion of invisible Unicode characters (e.g., zero-width joiners) in contexts where they do not alter rendering under normal viewing, or subtle probabilistic token-selection strategies within a language model's generation process that preserve human-readability and fluency while encoding information retrievable by a secret decoder. For multimodal outputs (S300), coordinated watermark payloads can be distributed across modalities so that the combined watermark is more robust while each modality's embedding remains imperceptible individually.

Detection and verification routines are designed to reveal the invisible watermark reliably while minimally exposing the watermark to adversarial removal. Non-blind detectors that require the original content can compute difference signals and apply matched filters or correlation tests against the expected pseudorandom patterns. Blind detectors that do not require the original use the keyed decoding process to extract the payload from degraded or transformed content. Detection sensitivity is tuned so that normal viewing and consumer processing do not provoke false positives or false negatives; thresholds are set based on empirical calibration using datasets augmented with the same transformations expected in deployment (S202) and benchmarked via periodic reliability evaluations (S904): Screening outputs for similarity with known works using perceptual hashing (S700) can be combined with watermark detection to confirm provenance while avoiding reliance on a single verification channel.

To preserve invisibility under real-world conditions, the watermark insertion subsystem performs pre-insertion simulations of common distributional changes and validates that the perceptual metrics remain within acceptable bounds after those simulated transformations. These simulations include common image and video operations (e.g., JPEG re-encoding at targeted quality factors, chroma subsampling, scaling), audio transcoding and resampling, and format-specific rendering pipelines. If the simulated post-processing would cause the watermark to become perceptible, the embedding parameters are adjusted-either by reducing local amplitude and increasing redundancy or by selecting alternate embedding domains that trade off visibility and robustness.

The invisibility requirement is enforced at multiple stages of a deployment pipeline. During content creation and generation (S200), an automated quality check performs both automated perceptual metric evaluation and optional human-in-the-loop MOS sampling for new watermark templates. During model deployment to downstream systems and edge devices (S502, S1004), the inserted watermarks are validated to remain invisible on target hardware and display configurations; hardware acceleration and specialized execution (S1004) can incorporate per-device calibration profiles to account for color gamuts, display gamma, audio playback chains, and other factors that affect perceptual rendering. The system can maintain device-specific embedding presets to ensure invisibility under the viewing conditions associated with those devices.

Alternative embodiments emphasize different invisibility strategies according to use case constraints. A robustness-focused embodiment distributes watermark energy across multiple bands and accepts a marginal, yet typically imperceptible, reduction in objective image fidelity to resist aggressive tampering. An ultra-invisibility embodiment minimizes any objective change by employing strongly redundant, reduced-amplitude encodings that carry smaller payloads while better preserving perceptual indistinguishability. The system supports configurable trade-offs so that operators can select settings appropriate for ownership assertion, content tracking, liability tracing, or content moderation workflows (S704, S900).

Security and anti-removal measures are incorporated to prevent casual or automated attempts to detect and remove invisible watermarks. The system periodically rotates embedding keys, changes embedding patterns, and obfuscates detection algorithms to limit exposure. Adversarial robustness testing, including simulated attack pipelines such as noise addition, geometric distortions, and learned removal networks, is performed to quantify the probability that an attacker can remove the watermark without producing visible artifacts. Results of such testing are used to adjust embedding redundancy, error-correcting strength, and pattern randomness.

The invention claimed is:

1. A method for running a multimodal generative artificial intelligence (AI) model, the method comprising:

transforming model parameters of a trained multimodal generative AI network from floating-point precision to selected bit-depth representations including 16-bit, 8-bit or 4-bit integers, wherein quantization preserves semantic features across text, image, video, audio, or sensor modalities to reduce memory footprint and computational complexity;

packaging quantized model parameters and a network architecture into a pruned deployment bundle;

retraining the pruned model and updating the relevance threshold by continuously collecting telemetry including layer-level flop counts, parameter sparsity patterns, communication volumes, and end-to-end iteration latency, supplying said telemetry to a learning-based or heuristic optimizer to maintain model sparsity and accuracy over successive pruning iterations;

transmitting said bundle to one or more edge devices, wherein model compatibility and runtime configuration for heterogeneous device hardware are validated prior to installation; and conducting AI inference operations on deployed edge devices with the bundle having modular neural network layers, on-device caching of intermediate results, and batched or streaming inference, wherein inference on multimodal inputs is completed without exceeding predetermined device memory or compute constraints while maintaining generative accuracy.

2. The method of claim 1, comprising enhancing data quality and consistency by:

receiving a dataset comprising inputs from two or more modalities, including at least text, image, audio, or video data, and applying modality-specific preprocessing operations selected from normalization, resizing of images or videos, tokenization, and spectral filtering to convert each raw input into a machine-processable format;

analyzing the preprocessed data for statistical outliers and noise artifacts by calculating summary statistics for each modality, applying denoising algorithms and removing or correcting data samples that fall outside modality-specific quality thresholds or contain missing, corrupted, or anomalous features; and evaluating each modality's cleaned input data against a schema tailored to the expected format and distribution for the modality, such that validation rules enforce conformity to required structures); and, excluding data points that fail schema validation to ensure only compliant samples are propagated to downstream training routines.

3. The method of claim 1, comprising reducing memory-efficient architecture transformer layers size less than a floating-point precision transformer layers size.

4. The method of claim 1, further comprising distilling the model from the deployment bundle prior to deployment.

5. The method of claim 1, wherein the AI inference operations are performed asynchronously.

6. The method of claim 1, comprising quantizing weights and activations.

7. The method of claim 1, further comprising caching inputs.

8. The method of claim 1, wherein bundle compression is performed using principal component analysis.

9. The method of claim 1, further comprising fallback to cloud-based inference if edge capacity is exceeded.

10. The method of claim 1, comprising setting quantization parameters based on modality type.

11. The method of claim 1, comprising distilling knowledge from a teacher model into the memory-efficient architecture.

12. The method of claim 1, further comprising dynamic loading of model modules based on task.

13. The method of claim 1, comprising:

evaluating the importance of model parameters using a relevance metric selected from parameter magnitude, activation statistics, or contribution to output accuracy, and removing or zeroing model parameters falling below a predefined relevance threshold during or after a training process, wherein a pruning comprises both structured pruning by removing neurons, filters, or layers and unstructured pruning by removing individual weights.

14. The method of claim 1, comprising segmenting a neural network model computation into multiple partitions, each partition assigned to a distinct compute node within a distributed computing environment, wherein the segmentation is performed based on layer structure, data modality, or computational demand.

15. A method, comprising:

segmenting a neural network model computation into multiple partitions, each partition assigned to a distinct compute node within a distributed computing environment, wherein the segmentation is performed based on layer structure, data modality, or computational demand;

monitoring real-time workload characteristics at each compute node, and allocating computational resources including processor cores, memory, and network bandwidth to each compute node in response to detected changes in training workload during model training for optimizing throughput and resource utilization;

evaluating the importance of model parameters using a relevance metric selected from parameter magnitude, activation statistics, or contribution to output accuracy, and removing or zeroing model parameters falling below a predefined relevance threshold during or after a training process, wherein a pruning comprises both structured pruning by removing neurons, filters, or layers and unstructured pruning by removing individual weights; and retraining the pruned model for a plurality of epochs to recover performance degraded by parameter removal, and updating the relevance threshold in subsequent pruning iterations to balance model sparsity and accuracy, further comprising continuously collecting telemetry including layer-level flop counts, parameter sparsity patterns, communication volumes, and end-to-end iteration latency, supplying said telemetry to a learning-based or heuristic optimizer, and pruning schedules to maintain model sparsity and accuracy over successive pruning iterations.

16. The method of claim 15, wherein segmenting the neural network model computation into multiple partitions comprises partitioning a model graph into subgraphs that are mapped to individual compute nodes or groups of nodes using layer-wise partitioning, operator-wise partitioning, or tensor-slicing, and assigning memory-bound operators to nodes with larger memory capacity and compute-bound operators to nodes with greater accelerator capability so as to balance load and minimize cross-node data transfer within the distributed computing environment.

17. The method of claim 15, wherein monitoring real-time workload characteristics at each compute node and allocating computational resources includes tracking per-node metrics comprising compute utilization, memory usage, queue lengths, and network traffic using a runtime monitor, and adjusting autoscaling policies to instantiate or retire nodes, migrate tasks, or rescale resource shares based on queue depth, latency targets, or cost constraints while maintaining stable operation of the distributed training workload.

18. The method of claim 15, wherein allocating computational resources further comprises coordinating with an orchestration layer configured to allocate GPUs and host resources via a cluster scheduler, place workloads on heterogeneous GPU types selected according to tensor-core availability or memory capacity, and apply backpressure, deadline-aware admission control, and task prioritization so that latency targets and throughput objectives for the model training are satisfied.

19. The method of claim 15, wherein evaluating the importance of model parameters using the relevance metric and removing or zeroing parameters falling below the predefined relevance threshold is performed in pruning rounds scheduled after a burn-in training phase, each pruning round followed by fine-tuning the model for a plurality of epochs to recover accuracy, and wherein the relevance threshold is progressively tightened or determined via automated hyperparameter search to trade off model size, throughput, and accuracy.

20. The method of claim 15, wherein the pruning comprises representing pruned parameters in a sparse format, encoding the sparse parameters using compressed representations, and communicating sparsified tensors across compute nodes using sparse all-reduce protocols so as to reduce memory footprint, network bandwidth consumption, and inter-node transfer overhead in the distributed computing environment.

* * * * *